US012137317B2

(12) United States Patent
Zhang et al.

(10) Patent No.: US 12,137,317 B2
(45) Date of Patent: Nov. 5, 2024

(54) LOUDSPEAKER DEVICE

(71) Applicant: SHENZHEN SHOKZ CO., LTD., Guangdong (CN)

(72) Inventors: Lei Zhang, Shenzhen (CN); Yongjian Li, Shenzhen (CN); Wenbing Zhou, Shenzhen (CN); Jinbo Zheng, Shenzhen (CN); Zhuyang Jiang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 206 days.

(21) Appl. No.: 18/052,944

(22) Filed: Nov. 7, 2022

(65) Prior Publication Data

US 2023/0082066 A1 Mar. 16, 2023

Related U.S. Application Data

(63) Continuation of application No. 17/445,602, filed on Aug. 22, 2021, now Pat. No. 11,659,318, which is a (Continued)

(30) Foreign Application Priority Data

Jan. 5, 2019 (CN) ......................... 201910009909.6

(51) Int. Cl.
*H04R 1/10* (2006.01)
*H04R 1/06* (2006.01)

(Continued)

(52) U.S. Cl.
CPC ............. *H04R 1/1075* (2013.01); *H04R 1/06* (2013.01); *H04R 1/1016* (2013.01); *H04R 1/105* (2013.01);

(Continued)

(58) Field of Classification Search
CPC ...... H04R 1/1075; H04R 1/06; H04R 1/1016; H04R 1/105; H04R 1/1066; H04R 1/1091;

(Continued)

(56) References Cited

U.S. PATENT DOCUMENTS

2009/0185699 A1 7/2009 Kim
2011/0317845 A1 12/2011 Yuan et al.

(Continued)

FOREIGN PATENT DOCUMENTS

CN 104581484 A 4/2015
CN 107454492 A 12/2017

(Continued)

OTHER PUBLICATIONS

International Search Report in PCT/CN2019/102388 mailed on Nov. 25, 2019, 6 pages.

(Continued)

*Primary Examiner* — Tuan D Nguyen
(74) *Attorney, Agent, or Firm* — METIS IP LLC

(57) ABSTRACT

A loudspeaker device may include a speaker component, a circuit housing configured to accommodate a control circuit, and a key module disposed on the core housing. The speaker component may include an earphone core and a core housing for accommodating the earphone core. The control circuit may drive the earphone core to vibrate to generate a sound, and the vibration of the earphone core may include at least two resonance peaks. The key module may include a key and an elastic bearing for supporting the key. The elastic bearing may include an integrally formed bearing body and a support column.

20 Claims, 37 Drawing Sheets

Related U.S. Application Data continuation of application No. 17/172,096, filed on Feb. 10, 2021, now Pat. No. 11,109,142, which is a continuation of application No. PCT/CN2019/102388, filed on Aug. 24, 2019.

(51) Int. Cl.

| | |
|---|---|
| ***H04R 5/033*** | (2006.01) |
| ***H04R 9/02*** | (2006.01) |
| ***H04R 9/06*** | (2006.01) |

(52) U.S. Cl.

CPC ......... *H04R 1/1066* (2013.01); *H04R 1/1091* (2013.01); *H04R 5/0335* (2013.01); *H04R 9/02* (2013.01); *H04R 9/06* (2013.01); *H04R 1/1041* (2013.01); *H04R 2201/109* (2013.01); *H04R 2420/07* (2013.01); *H04R 2460/13* (2013.01)

(58) Field of Classification Search

CPC .......... H04R 5/0335; H04R 9/02; H04R 9/06; H04R 1/1041; H04R 2201/109; H04R 2420/07; H04R 2460/13; H04R 1/1008

See application file for complete search history.

(56) References Cited

U.S. PATENT DOCUMENTS

| | | | |
|---|---|---|---|
| 2016/0246076 | A1 | 8/2016 | Wei |
| 2017/0006400 | A1 | 1/2017 | Robertson et al. |
| 2017/0087364 | A1 | 3/2017 | Cartledge et al. |
| 2018/0063626 | A1 | 3/2018 | Pong et al. |
| 2019/0082266 | A1 | 3/2019 | Qi et al. |
| 2022/0303665 | A1 | 9/2022 | Zhang et al. |

FOREIGN PATENT DOCUMENTS

| | | | |
|---|---|---|---|
| CN | 107493532 | A | 12/2017 |
| CN | 109495809 | A | 3/2019 |
| WO | 0137524 | A1 | 5/2001 |

OTHER PUBLICATIONS

Written Opinion in PCT/CN2019/102388 mailed on Nov. 25, 2019, 8 pages.

LOUDSPEAKER DEVICE

CROSS-REFERENCE TO RELATED APPLICATIONS

This application is a continuation of U.S. application Ser. No. 17/445,602, filed on Aug. 22, 2021, which is a continuation of U.S. application Ser. No. 17/172,096, filed on Feb. 10, 2021, now U.S. Pat. No. 11,109,142, issued Aug. 31, 2021, which is a continuation of International Application No. PCT/CN2019/102388, filed on Aug. 24, 2019, which claims priority of Chinese Patent Application No. 201910009909.6, filed on Jan. 5, 2019, the entire contents of each of which are hereby incorporated by reference.

TECHNICAL FIELD

The disclosure generally relates to the field of loudspeaker devices, and more particularly relates to a key module of a loudspeaker device.

BACKGROUND

At present, a speaker component of a loudspeaker device is provided with a key module and an auxiliary key module to facilitate users to perform corresponding functions. Users can realize corresponding functions through the key module and the auxiliary key module, such as pausing/playing music and answering calls. However, the settings of the key module and the auxiliary key module do not consider their impact on the working state of the speaker component. For example, the key module may reduce the volume generated by the speaker component to a certain extent.

SUMMARY

The present disclosure provides a loudspeaker device. The loudspeaker device includes a support connector configured to be in contact with a head and at least one speaker component. The at least one speaker component may include an earphone core and a core housing for accommodating the earphone core. The core housing may be fixedly connected to the support connector. The core housing may be provided with at least one key module. The support connector may accommodate a control circuit or a battery which drive the earphone core to vibrate to produce sound.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 118 is another longitudinal sectional view illustrating a loudspeaker device according to some embodiments of the present disclosure;

FIG. 119 is a further longitudinal sectional view illustrating a loudspeaker device according to some embodiments of the present disclosure;

FIG. 120 is a further longitudinal sectional view illustrating a loudspeaker device according to some embodiments of the present disclosure;

FIG. 121 is a longitudinal sectional view illustrating a housing according to some embodiments of the present disclosure;

FIG. 122 is a structural diagram and an application scenario of a loudspeaker device according to some embodiments of the present disclosure;

FIG. 123 is a schematic diagram illustrating a direction of an included angle according to some embodiments of the present disclosure;

FIG. 124 is a structural diagram of a loudspeaker device acting on human skin and bones according to some embodiments of the present disclosure;

FIG. 125 is a diagram illustrating an angle-relative displacement relationship of a loudspeaker device according to some embodiments of the present disclosure;

FIG. 126 is a schematic diagram illustrating frequency response curves of a loudspeaker device in a low-frequency part correspond to different angles θ according to some embodiments in the present disclosure; and FIG. 127 is a schematic diagram illustrating transmitting a sound through air conduction according to some embodiments of the present disclosure.

DETAILED DESCRIPTION

Figure 1:
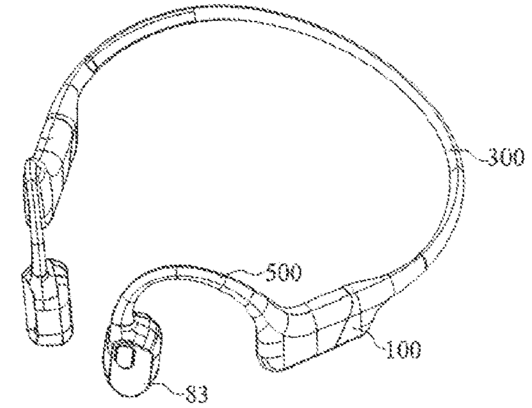
FIG. 1 is a schematic diagram illustrating an exemplary loudspeaker device according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment;" the term "another embodiment" means "at least one other embodiment." Related definitions of other terms will be given in the description below. In the following, without loss of generality, the "loudspeaker device" or "speaker" may be used when illustrating related technologies of conduction in the present disclosure. The illustration is only a form of conductive application. For those skilled in the art, "loudspeaker device" or "speaker" may also be replaced with other similar words, such as "sound producing device," "hearing aid," "sound raising device," or the like. In fact, various implementations in the present disclosure may be easily applied to other hearing devices belonging to non-speaker component. For example, for those skilled in the art, after understanding the basic principles of loudspeaker device, it may be possible to make various modifications and changes in the form and details of the specific methods and operations of implementing loudspeaker device without departing from the principles. In particular, an environmental sound collection and processing function may be added to the loudspeaker device to enable the loudspeaker device to implement the function of a hearing aid. For example, a microphone may collect environmental sounds of a user/wearer, process the sounds using a certain algorithm and transmit the processed sound (or generated electrical signal) to a speaker. That is, the loudspeaker device may be modified to include the function of collecting the environmental sounds, and after a certain signal processing, the sound may be transmitted to the user/wearer via the speaker module. As an example, the algorithm mentioned herein may include noise cancellation, automatic gain control, acoustic feedback suppression, wide dynamic range compression, active environment recognition, active noise reduction, directional processing, tinnitus processing, multi-channel wide dynamic range compression, active howling suppression, volume control, or the like, or any combination thereof.

Figure 2:
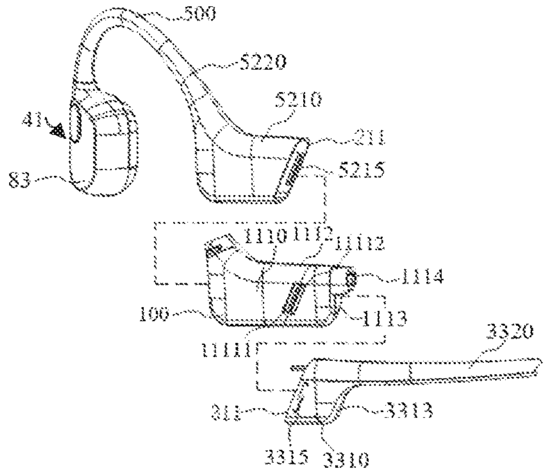
FIG. 2 is an exploded view of a partial structure of an exemplary loudspeaker device according to some embodiments of the present disclosure.
Figure 3:
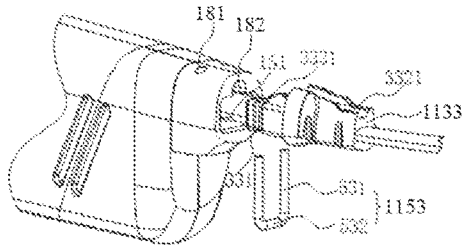
FIG. 3 is an exploded view of a partial structure of an exemplary loudspeaker device according to some embodiments of the present disclosure.
Figure 4:
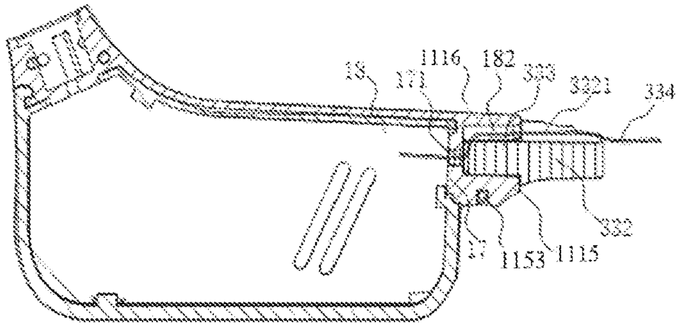
FIG. 4 is a cross-sectional view of a partial structure of an exemplary loudspeaker device according to some embodiments of the present disclosure.

FIG. 1 is a schematic diagram of an exemplary loudspeaker device according to some embodiments of the present disclosure. FIG. 2 is an exploded view of a partial structure of an exemplary loudspeaker device according to some embodiments of the present disclosure. FIG. 3 is an exploded view of apartial structure of an exemplary loudspeaker device according to some embodiments of the present disclosure. FIG. 4 is a cross-sectional view of a partial structure of an exemplary loudspeaker device according to some embodiments of the present disclosure. Referring to FIG. 1 to FIG. 4, in some embodiments, a loudspeaker device may include a device based on a headphone, an MP3, or other devices with speaker function. In some embodiments, the loudspeaker device may include a circuit housing 100, an ear hook 500, a rear hook 300, a speaker component 83, a control circuit, a battery, and the like. The circuit housing 100 may be used for accommodating the control circuit or the battery. The speaker component 83 may include a core housing 41. The core housing 41 may be operably connected to the ear hook 500 and used for accommodating an earphone core 42. The number (or count) of the circuit housing 100 and/or the number (or the count) of the ear hook 500 may be two, respectively corresponding to the left and right sides of a user. The core housing 41 and the circuit housing 100 may be respectively disposed at two ends of the ear hook 500. The rear hook 300 may be disposed at an end of the circuit housing 100 away from the ear hook 500.

As shown in FIG. 2, the ear hook 500 may be injection molded with a first housing sheath 5210. In some embodiments, the ear hook 500 may include a first elastic metal wire for supporting the shape of the ear hook 500. An ear hook sheath 5220 may be injection-molded on the periphery of the first elastic metal wire. The ear hook sheath 5220 may form, at the connection between the ear hook 500 and the circuit housing 100, the first housing sheath 5210 that is integrally formed with the ear hook sheath 5220. In some embodiments, the first housing sheath 5210 may be located on the side of the ear hook sheath 5220 facing the circuit housing 100.

In some embodiments, a second housing sheath 3310 may be injection molded on the rear hook 300. In some embodiments, the rear hook 300 may include a second elastic metal wire for supporting the shape of the rear hook 300, and a rear hook sheath 3320 injection molded around the second elastic metal wire. The rear hook sheath 3320 may form, at the connection of the rear hook 300 and the circuit housing 100, the second housing sheath 3310 that is integrally formed with the rear hook sheath 3320. In some embodiments, the second housing sheath 3310 may be located on the side of the rear hook sheath 3320 facing the circuit housing 100.

It should be pointed out that the first housing sheath 5210 and the ear hook sheath 5220, and the second housing sheath 3310 and the rear hook sheath 3320 may all be made of soft materials with certain elasticity, such as soft silicone, rubber, etc., to provide a better touch for users to wear.

In some embodiments, the circuit housing 100, the first housing sheath 5210, and the second housing sheath 3310 may be formed separately, so that the shape of the inner side wall of the first housing sheath 5210 matches the shape of at least a portion of the outer side wall of the circuit housing 100 near the ear hook 500, and the shape of the inner side wall of the second housing sheath 3310 matches the shape of at least a portion of the outer side wall of the circuit housing 100 near the rear hook 300. After the circuit housing 100, the first housing sheath 5210, and the second housing sheath 3310 are respectively formed, the first housing sheath 5210 may be disposed, in a sheathing manner, on the periphery of the circuit housing 100 from the side of the circuit housing 100 facing the ear hook 500, and the second housing sheath 3310 may be disposed, in a sheathing manner, on the periphery of the circuit housing 100 from the side of the circuit housing 100 facing the rear hook 300. Thus, the circuit housing 100 may be covered by the first housing sheath 5210 and the second housing sheath 3310 together.

It should be noted that since the first housing sheath 5210 and the second housing sheath 3310 may be formed at a high temperature, and the high temperature environment may cause a certain damage to the control circuit or the battery contained in the circuit housing 100. Therefore, in the molding stage, the circuit housing 100, the first housing sheath 5210, and the second housing sheath 3310 may be separately molded and then assembled together, instead of molding the first housing sheath 5210 and the second housing sheath 3310 directly on the periphery of the circuit housing 100, so as to avoid damage to the control circuit or the battery caused by high temperature during integral injection molding, thereby reducing the adverse impact on the control circuit or the battery during the molding stage.

In some embodiments, the circuit housing 100 may include a main side wall 1110, an auxiliary side wall 1112, and an end wall 1113 operably connected to each other. The circuit housing 100 may be a flat housing. The flat circuit housing 100 may include the main side wall 1110 with a large area. When a user wears the loudspeaker device, the main side walls 1110 may include two side walls one of which is in contact with the head and the other one of which is opposite to the side wall and located away from the head. Both the auxiliary side wall 1112 and the end wall 1113 may be used to connect the two side walls of the main side walls 1110. The auxiliary side walls 1112 may include two side walls facing the upper and lower sides of the user's head when the user wears the loudspeaker device. The end wall 1113 may include two opposite side walls. One of the two opposite side walls of the end wall 1113 may be close to an end of the ear hook 500 and the other one of the two opposite side walls of the end wall 1113 may be close to an end of the rear hook 300. The two opposite side walls of the end wall 1113 may respectively face the front side and the back side of the user's head when the user wears the loudspeaker device. The main side wall 1110, the auxiliary side wall 1112, and the end wall 1113 may be operably connected to each other to form the circuit housing 100.

In some embodiments, the first housing sheath 5210 may include an open end 211 that extends from the circuit housing 100 toward the ear hook 500. The open end 211 may be sleeved on the circuit housing 100. The open end 211 may cover a portion of the end wall 1113 of the circuit housing 100 facing the ear hook 500, and a portion of the main side wall 1110 and the auxiliary side wall 1112 close to the ear hook 500. The second housing sheath 3310 may include an open end 311 that extends from the circuit housing 100 toward the rear hook 300. The open end 311 may be sleeved on the circuit housing 100. The open end 311 may cover a portion of the end wall 1113 of the circuit housing 100 facing the rear hook 300, and a portion of the main side wall 1110 and the auxiliary side wall 1112 close to the rear hook 300. In some embodiments, the open end 211 and the open end 311 may be operably connected to each other on the main side wall 1110 and the auxiliary side wall 1112 of the circuit housing 100 to cover the circuit housing 100.

In some embodiments, the first housing sheath 5210 and the second housing sheath 3310 may not completely cover the entire circuit housing 100. For example, at least one exposed hole may be provided at a position corresponding to a button or a position corresponding to a power interface to expose the corresponding structure and facilitate user operation.

After the first housing sheath 5210 and the second housing sheath 3310 are placed on the periphery of the circuit housing 100, the first housing sheath 5210 and the second housing sheath 3310 may be further fixed on the circuit housing 100 by a certain means, so that the circuit housing 100 is fixed with the corresponding housing sheath.

In some embodiments, the inner surfaces of the first housing sheath 5210 and the second housing sheath 3310 corresponding to the main side wall 1110 may be integrally formed with a positioning protrusion 5215 and a positioning protrusion 3315, respectively. The outer surface of the main side wall 1110 may be provided with a positioning groove 11111 and a positioning groove 11112.

The positioning protrusion 5215 may be disposed on the inner side wall close to the open end 211. The positioning protrusion 5215 may include an annular protrusion surrounding the inner side wall of the first housing sheath 5210, or may include a plurality of protrusions disposed on the inner side wall of the first housing sheath 5210 at intervals, etc., which may be set according to actual needs. In this embodiment, the number (or count) of the positioning protrusions 5215 is two. The two positioning protrusions 5215 may be respectively disposed on the inner side walls of the first housing sheath 5210 corresponding to the two side walls of the main side wall 1110 of the circuit housing 100. Similarly, the number (or count) of the positioning protrusion 3315 is two. The two positioning protrusions 3315 may be respectively disposed on the inner side walls of the second housing sheath 3310 corresponding to the two side walls of the main side wall 1110 of the circuit housing 100.

In some embodiments, after the first housing sheath 5210 and the second housing sheath 3310 are respectively sleeved on both sides of the circuit housing 100, the positioning protrusions 5215 may be further inserted into the positioning groove 11111, and the positioning protrusions 3315 may be inserted into the positioning groove 11112, so that the open end 211 of the first housing sheath 5210 and the open end 311 of the second housing sheath 3310 elastically abut together, thereby covering the circuit housing 100.

In some embodiments, the outer side wall 3313 of a region of the second housing sheath 3310 may be inclined with respect to the auxiliary side wall 1112. The region of the second housing sheath 3310 may cover the end wall 1113 of the circuit housing 100. In some embodiments, when the user wears the loudspeaker device, the outer side wall 3313 of the second housing sheath 3310 may be inclined from a side of the outer side wall 3313 close to the upper side of the user's head to a side the outer side wall 3313 close to the lower side of the user's head in a direction gradually away from the rear hook 300.

The positioning protrusion 5215 and the positioning protrusion 3315 may be arranged in strips along the open end 211 and the open end 311, respectively, and may be inclined with respect to the auxiliary side wall 1112. Further, the joint seam between the first housing sheath 5210 and the second housing sheath 3310 on the main side wall 1110 of the circuit housing 100 may be inclined with respect to the auxiliary side wall 1112. The inclination direction of the positioning protrusions 5215 and the positioning protrusions 3315, as well as the inclination direction of the joint seam of the first housing sheath 5210 and the second housing sheath 3310 on the main side wall 1110 of the circuit housing 100 may be the same as the inclination direction of the outer side wall 3313 of the region of the second housing sheath 3310 covering the end wall 1113 of the circuit housing 100, so that the appearance of the loudspeaker device is more consistent.

In some embodiments, the covering area of any one of the first housing sheath 5210 and the second housing sheath 3310 to the circuit housing 100 may be not less than one-half of the covering area of the other one to the circuit housing 100. For example, the covering area of the first housing sheath 5210 to the circuit housing 100 may be not less than one-half of the covering area of the second housing sheath 3310 to the circuit housing 100, or the covering area of the second housing sheath 3310 to the circuit housing 100 may be not less than one-half of the covering area of the first housing sheath 5210 to the circuit housing 100. The covering area of the first housing sheath 5210 to the circuit housing 100, the covering area of the second housing sheath 3310 to the circuit housing 100, and the ratio between the two covering areas may be set to other values according to requirements, for example, the two covering areas may be 50%, respectively, which is not specifically limited herein.

The circuit housing 100 and the rear hook 300 may be connected together by plugging, snapping, or the like.

In some embodiments, the rear hook 300 may include a plug end 1133 facing the circuit housing 100, and the second housing sheath 3310 may be sleeved on at least a portion of the plug end 1133. In some embodiments, the plug end 1133 may be injection molded on an end of the second elastic metal wire, and the rear hook sheath 3320 may be injection molded on the second elastic metal wire and the outer part of the plug end 1133. The second housing sheath 3310 may be integrally formed at the plug end 1133, so that the second housing sheath 3310 may be sheathed on the periphery of a region of the plug end 1133 that is not covered by the rear hook sheath 3320.

In some embodiments, the circuit housing 100 may be provided with a socket 1114 facing the rear hook 300, wherein the socket 1114 may be disposed on the end wall 1113 of the circuit housing 100 close to the rear hook 300, and formed by extending from a side of the end wall 1113 close to the auxiliary side wall 1112 to the rear hook 300.

At least a portion of the plug end 1133 may be inserted into the socket 1114. Two slots 331 may be respectively disposed on opposite sides of the plug end 1133. The two slots 331 may be perpendicular to the insertion direction of the plug end 1133 with respect to the socket 1114. The two slots 331 may be spaced and symmetrically disposed on the two sides of the plug end 1133. In some embodiments, the two slots 331 may be respectively in communication with the corresponding side wall of the plug end 1133 in a direction perpendicular to the insertion direction.

In some embodiments, the first side wall 1115 defining the socket 1114 may be provided with first through holes 151 corresponding to the positions of the two slots 331. The first side wall 1115 of the socket 1114 may be disposed on the periphery of the socket 1114 and face the lower side of the user's head when the user wears the loudspeaker device.

The loudspeaker device may include a fixing member 1153. The fixing member 1153 may include two pins 531 disposed in parallel and a connecting member 532 for connecting the pins 531. In the embodiment shown in FIG. 3, the two pins 531 may be disposed in parallel. The connecting member 532 may be vertically connected with the two pins 53 land disposed on the same side of the two pins 531 to form a U-shaped fixing member 1153.

In some embodiments, the pin 531 may be inserted from the outer side wall of the first side wall 1115 of the socket 1114 through a through hole to the slot 331, so as to block the connecting member 532 from the outside of the socket 1114, thereby realizing the connection and fixation between the circuit housing 100 and the rear hook 300.

In some embodiments, the second side wall 1116 that defines the socket 1114 and is opposite to the first side wall 1115 may be provided with a second through hole 181 opposite to the first through hole 151. The pin 531 may be inserted into the second through hole 181 through the slot 331. The second side wall 1116 may be an auxiliary side wall 1112 of the circuit housing 100 close to one side of the socket 1114. When the user wears the loudspeaker device, the auxiliary side wall 1112 may face the upper side of the user's head.

In some embodiments, the pin 531 may be inserted into the slot 331 through the first through hole 151, and may be further inserted into the second through hole 181 through the slot 331. The pin 531 may completely penetrate and connect the two opposite side walls of the plug end 1133 of the rear hook 300 and the plug end 1133, so that the connection between the circuit housing 100 and the rear hook 300 may be more stable.

In some embodiments, the plug end 1133 may be divided into a first plug section 332 and a second plug section 333 along the insertion direction of the plug end 1133 with respect to the socket 1114. In the cross-sectional direction perpendicular to the insertion direction of the plug end 1133 with respect to the socket 1114, the cross section of the first plug section 332 may be larger than the cross section of the second plug section 333.

The rear hook sheath 3320 may be injection molded on the first plug section 332 of the plug end 1133, and the second housing sheath 3310 may be integrally molded at the junction of the first plug section 332 and the second plug section 333. In some embodiments, the slot 331 may be disposed on the second plug section 333. The second plug section 333 may be inserted into the socket 1114. The plug end 1133 may be exposed to the outside of the socket 1114.

In some embodiments, the first plug section 332 may be provided with a first wiring groove 3321 disposed along the insertion direction of the plug end 1133 with respect to the socket 1114, and the outer end surface of the second plug section 333 away from the first plug section 332 may be provided with a second wiring groove 3331 extending perpendicular to the insertion direction and penetrating at least one outer side surface. In some embodiments, the first wiring groove 3321 may be disposed on the side of the first plug section 332 close to the auxiliary side wall 1112 defining the socket 1114, and penetrate through the two ends of the first plug section 332 along the insertion direction of the plug end 1133 with respect to the socket 1114. The second wiring groove 3331 may penetrate through the two outer sides of the second plug section 333 perpendicular to the extending direction of the second wiring groove 3331.

In some embodiments, the inner side wall of the socket 1114 may be provided with a third wiring groove 182 with one end communicating with the first wiring groove 3321 and the other end communicating with the second wiring groove 3331. The third wiring groove 182 may be formed by the depression of the inner surface of the second side wall 1116.

In some embodiments, the circuit housing 100 may include an inner partition wall 17 disposed inside the housing to form an accommodating cavity 18 spaced apart from the socket 1114. In some embodiments, the main side wall 1110, the auxiliary side wall 1112, and the end wall 1113 of the circuit housing 100 may jointly constitute an accommodation space, and the arrangement of the inner partition wall 17 may separate the accommodation space into an accommodating cavity 18 and a socket 1114. A wiring hole 171 may be disposed on the inner partition wall 17 so as to communicate the socket 1114 and the accommodating cavity 18 through the wiring hole 171.

The loudspeaker device may be provided with a rear hook wire 334. The rear hook wire 334 may pass through the rear hook 300, and both ends of the rear hook wire 334 may be respectively connected to the control circuit and the battery. In some embodiments, the rear hook wire 334 may sequentially pass, from the rear hook 300, through the first wiring groove 3321, the third wiring groove 182, and the second wiring groove 3331, and pass through the wiring hole 171 to enter the accommodating cavity 18 to connect with the control circuit or the battery.

In some embodiments, the ear hook 500 in the present disclosure may include ear hooks of various loudspeaker devices such as earphones, near-sighted glasses, far-sighted glasses, sunglasses, three-dimensional (3D) loudspeaker devices, etc., and is not specifically limited. In some embodiments, a functional member 80 (e.g., the speaker component 83) may be connected to the ear hook 500 through a hinge assembly 122, so that the loudspeaker device may include some other functional components or assemblies.

Further, as described in the foregoing embodiment, the speaker component 83 may include an earphone core. The earphone core and the ear hook 500 may be connected by a hinge, and the hinge may be disposed on the ear hook 500 close to one end of the earphone core.

Figure 5:
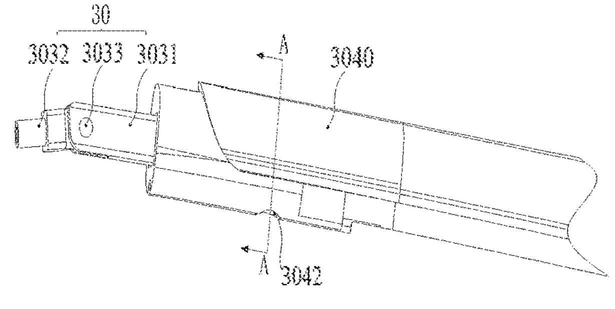
FIG. 5 is a schematic structural diagram illustrating an exemplary hinge component according to some embodiments of the present disclosure.
Figure 6:
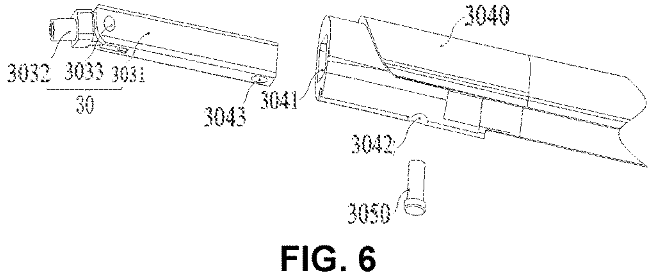
FIG. 6 is a schematic diagram illustrating an exploded view of an exemplary hinge component according to some embodiments of the present disclosure.

FIG. 5 is a schematic diagram illustrating an exemplary hinge component according to some embodiments of the present disclosure. FIG. 6 is a schematic diagram illustrating an exploded view of an exemplary hinge component according to some embodiments of the present disclosure. In some embodiments, the hinge assembly 122 of the present disclosure may be used in a loudspeaker device in some embodiment of the present disclosure.

In the present disclosure, the hinge assembly 122 may include a hinge 30. The hinge 30 may be a structure used to connect two solids and allow a relative rotation between the two solids.

In some embodiments, when the hinge assembly 122 in the embodiment is used in the embodiment of the loudspeaker device described above, the hinge assembly 122 may be disposed at an end of the ear hook 500 away from the circuit housing 100. The function member 80 may further be connected to the end of the ear hook 500 away from the circuit housing 100 via the hinge 30.

In some embodiments, the hinge assembly 122 may also include a rod-shaped member 3040 and a fixing member 3050. In some embodiments, the hinge 30 may include a hinge mount 3031 and a hinge arm 3032. In some embodiments, the hinge arm 3032 may be rotatably connected to the hinge mount 3031 via a rotating shaft 3033. It is easily understood that the hinge mount 3031 and the hinge arm 3032 may be respectively connected to two members that need to be rotatably connected. Therefore, the two members may be rotatably connected together via the rotating shaft 3033 of the hinge 30.

In some embodiments, the hinge mount 3031 of the hinge 30 may be connected to the rod-shaped member 3040. In some embodiments, the rod-shaped member 3040 may be a partial structure or an integral structure of one of the two members that are rotatably connected via the hinge 30. Alternatively, the rod-shaped member 3040 may be a connection structure that connects one of the two members that need to be rotatably connected to the hinge 30. When the hinge assembly 122 in the embodiment is used for the loudspeaker device, the rod-shaped member 3040 may be at least a portion of the ear hook 500 of the loudspeaker device. For example, the rod-shaped member 3040 may be the entirety of the ear hook 500. Alternatively, the rod-shaped member 3040 may be a portion of an end of the ear hook 500 away from the circuit housing 100. The hinge 30 may be disposed at the end of the ear hook 500 away from the circuit housing 100 via the portion of the ear hook 500.

Specifically, the rod-shaped member 3040 may be provided with a hinge chamber 3041 connected to an end surface of the rod-shaped member 3040 along the length direction. A side wall of the rod-shaped member 3040 may be provided with a first insertion hole 3042 communicating with the hinge chamber 3041. The end of the hinge mount 3031 away from the hinge arm 3032 may be inserted into the hinge chamber 3041 from the end surface of the rod-shaped member 3040, and fixed in the hinge chamber 3041 via a fixing member 3050 inserted in the first insertion hole 3042.

In the embodiment, the hinge chamber 3041 may communicate with the end surface of the ear hook 500 away from the end of the circuit housing 100. Therefore, the hinge mount 3031 is inserted into the hinge chamber 3041 and the hinge 30 is connected to the ear hook 500.

In some embodiments, the hinge chamber 3041 may be formed during a molding process of the rod-shaped member 3040. For example, the material of the rod-shaped member 3040 may be rubber or plastic. At this time, the hinge chamber 3041 may be formed by injection molding. The shape of the hinge chamber 3041 may match the hinge mount 3031 so that the hinge mount 3031 may be accommodated inside the hinge chamber 3041. In the embodiment, the ear hook 500 may have the shape of a long straight rod along the length direction. Correspondingly, the rod-shaped member 3040 may be a straight rod along the length direction, and the hinge chamber 3041 may be disposed inside the straight rod. Further, the hinge mount 3031 may match the hinge chamber 3041 to be accommodated inside the hinge chamber 3041 to implement the installation of the hinge 30. Of course, in other embodiments, the rod-shaped member 3040 may also have other shapes such as an arc-shaped rod.

In addition, the first insertion hole 3042 may be formed during the molding process of the rod-shaped member 3040, or may be further formed on a side wall of the rod-shaped member by a manner such as drilling after the molding process. Specifically, in the embodiment, the shape of the first insertion hole 3042 may be a circle, and may be other shapes such as a square or a triangle in other embodiments. The shape of the fixing member 3050 may match the first insertion hole 3042 so that the fixing member 3050 may be inserted into the first insertion hole 3042 from the outside of the rod-shaped member 3040. Further, the hinge mount 3031 may be fixed inside the hinge chamber 3041 by abutting the side wall of the hinge mount 3031 or further penetrating the outer wall of the hinge mount 3031 in a plugging manner. Specifically, a matching thread may be provided on the inner wall of the first insertion hole 3042 and the outer wall of the fixing member 3050. Therefore, the fixing member 3050 may be connected to the first insertion hole 3042 in a screwing manner to further fix the hinge mount 3031 inside the hinge chamber 3041. Of course, other manners may also be used, such as connecting the first insertion hole 3042 and the fixing member 3050 in an interference fit manner.

Further, the hinge arm 3032 may also be connected to other components. Therefore, after the other components are connected to the hinge arm 3032, the other components and the rod-shaped member 3040 or other components connected to the rod-shaped member 3040 may further rotate around the rotating shaft 3033 by mounting the hinge mount 3031 inside the hinge chamber 3041. For example, when the hinge assembly 122 is used in the loudspeaker device, the function member 80 (e.g., the speaker component 83) may be connected to the end of the hinge arm 3032 away from the hinge mount 3031. Therefore, the function member 80 may be connected to the end of the ear hook 500 away from the circuit housing 100 via the hinge 30.

In the above manner, the rod-shaped member 3040 may be provided with the hinge chamber 3041 communicating with the end surface of the rod-shaped member 3040. The hinge 30 may be accommodated inside the hinge chamber 3041 via the hinge mount 3031. The fixing member 3050 may further penetrate the side wall of the rod-shaped member 3040 via the first insertion hole 3042. Therefore, the hinge mount 3031 accommodated inside the hinge chamber 3041 may be fixed inside the hinge chamber 3041. Therefore, the hinge 30 may be detached relative to the rod-shaped member 3040 to facilitate the replacement of the hinge 30 or the rod-shaped member 3040. When applied to the loudspeaker device in the embodiment of the present disclosure described above, the hinge 30 and the function member 80 may be detachable relative to the ear hook 500. Therefore, it may be easy to replace when the function member 80, the circuit housing 100, or the ear hook 500 is damaged.

Further, referring to FIG. 6, in some embodiments, the hinge mount 3031 may be provided with a second insertion hole 3043 corresponding to the first insertion hole 3042. The fixing member 3050 may be further inserted into the second insertion hole 3043.

Specifically, the shape of the second insertion hole 3043 may match the fixing member 3050, so that the fixing member 3050 may be further inserted into the second insertion hole 3043 to fix the hinge mount 3031 after passing through the first insertion hole 3042. Therefore, the shaking of the hinge mount 3031 inside the hinge chamber 3041 may be reduced and the hinge 30 may be fixed more firmly. Specifically, similar to the connection manner of the first insertion hole 3042 and the fixing member 3050, the inner wall of the second insertion hole 3043 may be provided with a matching thread corresponding to the outer wall of the fixing member 3050. Therefore, the fixing member 3050 and the hinge mount 3031 may be screwed together. Alternatively, the inner wall of the second insertion hole 3043 and the outer wall of a corresponding contact position of the fixing member 3050 may be smooth surfaces. Therefore, the fixing member 3050 and the second insertion hole 3043 may be in an interference fit, and be not specifically limited herein.

Further, the second insertion hole 3043 may penetrate both sides of the hinge mount 3031, so that the fixing member 3050 may further penetrate the entire hinge mount 3031. The hinge mount 3031 may be more firmly fixed inside the hinge chamber 3041.

Figure 7:
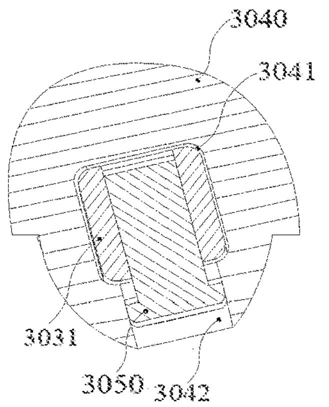
FIG. 7 illustrates a sectional view of the hinge component in FIG. 5 along an A-A axis according to some embodiments of the present disclosure.

Further, referring to FIG. 7, FIG. 7 illustrates a sectional view of the hinge component in FIG. 5 along an A-A axis according to some embodiments of the present disclosure. In the embodiment, a cross-sectional shape of the hinge mount 3031 may match a cross-sectional shape of the hinge chamber 3041 in a section perpendicular to the longitudinal direction of the rod-shaped member 3040. Therefore, the hinge mount 3031 and the rod-shaped member 3040 may form a tight fit after the insertion.

In some embodiments, the cross-sectional shape of the hinge mount 3031 and the cross-sectional shape of the hinge chamber 3041 may include any shape in the section shown in FIG. 7, as long as the hinge mount 3031 is inserted into the hinge chamber 3041 from an end surface of the rod-shaped member 3040 away from the hinge arm 3032. Further, the first insertion hole 3042 may be disposed on a side wall of the hinge chamber 3041, and pass through the side wall of the hinge chamber 3041 and communicate with the hinge chamber 3041.

In an application scenario, the cross-sectional shape of the hinge mount 3031 and the cross-sectional shape of the hinge chamber 3041 may have a rectangular shape. The first insertion hole 3042 may be perpendicular to one side of the rectangle.

Specifically, in the application scenario, a corner angle of the outer wall of the hinge mount 3031 or an angle of the inner wall of the hinge chamber 3041 may be further in a fillet set to make contact between the hinge mount 3031 and the hinge chamber 3041 smoother. Therefore, the hinge mount 3031 may be smoothly inserted into the hinge chamber 3041.

It should be further pointed out that an amount of gas may be stored in the hinge chamber 3041 before the hinge 30 is assembled. Therefore, if the hinge chamber 3041 is a chamber with an open at only one end, the assembly of the hinge mount 3031 may not be facilitated due to the difficulty in exhausting the gas inside the hinge chamber 3041 during the assembly process. In the embodiment, the first insertion hole 3042 may penetrate the side wall of the hinge chamber 3041 and communicate with the hinge chamber 3041 which may assist in exhausting the inner gas from the first insertion hole 3042 through the hinge chamber 3041 during the assembly, thereby facilitating the normal assembly of the hinge 30.

Figure 8:
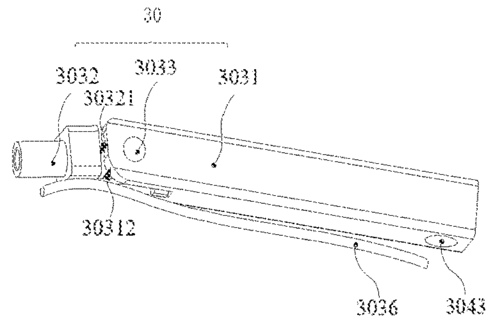
FIG. 8 is a schematic structural diagram illustrating a hinge component according to some embodiments of the present disclosure.
Figure 9:
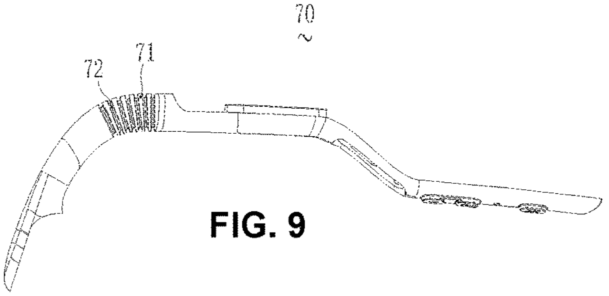
FIG. 9 is a diagram illustrating an original state of a protective sleeve of a hinge component according to some embodiments of the present disclosure.

Further referring to FIG. 8, FIG. 8 is a schematic structural diagram illustrating a hinge component according to some embodiments of the present disclosure. In the embodiment of the present disclosure, the hinge assembly 122 may further include a connection wire 3036 disposed outside the hinge 30.

In some embodiments, the connection wire 3036 may be a connection wire 3036 having an electrical connection function and/or a mechanical connection function. When applied to the loudspeaker device in the embodiment of the present disclosure described above, the hinge assembly 122 may be used to connect the function member 80 to the end of the ear hook 500 away from the circuit housing 100. A control circuit and the like related to the function member 80 may be disposed on the ear hook 500. At this time, the connection wire 3036 may be required to electrically connect the function member 80 to the control circuit and the like of the ear hook 500. Specifically, the connection wire 3036 may be located at one side of the hinge mount 3031 and the hinge arm 3032, and disposed in the same accommodation space with the hinge 30.

Further, the hinge mount 3031 may include a first end surface 30312. The hinge arm 3032 may have a second end surface 30321 disposed opposite the first end surface 30312. It is easily understood that there is a gap between the first end surface 30312 and the second end surface 30321. Therefore, the hinge mount 3031 and the hinge arm 3032 may be relatively rotated around the rotating shaft 3033. In the embodiment, during the relative rotation of the hinge arm 3032 and the hinge mount 3031, relative positions between the first end surface 30312 and the second end surface 30321 may also change. Therefore, the gap between thereof may become larger or smaller.

In the embodiment, the gap between the first end surface 30312 and the second end surface 30321 may always be kept larger than or less than the diameter of the connection wire 3036. Therefore, the connection wire 3036 located outside the hinge 30 may not be inserted into the gap between the first end surface 30312 and the second end surface 30321 during the relative rotation of the hinge mount 3031 and the hinge arm 3032, thereby reducing the damage to the connection wire 3036 by the hinge. Specifically, during the relative rotation of the hinge arm 3032 and the hinge mount 3031, the ratio of the gap between the first end surface 30312 and the second end surface 30321 to the diameter of the connection wire 3036 may always be kept greater than 1.5 or less than 0.8, for example, greater than 1.5, 1.7, 1.9, 2.0, etc., or less than 0.8, 0.6, 0.4, 0.2, etc., and be not specifically limited herein.

Figure 11:
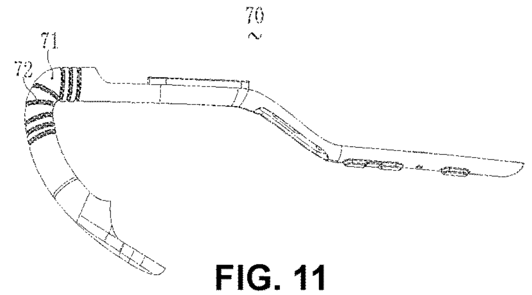
FIG. 11 is a diagram illustrating a bent state of a protective sleeve of a hinge component according to some embodiments of the present disclosure.
Figure 10:
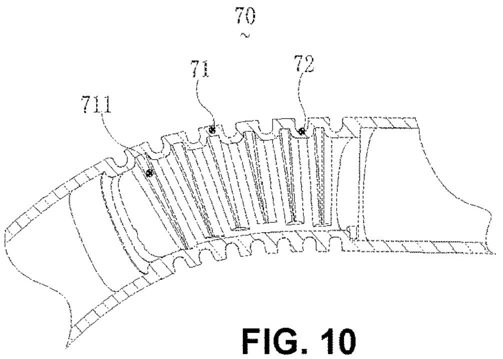
FIG. 10 illustrates a partial sectional view of an original state of a protective sleeve of a hinge component according to some embodiments of the present disclosure.
Figure 12:
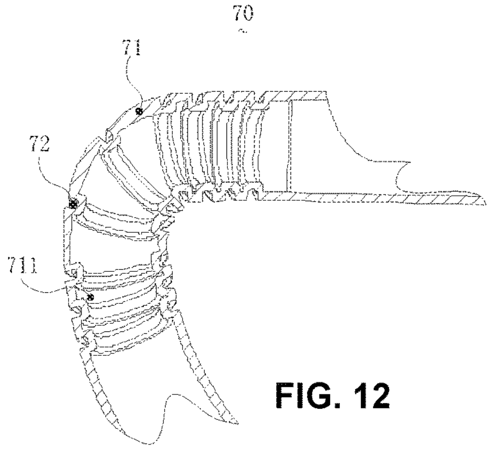
FIG. 12 illustrates a partial sectional view of a bent state of a protective sleeve of a hinge component according to some embodiments of the present disclosure.

Further referring to FIG. 5, and FIG. 9 to FIG. 12, FIG. 9 is a diagram illustrating an original state of a protective sleeve of a hinge component according to some embodiments of the present disclosure. FIG. 10 illustrates a partial sectional view of an original state of a protective sleeve of a hinge component according to some embodiments of the present disclosure. FIG. 11 is a diagram illustrating a bent state of a protective sleeve of a hinge component according to some embodiments of the present disclosure. FIG. 12 illustrates a partial sectional view of a bent state of a protective sleeve of a hinge component according to some embodiments of the present disclosure. In the embodiment, the hinge assembly 122 may also include a protective sleeve 70.

Specifically, the protective sleeve 70 may be disposed on the periphery of the hinge 30 and bent along with the hinge 30. In some embodiments, the protective sleeve 70 may include a plurality of annular ridge portions 71 spaced apart along the length direction of the protective sleeve 70 and annular connection portions 72 disposed between the annular ridge portions 71 and used to connect each two adjacent annular ridge portions. In some embodiments, the tube wall thickness of the annular ridge portion 71 may be greater than the tube wall thickness of the annular connection portion 72.

In some embodiments, the length direction of the protection sleeve 70 may be consistent with the length direction of the hinge 30. The protection sleeve 70 may be disposed along the length direction of the hinge mount 3031 and the hinge arm 3032. The protective sleeve 70 may be made of a soft material, such as soft silicone, rubber, etc.

Further, the outer sidewall of the protective sleeve 70 may protrude outwardly to form the annular ridge portion 71. The shape of the inner sidewall of the protective sleeve 70 corresponding to the annular ridge portion 71 may not be specifically limited herein. For example, the inner wall may be smooth, or a recession may be disposed on the position of the inner wall corresponding to the annular ridge portion 71.

Further, the annular connection portion 72 may be used to connect the adjacent annular ridge portions 71, specifically connected to an edge region of the annular ridge portion 71 near the inside of the protective sleeve 70. Therefore, the annular connection portion 72 may recess relative to the annular ridge portion 71 at a side of the outer wall of the protective sleeve 70.

Specifically, the count of the annular ridge portions 71 and the count of the annular connection portions 72 may be determined according to actual use conditions, for example, according to the length of the protective sleeve 70, the width of the annular ridge 71 and the width of the annular connection portion 72 in the longitudinal direction of the protective sleeve 70, or the like.

Further, the tube wall thickness of the annular ridge portion 71 and the tube wall thickness of the annular connection portion 72 refer to the thickness between the inner wall and the outer wall of the protective sleeve 70 corresponding to the annular ridge portion 71 and the annular connection portion 72, respectively. In the embodiment, the tube wall thickness of the annular ridge portion 71 may be greater than the tube wall thickness of the annular connection portion 72.

It should be easily understood when the hinge mount 3031 and the hinge arm 3032 of the hinge 30 are relatively rotated around the rotating shaft 3033, the angle between the hinge mount 3031 and the hinge arm 3032 may change so that the protective sleeve 70 is bent as shown in FIGS. 11 and 12. Specifically, when the protective sleeve 70 is bent with the hinge 30, the annular ridge portion 71 and the annular connection portion 72 located in an outer region of the bent shape formed by the protective sleeve 70 may be in a stretched state, while the annular ridge portion 71 and the annular connection portion 72 located in an inner region of the bent shape may be in a compressed state.

In the embodiment, the tube wall thickness of the annular ridge portion 71 may be greater than the tube wall thickness of the annular connection portion 72. Therefore, the annular ridge portion 71 may be more rigid than the annular connection portion 72. Therefore, when the protective sleeve 70 is in the bent state, the protective sleeve 70 at the outer side of the bent shape may be in the stretched state. The annular ridge portion 71 may provide a strength support for the protective sleeve 70. At the same time, a region of the protective sleeve 70 at the inner side in the bent state may be compressed. The annular ridge portion 71 may also withstand a compression force, thereby protecting the protective sleeve 70, improving the stability of the protective sleeve 70, and extending the life of the protective sleeve 70.

Further, it should be noted that the shape of the protective sleeve 70 may be consistent with the state of the hinge 30. In one application scenario, both sides of the protective sleeve 70 along the length direction and rotating around the rotating shaft may be stretched or compressed. In another application scenario, the hinge mount 3031 and the hinge arm 3032 of the hinge 30 may rotate around the rotating shaft 3033 only within a range less than or equal to 180 degree. That is, the protective sleeve 70 may only be bent toward one side. One side of the two sides of the protective sleeve 70 in the length direction may be compressed, and the other side may be stretched. At this time, according to different forces on the two sides of the protective sleeve 70, the two sides of the protective sleeve 70 under the different forces may have different structures.

In some embodiments, when the protective sleeve 70 is in the bent state, the width of the annular ridge portion 71 along the longitudinal direction of the protective sleeve 70 toward the outer side of the bent shape formed by the protective sleeve 70 may be greater than the width along the length of the protective sleeve 70 towards the inside of the bent shape.

In some embodiments, an increment of the width of the annular ridge portion 71 along the length direction of the protective sleeve 70 may further increase the strength of the protective sleeve. Meanwhile, in the embodiment, an original included angle between the hinge mount 3031 and the hinge arm 3032 may be less than 180 degree. At this time, if the annular ridge portions 71 of the protective sleeve 70 are uniformly disposed, the protective sleeve 70 may be compressed in the original state. In the embodiment, the width of the annular ridge portion 71 corresponding to one side of the outer region of the bent shape in the bent state may be relatively large, so that the length of the side of the protective sleeve 70 may increase. Therefore, during the increment of the strength of the protective sleeve 70, a stretching degree of the stretching side may be reduced when the protective sleeve 70 is bent. At the same time, the width of the annular ridge portion 71 along the longitudinal direction of the protective sleeve 70 toward the side of the inner region of the bent shape may be relatively small when the protective sleeve 70 is in the bent state, which may increase a space of the compressed annular connection portion 72 in the length direction of the protective sleeve 70, and alleviate the compression of the compressed side.

Further, in an application scenario, the width of the annular ridge portion 71 may gradually decrease from the side of the outer region towards the bent shape to the side of the inner region towards the bent shape. Therefore, the width toward the side of the outer region of the bent shape formed by the protective sleeve 70 may be greater than the width toward the side of the inner region of the bent shape when the protective sleeve 70 is in the bent state.

It should be easily understood that the annular ridge portions 71 are disposed around the periphery of the protective sleeve 70. In the length direction of the protective sleeve 70, one side may correspond to the stretched side, and the other side may correspond to the compressed side. In the embodiment, the width of the annular ridge portion 71 may gradually decrease from the side of the outer region towards the bent shape to the side of the inner region towards the bent shape, so that the width may be more uniform, which may improve the stability of the protective sleeve 70.

In some embodiments, the annular ridge portion 71 may be disposed with a groove 711 on an inner ring surface inside the protective sleeve 70 at the side of the outer region of the bent shape formed by the protective sleeve 70 when the protective sleeve 70 is in the bent state.

Specifically, the groove 711 in the embodiment may be disposed along a direction perpendicular to the length direction of the protective sleeve 70. Therefore, the corresponding annular ridge portion 71 may be appropriately extended in the length direction when the protective sleeve 70 is stretched.

As described above, when the protective sleeve 70 is in the bent state, the protective sleeve 70 towards the outer side of the bent shape formed by the protective sleeve 70 may be in the stretched state. In the embodiment, the groove 711 may be further disposed on the inner ring surface inside the protective sleeve 70 corresponding to the corresponding annular ridge portion 71. Therefore, the annular ridge portion 71 corresponding to the groove 711 may be appropriately extended to bear a portion of the stretch when the protective sleeve is stretched at the side, thereby reducing a tensile force experienced by the protective sleeve at the side, and protecting the protective sleeve 70.

It should be noted that the inner wall of the protective sleeve 70 corresponding to the annular ridge portion 71 at the side towards the inner region of the bent shape may not be disposed with the groove 711 when the protective sleeve 70 is in the bent state. In some embodiments, the width of the groove 71 along the length of the protective sleeve 70 may gradually decrease from the side of the outer region towards the bent shape to the side of the inner region towards the bent shape. Therefore, no groove 711 may be disposed on the inner side wall of the protective sleeve 70 corresponding to the annular ridge portion 71 towards the inner region side of the bent shape.

Specifically, when the hinge assembly 122 in the embodiment is applied to the loudspeaker device in the embodiment of the present disclosure described above, the protective sleeve 70 may be connected to the ear hook s 500 disposed at both sides in the length direction of the protective sleeve 70, respectively, and connected to the function member 80. In an application scenario, the protective sleeve 70 may also be integrally formed as other structures of the loudspeaker device, such as protective covers of some components, so that the loudspeaker device may be more sealed and integrated.

It should be noted that the hinge assembly 122 in the embodiment of the present disclosure may not only be used in the loudspeaker device in the embodiment of the present disclosure, but also be used in other devices. Moreover, the hinge assembly 122 may also include other components related to the hinge 30 other than the rod-shaped member 3040, the fixing member 3050, the connection wire 3036, the protective sleeve 70, etc. to achieve corresponding functions.

Figure 13:
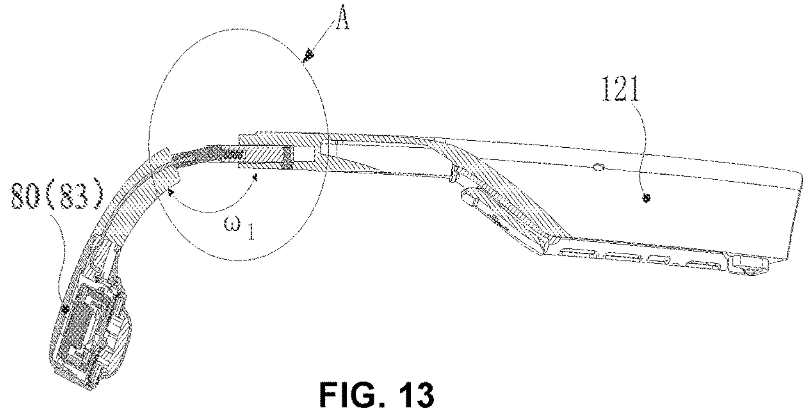
FIG. 13 illustrates a partial sectional view of a loudspeaker device according to some embodiments of the present disclosure.
Figure 14:
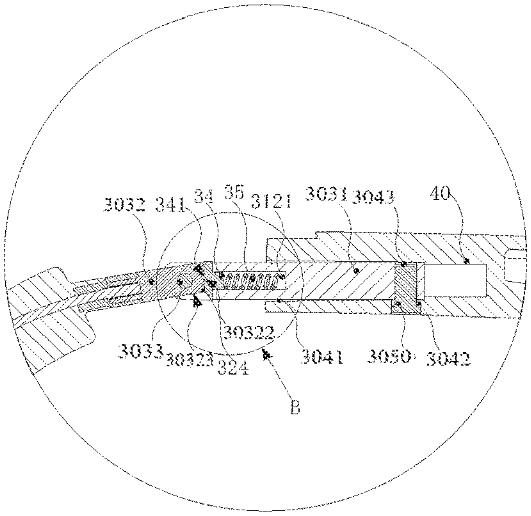
FIG. 14 illustrates an enlarged view of part A in FIG. 13.
Figure 15:
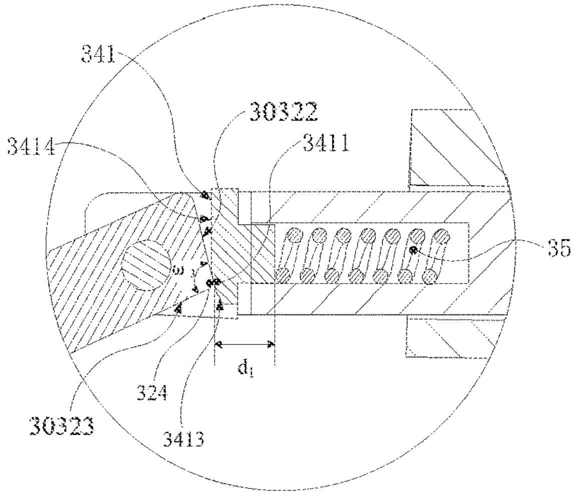
FIG. 15 illustrates an enlarged view of part B in FIG. 14.
Figure 16:
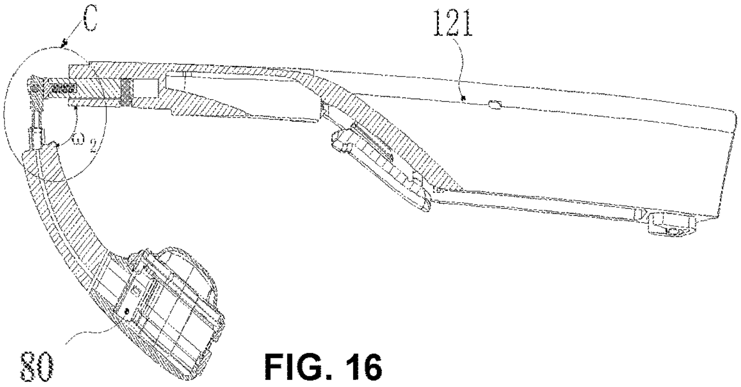
FIG. 16 illustrates a partial sectional view of a hinge according to some embodiments of the present disclosure.
Figure 17:
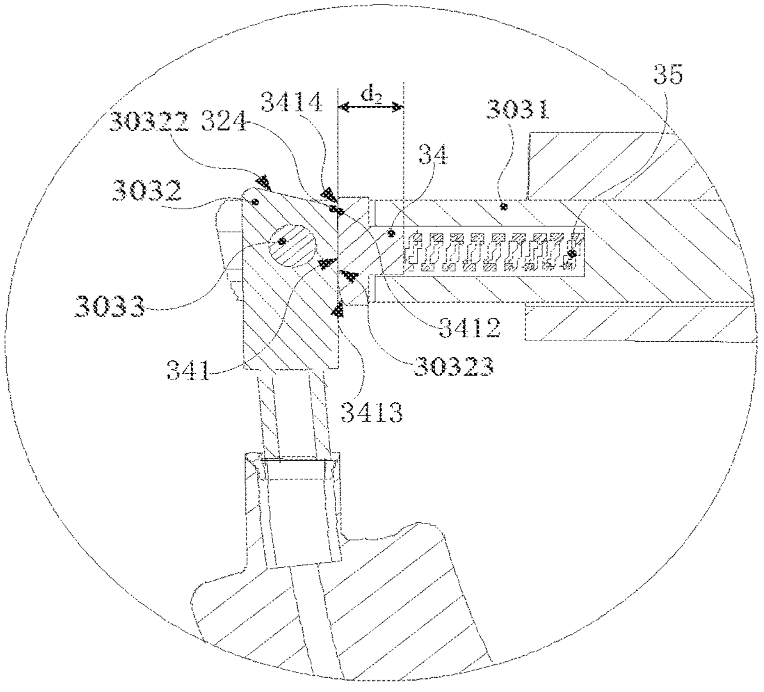
FIG. 17 illustrates an enlarged view of part C in FIG. 16.

Specifically, further referring to FIG. 13 to FIG. 17 together, FIG. 13 illustrates a partial sectional view of a loudspeaker device according to some embodiments of the present disclosure. FIG. 14 illustrates an enlarged view of part A in FIG. 13. FIG. 15 illustrates an enlarged view of part B in FIG. 14. Specifically, FIG. 15 shows an enlarged view of part B in FIG. 14 when the abutting between a first support surface and a third support surface is changed to the abutting between a second support surface and the third support surface so that a connection between the first support surface and the second support surface initially touches the third support surface. FIG. 16 illustrates a partial sectional view of a hinge according to some embodiments of the present disclosure. FIG. 17 illustrates an enlarged view of part C in FIG. 16. It should be noted that the hinge 30 in the embodiment of the present disclosure may be used in the loudspeaker device in the embodiment of the present disclosure. The hinge 30 may be used in the hinge assembly 122 in the embodiments of the present disclosure, or used in other devices, and be not specifically limited herein.

In the embodiment, the hinge arm 3032 of the hinge 30 may have a first support surface 30322 and a second support surface 30323 connected to each other.

The hinge 30 may also include a support member 34 and an elastic member 35. The support member 34 may be flexibly disposed on the hinge mount 3031 and have a third support surface 30341. The elastic member 35 may be used to elastically offset the support member 34 toward the hinge arm 3032, so that the third support surface 30341 may elastically abut on the first support surface 30322 and the second support surface 30323, respectively.

In some embodiments, when the hinge arm 3032 is rotated relative to the hinge mount 3031 under an external force, a connection 324 of the first support surface 30322 and the second support surface 30323 may drive the support member 34 against the elastic offset of the elastic member 35 to move in the opposite direction. Therefore, the third support surface 30341 may be switched from elastically abutting on one of the first support surface 30322 and the second support surface 30323 to elastically abutting on the other of the first support surface 30322 and the second support surface 30323.

In an application scenario, the support member 34 may be connected to an end of the elastic member 35 towards the hinge arm 3032. The third support surface 30341 may face the side toward the hinge arm 3032. In the process that the hinge arm 3032 is rotated relative to the hinge mount 3031 around the rotating shaft 3033 under the external force, the third support surface 30341 may be pushed so that the support member 34 may compress the elastic member 35. Further, the elastic offset may occur under the action of the elastic member 35. Of course, the elastic member 35 may be disconnected to the support member 34, and only abut on one side of the support member 34 as long as the support member 34 implements the elastic offset.

In some embodiments, the first support surface 30322 and the second support surface 30323 may be two side surfaces adjacent to the hinge arm 3032 and at least partially parallel to the central axis of the rotating shaft 3033, or a portion of the two side surfaces. When the hinge arm 3032 rotates relative to the hinge mount 3031, the first support surface 30322 and the second support surface 30323 may rotate with the hinge arm 3032 around the rotating shaft 3033. Therefore, different side surfaces of the hinge arm 3032 may face the hinge mount 3031. Thus, the hinge arm 3032 may have different positions relative to the hinge mount 3031.

In addition, the elastic member 35 may be a member that may provide an elastic force and be compressed in an elastic direction to provide a compression space. For example, the elastic member 35 may include a spring. One end of the spring may abut on the support member 34. When the third support surface 30341 of support member 34 is pushed toward the elastic member 35, the elastic member 35 may be against the support member 34 and be compressed to provide a space in a direction that the third support surface 30341 of the support member 34 faces. Therefore, when a relative position of the rotating shaft 3033 is unchanged, there may be still enough space for different sides of the hinge arm 3032 to rotate between the rotating shaft 3033 and the third support surface 30341.

Specifically, when the hinge arm 3032 rotates relative to the hinge mount 3031, the relative position of the rotating shaft 3033 may be unchanged. A contact position of the hinge arm 3032 and the third support surface 30341 of the hinge mount 3031 may change. Since distances between different positions of the hinge arm 3032 and the rotating shaft 3033 are different, the required space between the rotating shaft 3033 and the contact position of the hinge arm 3032 and the third support surface 30341 may be different when different positions of the hinge arm 3032 (e.g., different positions of the first support surface 30322 and the second support surface 30323) contact the third support surface 30341. Due to the limitation of the elastic force and the space, the space provided by the compression of the elastic member 35 may be limited. Therefore, during the rotation of the hinge arm 3032 relative to the hinge mount 3031, if a distance between a position of the hinge arm 3032 and the rotating shaft 3033 is too large in a section perpendicular to the central axis of the rotating shaft 3033, the position may be locked at another position of the third support surface during the rotation process, so that the hinge arm 3032 may not continue to rotate. Therefore, the hinge arm 3032 and the hinge mount 3031 only rotates relatively within a range. In an application scenario, during the relative rotation between the hinge arm 3032 and the hinge mount 3031 around the rotating shaft 3033, only the first support surface 30322, the second support surface 30323, and a region corresponding to the connection 324 between the first support surface 30322 and the second support surface 30323 may abut on the third support surface 30341.

Further, in the embodiment, the first support surface 30322 and the second support surface 30323 may both be planes. A distance from the rotating shaft 3033 to the connection 324 of the two support surfaces may be greater than a distance from the rotating shaft 3033 to the first support surface 30322 and a distance to the second support surface 30323. The hinge 30 may have two relatively stable states that the third support surface 30341 abuts on the first support surface 30322 and the third support surface 30341 abuts on the second support surface 30323.

Of course, in the embodiment, the first support surface 30322 and the second support surface 30323 may also be curved surfaces with a radian or even include different sub-support surfaces, as long as a positional relationship between the hinge arm 3032 and the hinge mount 3031 may have at least two corresponding relatively stable states, and be not specifically limited herein. In addition, the hinge arm 3032 may be disposed with more support surfaces. The hinge arm 3032 and the hinge mount 3031 may have various relative positional relationships by the different support surfaces elastically abutting on the third support surface 30341 when the hinge arm 3032 rotates relative to the hinge mount 3031 around the rotating shaft 3033 under an external force, and be not specifically limited herein.

Specifically, as shown in FIG. 14 and FIG. 15, an original state that the first support surface 30322 abuts on the third support surface 30341 of the support member 34 may be taken as an example. At this time, the elastic member 35 may have an elastic compression deformation, or be in an original natural state, and be not limited herein. When the hinge 30 is subject to an external force, the hinge arm 3032 may rotate relative to the hinge mount 3031 around the rotating shaft 3033, so that the second support surface 30323 gradually approaches the third support surface 30341. In this case, the connection 324 between the first support surface 30322 and the second support surface 30323 may touch the third support surface 30341. Since the distance from the connection 324 to the rotating shaft 3033 may be greater than the distance from the first support surface 30322 to the rotating shaft 3033, the connection 324 may abut on the support member 34 and push the support member 34 move toward the elastic member 35, thereby allowing the elastic member 35 against the pull to compress. When the hinge arm 3032 is further stressed, the connection 324 may gradually approach a region between the rotating shaft 3033 and the third support surface 30341. In the process, the distance between the rotating shaft 3033 and the third support surface 30341 may gradually increase. It should be easily understood when a connection line between the connection 324 and the rotating shaft 3033 is perpendicular to the third support surface 30341, the distance from the rotating shaft 3033 to the third support surface 30341 may be equal to the distance from the rotating shaft 3033 to the connection 324 in a section perpendicular to the central axis of the rotating shaft 3033. At this time, the rotating shaft 3033 may be farthest from the third support surface 30341. At this time, if the force is continuously applied to the hinge 30, the distance from the rotating shaft 3033 to the third support surface 30341 may gradually become smaller, so that the required compression space of the elastic member 35 may be reduced. Then the elastic member 35 may gradually release the elastic force and recover until the connection 324 leaves the third support surface 30341 and the second support surface 30323 abuts on the third support surface 30341, thereby switching from abutting the first support surface 30322 on the third support surface 30341 to abutting the second support surface 30323 on the third support surface 30341.

Similarly, the process (as shown in FIG. 16 and FIG. 17) for switching from an original state that the second support surface 30323 abuts on the third support surface 30341 of the support member 34 to a state that the first support surface 30322 abuts on the third support surface 30341 of the support member 34 may be similar to the above process.

It should be noted that the hinge 30 in the embodiment may be applied to the hinge assembly 122 in the embodiment of the present disclosure. In one embodiment, the function member 80 may be the speaker component 83. In some embodiments, when the third support surface 30341 is switched from elastically abutting on one of the first support surface 30322 and the second support surface 30323 to elastically abutting on the other of the first support surface 30322 and the second support surface 30323, the hinge assembly 122 may drive the speaker component 83 to switch between a first relatively fixing position and a second relatively fixing position relative to the ear hook 500. The hinge assembly 122 may fit on the back of an auricle of the user when the speaker component 83 is in the first relatively fixing position. As used herein, the auricle may be a portion of an external ear and mainly composed of cartilage. In some embodiments, the speaker component 83 may include a bone conduction speaker component 83. By fitting the speaker component 83 to the back of the auricle, the cartilage of the auricle may be used to transmit bone conduction sound/vibration. The speaker component 83 may be fitted to the back of the auricle, thereby improving the sound quality and reducing the impact on an ear canal during the sound transmission.

It should be noted that the distance from the rotating shaft 3033 to the connection 324 may be greater than a vertical distance from the first support surface 30322 and the second support surface 30323. Therefore, in the process that the third support surface 30341 is switched from elastically abutting on one of the first support surface 30322 and the second support surface 30323 to elastically abutting on the other of the first support surface 30322 and the second support surface 30323, the state of the hinge 30 may change abruptly.

The switch from elastically abutting between the first support surface 30322 and the third support surface 30341 to elastically abutting between the second support surface 30323 and the third support surface 30341 may be taken as an example. When a ratio between the maximum distance $h_1$ from the rotating shaft 3033 to the connection 324 and the shortest distance $h_2$ from the rotating shaft 3033 to the first support surface 30322 is different, the change during the switching process may be different.

In some embodiments, the ratio between the maximum distance h1 from the rotating shaft 3033 to the connection 324 and the shortest distance $h_2$ from the rotating shaft 3033 to the first support surface 30322 may be between 1.1 and 1.5 in the section perpendicular to the central axis of the rotating shaft 3033.

Specifically, the maximum distance $h_1$ from the rotating shaft 3033 to the connection 324 may be larger than the shortest distance $h_2$ of the rotating shaft 3033 to the first support surface 30322 by disposing the rotating shaft 3033 away from the second support surface 30323 and close to the side of the hinge arm 3032 opposite to the second support surface 30323, thereby satisfying the ratio described above.

It should be noted that the change may become obvious when the ratio between $h_1$ and $h_2$ is too large. However, a large force may be needed to switch from elastically abutting between the first support surface 30322 and the third support surface 30341 to elastically abutting between the second support surface 30323 and the third support surface 30341, thereby causing inconvenience. If the ratio between $h_1$ and $h_2$ is too small, although it is easier to switch the state, the change may be small. For example, when the user pulls the hinge 30, there may be no obvious handle sense, causing inconvenience. In the embodiment, the ratio of $h_1$ to $h_2$ may be set between 1.1 and 1.5, and the hinge 30 may have a more obvious change when the third support surface 30341 is switched from elastically abutting on the first support surface 30322 to elastically abutting on the second support surface 30323. Thus, during use, the user may have a relatively obvious handle sense of pulling the hinge 30. At the same time, the change may not be too abrupt to making it difficult for the user to switch the state of the hinge 30.

In an application scenario, the ratio of $h_1$ to $h_2$ may also be between 1.2 and 1.4. Specifically, the ratio of $h_1$ to $h_2$ may also be 1.1, 1.2, 1.3, 1.4, 1.5, etc., and be not specifically limited herein.

In addition, the positions of the first support surface 30322 and the second support surface 30323 set on the hinge arm 3032 may affect the included angle between the hinge arm 3032 and the hinge mount 3031 when the third support surface 30341 abuts on one of the first support surface 30322 and the second support surface 30323. Therefore, the positions of the first support surface 30322 and the second support surface 30323 on the hinge arm 3032 may be set differently according to specific user requirements. In some embodiments, the included angle between the hinge arm 3032 and the hinge mount 3031 may be specifically shown in FIG. 12 and FIG. 15. Angle ω1 may be the included angle between the hinge arm 3032 and the hinge mount 3031 when the third support surface 30341 abuts on the first support surface 30322. Angle ω2 may be the included angle between the hinge arm 3032 and the hinge mount 3031 when the third support surface 30341 abuts on the second support surface 30323. In some embodiments, each of the hinge arm 3032 and the hinge mount 3031 may have a length. The hinge arm 3032 may be disposed on one end side of the hinge mount 3031 in the length direction. The first support surface 30322 may be disposed at the end of the hinge arm 3032 near the hinge mount 3031 in the length direction. The second support surface 30323 may be disposed at one end in the width direction of the hinge arm 3032 and parallel to the central axis of the rotating shaft 3033. At this time, when the third support surface 30341 elastically abuts on the first support surface 30322, the included angle between the hinge arm 3032 and the hinge mount 3031 may be the largest. When the third support surface 30341 elastically abuts on the second support surface 30323, the included angle between the hinge arm 3032 and the hinge mount 3031 may be the smallest. Therefore, the included angle between the hinge mount 3031 and the hinge arm 3032 may be changed from ω1 to ω2 and become smaller when the third support surface 30341 is switched from elastically abutting on the first support surface 30322 to elastically abutting on the second support surface 30323.

It should to be further noted if the direction of the force applied to the hinge arm 3032 is the same as the direction of the gravity of the hinge arm 3032 when the third support surface 30341 is switched from elastically abutting on the first support surface 30322 to elastically abutting on the second support surface 30323, the switching in this state may make the included angle between the hinge mount 3031 and the hinge arm 3032 smaller. The setting of the ratio between the $h_1$ and $h_2$ in the embodiment may also make the hinge arm 3032 not or hardly reduce the angle between the hinge arm 3032 and the hinge mount 3031 spontaneously due to the own gravity when the third support surface 30341 elastically abut on the first support surface 30322.

In some embodiments, referring to FIG. 15, the included angle $\omega_3$ between the first support surface 30322 and the second support surface 30323 may be an obtuse angle in a section perpendicular to the central axis of the rotating shaft 3033.

In some embodiments, when the hinge 30 switches from the state of elastically abutting between the first support surface 30322 and the third support surface 30341 to the state of elastically abutting between the second support surface 30323 and the third support surface 30341, the smaller the included angle $\omega_3$ between the first support surface 30322 and the second support surface 30323, the larger the relative rotation angle between the hinge mount 3031 and the hinge arm 3032 may be when the state is switched. That is, when the hinge mount 3031 is fixed, the user may need to move the hinge arm 3032 to a larger angle to switch the state of the hinge 30, so that the user may be laborious and it may bring inconvenience to the user.

Since the hinge arm 3032 has a length, and the first support surface 30322 is disposed at one end in the length direction of the hinge arm 3032, the second support surface 30323 may be disposed adjacent to the first support surface 30322 in the width direction of the hinge arm 3032. Normally, the first support surface 30322 and the second support surface 30323 may be arranged vertically. At this time, when the hinge 30 is switched between the two states, the hinge arm 3032 and the hinge mount 3031 may need to be moved relative to each other by 90 degree.

In the embodiment, in the section perpendicular to the central axis of the rotating shaft 3033, the included angle $\omega_3$ between the first support surface 30322 and the second support surface 30323 may be an obtuse angle. Thus, the angle required for the relative movement of the hinge arm 3032 and the hinge mount 3031 may be less than 90 degree when the hinge 30 switches between the two states, which may facilitate the user.

Specifically, when the hinge 30 in the embodiment is used in the embodiment of the loudspeaker device in the present disclosure, the hinge 30 may be used to connect the ear hook 500 and the speaker component 83. In some embodiments, the speaker component 83 may be a bone conduction speaker component 83. For example, when the hinge 30 is in a second state of elastically abutting between the second support surface 30323 and the third support surface 30341, the speaker component 83 may be in the first relatively fixing position to fit the back of the auricle of the user. Therefore, when the user needs to use the function of the speaker component 83 of the loudspeaker device, the user may only need to rotate the speaker component 83 by an angle less than 90 degree to fit it to the back of the auricle of the user. In addition, when the hinge 30 is in a first state of elastically abutting between the first support surface 30322 and the third support surface 30341, the hinge arm 3032 and the connected speaker component 83 may form an angle. Therefore, the hinge arm 3032 and the connected speaker component 83 may be located behind an ear of the user and face the direction of the ear of the user when the user wears the loudspeaker device. Therefore, the loudspeaker device may be blocked and fixed, and prevented from falling off the head of the user.

It should be noted that the included angle $\omega_3$ between the first support surface 30322 and the second support surface 30323 may be set according to actual requirements. If the included angle is too large, the included angle between the hinge arm 3032 and the hinge mount 3031 and the angle between the function member 80 connected to the end of the hinge arm 3032 away from the hinge mount 3031 and the hinge mount 3031 may be smaller. Therefore, the hinge arm 3032 and the function member 80 may be too close to the ears of the user to compress the ears when the user wears it, reducing the comfort of the user. If the included angle is too small, on the one hand, the required angle may be too large, which is inconvenient for the user when the user moves the speaker component 83 to switch between the first relative position and the second relative position. On the other hand, the included angle between the ear hook 500 and the hinge 30 and the included angle between the ear hook 500 and the speaker component 83 may be too small to play a role in blocking and fixing the loudspeaker device. Therefore, the loudspeaker device may be easily dropped from the front side of the head of the user when the user wears the loudspeaker device. Specifically, the included angle between the first support surface 30322 and the second support surface 30323 may be set according to the shape of the head of the user.

Specifically, in an application scenario, in the section perpendicular to the central axis of the rotating shaft 3033, the included angle $\omega_3$ between the first support surface 30322 and the second support surface 30323 may be between 100 degree and 120 degree, and specifically be 100 degree, 110 degree, 120 degree, or the like. The setting of the angle may enable the user to wear the loudspeaker device, and the speaker component 83 may not be too close to the ears of the user to cause discomfort to the ears of the user when the speaker component 83 is in the first relatively fixing position. It may be unnecessary to rotate the hinge by an excessive angle upon switching between the two relative positions of the speaker component 83, which is convenient for users.

In some embodiments, in the process that the third support surface 30341 is switched from elastically abutting on one of the first support surface 30322 and the second support surface 30323 to elastically abutting on the other of the first support surface 30322 and the second support surface 30323, the connection 324 between the first support surface 30322 and the second support surface 30323 may abut on the third support surface 30341, and drive the support member 34 against the elastic offset of the elastic member 35 to move in the opposite direction. Elastically abutting between the third support surface 30341 and the first support surface 30322 before the switching may be taken as an example. At the start of the switching, while the first support surface 30322 gradually moves away from the third support surface 30341, the connection 324 may gradually abut on the third support surface 30341 and slide from one side of the third support surface 30341 to another side of the third support surface 30341 during the switching process. Finally, the second support surface 30323 and the third support surface 30341 may further turn to elastically abut. During the state switching process, the connection 324 may always abut on and interact with the third support surface 30341. The shape of the connection 324 may have an effect on the state switching process. For example, if the first support surface 30322 and the second support surface 30323 are line-connected, the connection 324 may have a relatively sharp angle. Therefore, during the user pulls the hinge mount 3031 and/or the hinge arm 3032 to switch the state of the hinge 30, on the one hand, the buffer may be small and the switching may be abrupt upon switching from abutting between the connection 324 and the third support surface 30341 to abutting between the connection 324 and the first support surface 30322 and the second support surface 30323. The user may feel poor when pulling the hinge 30. On the other hand, the connection 324 may be relatively sharp, which may cause wear to the third support surface 30341 during repeated switching processes.

In some embodiments of the present disclosure, in a section perpendicular to the central axis of the rotating shaft 3033, the connection 324 may have a shape of an arc. As a result, the connection between the first support surface 30322 and the second support surface 30323 may be a connection with an arc surface. During the state switching process of the hinge 30, the connection 324 abutting on the third support surface 30341 may be relatively smooth, so that the user may have a better fell when pulling the hinge 30. The damage to the third support surface 30341 may be reduced during repeated switching processes.

Specifically, in some embodiments, the connection 324 may have a shape of a circular arc. If a curvature of the arc is different, effects brought by the curvatures may be different. The curvature may be set in combination with actual use situations. The curvature of the arc in the embodiment may be between 5 and 30, and specifically 5, 10, 15, 20, 25, 30, etc., and be not limited herein.

It should be noted when the hinge 30 in the embodiment is applied to the loudspeaker device in the embodiment described above, the circular arc shape of the curvature of the connection 324 may enable the user to have a better feel when the hinge 30 is pulled to drive the speaker to switch between the first relatively fixing position and the second relatively fixing position.

In some embodiments, the third support surface 30341 may be set so that the external force required when the third support surface 30341 is switched from elastically abutting on the first support surface 30322 to elastically abutting on the second support surface 30323 may be different from the external force required when the third support surface 30341 is switched from elastically abutting on the second support surface 30323 to elastically abutting on the first support surface 30322.

It should be noted that, in a specific application scenario, different states of the hinge 30 may correspond to different functions of the hinge 30 or structures connected to the hinge 30. Alternatively, due to a setting problem of the position of the hinge 30, it may not be convenient for the user to exert a force to switch from one state to another. When the user switches the state of the hinge 30, it may be necessary to distinguish the strength of pulling the hinge 30 to facilitate the user to exert the force, or to provide the user with an intuitive experience to distinguish the two hinge states.

Specifically, when the hinge 30 in the embodiment is applied to the loudspeaker device, the state switching of the hinge 30 may drive the speaker component 83 to switch between the first relatively fixing position and the second relatively fixing position relative to the ear hook 500. Correspondingly, the two relatively fixing positions may correspond to two situations where the user uses the speaker component 83 and where the user does not use the speaker component 83. When the user wears the loudspeaker device, difficulty of applying forces to the back of the head to switch between the two states may be different. Therefore, the design of applying different external forces to correspondingly switching between different states may facilitate the usage of the user.

Specifically, in some embodiments, when the third support surface 30341 is switched from elastically abutting on the first support surface 30322 to elastically abutting on the second support surface 30323, the speaker component 83 may move from the second relatively fixing position to the first relatively fixing position so as to fit the back of the auricle of the user.

Further, in the embodiment, the third support surface 30341 may be set such that the external force required when the third support surface 30341 is switched from elastically abutting on the first support surface 30322 to elastically abutting on the second support surface 30323 may be less than the external force required when the third support surface 30341 is switched from elastically abutting on the second support surface 30323 to elastically abutting on the first support surface 30322.

It should be noted when the speaker component 83 is used, the third support surface 30341 may need to be switched from elastically abutting on the first support surface 30322 to elastically abutting on the second support surface 30323 upon being applied to the loudspeaker device. When the speaker component 83 is not used, the third support surface 30341 may need to be switched from elastically abutting on the second support surface 30323 to elastically abutting on the third support surface 30341. According to the embodiment, the force required when the user uses the speaker component 83 may be less than the force required when the speaker component 83 is not used. Therefore, it may be convenient for the user to use the function of the speaker component 83 of the loudspeaker device.

Specifically, referring to FIG. 15 and FIG. 17 together, in an application scenario, when the third support surface 30341 is switched from elastically abutting on the first support surface 30322 to elastically abutting on the second support surface 30323, the connection 324 may initially contact a first position 3411 of the third support surface 30341. When the third support surface 30341 is switched from elastically abutting on the second support surface 30323 to elastically abutting on the first support surface 30322, the connection 324 may initially contact a second position 3412 of the third support surface 30341. In some embodiments, in a section perpendicular to the central axis of the rotating shaft 3033, a distance d1 between the first position 3411 and a contact point of the elastic member 35 and the support member 34 along the direction of the elastic offset of the elastic member 35 may be less than a distance d2 between the second position 3412 and the contact point in the direction of the elastic offset.

It should be noted when the third support surface 30341 elastically abuts on the first support surface 30322, the connection 324 may be located near a position of one end of the third support surface 30341. When the third support surface 30341 elastically abuts on the second support surface 30323, the connection 324 may be located near a position of another end of the third support surface 30341. Therefore, the first position 3411 and the second position 3412 may be located near the two ends of the third support surface 30341, respectively. That is, in the embodiment, a distance between the positions of the third support surface 30341 of the support member 34 near the two ends may be different from a distance between the elastic member 35 and the contact point of the support member 34 in the direction of the elastic offset of the elastic member 35. The distance corresponding to the second position 3412 may be less than the distance corresponding to the first position 3411. At this time, when the third support surface 30341 is switched from elastically abutting on the first support surface 30322 to elastically abutting on the second support surface 30323, the connection 324 may not immediately abut on the third support surface 30341 and receive a reaction force of the elastic member 35, but gradually abut on the third support surface 30341 and receive the reaction force of the elastic member 35 during the switching process. When the third support surface 30341 is switched from elastically abutting on the first support surface 30322 to elastically abutting on the second support surface 30323, the connection 324 may initially abut on the third support surface 30341 and receive the reaction force of elastic member 35, or at least receive the reaction force of elastic member 35 earlier than that the third support surface 30341 is switched from elastically abutting on the second support surface 30323 to elastically abutting on the first support surface 30322. Therefore, in this case, the hinge 30 may need a smaller force to switch from elastically abutting on the first support surface 30322 to elastically abutting on the second support surface 30323. Therefore, the force required to move the speaker component 83 may be small when the user uses the speaker component 83, which is convenient for the user.

Further, the third support surface 30341 may include a first sub-support surface 3413 and a second sub-support surface 3414. In some embodiments, the first position 3411 may be disposed on the first sub-support surface 3413. The second position 3412 may be disposed on the second sub-support surface 3414. That is, the first sub-support surface 3413 and the second sub-support surface 3414 may be disposed near the two ends of the third support surface 30341, respectively.

In some embodiments, the second sub-support surface 3414 may be a plane. Specifically, when the first support surface 30322 or the second support surface 30323 elastically abuts on the third support surface 30341, the second sub-support surface 3414 may be parallel to the first support surface 30322 or the second support surface 30323. The first sub-support surface 3413 may be a flat surface or a curved surface, and be not limited herein.

Further, the first sub-support surface 3413 and the second sub-support surface 3414 may not be located in the same plane. The first sub-support surface 3413 may be inclined relative to the second sub-support surface 3414. An included angle between the two sub-support surfaces may be no greater than 10 degree, for example, no greater than 2 degree, 4 degree, 6 degree, 8 degree, 10 degree, etc. Specifically, the first sub-support surface 3413 may be disposed in a direction away from the hinge arm 3032. Therefore, in the section perpendicular to the central axis of the rotating shaft 3033, the distance between the first position 3411 and the elastic member 35 and the distance between the first position 3411 and the contact point of the elastic member 35 in the direction of the elastic offset of the elastic member 35 may be less than the distance between the second position 3412 and the contact point in the direction of the elastic offset. In some embodiments, when the first sub-support surface 3413 is a curved surface and the second sub-support surface 3414 is a flat surface, the included angle between the first sub support surface 3413 and the second sub-support surface 3414 may be an included angle between a plane tangent to the first sub support surface 3413 and the second sub support surface 3414 at the intersection of the two sub-support surfaces.

Figure 18:
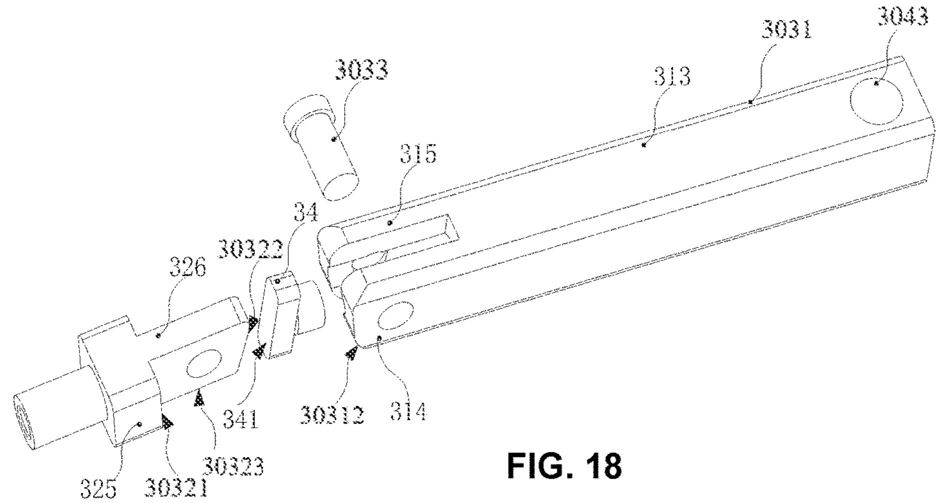
FIG. 18 is an exploded structural diagram illustrating a hinge according to some embodiments of the present disclosure.

Referring to FIG. 18, FIG. 18 is an exploded structural diagram illustrating a hinge according to some embodiments of the present disclosure. In the embodiment, the hinge mount 3031 may include a mount body 313, and a first lug 314 and a second lug 315 protruding from the mount body 313 and spaced from each other. The hinge arm 3032 may include an arm body 325 and a third lug 326 protruding from the arm body 325. The third lug 326 may be inserted into an interval region between the first lug 314 and the second lug 315, and rotatably connected to the first lug 314 and the second lug 315 via the rotating shaft 3033. The first support surface 30322 and the second support surface 30323 may be disposed on the third lug 326. The support member 34 may be at least partially disposed in the interval region and located at the side of the third lug 326 towards the mount body 313. The mount body 313 may be disposed with an accommodation chamber 3121 communicating with the interval region. The elastic member 35 may be disposed inside the accommodation chamber 3121, and allow the support member 34 elastically offset towards the third lug 326.

Specifically, corresponding positions of the first lug 314, the second lug 315, and the third lug 326 may be respectively disposed with a first through-hole, a second through-hole, and a third through-hole located in a same axial direction. Inner diameters of the three through-holes may be no less than the outer diameter of the rotating shaft 3033. Thus, when the rotating shaft 3033 passes through a corresponding through-hole, the hinge mount 3031 where the first lug 314 and the second lug 315 are located may be rotatably connected to the hinge arm 3032 where the third lug 326 is located.

In some embodiments, the first support surface 30322 and the second support surface 30323 may be both disposed on the third lug 326 and parallel to the central axis of the rotating shaft 3033. Therefore, the first support surface 30322 and the second support surface 30323 may enter the interval region between the first lug 314 and the second lug 315 when the hinge arm 3032 rotates around the rotating shaft 3033 relative to the hinge mount 3031.

Further, the support member 34 may be located between the first lug 314 and the second lug 315 of the mount body 313. The third support surface 30341 of the support member 34 may be disposed toward the third lug 326. In one application scenario, the elastic member 35 may be completely set inside the accommodation chamber 3121, and touch the support member 34 at the side towards the interval region between the first lug 314 and the second lug 315. When the elastic member 35 is in a natural state, a region of the support member 34 near the elastic member 35 may be at least partially located inside the accommodation chamber 3121. It should be noted that the shape of the portion of the support member 34 inside the accommodation chamber 3121 may match the shape of the accommodation chamber 3121. Therefore, the portion of the support member 34 located inside the accommodation chamber 3121 may stably slide inside the accommodation chamber 3121 when the support member 34 is elastically offset via the elastic member 35.

In an application scenario, a sectional area of the accommodation chamber 3121 may be less than a sectional area of the interval region between the first lug 314 and the second lug 315 in a section perpendicular to the length direction of the hinge mount 3031. The shape of the support member 34 region outside the accommodation chamber 3121 may match the interval region. Therefore, the support member 34 may not all enter the accommodation chamber 3121 upon moving toward a side of the elastic member 35.

Of course, in other embodiments, the sectional shape of the accommodation chamber 3121 may be the same as the interval region between the first lug 314 and the second lug 315 in the section perpendicular to the length direction of the hinge mount 3031. At this time, the support member 34 may completely enter the accommodation chamber 3121. Therefore, the support member 34 may slide inside the entire accommodation chamber 3121 upon receiving a pushing force.

Further, when the hinge 30 in the embodiment is applied to the hinge assembly 122 in the embodiment of the hinge component in present disclosure, the first end surface 30312 of the hinge mount 3031 may be an end surface of the first lug 314 and the second lug 315 toward the hinge arm 3032. The third lug 326 facing a protrusion toward the arm body 325 may be located inside the interval region between the first lug 314 and the second lug 315. Therefore, the first end surface 30312 of the first lug 314 and the second lug 315 may be disposed toward the arm body 325. In a section of the central axis direction of the rotating shaft 3033, the arm body 325 may be further protruded from the third lug 326 to form a second end surface 30321 of the first lug 314 and the second lug 315 toward the hinge mount 3031.

In the embodiment, during the relative rotation of the hinge arm 3032 and the hinge mount 3031, a gap between the first end surface 30312 of the first lug 314 and the second lug 315 and the second end surface 30321 of the arm body 325 may always be larger or smaller than the diameter of the connection wire 3036. Therefore, the connection wire 3036 may not be sandwiched between the first lug 314 and the second lug 315 and the arm body 325 during the relative rotation of the hinge mount 3031 and the hinge arm 3032, thereby reducing the damage of the connection wire 3036 by the hinge 30.

In an application scenario, the gap between the second end surface 30321 of the first lug 314 and the second lug 315 and the first end surface 30312 of the arm body 325 may always be kept much larger or smaller than the diameter of the connection wire 3036 during the relative rotation of the hinge arm 3032 and the hinge mount 3031, thereby further reducing the damage of the connection wire 3036 by the hinge 30.

It should be noted that, in the embodiment, the gap between the first end surface 30312 and the second end surface 30321 may be a gap with even size, thereby satisfying the above condition of being greater than or less than the diameter of the connection wire 3036. Alternatively, in another embodiment, only gaps of positions at both end surfaces close to the connection wire 3036 may be greater than or less than the diameter of the connection wire 3036. Gaps of other positions at both end surfaces may not need to satisfy the condition.

Specifically, in an application scenario, in a section perpendicular to the central axis of the rotating shaft 3033, at least one of an end surface of the first lug 314 and the second lug 315 towards the hinge arm 3032 and an end surface of the arm body 325 towards the hinge mount 3031 may be in a chamfer setting. Therefore, during the relative rotation of the hinge arm 3032 and the hinge mount 3031, the positions close to the connection wire 3036 may always be kept larger than the diameter of the connection wire 3036.

In some embodiments, the chamfer setting may be filleted, or directly chamfered.

In the application scenario, it may be only necessary to chamfer at least one of the end surface of the first lug 314 and the second lug 315 near the connection wire 3036 towards the hinge arm 3032 and the end surface of the arm body 325 towards the hinge mount 3031. Therefore, during the relative rotation of the hinge arm 3032 and the hinge mount 3031, the connection wire 3036 may not be clamped into the gap between the two end surfaces.

The hinge in the embodiment of the present disclosure may be applied to the embodiment of the hinge component in the present disclosure, and not be limited herein. In other embodiments, it may also be applied to other hinge components, or a direct connection of two components that need to be rotatably connected.

In some embodiments, as shown in FIG. 1, the speaker component 83 may be operably connected to the ear hook 500. In some embodiments, the speaker component 83 may include, but is not limited to, earphones, MP3 players, hearing aids, and the like.

In an application scenario, the bone conduction speaker component in this embodiment is an example of the speaker component 83 for illustrative purposes only. The following may further describe the fitting position of the speaker component 83 on the human body based on the bone conduction speaker component. It should be noted that without violating the principle, the following descriptions may also be applied to the air conduction speaker component.

In some embodiments, the position of the speaker component 83 in the MP3 player may not be fixed, and the speaker component 83 may fit different parts of the user's cheek (for example, in front of the ear, behind the ear, etc.), so that the user may feel different sound quality. Users can adjust the sound quality according to their own preferences, and it is also convenient for users with different head sizes. The loudspeaker device may be fixed on the human ear through the ear hook 500, and the speaker component 83 may be located in front of the ear. In some embodiments, the ear hook 500 may be elastically deformable, and the ear hook 500 may be bent to change the fitting position of the speaker component 83 on the human body. In some embodiments, the connection end of the ear hook 500 with the speaker component 83 may be set according to the position that the user is accustomed to. For example, if the user is accustomed to wearing the speaker component 83 behind the ear, the connection end of the ear hook 500 may be set behind the ear under the premise that the fixing function of the ear hook 500 is maintained. More descriptions about the snap connection between the ear hook 500 and the speaker component 83 may be found elsewhere in this application. It should be noted that the connection between the ear hook 500 and the speaker component 83 is not limited to the above-mentioned snap connection. For example, the ear hook 500 and the speaker component 83 may also be connected by a hinge. More descriptions about the hinge may be found elsewhere in this application.

In some embodiments, the speaker component 83 may fit on any position of the user's head, for example, the top of the head, forehead, cheeks, hips, auricles, back of auricles, or the like. In some embodiments, the way of fitting the speaker component 83 to the head may include surface fitting or point fitting. The fitting surface may be provided with a gradient structure which refers to the area where the height of the contact surface changes. The gradient structure may include a convex/concave or stepped structure on the outside of the contact surface (the side that is attached to the user), or a convex/concave or stepped structure on the inside of the contact surface (the side facing away from the user).

Figure 19:
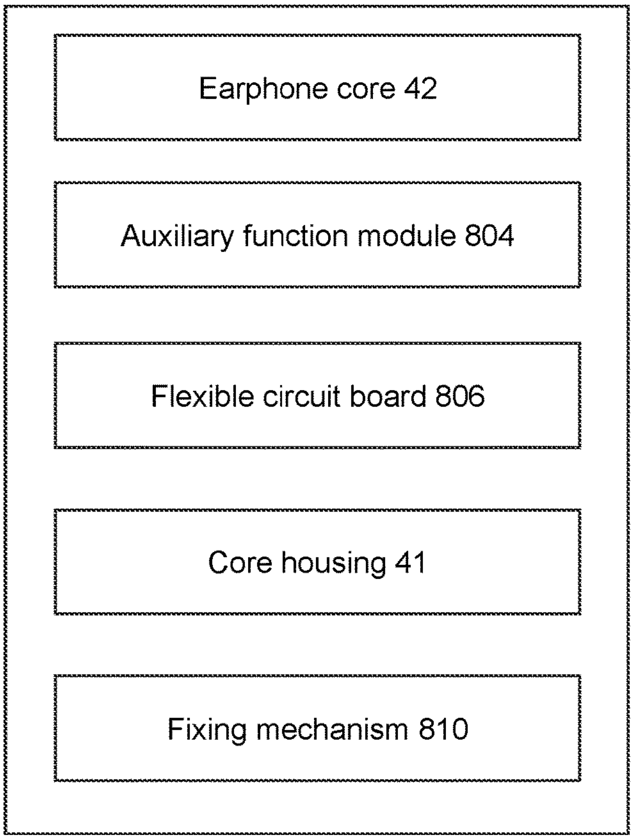
FIG. 19 is a block diagram illustrating a structure of a speaker according to some embodiments of the present disclosure.

FIG. 19 is a block diagram illustrating a structure of a speaker according to some embodiments of the present disclosure. Referring to FIG. 19, in some embodiments, a speaker may include at least an earphone core 42, an auxiliary function module 804, a flexible circuit board 806, a core housing 41, and a fixing mechanism 810.

In some embodiments, the earphone core 42 may receive electrical audio signal(s) and convert the audio signal(s) into the sound signal(s). The flexible circuit board 806 may include a first flexible circuit board 44 and a second flexible circuit board 54. The flexible circuit board 806 may facilitate electrical connection(s) between different modules/components. For example, the first flexible circuit board 44 may facilitate an electrical connection between the earphone core 42 and an external control circuit and an electrical connection between the earphone core 42 and the auxiliary function module 804. For instance, the first flexible circuit board 44 may be used to connect with the earphone core and the auxiliary function module, and the second flexible circuit board 54 may be used to connect a battery to other components. In some embodiments, the core housing 41 may be configured to accommodate the earphone core 42, the auxiliary function module 804, and the flexible circuit board 806. Further, the fixing mechanism 810 may be connected to the core housing 41, and be configured to support and maintain the position of the core housing 41. In some embodiments, the speaker may transmit sound(s) through a bone conduction mode or an air conduction mode.

Specifically, when the speaker transmits a sound through the bone conduction mode, an outer surface of the core housing 41 may have a fitting surface. The fitting surface may be an outer surface of the speaker in contact with the human body when the user wears the speaker. The speaker may compress the fitting surface against a preset area (e.g., a front end of a tragus, a position of a skull, or a back surface of an auricle), thereby effectively transmitting the vibration signal(s) to the auditory nerve of the user through the bone and improving the sound quality of the speaker. In some embodiments, the fitting surface may be abutted on the back surface of the auricle. The mechanical vibration signal(s) may be transmitted from the earphone core 42 to the core housing 41 and transmitted to the back of the auricle through the fitting surface of the core housing 41. The vibration signal(s) may then be transmitted to the auditory nerve by the bone near the back of the auricle. In this case, the bone near the back of the auricle may be closer to the auditory nerve, which may have a better conduction effect and improve the efficiency of transmitting the sound to the auditory nerve by the speaker.

Figure 20:
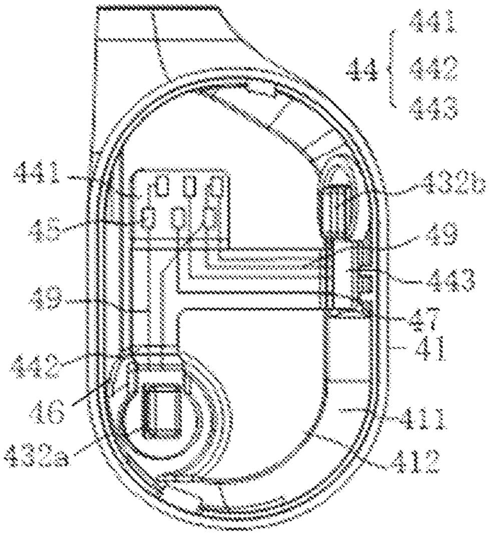
FIG. 20 is a schematic diagram illustrating a structure of a flexible circuit board located inside a core housing according to some embodiments of the present disclosure.
Figure 21:
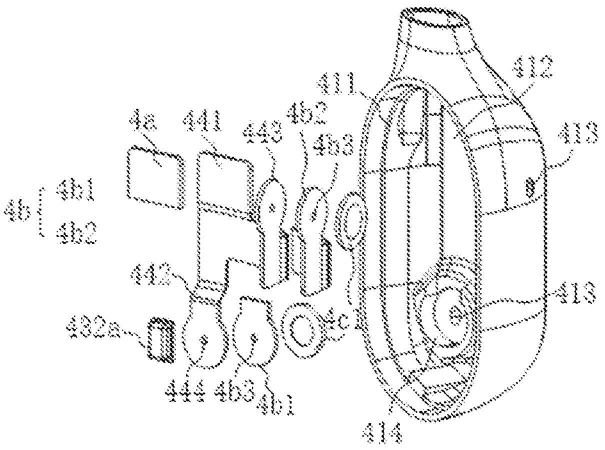
FIG. 21 is an exploded diagram illustrating a partial structure of a speaker according to some embodiments of the present disclosure.

Further, FIG. 20 is a schematic diagram illustrating a structure of a flexible circuit board located inside a core housing according to some embodiments of the present disclosure. FIG. 21 is an exploded diagram illustrating a partial structure of a speaker according to some embodiments of the present disclosure. Referring to FIGS. 20 and 21, in some embodiments, the first flexible circuit board 44 may be disposed with a plurality of pads. Different signal wires (e.g., audio signal wires, auxiliary signal wires) may be electrically connected to different pads through different flexible leads to avoid numerous and complicated internal wires issues, which may occur when both audio signal wires and auxiliary signal wires need to be connected to the earphone core 42 or the auxiliary function module.

As shown in FIGS. 20 and 21, in some embodiments, the first flexible circuit board 44 may at least include a plurality of first pads 45 and a plurality of second pads 46. At least one of the first pads 45 may be electrically connected to auxiliary function module(s). The at least one of the first pads 45 may be electrically connected to at least one of the second pads 46 through a first flexible lead 47 on the first flexible circuit board 44. The at least one of the second pads 46 may be electrically connected to the earphone core 42 through external wire(s) 4. At least another one of the first pads 45 may be electrically connected to auxiliary signal wire(s). The at least another one of first pads 45 and the auxiliary function module(s) may be electrically connected through a second flexible lead 49 on the first flexible circuit board 44.

In the embodiment, the at least one of the first pads 45 may be electrically connected to the auxiliary function module(s) 804. The at least one of the second pads 46 may be electrically connected to the earphone core 42 through the external wire(s). The one of the at least one of the first pads 45 may be electrically connected to one of the at least one of the second pads 46 through the first flexible lead 47, so that the external audio signal wire(s) and the auxiliary signal wire(s) may be electrically connected to the earphone core 42 and the auxiliary function modules 804 at the same time through the first flexible circuit board 44, which may simplify a layout of the wiring.

In some embodiments, the audio signal wire(s) may be wire(s) electrically connected to the earphone core 42 and transmitting audio signal(s) to the earphone core 42. The auxiliary signal wire(s) may be wire(s) electrically connected to the auxiliary function modules 804 and performing signal transmission with the auxiliary function modules 804.

In some embodiments, referring to FIG. 20, specifically, the first flexible circuit board 44 may be disposed with the plurality of first pads 45 and two second pads 46. The two second pads 46 and at least one of the plurality of first pads 45 may be located on the same side of the first flexible circuit board 44 and spaced apart. The two second pads 46 may be connected to two corresponding first pads 45 of the plurality of first pads 45 through the first flexible lead(s) 47 on the first flexible circuit board 44. Further, a core housing 41 may also accommodate two external wires. One end of each of the external wires may be welded to a corresponding second pad 46, and the other end may be connected to the earphone core 42, so that the earphone core 42 may be connected to the second pads 46 through the external wires. The auxiliary function module may be mounted on the first flexible circuit board 44 and connected to other pads of the plurality of first pads 45 through the second flexible lead(s) 49 on the first flexible circuit board 44.

In some embodiments, wires may be disposed in the fixing mechanism 810 of the speaker. The wires may at least include the audio signal wire(s) and the auxiliary signal wire(s). In some embodiments, there may be multiple wires in the fixing mechanism 810. Such wires may include at least two audio signal wires and at least two auxiliary signal wires. For example, the fixing mechanism 810 may include an ear hook. The ear hook may be connected to the core housing 41, and the wires may be ear hook wires disposed in the ear hook. One end of each of the ear hook wires is welded to the first flexible circuit board 44 arranged in the core housing 41, or to a control circuit board, and the other end enters the core housing 41 and is welded to the first pads 45 of the first flexible circuit board 44.

Further, the fixing mechanism 810 may further include a circuit housing 100, an ear hook 500, a rear hook 300, or the like.

As used herein, one end of each of the two audio signal wires in the ear hook wires, which is located in the core housing 41, may be welded to the two first pads 45 by two first flexible leads 47, and the other end may be directly or indirectly connected to the control circuit board. The two first pads 45 may be further connected to the earphone core 42 through the welding of the second flexible lead(s) 49 and the two second pad 46 and the welding of the two external wires and the second pads 46, thereby transmitting the audio signal(s) to the earphone core 42.

One end of each of at least two auxiliary signal wires in the core housing 41 may be welded to the first pad 45 by the second flexible lead(s) 49, and the other end may be directly or indirectly connected to the control circuit board so as to pass the auxiliary signal(s) received and transformed by the auxiliary function module(s) to the control circuit 5051.

In the approach described above, the first flexible circuit board 44 may be disposed in the core housing 41, and the corresponding pads may be further disposed on the first flexible circuit board 44. Therefore, the wires 23 may enter the core housing 41 and be welded to the corresponding pads, and further connected to the corresponding auxiliary function module(s) 804 through the first flexible leads 47 and the second flexible leads 49 on the pads, thereby avoiding a plurality of wires directly connected to the auxiliary function module(s) 804 to make the wiring in the core housing 41 complicated. Therefore, the arrangement of the wirings may be optimized, and the space occupied by the core housing 41 may be saved. In addition, when the multiple ear hook wires are directly connected to the auxiliary function module(s) 804, a middle portion of each of the ear hook wires may be suspended in the core housing 41 to easily cause vibration, thereby resulting in abnormal sounds to affect the sound quality of the earphone core 42. According to the approach, the ear hook wires may be welded to the first flexible circuit board 44 and further connected to the corresponding auxiliary function module (s), which may reduce a situation that the wires are suspended from effecting the quality of the earphone core 42, thereby improving the sound quality of the earphone core 42 to a certain extent.

In some embodiments, the first flexible circuit board 44 may be further divided. The first flexible circuit board 44 may be divided into at least two regions. One auxiliary function module 804 may be disposed on one of the at least two regions, so that at least two auxiliary function modules 804 may be disposed on the first flexible circuit board 44. Wiring between the audio signal wire(s) and the auxiliary signal wire(s) and the at least two auxiliary function modules may be implemented through the first flexible circuit board 44.

In some embodiments, the first flexible circuit board 44 may include at least a main circuit board 441 and a first branch circuit board 442. The first branch circuit board 442 may be connected to the main circuit board 441 and extend away from the main circuit board 441 along one end of the main circuit board 441. The auxiliary function module 804 may include a first auxiliary function module and a second auxiliary function module. The first auxiliary function module may be disposed on the main circuit board 441, and the second auxiliary function module may be disposed on the first branch circuit board 442.

Further, the plurality of first pads 45 may be disposed on the main circuit board 441, and the second pads 46 may be disposed on the first branch circuit board 442. In some embodiments, the first auxiliary function module may be a key switch 431. The key switch 431 may be disposed on the main circuit board 441, and the first pads 45 may be disposed corresponding to the key switch 431. The second auxiliary function module may be a microphone. The microphone may be disposed on the first branch circuit board 442, and the second pads 46 corresponding to the microphone may be disposed on the first branch circuit board 442. The first pads 45 corresponding to the key switch 431 on the main circuit board 441 may be connected to the second pads 46 corresponding to the microphone on the first branch circuit board 442 through the second flexible lead(s) 49. The key switch 431 may be electrically connected to the microphone 432, so that the key switch 431 may control or operate the microphone 432.

In some embodiments, the first flexible circuit board 44 may further include a second branch circuit board 443. The second branch circuit board 443 may be connected to the main circuit board 441. The second branch circuit board 443 may extend away from the main circuit board 441 along the other end of the main circuit board 441 and be spaced from the first branch circuit board 442.

Further, the plurality of first pads 45 may be disposed on the main circuit board 441. At least one of the second pads 46 may be disposed on the first branch circuit board 442, and the other second pads 46 may be disposed on the second branch circuit.

Further, the auxiliary function module 804 may further include a third auxiliary function module. The third auxiliary function module may be disposed on the second branch circuit board 443.

In some embodiments, the third auxiliary function module may be a second microphone **432*b*. The second branch circuit board may extend perpendicular to the main circuit board 441. The second microphone 432*b* may be mounted on the end of the second branch circuit board 443 away from the main circuit board 441. Multiple pads may be disposed at the end of the main circuit board 441 away from the second branch circuit board 443**.

Specifically, as shown in FIG. 20 and FIG. 21, the second auxiliary function module may be the first microphone **432*a*. The third auxiliary function module may be the second microphone 432*b*. As used herein, the first microphone 432*a* and the second microphone 432*b* may both be MEMS (micro-electromechanical system) microphone 432, which may have a small working current, relatively stable performance, and high voice quality. The two microphones 432 may be disposed at different positions of the first flexible circuit board 44** according to actual needs.

As used herein, the first flexible circuit board 44 may include a main circuit board 441, and a first branch circuit board 442 and a second branch circuit board 443 connected to the main circuit board 441. The first branch circuit board 442 may extend in the same direction as the main circuit board 441. The first microphone **432*a* may be mounted on one end of the first branch circuit board 442 away from the main circuit board 441. The second branch circuit board 443 may extend perpendicular to the main circuit board 441. The second microphone 432*b* may be mounted on one end of the second branch circuit board 443 away from the main circuit board 441. A plurality of first pads 45 may be disposed on the end of the main circuit board 441 away from the first branch circuit board 442 and the second branch circuit board 443**.

In one embodiment, the core housing 41 may include a peripheral side wall 411 and a bottom end wall 412 connected to one end surface of the peripheral side wall 411, so as to form an accommodation space with an open end. As used herein, an earphone core 42 may be disposed in the accommodation space through the open end. The first microphone **432*a* may be fixed on the bottom end wall 412. The second microphone 432*b* may be fixed on the peripheral side wall 411**.

In the embodiment, the first branch circuit board 442 and/or the second branch circuit board 443 may be appropriately bent to suit a position of a sound inlet corresponding to the microphone 432 on the core housing 41. Specifically, the first flexible circuit board 44 may be disposed in the core housing 41 in a manner that the main circuit board 441 is parallel to the bottom end wall 412. Therefore, the first microphone 432*a* may correspond to the bottom end wall 412 without bending the main circuit board 441. Since the second microphone 432*b* may be fixed on the peripheral side wall 411 of the core housing 41, it may be necessary to bend the second main circuit board 441. Specifically, the second branch circuit board 443 may be bent at one end away from the main circuit board 441 so that a board surface of the second branch circuit board 443 may be perpendicular to a board surface of the main circuit board 441 and the first branch circuit board 442. Further, the second microphone 432*b* may be fixed at the peripheral side wall 411 of the core housing 41 in a direction facing away from the main circuit board 441 and the first branch circuit board 442.

In one embodiment, the first pads 45, the second pads 46, the first microphone 432*a*, and the second microphone 432*b* may be disposed on the same side of the first flexible circuit board 44. The second pads 46 may be disposed adjacent to the second microphone 432*b*.

As used herein, the second pads 46 may be specifically disposed at one end of the branch circuit board 443 away from the main circuit board 441 and have the same direction as the second microphone 432*b* and disposed at intervals. Therefore, the second pads may be perpendicular to the direction of the first pads 45 as the branch circuit board 443 is bent. It should be noted that the second branch circuit board 443 may not be perpendicular to the board surface of the main circuit board 441 after being bent, which may be determined according to the arrangement between the side wall 411 and the bottom end wall 412.

Further, another side of the first flexible circuit board 44 may be disposed with a rigid support plate 4*a* and a microphone rigid support plate 4*b* for supporting the first pads 45. The microphone rigid support plate 4*b* may include a rigid support plate 4*b*1 for supporting the first microphone 432*a* and a rigid support plate 4*b*2 for supporting the second pads and the second microphone 432*b* together.

As used herein, the rigid support plate 4*a*, the rigid support plate 4*b*1, and the rigid support plate 4*b*2 may be mainly used to support the corresponding pads and the microphone 432, and thus may need to have certain strengths. The materials of the three may be the same or different. The specific material may be polyimide (PI), or other materials that may provide the strengths, such as polycarbonate, polyvinyl chloride, etc. In addition, the thicknesses of the three rigid support plates may be set according to the strengths of the rigid support plates, and actual strengths required by the first pads 45, the second pads 46, the first microphone 432*a*, and the second microphone 432*b*, and be not specifically limited herein.

As used herein, the rigid support plate 4*a*, the rigid support plate 4*b*1, and the rigid support plate 4*b*2 may be three different regions of an entire rigid support plate, or three independent bodies spaced apart from each other, and be not specifically limited herein.

In one embodiment, the first microphone 432*a* and the second microphone 432*b* may correspond to two microphone components 4*c*, respectively. In one embodiment, the structures of the two microphone components 4*c* may be the same. A sound inlet 413 may be disposed on the core housing 41. Further, the speaker may be further disposed with an annular blocking wall 414 integrally formed on the inner surface of the core housing 41 at the core housing 41, and disposed at the periphery of the sound inlet 413, thereby defining an accommodation space 415 connected to the sound inlet 413.

In one embodiment, the first flexible circuit board 44 may be disposed between a rigid support plate and the microphone 432. A sound input 444 may be disposed at a position corresponding to a sound input 4*b*3 of the microphone rigid support plate 4*b*.

Further, the first flexible circuit board 44 may further extend away from the microphone 432, so as to be connected to other functional components or wires to implement corresponding functions. Correspondingly, the microphone rigid support plate 4*b* may also extend out a distance with the first flexible circuit board 44 in a direction away from the microphone 432.

Correspondingly, the annular blocking wall 414 may be disposed with a gap matching the shape of the first flexible circuit board 44 to allow the first flexible circuit board 44 to extend out of the accommodation space 415. In addition, the gap may be further filled with a sealant to further improve the sealing.

Figure 22:
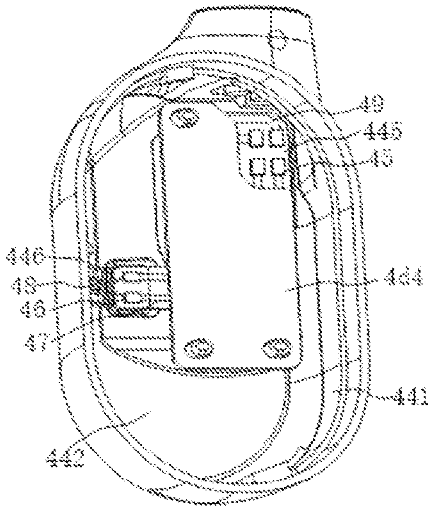
FIG. 22 is a partial sectional view illustrating a structure of a speaker according to some embodiments of the present disclosure.

FIG. 22 is a partial sectional view illustrating a structure of a speaker according to some embodiments of the present disclosure. In some embodiments, as shown in FIG. 22, the first flexible circuit board 44 may include a main circuit board 445 and a branch circuit board 446. The branch circuit board 446 may extend along an extending direction perpendicular to the main circuit board 445. As used herein, a plurality of first pads 45 may be disposed at the end of the main circuit board 445 away from the branch circuit board 446. A key switch may be mounted on the main circuit board 445. The second pads 46 may be disposed at the end of the branch circuit boards 446 away from the main circuit board 445.

In the embodiment, a board surface of the first flexible circuit board 44 and the bottom end wall 412 may be disposed in parallel and at intervals, so that the key switch 431 may be disposed towards the bottom end wall 412 of the core housing 41.

As described above, the earphone core 42 may include a magnetic circuit component configured to provide a magnetic field, a vibration component, an external wire 48, and a bracket 4210. As used herein, the vibration component may include a coil located in the magnetic field and an inner lead 4230 electrically connected to the coil. The external wire 48 may transmit an audio current to the coil in the vibration component. One end of the external wire 48 may be connected to the inner lead 4230 of the earphone core 42, and the other end may be connected to the flexible circuit board 44 of a speaker. The bracket 4210 may be configured to support and protect the earphone core 42. The bracket 4210 may include a wiring groove 4211. At least a portion of the external wire 48 and/or the inner lead may be disposed in the wiring groove 4211. The wiring groove 4211 may be configured to accommodate leads of the earphone core 42. In some embodiments, the inner lead 4230 and the external wire may be welded to each other. A welding position may be located in the wiring groove 4211.

Figure 23:
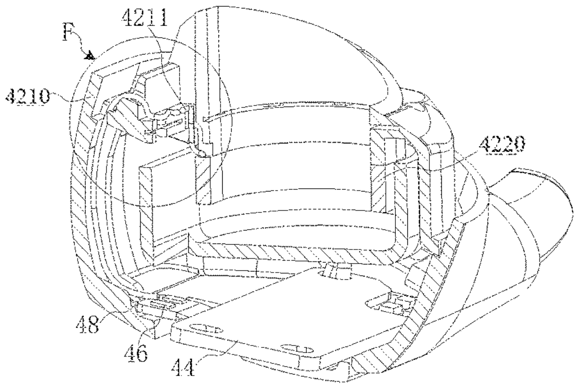
FIG. 23 is a partial sectional diagram illustrating a speaker according to some embodiments of the present disclosure.
Figure 24:
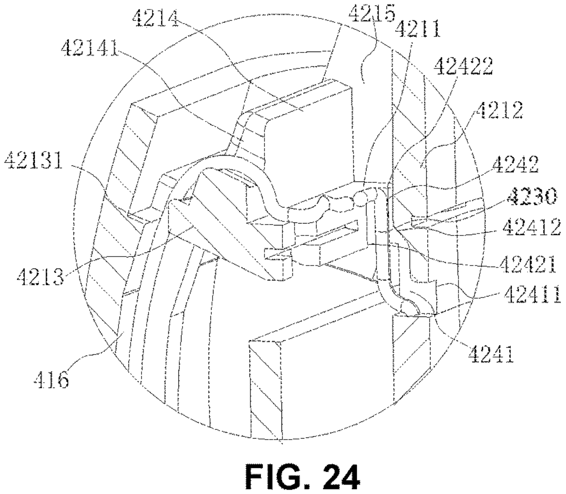
FIG. 24 is a partial enlarged diagram illustrating part F of a speaker in FIG. 23 according to some embodiments of the present disclosure.

Further, referring to FIG. 23 and FIG. 24, FIG. 23 is a partial sectional diagram illustrating a speaker according to some embodiments of the present disclosure.

FIG. 24 is a partial enlarged diagram illustrating part F of a speaker in FIG. 23 according to some embodiments of the present disclosure. In some embodiments, the coil 4220 may be disposed on the bracket 4210 and have at least one inner lead 4230. One end of the inner lead(s) 4230 may be connected to a main circuit in the coil 4220 to lead out the main circuit and transmit an audio current to the coil 4220 through the inner lead 4230.

One end of the external wire 48 may be connected to the inner lead(s) 4230. Further, the other end of the external wire 48 may be connected to a control circuit 5051 to transmit the audio current through the control circuit to the coil 4220 through the inner lead 4230.

Specifically, during an assembly stage, the external wire 48 and the inner lead(s) 4230 may need to be connected together by means of welding, or the like. Due to structural and other factors, after the welding is completed, a length of the wire may not be exactly the same as a length of a channel, and there may be an excess length part of the wire. And if the excess length part of the wire is not disposed reasonably, it may vibrate with the vibration of the coil 4220, thereby making an abnormal sound and affecting the sound quality of the earphone core 42.

Further, at least one of the external wire 48 and the inner lead 4230 may be wound and disposed in the wiring groove 4211. In an application scenario, the welding position between the inner lead 4230 and the external wire 48 may be disposed in the wiring groove 4211, so that a portion of the external wire 48 and the inner lead 4230 located near the welding position may be wound in the wiring groove 4211. In addition, in order to maintain stability, the wiring groove 4211 may be further filled with a sealant to further fix the wiring in the wiring groove 4211.

In the manner described above, the wiring groove 4211 may be disposed on the bracket 4210, so that at least one of the external wire 48 and the inner lead 4230 may be wound into the wiring groove 4211 to accommodate the excess length part of the wire, thereby reducing the vibration generated inside the channel, and reducing the influence of the abnormal sound caused by the vibration on the sound quality of the earphone core 42.

In one embodiment, the bracket 4210 may include an annular main body 4212, a support flange 4213, and an outer blocking wall 4214. As used herein, the annular main body 4212, the support flange 4213, and the outer blocking wall 4214 may be integrally formed.

As used herein, the annular main body 4212 may be disposed inside the entire bracket 4210 and used to support the coil 4220. Specifically, a cross-section of the annular main body 4212 in a direction perpendicular to the radial direction of a ring of the annular main body 4212 may be consistent with the coil 4220. The coil 4220 may be disposed at an end of the annular main body 4212 facing the core housing 41. The inner side wall and the outer side wall of the annular main body 4212 may be flush with the inner side wall and the outer side wall of the coil 4220, respectively, so that the inner side wall of the coil 4220 and the inner side wall of the annular main body 4212 may be coplanar, and the outer side wall of the coil 4220 and the outer side wall of the annular main body 4212 may be coplanar.

Further, the support flange 4213 may protrude on the outer side wall of the annular main body 4212 and extend along the outside of the annular main body 4212. Specifically, the support flange 4213 may extend outward in a direction perpendicular to the outer side wall of the annular main body 4212. As used herein, the support flange 4213 may be disposed at a position between two ends of the annular main body 4212. In the embodiment, the support flange 4213 may protrude around the outer side wall of the annular main body 4212 to form an annular support flange 4213. In other embodiments, the support flange 4213 may also be formed by protruding at a portion of the outer side wall of the annular main body 4212 according to needs.

The outer blocking wall 4214 may be connected to the support flange 4213 and spaced apart from the annular main body 4212 along the side of the annular main body 4212. As used herein, the outer blocking wall 4214 may be sleeved on the periphery of the annular main body 4212 and/or the coil 4220 at intervals. Specifically, the outer blocking wall 4214 may be partially sleeved around the periphery of the annular main body 4212 and the coil 4220 according to actual needs, or partially sleeved around the periphery of the annular main body 4212. It should be noted that, in the embodiment, a portion of the outer blocking wall 4214 close to the wiring groove 4211 may be sleeved on a portion of the periphery of the annular main body 4212. Specifically, the outer blocking wall 4214 may be disposed on a side of the support flange 4213 away from the core housing 41. As used herein, the outer side wall of the annular main body 4212, the side wall of the support flange 4213 away from the core housing 41, and the inner side wall of the outer blocking wall 4214 may together define the wiring groove 4211.

In one embodiment, a wiring channel 424 may be disposed on the annular main body 4212 and the support flange 4213. The inner lead(s) 4230 may extend inside the wiring groove 4211 via the wiring channel 424.

As used herein, the wiring channel 424 may include a sub-wiring channel 4241 on the annular main body 4212 and a sub-wiring channel 4242 on the support flange 4213. The sub-wiring channel 4241 may be disposed through the inner side wall and the outer side wall of the annular main body 4212. A wiring port 42411 communicating with one end of the sub-wiring channel 4241 may be disposed on a side of the annular main body 4212 near the coil 4220. A wiring port 42412 communicating with the other end of the sub-wiring channel 4241 may be disposed on a side of the core housing near the support flange 4213 facing the core housing 41. The sub-wiring channel 4242 may penetrate the support flange 4213 in a direction towards the outside of the core housing 41. The wiring port 42421 communicating with the end of the sub-wiring channel 4242 may be disposed on a side of the support flange 4213 facing the core housing 41. The wiring port 42422 communicating with the other end of the sub-wiring channel 4242 may be disposed on a side away from the core housing 41. As used herein, the wiring port 42412 and the wiring port 42421 may communicate through a space between the support flange 4213 and the annular main body 4212.

Further, the inner lead(s) 4230 may enter the wiring port 42411, extend along the sub-wiring channel 4241, exit from the wiring port 42412 to enter a region between the annular main body 4212 and the support flange 4213, further enter the sub-wiring channel 4242 from the wiring port 42421, and extend into the wiring groove 4211 after passing through the wiring port 42422.

In one embodiment, the top of the outer blocking wall 4214 may be disposed with a slot 42141. The external wire 48 may extend inside the wiring groove 4211 through the slot 42141.

As used herein, one end of the external wire 48 may be disposed on the flexible circuit board 44. The flexible circuit board 44 may be specifically disposed on an inner side of the earphone core 42 facing the core housing 41.

In the embodiment, the support flange 4213 may be further extended to a side of the outer blocking wall 4214 away from the annular main body 4212 to form an outer edge. Further, the outer edge may surround and abut on the inner side wall of the core housing 41. Specifically, the outer edge of the support flange 4213 may be disposed with a slot 42131, so that the external wire 48 on the inner side of the earphone core 42 facing the core housing 41 may be extended to the outer side of the support flange 4213 facing the core housing 41 through the slot 42131, and then to the slot 42141, and enter the wiring groove 4211 through the slot 42141.

Further, the inner side wall of the core housing 41 may be disposed with a guide groove 416. One end of the guide groove 416 may be located on one side of the flexible circuit board 44 and the other end may communicate with the slot 42131 and extend in a direction towards the outside of the core housing 41, so that the external wire 48 extends from the flexible circuit board to a second wiring groove 3331 by passing through the guide slot 416.

In one embodiment, the bracket 4210 may further include two side blocking walls 4215 spaced along the circumferential direction of the annular main body 4212 and connected to the annular main body 4212, the supporting flange 4213, and the outer blocking wall 4214, thereby defining the wiring groove 4211 between the two side blocking walls 4215.

Specifically, the two side blocking walls 4215 may be oppositely disposed on the support flange 4213 and protrude towards the outer side of the core housing 41 along the support flange 4213. As used herein, a side of the two side blocking walls 4215 facing the annular main body 4212 may be connected to the outer side wall of the annular main body 4212. A side away from the annular main body 4212 may terminate at the outer side wall of the outer blocking wall 4214. The wiring port 42422 and the slot 42141 may be defined between the two side blocking walls 4215. Therefore, the inner lead(s) 4230 exiting from the wiring port 42422 and the external wire 48 entering through the slot 42141 may extend into the wiring groove 4211 defined by the two side blocking walls 4215.

Figure 25:
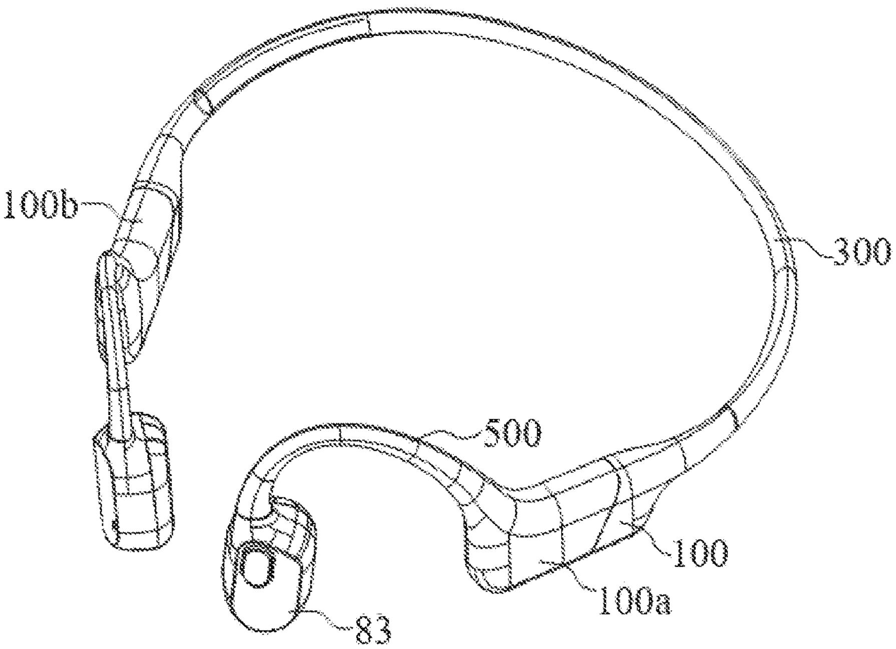
FIG. 25 is a schematic structural diagram of a speaker according to some embodiments of the present disclosure.
Figure 26:
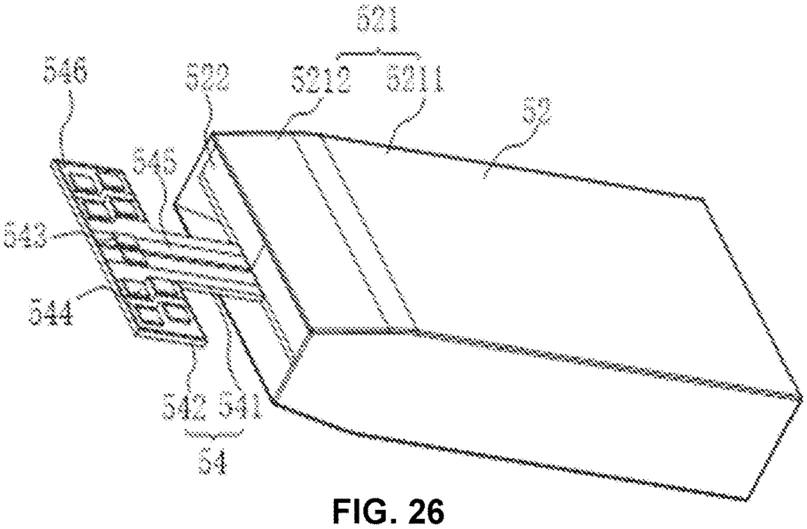
FIG. 26 is a schematic structural diagram of a battery assembly of a speaker according to some embodiments of the present disclosure.
Figure 27:
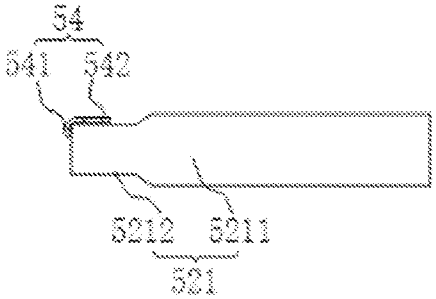
FIG. 27 is a schematic structural diagram of a battery assembly of a speaker according to some embodiments of the present disclosure.
Figure 28:
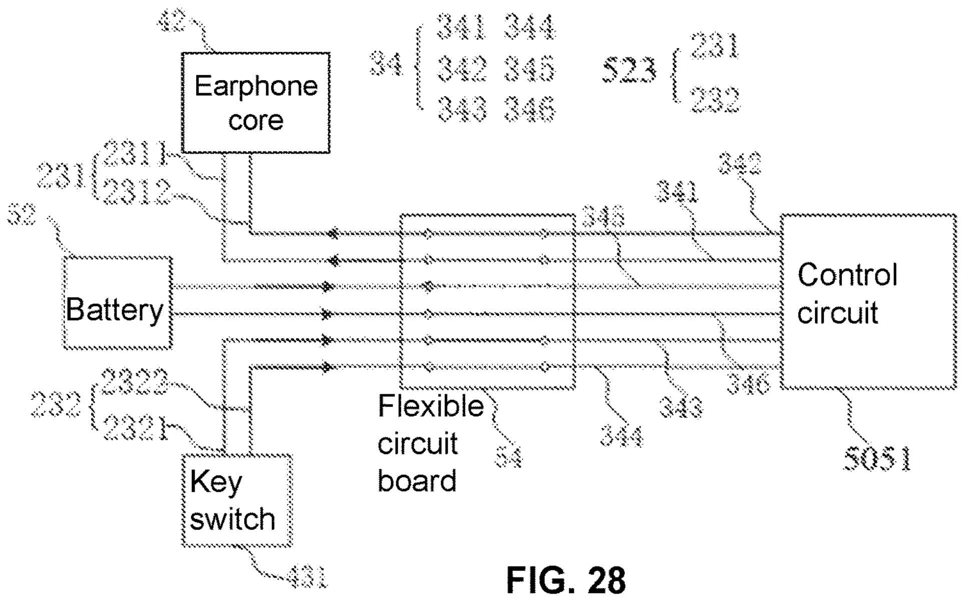
FIG. 28 is a schematic diagram of a flexible circuit board wiring at a battery according to some embodiments of the present disclosure.

FIG. 25 is a schematic structural diagram of a speaker according to some embodiments of the present disclosure. FIG. 26 is a schematic structural diagram of a battery assembly of a speaker according to some embodiments of the present disclosure. FIG. 27 is a schematic structural diagram of a battery assembly of a speaker according to some embodiments of the present disclosure. FIG. 28 is a schematic diagram of a flexible circuit board wiring at a battery according to some embodiments of the present disclosure. Referring to FIG. 25 to FIG. 28, in some embodiments, as described in the previous embodiments, the fixing mechanism 810 may include a circuit housing 100, an ear hook 500, a rear hook 300, etc., for fixing the speaker to the human body. Further, a battery assembly and a control circuit may be disposed in the fixing mechanism 810. The battery assembly may include a battery 52 including a positive terminal and a negative terminal. Furthermore, the circuit housing 100 may include a first circuit housing 100*a* and a second circuit housing 100*b*. Furthermore, the loudspeaker device may include a second flexible circuit board 54 that can be accommodated together with the battery 52 in an accommodation cavity (not shown in the figure) of the first circuit housing 100*a*. The second flexible circuit board 54 may be a flexible printed circuit (FPC).

The second flexible circuit board 54 may include a first board 541 and a second board 542. One end of the first board 541 may be fixed to the battery 52 and the other end may be connected to the second board 542. The second flexible circuit board 54 may be a whole body, and the first board 541 and the second board 542 may be two areas of the whole body. The second board 542 may be provided with pads and flexible wires connecting the pads. The first board 541 may only be provided with flexible wires for connecting the corresponding pads on the second board 542 to battery 52. Since only flexible wires are provided on the first board 541, the first board 541 may be bent, as shown in FIG. 27, so that the position of the second flexible circuit board 54 may be adjusted according to requirements.

A plurality of pads may be disposed on the second board 542 at intervals, and the plurality of pads may include two third pads 543 and a plurality of fourth pads 544. Further, two consecutive third flexible wires 545 may be commonly disposed on the first board 541 and the second board 542. The two third pads 543 may be electrically connected to the positive and negative terminals of the battery 52 by the two third flexible wires 545, respectively.

It should be noted that the first, second, third and fourth pads in the foregoing embodiments may be the same object.

In addition, the plurality of fourth pads 544 may be divided into at least two groups, and the number of the fourth pads 544 in each group may be set according to requirements. For example, the number of the fourth pads 544 in each group may be two. In addition, the two fourth pads 544 may be electrically connected to each other by the fourth flexible leads 546 disposed on the second board 542. The two fourth pads 544 in each group may be connected to functional elements through wires respectively. Therefore, the two corresponding functional elements may be connected together through the fourth flexible wire 546.

It should be noted that the first, second, third and fourth flexible leads in the foregoing embodiments may be the same object.

In the embodiment, on the one hand, the pads used for circuit switching may be all disposed on the second board 542 of the second flexible circuit board 54 and connected to the battery 52 via the first board 541 of the second flexible circuit board 54, so that the first board 541 may be bent according to space requirements to place the second board 542, thereby optimizing the space utilization of the accommodating cavity of the first circuit housing 100*a* and improving the space utilization. On the other hand, the two third pads 543 may be directly connected to the positive and negative terminals of the battery 52 through the third flexible wire 545 on the second flexible circuit board 54. There is no need to provide additional pads to lead the positive and negative electrodes of the battery 52, thereby reducing the number of pads and simplifying the structure and process.

In some embodiments, the first board 541 may be further folded and arranged so that the second board 542 may be attached to the side surface of the battery 52, and the first board 541 and the battery 52 may be stacked, thereby greatly reducing the space occupied by the battery 52 and the second flexible circuit board 54.

Specifically, the battery 52 may include a battery cell 521. The battery cell 521 may include a body region 5211 and a sealing region 5212. The body region 5211 and the sealing region 5212 may be laid flat, and the thickness of the body region 5211 may be greater than the thickness of the sealing region 5212, thereby making the side surface of the sealing region 5212 and the side surface of the body region 5211 being arranged in a stepped manner.

Specifically, the side surfaces of the sealing region 5212 and the body region 5211 in the thickness direction of the battery cell 521 may be arranged in a stepped manner, so that the second board 542 may use the space formed by the body region 5211 and the sealing region 5212 of the battery cell 521. There is no need to provide a separate space for placing the second flexible circuit board 54, thereby further improving the space utilization.

In some embodiments, the battery 52 may further include a hard circuit board 522 disposed on the side surface of the sealing region 5212 of the battery cell 521. Specifically, the positive terminal and the negative terminal may be disposed on the hard circuit board 522, and a protection circuit (not shown) may be further disposed on the hard circuit board 522, so as to protect the battery 52 from overload by the protection circuit.

In this embodiment, the end of the first board 541 away from the second board 542 may be attached and fixed to the hard circuit board 522, so that the two flexible wires on the first board 541 may be connected to the positive terminal and the negative terminal of the hard circuit board 522. Specifically, the first board 541 and the hard circuit board 522 may be directly pressed together in the manufacturing stage.

Further, the shape of the first board 541 and the second board 542 may be set according to actual conditions. In this embodiment, the shape of the first board 541 may match the shape of the sealing region 5212 of the battery cell 521, and the shapes of the first board 541 and the sealing region 5212 of the battery cell 521 may be elongated rectangles. The shape of the second board 542 may also be rectangular. The second board 542 may be disposed on one end of the first board 541 in the length direction and may be perpendicular to the first board 541 along the length direction. Further, the first board 541 may be connected to the middle area of the second board 542 in the length direction, so that the first board 541 and the second board 542 may be arranged in a T shape.

Further, on the second board 542, the third pads 543 and the fourth pads 544 may be arranged in multiple ways. For example, all the pads may be arranged at intervals along a straight line or arranged at intervals in other shapes.

In this embodiment, the two third pads 543 may be disposed in the middle area of the second board 542 at intervals along the length direction of the second board 542, and a plurality of fourth pads 544 may be further distributed on two sides of the two third pads 543 along the length direction of the second board 542, and the fourth pads 544 in each group may be adjacently arranged.

In this embodiment, the fourth pads 544 in each group may be arranged at intervals along the width direction of the second board 542, and may be staggered from each other along the length direction of the second board 542, so that the fourth pads 544 in each group may be arranged along stepped intervals. In this way, on the one hand, it is possible to avoid the formation of a flush space between the two adjacent groups of fourth pads 544, thereby making the intensity distribution on the second board 542 uniform, and reducing the occurrence of bending between the two adjacent groups of fourth pads 544, and reducing the probability that the second board 542 is broken due to bending, so as to protect the second board 542. On the other hand, the distance between the pads may be increased to facilitate soldering and reduce short circuits between different pads.

The present disclosure also provides a battery assembly. In an embodiment of the battery assembly, the battery assembly may include the battery 52 and the second flexible circuit board 54 in the foregoing embodiment. The battery assembly in this embodiment may be applied to devices such as earphones, MP3 devices, etc., that require circuit switching at the battery 52. For example, the battery assembly may be used to the loudspeaker device in the present disclosure.

In some embodiments, the rear hook 300 may be connected to one end of the first circuit housing **100*a*, and may be provided with a plurality of rear hook wires 334 (shown in FIG. 28). The ear hook 500 may be connected to the other end of the first circuit housing 100*a*, and may be provided with a plurality of ear hook wires 523**.

Each group of fourth pads 544 may include two fourth pads 544, and the ear hook wires 523 and the corresponding rear hook wires 334 may be electrically connected to the two fourth pads 544 in the same group of fourth pads 544. Therefore, the functional element connected to the rear hook wire 334 and the functional element connected to the ear hook wire 523 may be connect together through the two fourth pads 544 connecting the fourth flexible leads 546 in each group.

In some embodiments, the core housing 41 may further include functional modules such as the key switch 431. In addition, the control circuit 5051 may be included in the second circuit housing **100*b*. There may be four groups of the fourth pads 544 on the second board 542**.

The ear hook wire 523 may include two audio signal wires 231, i.e., the first ear hook wire 2311 and the second ear hook wire 5312 connected to the earphone core 42. The rear hook wire 334 may include the first rear hook wire 3341 and the second rear hook wire 3342 that are connected to the control circuit 5051 and are used to transmit the audio signal to the earphone core 42. Further, the first ear hook wire 2311 and the first rear hook wire 3341, and the second ear hook wire 5312 and the second rear hook wire 3342 may be respectively connected to different pads in different groups of the two groups of fourth pads 544. Specifically, the first ear hook wire 2311 and the first rear hook wire 3341 may be respectively connected to the two fourth pads 544 in the same group of fourth pads 544, and the second ear hook wire 5312 and the second rear hook wire 3342 may be respectively connected to the two fourth pads 544 of the other group of fourth pads 544, thereby electrically connecting the earphone core 42 and the control circuit 5051 together to realize the transmission of audio signals.

In addition, the ear hook wire 523 may also include at least two auxiliary signal wires 232, for example, a third ear hook wire 2321 and a fourth ear hook wire 2322 connected to the key switch 431. Correspondingly, the rear hook wire 334 may also include a third rear hook wire 3343 and a fourth rear hook wire 3344 that are connected to the control circuit 5051 and are used to transmit key signals to the key switch 431. Further, the third ear hook wire 2321 and the third rear hook wire 3343, and the fourth ear hook wire 2322 and the fourth rear wire 3344 may be respectively connected to different pads in different groups of the two groups of fourth pads 544. The two groups of fourth pads 544 may be different from the two groups of fourth pads 544 that realize the transmission of audio signals to the earphone core 42 described above. Further, the third ear hook wire 2321 and the third rear hook wire 3343 may be respectively connected to two fourth pads 544 in the same group of fourth pads 544, and the fourth ear hook wire 2322 and the fourth rear hook wire 3344 may be respectively connected to two fourth pads 544 in another group of fourth pads 544, thereby electrically connecting the key switch 431 and the control circuit 5051 together to realize the transmission of key signals.

Further, the rear hook wire 334 may also include a fifth rear hook wire 3345 and a sixth rear hook wire 3346 connected to the control circuit 5051 and used to supply power to the control circuit 5051. The fifth rear hook wire 3345 and the sixth rear hook wire 3346 may be connected to two third pads 543 respectively, thereby connecting the battery 52 and the control circuit 5051 together.

Figure 29:
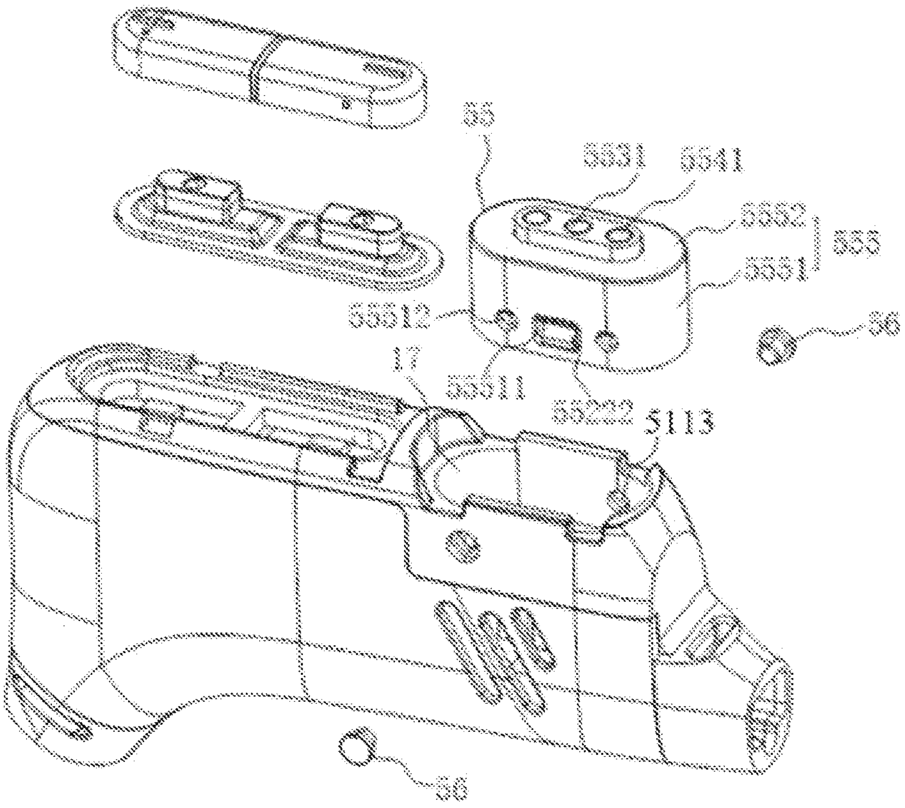
FIG. 29 is an exploded view of a partial structure of a loudspeaker device according to some embodiments of the present disclosure.
Figure 30:
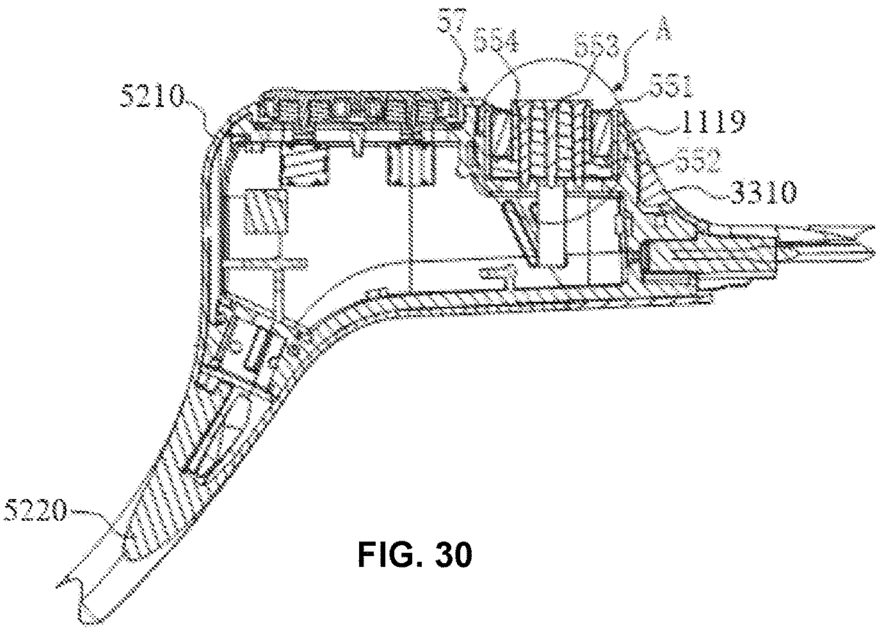
FIG. 30 is a cross-sectional view of a partial structure of a loudspeaker device according to some embodiments of the present disclosure.

FIG. 29 is an exploded view of a partial structure of a loudspeaker device according to some embodiments of the present disclosure. FIG. 30 is a cross-sectional view of a partial structure of a loudspeaker device according to some embodiments of the present disclosure. Referring to FIG. 29 and FIG. 30, in some embodiments, the loudspeaker device may further include a magnetic attraction joint 55. The magnetic attraction joint 55 may be used as a power interface to cooperate with the power interface of a charger to charge the loudspeaker device. Specifically, when the loudspeaker device is charged, the magnetic attraction joint 55 and the corresponding joint of the charger may form a system and match each other so that the magnetic attraction joint 55 and the corresponding joint of the charger may be attracted together, and then establish an electrical connection to charge the loudspeaker device. In this embodiment, the magnetic attraction joint 55 may include a magnetic attraction ring 551, an insulating base 552, a first terminal 553, and a second terminal 554.

The magnetic attraction ring 551 may be a magnet, and the magnetic polarities of the two opposite ends may be different. Correspondingly, the corresponding joint of the charger may include a magnetic attraction structure corresponding to the magnetic attraction ring 551. The magnetic attraction structure may be made of a magnetic material, such as iron. Regardless of the magnetic polarity of the outer end surface of the magnetic attraction ring 551, the magnetic attraction ring 551 and the corresponding joint of the charger may be attracted together. The magnetic attraction structure may also be a magnet. In this case, only when the magnetic polarity of the outer end surface of the magnetic attraction structure and the outer end surface of the magnetic attraction ring 551 are opposite, the magnetic polarity of the outer end surface of the magnetic attraction structure and the outer end surface of the magnetic attraction ring 551 can be attracted together. Furthermore, the magnetic attraction joint 55 and the corresponding joint may be attracted to each other in a preset relative position relationship through magnetic attraction, so as to connect the corresponding terminals of the two together to establish an electrical connection.

Specifically, the shape of the outer end surface of the magnetic attraction ring 551 may be annular, and the magnetic attraction ring 551 may be attracted with the magnetic attraction structure of the corresponding joint through the annular end surface. It should be noted that since the "hollow" design of the ring, the magnetic attraction ring 551 may be attracted and restrained in multiple directions when the magnetic attraction ring 551 is attracted to the ring magnetic attraction structure of the corresponding joint, so that the magnetic attraction ring 551 can be accurately combined with the corresponding magnetic attraction structure.

Figure 31:
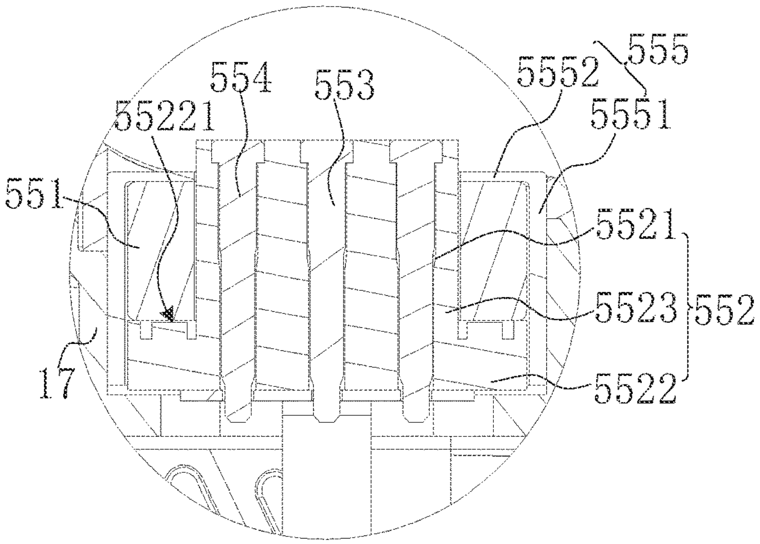
FIG. 31 is a partial enlarged view of part A in FIG. 30.

FIG. 31 is a partial enlarged view of part A in FIG. 30. In some embodiments, at least a portion of the insulating base 552 may be inserted into the magnetic attraction ring 551 to fix the magnetic attraction ring 551. The insulating base 552 may be provided with at least two accommodating holes 5521. The extending direction of the at least two accommodating holes 5521 may be consistent with the height direction of the insulating base 552. The at least two accommodating holes 5521 may at least penetrate the outer end surface of the insulating base 552. The insulating base 552 may be made of insulating materials such as Polycarbonate (PC) and Polyvinyl chloride (PVC).

Further, the first terminal 553 and the second terminal 554 may be arranged in a column shape respectively. The number of the first terminal 553 and the second terminal 554 may be the same as the number of the accommodating holes 5521 on the insulating base 552. Thus, the terminals may be inserted into the respective accommodating hole 5521, and the corresponding end face may be exposed at one end of the top surface of the insulating base 552 through the accommodating hole 5521, so as to be visible from the top surface of the insulating base 552 and flush with the top surface of the insulating base 552 to form a first contact surface 5531 and a second contact surface 5531. The first terminal 553 and the second terminal 554 may correspond to the positive terminal and the negative terminal of the power source respectively, and be used to supply power to the electronic device by connecting the positive terminal and the negative terminal of the power source. Correspondingly, the first contact surface 5531 and the second contact surface 5541 may be electrically connected to the corresponding joints through contact.

In the above embodiment, when used in conjunction with the corresponding joint, the magnetic attraction joint 55 may be adsorbed and restrained from different directions along the direction of the "hollow" annular surface of the magnetic attraction ring 551, thereby reducing the situation that the "solid" surface is easily staggered and deviated from each other and cannot be accurately positioned. The first contact surface 5531 and the second contact surface 5541 may be accurately positioned by aligning the magnetic attraction ring 551 to achieve the matching connection with the corresponding joint, thereby improving the accuracy of the docking with the corresponding joint.

In some embodiments, the insulating base 552 may include a support part 5522 and an insertion part 5523. Specifically, the support part 5522 and the insertion part 5523 may be arranged along the extending direction of the receiving hole 5521. The cross section of the support part 5522 may be larger than the cross section of the insertion part 5523, so that a support table 55221 may be formed at the junction of the support part 5522 and the insertion part 5523.

The shape of the outer side wall near the end of the insertion part 5523 may match the shape of the inner side wall of the magnetic attraction ring 551, so that the insertion part 5523 may be inserted into the magnetic attraction ring 551 and play a role of fixing the magnetic attraction ring 551. The two ends of the accommodating hole 5521 of the insulating base 552 may respectively penetrate through the end surfaces of the insertion part 5523 and the support part 5522 away from each other, so that the first terminal 553 and the second terminal 554 may penetrate the entire insulating base 552, and the first contact surface 5531 and the second contact surface 5541 may be exposed from the outer end surface of the insertion portion 5523 away from the support part 5522. Further, the first terminal 553 and the second terminal 554 may also extend from the outer end surface of the support part 5522 away from the insertion part 5523 to further connect to the internal circuit.

Specifically, the insertion part 5523 may be inserted into the ring of the magnetic attraction ring 551 from the end away from the support part 5522. The magnetic attraction ring 551 and its outer end facing the back end may be supported on the support table 55221. The size of the outer surface of the magnetic attraction ring 551 may be kept consistent with the size of the outer surface of the support part 5522, so that the structure of the magnetic joint may be more unified.

In some embodiments, the magnetic attraction joint 55 may further include a housing 555, which may be sleeved on the outer periphery of the insulating base 552 and the magnetic attraction ring 551, so that the entire magnetic attraction joint 55 may become a whole. Therefore, it is convenient for the magnetic attraction joint 55 to be further assembled on the power interface of the loudspeaker device.

The material of the housing 555 may be a metal material that is not attracted by a magnetic field, such as copper, aluminum, aluminum alloy, etc., or a plastic material, which is not specifically limited here.

In this embodiment, metal may be used as the material of the housing 555 of the magnetic attraction joint 55, so that the housing 555 may be made thin while meeting the strength requirement, so as to reduce the space occupation.

Specifically, the housing 555 may include a cylinder 5551 and a flange 5552 disposed at one end of the cylinder 5551 and protruding into the cylinder 5551, so that one end of the housing 555 where the flange 5552 is provided may be partially open, and the other end may be completely open. The shape of the inner surface of the cylinder 5551 may match the shape of the outer surface of the magnetic attraction ring 551 and the outer surface of the support part 5522 of the insulating base 552. The flange 5552 at the partially open end may cover the magnetic attraction ring 551 to expose the first contact surface 5531 and the second contact surface 5541 of the first terminal 553 and the second terminal 554, so that the housing 555 may be sleeved on the periphery of the insulating base 552, the first terminal 553, the second terminal 554, and the magnetic attraction ring 551 through the fully open end, and the flange 5552 may cover the periphery of the end of the magnetic attraction ring 551 away from the support part 5522, and expose the first contact surface 5531 and the second contact surface 5541 through the partially open end to further electrically connect with the corresponding joint.

In an application scenario, the outer end surface of the insertion part 5523 of the insulating base 552 away from the support part 5522 may be protruded relative to the end of the magnetic attraction ring 551 away from the support part 5522. At this time, the shape of the partially open end formed by the flange 5552 may match the shape of the periphery of the insertion part 5523, so that the end of the insertion part 5523 away from the support part 5522 may pass through the partially open end of the housing 555 and extend to the outside of the housing 555.

In another application scenario, the outer end surface of the insertion part 5523 of the insulating base 552 away from the support part 5522 may be recessed relative to the top surface of the flange 5552.

It should be pointed out that the magnetic attraction joint 55 in this embodiment may be applied to the power interface of the electronic device or the power interface of the charger, so as to cooperate with the power interface of the corresponding charger or the power interface of the electronic device to supply power for the electronic device. In the above manner, by protruding or recessing the top surface of the insulating base 552 relative to the top surface of the flange 5552, the magnetic attraction joint 55 may protrude into the corresponding joint, thereby forming a certain plug-in relationship between the two components to make the connection between the two components more stable.

In some embodiments, the outer peripheral wall of the support part 5522 and the inner peripheral wall of the cylinder 5551 may be respectively provided with a buckle structure that cooperates with each other. Through the buckle structure, the housing 555 may be more securely sleeved on the insulating base 552 and the magnetic attraction ring 551, thereby making the structure of the magnetic attraction joint 55 more stable.

Specifically, in an application scenario, two opposite outer surfaces of the outer peripheral wall of the cylinder 5551 may be each provided with a through groove 55511, and correspondingly, a buckle 55222 may be respectively disposed on the support part 5522 at a corresponding position of the two through grooves 55511. When assembling the magnetic attraction joint 55, the housing 555 may be sleeved on the periphery of the insulating base 552, and the hooks on the support part 5522 may be clamped on the side walls of the corresponding through groove 55511, thereby fixing the housing 555 on the periphery of the outer peripheral wall of the support part 5522.

It should be noted that the specific shape of the magnetic attraction ring 551 in the foregoing embodiments may be set according to different requirements.

In some embodiments, the outer end surface of the magnetic attraction ring 551 may be rotationally symmetric with respect to a preset symmetry point. When the magnetic attraction ring 551 performs symmetrical rotation, the first contact surface 5531 and the second contact surface 5541 may rotate with the magnetic attraction ring 551, and the first contact surface 5531 and the second contact surface 5541 before the rotation may at least partially overlap with the first contact surface 5541 and the second contact surface 5541 after the rotation, respectively. That is to say, the surface formed by the first contact surface 5531 and the second contact surface 5541 may also be or subsequent be rotationally symmetrical with respect to the preset symmetry point. The shape of the outer end surface of the magnetic attraction ring 551 and the angle of rotational symmetry may be determined according to the arrangement of the first contact surface 5531 and the second contact surface 5541.

Specifically, the outer end surface of the magnetic attraction ring 551 may be set as a circular ring, an elliptical ring, a rectangular ring, etc., according to requirements, as long as it may be consistent with the arrangement of the first contact surface 5531 and the second contact surface 5541 so that the first contact surface 5531 and the second contact surface 5541 before the symmetric rotation and the second contact surface 5541 after the symmetric rotation can partially be overlapping.

Through the above method, since the outer end surface of the magnetic attraction ring 551 is rotationally symmetrical with respect to the preset symmetry point, the magnetic attraction ring 551 may be restored to the position before the symmetrical rotation after symmetrical rotation. On the one hand, when assembling the magnetic attraction joint 55, the magnetic attraction ring 551 may include at least two relative assembly positions relative to the first contact surface 5531 and the second contact surface 5541, so as to facilitate assembly. On the other hand, when the magnetic attraction joint 55 is applied to a power interface, the magnetic attraction joint 55 may be docked with the corresponding interface at multiple rotation angles to realize normal power supply to the electronic device, which is convenient to use.

Specifically, such as FIG. 31, in some embodiments, the magnetic attraction ring 551 may be a circular ring centered on the symmetry point, and the first contact surface 5531 and the second contact surface 5541 may be respectively a circle or an annular shaped arranged concentrically with the magnetic attraction ring 551 and nested with each other.

In this way, when the magnetic attraction ring 551 rotates symmetrically at any angle at the center of the circle, the first contact surface 5531 and the second contact surface 5541 before the rotation, and the first contact surface 5531 and the second contact surface 5541 after the rotation may be overlapping. Therefore, during assembly, the magnetic attraction ring 551 only needs to be sleeved concentrically with the first contact surface 5531 and the second contact surface 5541 on the periphery of the insertion part 5523 of the insulating base 552, and there is no need to compare other positions. At the same time, when the magnetic attraction joint 55 is docked with the corresponding joint, it is only necessary to make the magnetic attraction ring 551 correspond to the magnetic attraction structure of the corresponding joint concentrically. That is, the first contact surface 5531 and the second contact surface 5541 may be connected to the positive terminal and the negative terminal of the corresponding interface correspondingly, without further calibration in other ways, which is convenient for users to use.

Figure 32:
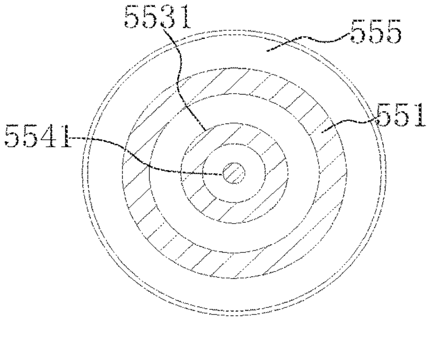
FIG. 32 is a first top view of a magnetic attraction joint of a loudspeaker device according to some embodiments of the present disclosure.

FIG. 32 is a first top view of a magnetic attraction joint of a loudspeaker device according to some embodiments of the present disclosure. In some embodiments, such as FIG. 32, the magnetic attraction ring 551 may be 180 degrees rotationally symmetrical with respect to the symmetry point, that is, when the magnetic attraction ring 551 rotates 180 degrees with respect to the symmetry point, the first contact surface 5531 and the second contact surface 5541 before the rotation, and the first contact surface 5531 and the second contact surface 5541 after the rotation may be at least partially overlapping.

The size of the magnetic attraction ring 551 may be different in the first direction and the second direction that pass through the symmetry point and are perpendicular to each other. For example, the outer end surface of the magnetic adsorption ring 551 may be an elliptical ring, a rectangular ring, etc., which is not specifically limited here.

In an application scenario, the size in the first direction may be larger than the size in the second direction. The number of the first contact surface 5531 may be one and the first contact surface 5531 may be arranged on the symmetry point of the magnetic attraction ring 551. The number of the second contact surface 5541 may be two, so that when the magnetic attraction ring 551 rotates relative to the symmetry point, the two second contact surfaces 5541 may rotate relative to the first contact surface 5531. When the magnetic attraction ring 551 rotates 180 degrees, the two second contact surfaces 5541 may switch positions.

Further, the two second contact surfaces 5541 may be arranged on both sides of the symmetry point along the first direction, and when the magnetic attraction ring 551 rotates 180 degrees, any one of the two second contact surfaces 5541 before the rotation respectively may at least partially overlap with another second contact surface 5541 after the rotation. Since the two contact surfaces are arranged in the first direction, before and after the rotation, the two second contact surfaces 5541 may be located on the same straight line and exchange positions with each other, that is, one of the second contact surfaces 5541 may be located on the other second contact surface 5541 before the rotation after rotation. Therefore, when any one of the two second contact surfaces 5541 before rotation at least partially overlaps the other second contact surface 5541 after rotation, the two second contact surfaces 5541 may both at least partially overlap before and after the rotation.

Specifically, the first contact surface 5531 and the two second contact surfaces 5541 may be rotationally symmetrical 180 degrees with respect to the symmetry point, that is, the first contact surface 5531 and the second contact surface 5541 may be rotationally symmetrical at 180 degrees relative to the center point of the first contact surface 5531, so that the first contact surface 5531 and the second contact surface 5541 before the symmetrical rotation, and the first contact surface 5531 and the second contact surface 5541 after the symmetrical rotation may completely overlap, but cannot be completely overlapped when rotated by other degrees.

The shape of the first contact surface 5531 and the shape of the second contact surface 5541 may be the same or different, but the shapes of the two second contact surfaces 5541 need to be correspondingly the same. For example, both the first contact surface 5531 and the second contact surface 5541 may be circular surfaces, or other surfaces that can completely overlap after being rotated 180 degrees around the center point of the first contact surface 5531.

Through the above method, since before and after the magnetic attraction ring 551 rotates 180° with respect to the symmetry point, the magnetic attraction ring 551 may face two opposite directions, and at the same time, the first contact surface 5531 and the second contact surface 5541 before rotating 180°, and the first contact surface 5531 and the second contact surface 5541 after rotating 180° may at least partially overlap. When assembling the magnetic attraction joint 55, the magnetic attraction ring 551 may be sleeved on the periphery of the insertion part 5523 of the insulating base 552 of the first terminal 553 and the second terminal 554 in two opposite directions, so as to facilitate assembly. In addition, when the magnetic attraction joint 55 is docked with the corresponding joint, the docking can also be achieved in two opposite directions, which is convenient for users to use.

In some embodiments, the magnetic attraction ring 551 may be divided into at least two ring segments 5511 along the circumferential direction, wherein the outer end surfaces of the adjacent ring segments 5511 may have different magnetic polarities.

The division of the ring segments 5511 may be carried out according to certain rules. For example, when the outer end surface of the magnetic attraction ring 551 is annular, the magnetic attraction ring 551 may be divided into equal parts along the radial direction of the annular shape. For example, the magnetic attraction ring 551 may be divided into four equal parts to obtain four symmetrically distributed quarter ring segment 5511 with the same shape, or the magnetic attraction ring 551 may be randomly divided into multiple ring segments 5511 with different shapes, which are not specifically limited here.

Specifically, in actual use, it is necessary to contact the first contact surface 5531 and the second contact surface 5541 with the exposed surface of the corresponding terminal of the corresponding joint to establish an electrical connection between the magnetic attraction joint 55 and the corresponding joint, thereby supplying power to the loudspeaker device. When the first contact surface 5531 and the second contact surface 5541 are incorrectly connected to the exposed surfaces of the terminal in the corresponding joint, the correct electrical connection cannot be established between the magnetic attraction joint 55 and the corresponding joint, and thus cannot supply power to the loudspeaker device.

In this embodiment, the magnetic polarity of the outer end surface of each ring segment 5511 may be set according to the connection mode of the first contact surface 5531 and the second contact surface 5541 with the terminal in the corresponding joint, so that when the first contact surface 5531 and the second contact surface 5541, and the corresponding joints are correct, the magnetic polarity of the outer end surface of the magnetic structure of the corresponding joints may be the same as the magnetic polarity of the outer end surface of the corresponding ring segment 5511 of the magnetic attraction joint 55. Thus, the two joints may be butted together due to the attraction of opposite polarity, so as to establish the correct connection relationship between the two joints. When the first contact surface 5531 and the second contact surface 5541, and the corresponding joints are incorrect, the magnetic polarity of the outer end face of the magnetic structure of the corresponding joint may be the same as that of the outer end face of the corresponding ring segment 5511 of the magnetic attraction joint 55, so that the joints cannot be butted together due to the repulsion of the same polarity, thereby avoiding the establishment of an incorrect connection and making the magnetic attraction joint 55 unable to perform normal work, improving the accuracy and efficiency of docking, and bringing convenience to users.

In some embodiments, the magnetic attraction ring 551 may be divided into two ring segments 5511 along the circumferential direction.

Specifically, the shape of the outer end surface of the magnetic attraction ring 551 may be a regular symmetrical ring, such as an elliptical ring, a circular ring, a rectangular ring, etc., as described in the above embodiment, so that the magnetic attraction ring 551 can be divided into two ring segments 5511 along the symmetry axis of the regular ring, or the magnetic attraction ring 551 can also be an irregular ring, and correspondingly divided into two asymmetric ring segments 5511, which may be specifically set according to requirements, and there is no specific limitation here.

Figure 33:
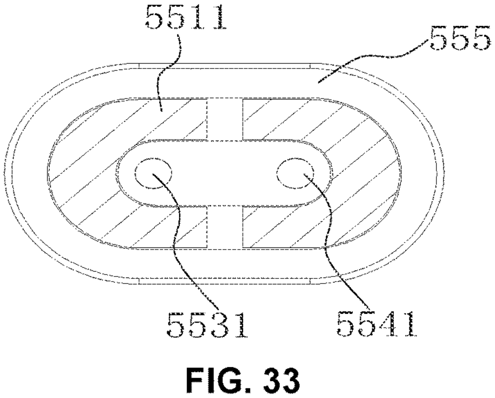
FIG. 33 is a second top view of a magnetic attraction joint of a loudspeaker device according to some embodiments of the present disclosure.
Figure 34:
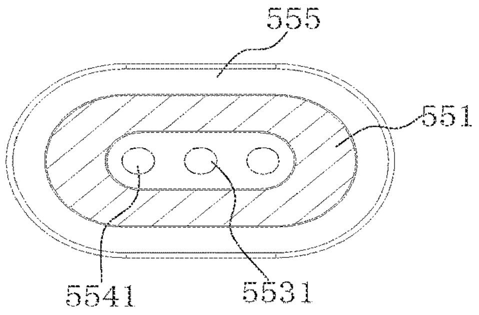
FIG. 34 is a third top view of a magnetic attraction joint of a loudspeaker device according to some embodiments of the present disclosure.

FIG. 33 is a second top view of a magnetic attraction joint of a loudspeaker device according to some embodiments of the present disclosure. FIG. 34 is a third top view of a magnetic attraction joint of a loudspeaker device according to some embodiments of the present disclosure. In an application scenario, such as FIG. 33 and FIG. 34, the number of the first contact surface 5531 and the number of the second contact surface 5541 may be one, respectively, and the first contact surface 5531 and the second contact surface 5541 may be arranged side by side at intervals corresponding to the positive and negative terminals of the electronic device, respectively. The magnetic attraction ring 551 may be 180-degree rotationally symmetrical with respect to the symmetry point, and the sizes of the magnetic attraction ring 551 in the first direction and the second direction which pass through the symmetry point and are perpendicular to each other may be different. Specifically, the size of the magnetic attraction ring 551 in the first direction may be larger than the size in the second direction, and the shape of the outer end surface thereof may be an elliptical ring. Further, the elliptical ring may be divided into two ring segments 5511 arranged side by side at intervals along its axis of symmetry in the first direction or the second direction. The magnetic polarity of the outer end surface of one ring segment 5511 may be N-pole, and the magnetic polarity of the outer end surface of the other ring segment 5511 may be S-pole. Further, the first contact surface 5531 and the second contact surface 5541 of the magnetic attraction joint 55 may also be arranged side by side and spaced apart. Each contact surface may be 180-degree rotationally symmetrical with the symmetry point of the magnetic attraction ring 551 as the symmetry point.

Correspondingly, the shape and number of the magnetic attraction structure of the corresponding joint may be consistent with the shape and number of the magnetic attraction ring 551 of the magnetic attraction joint 55, and the magnetic polarity of the outer end surface may be correspondingly opposite.

At this time, when the first contact surface 5531 and the second contact surface 5541 are correctly connected to the corresponding terminals in the corresponding joint, the two ring segments 5511 of the magnetic attraction ring 551 and the magnetic attraction structure in the corresponding joint may be attracted by opposite polarities. When the first contact surface 5531 and the second contact surface 5541 are incorrectly connected to the corresponding terminals in the corresponding joint, the outer end surface of the ring segment 5511 in the magnetic attraction joint 55 with N-pole of the magnetic polarity may correspond to the N-pole in the magnetic attraction structure, and the outer end surface of the ring segment 5511 with the S-pole of the magnetic polarity may correspond to the S-pole in the magnetic attraction structure, so that the same polarity repels and cannot be connected together, thereby avoiding incorrect connection and facilitating users to use.

The present disclosure also provides a magnetic attraction joint 55. The magnetic attraction structure may include the specific structure of the magnetic attraction joint 55 in the loudspeaker device described above. The magnetic attraction joint 55 may be used for the power interface of the electronic equipment including the loudspeaker device of the present disclosure, or may be used for the power interface of the charger. The magnetic attraction joint 55 may be used for positioning and electrically connecting the power interface of the electronic device and the power interface of the charger with the corresponding joint used in conjunction with the magnetic attraction joint 55 through magnetic attraction, so as to supply power to the electronic device. For the related structures and the technical effects that may be produced, please refer to the above-mentioned embodiment, which may not be repeated here.

The present disclosure also provides a magnetic attraction joint 55 assembly. The magnetic attraction joint 55 assembly may include two magnetic attraction joints 55 in the above-mentioned embodiments of the magnetic attraction joint 55. The number and shape of the ring segments 5511 on the two magnetic attraction joints 55 may correspond to each other, and the magnetic polarities of the outer end surfaces of the corresponding ring segments 5511 may be opposite to each other, so that when the corresponding ring segments 5511 are attracted to each other, the first contact surface 5531 and the second contact surface 5541 of the two magnetic attraction joints 55 may be respectively contact each other. For other related details, referring to the foregoing embodiment, which may not be repeated here.

It should be pointed out that through the above method, the magnetic polarity of the outer end surface of each ring segment 5511 of the two magnetic joints 55 may be set, so that when the first contact surface 5531 and the second contact surface 5541 of the two magnetic joints 55 are in contact with each other, the magnetic polarities of the outer end faces of the corresponding ring segments 5511 may be contrast, so that the two magnetic joints 55 may be butted together due to the attraction of opposite polarities, thereby establishing the correct connection relationship between the two magnetic joints 55. When the first contact surface 5531 and the second contact surface 5541 of one magnetic joint 55 correspond to the second contact surface 5541 and the first contact surface 5531 of the other magnetic attraction joint 55, the magnetic polarities of the outer end faces of the corresponding ring segment 5511 may be the same, so the two magnetic attraction joints 55 cannot be butted together due to the repulsion of the same polarity, thereby reducing the probability of establishing an incorrect connection between the two magnetic attraction joints 55, and improving the accuracy and efficiency of docking.

Further, in the embodiments of the loudspeaker device in the present disclosure, the magnetic attraction joint 55 may be disposed in a circuit housing 100, and specifically may be disposed in the circuit housing 100 for accommodating the control circuit 5051.

In an application scenario, the two main side walls 1110 of the circuit housing 100 may be spaced apart from each other, and the inner surface of at least one main side wall 1110 may be formed with two blocking walls 1119 spaced apart from each other. The two blocking walls 1119 may be arranged in parallel with the end wall 1113 of the circuit housing 100. The two main side walls 1110 and the two blocking walls 1119 may enclose an accommodation space, and the accommodation space may be arranged on the side close to an auxiliary side wall 1112, and the magnetic attraction joint 55 may be disposed in the accommodation space.

The two main side walls 1110 may be further provided with mounting holes 5113, and the loudspeaker device may further include two fixing members 56. The two fixing members 56 may be inserted into the mounting holes 5113 of the two main side walls 1110. The opposite sides of the magnetic attraction joint 55 may abut against the magnetic attraction joint 55.

Further, the number of the mounting holes 5113 and the number of the fixing members 56 may be the same. Specifically, the fixing member 56 may be a screw. The screw may pass through the mounting hole 5113 from the outer side of the main side wall 1110, so that one end of the screw may abut against the outer side wall of the magnetic attraction joint 55, and the other end may be fixed in the mounting hole 5113.

In an application scenario, a mounting hole 5113 may be respectively disposed on each of the two main side walls 1110. The magnetic attraction joint 55 may be 180-degree rotationally symmetrical around the magnetic attraction joint 55 with respect to the insertion direction of the accommodation space surrounded by the two main side walls 1110 and the two blocking walls 1119. Two mounting holes 55512 capable of receiving the fixing member 56 may be respectively disposed on opposite sides of the magnetic attraction joint 55. After the magnetic attraction joint 55 is symmetrically rotated and inserted into the accommodation space, the two mounting holes 55512 on each side of the magnetic attraction joint 55 may have one mounting hole 55512 aligned with the mounting hole 5113.

Specifically, the mounting hole 5113 may be used to receive the outer end of the fixing member 56, and the mounting hole 55512 may be used to receive the inner end of the fixing member 56. By penetrating the mounting hole 5113 and the mounting hole 55512 at both ends of the fixing member 56 through, respectively, the magnetic attraction joint 55 may be fixed in the accommodation space enclosed by the two main side walls 1110 and the two blocking walls 1119.

It should be pointed out that the magnetic attraction joint 55 may be 180-degree rotationally symmetrical, so that there may be two corresponding mounting holes 55512 corresponding to the mounting holes 5113 before and after the 180-degree rotation. And then the magnetic attraction joint 55 may be fixed under the two relative positions, so as to facilitate the assembly.

Further, the first housing sheath 5210 or the second housing sheath 3310 may cover the mounting hole 5113 disposed on the main side wall 1110, and the corresponding first housing sheath 5210 and/or second housing sheath 3310 may be provided with an exposed hole 57 that allows the magnetic attraction joint 55 to be exposed for convenient use.

Figure 35:
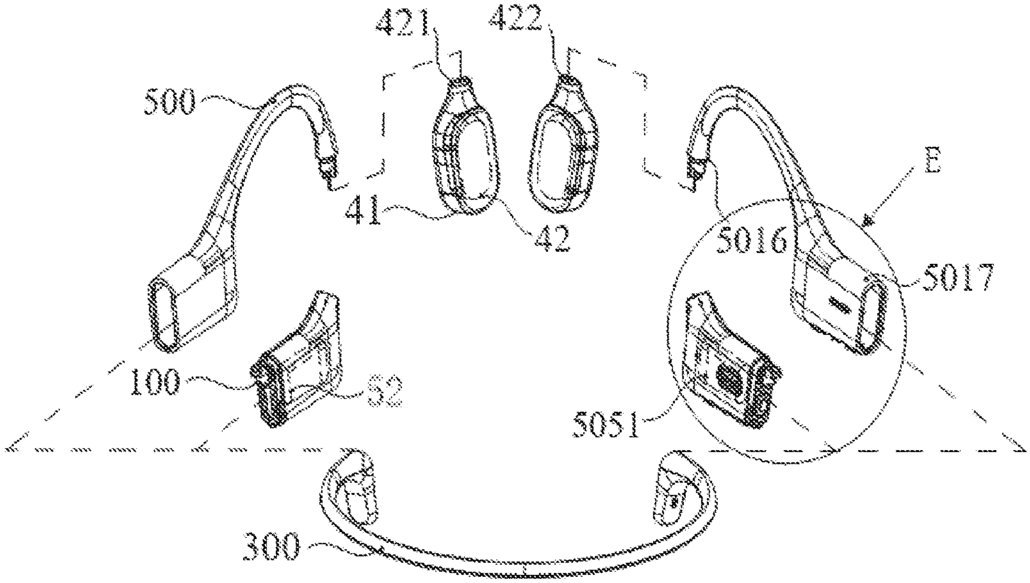
FIG. 35 is an exploded structural diagram of a speaker according to some embodiments of the present disclosure.

FIG. 35 is an exploded structural diagram of a speaker according to some embodiments of the present disclosure. As shown in FIG. 35, a speaker apparatus may include an ear hook 500, a circuit housing 100, a core housing 41, a rear hook 300, an earphone core 42, a control circuit 5051, and a battery 52. The core housing 41 and the circuit housing 100 may be disposed at two ends of the ear hook 500 respectively, and the rear hook 300 may be further disposed at an end of the circuit housing 100 away from the ear hook 500. The number of the core housings 41 may be two, which may be used to accommodate two earphone cores 42 respectively. The number of the circuit housings 100 may also be two, which may be used to accommodate the control circuit 5051 and the battery 52 respectively. The two ends of the rear hook 300 may be connected to the corresponding circuit housings 100 respectively. The ear hook 500 may include a first elastic metal wire 5011, a wire 5012, a fixed sleeve 5013, a plug end 513, and a plug end 515. The plug end 513 and the plug end 515 may be disposed at both ends of the first elastic metal wire 5011. The ear hook 500 may further include a protective sleeve 5016 and a housing sheath 5017 integrally formed with the protective sleeve 5016.

Figure 36:
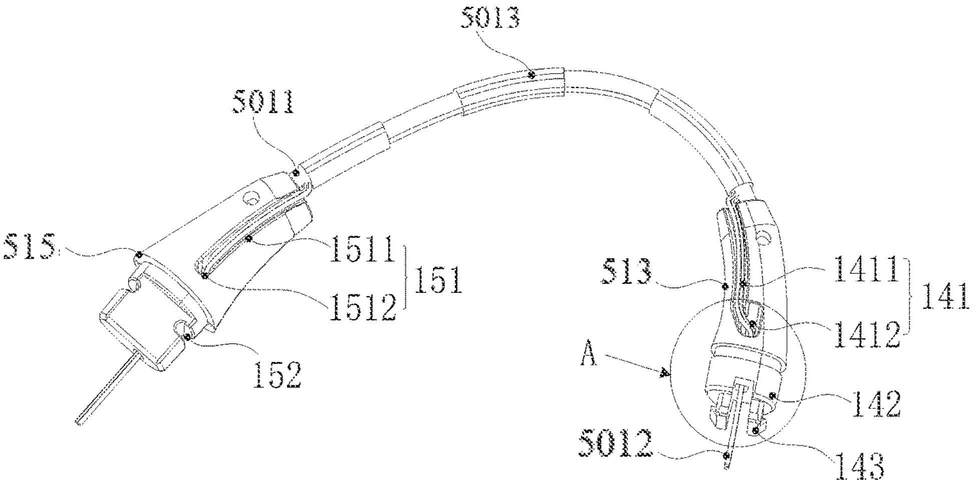
FIG. 36 is a partial structural diagram of an ear hook of a speaker according to some embodiments of the present disclosure.
Figure 37:
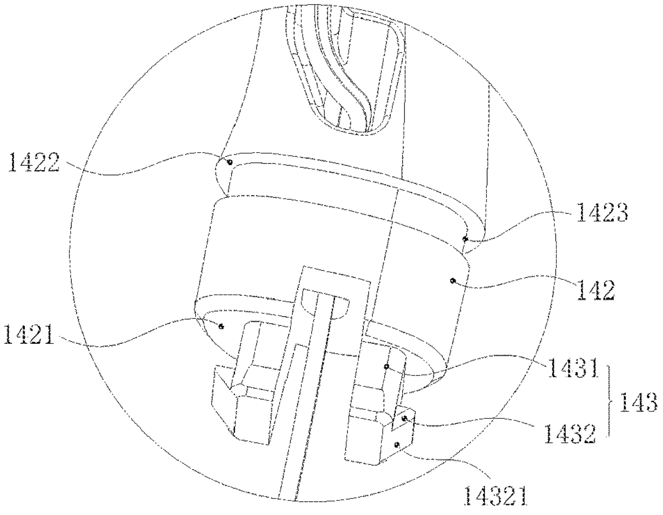
FIG. 37 is a partial enlarged view of part A in FIG. 36.
Figure 38:
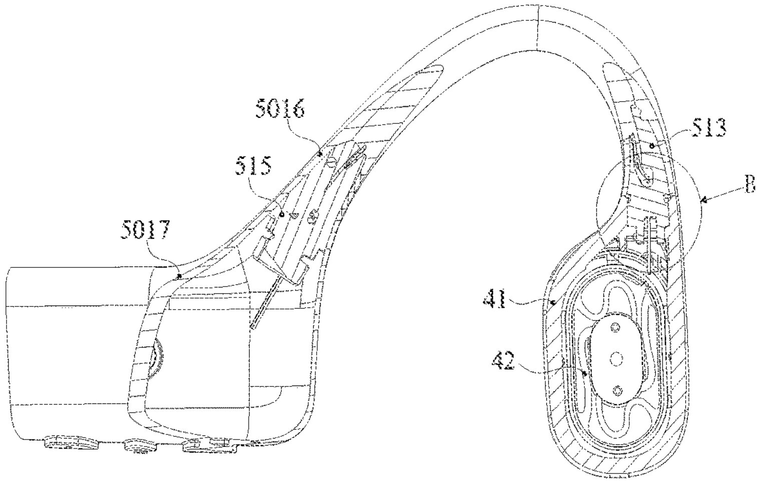
FIG. 38 is a partial sectional view of a speaker according to some embodiments of the present disclosure.
Figure 39:
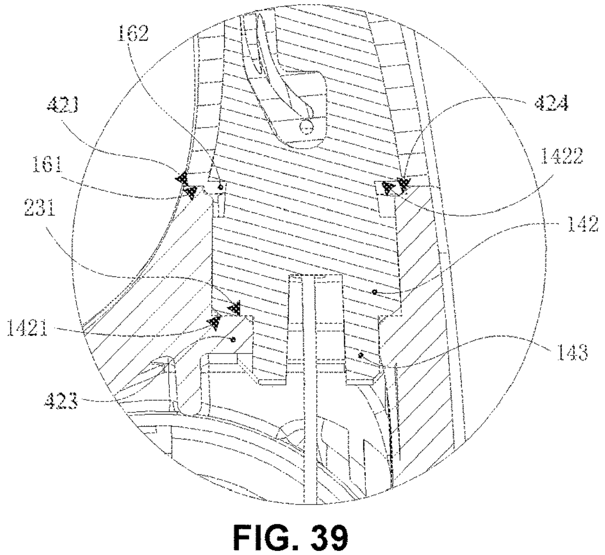
FIG. 39 is a partial enlarged view of part B in FIG. 38.
Figure 40:
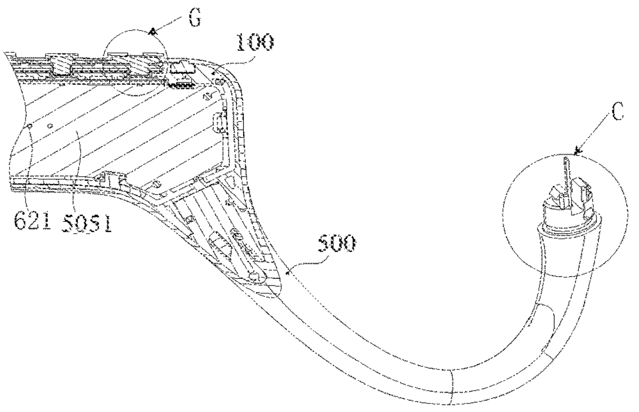
FIG. 40 is a partial sectional view of a speaker according to some embodiments of the present disclosure.
Figure 41:
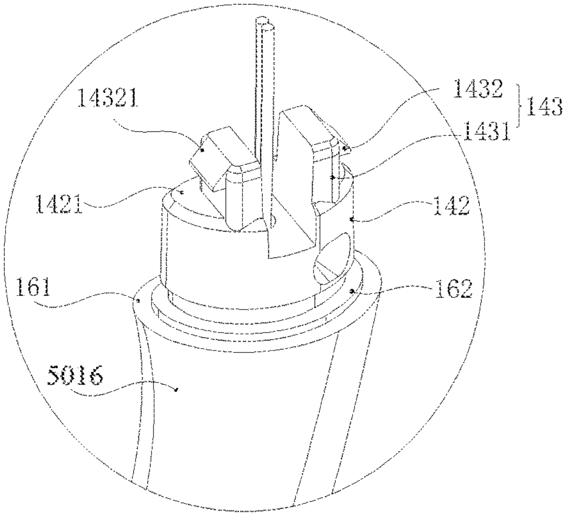
FIG. 41 is a partial enlarged view of part C in FIG. 40.

FIG. 36 is a partial structural diagram of an ear hook of a speaker according to some embodiments of the present disclosure. FIG. 37 is a partial enlarged view of part A in FIG. 36. FIG. 38 is a partial sectional view of a speaker according to some embodiments of the present disclosure. FIG. 39 is a partial enlarged view of part B in FIG. 38. FIG. 40 is a partial sectional view of a speaker according to some embodiments of the present disclosure. FIG. 41 is a partial enlarged view of part C in FIG. 40. In some embodiments, the outer end surface 421 of the core housing 41 refers to the end surface of the core housing 41 facing the ear hook 500. The socket 422 may provide an accommodation space for the plug end 513 of the ear hook 500 to be inserted into the core housing 41, so as to further realize the plug and fixation between the plug end 513 and the core housing 41.

Further, a stopping block 423 may be formed by protruding from the inner side wall of the socket 422 in a direction perpendicular to the inner side wall. Specifically, the stopping block 423 may be a plurality of block-shaped protrusions arranged at intervals, or may also be ring-shaped protrusions along the inner side wall of the socket 422, which is not specifically limited here.

As used herein, the plug end 513 may include an inserting portion 142 and two elastic hooks 143. Specifically, the inserting portion 142 may be at least partially inserted into the socket 422 and abut against the outer side surface 233 of a stopping block 423. The shape of the outer sidewall of the inserting portion 142 matches the shape of the inner sidewall of the socket 422, so that the outer sidewall of the inserting portion 142 may abut against the inner sidewall of the socket 422 when the inserting portion 142 is at least partially inserted into the socket 422.

It should be noted that the outer side surface 233 of the stopping block 423 refers to a side of the stopping block 423 facing the ear hook 500. The inserting portion 142 may further include an end surface 1421 facing the core housing 41. The end surface 1421 may match the outer side surface 233 of the stopping block 423, so that the end surface 1421 of the inserting portion 142 may abut against the outer side surface 233 of the stopping block 423 when the inserting portion 142 is at least partially inserted into the socket 422.

Specifically, the cross-sectional shape of the socket 422 of the core housing 41 along the insertion direction perpendicular to the plug end 513 with respect to the core housing 41 may be or substantially be an oval shape. Correspondingly, the cross-sectional shape of the inserting portion 142 may be a nearly oval shape matching the socket 422. Of course, the shapes of the cross-section of the socket 422 and the cross-section of the inserting portion 142 may also be other shapes, which can be specifically set according to actual needs.

Further, the two elastic hooks 143 may be arranged side by side and spaced apart symmetrically on the side of the inserting portion 142 facing the inside of the core housing 41 along the direction of insertion. Each elastic hook 143 may include a beam portion 1431 and a hook portion 1432. The beam portion 1431 may be connected to the side of the inserting portion 142 facing the core housing 41. The hook portion 1432 may be arranged on the beam portion 1431 away from the inserting portion 142 and extend perpendicular to the inserted direction. Further, each hook portion 1432 may be arranged with a side parallel to the inserted direction and a transitional slope 14321 away from the inserting portion 142.

Specifically, during the installation process of the ear hook 500 and the core housing 41, the plug end 513 may gradually enter the core housing 41 from the socket 422. When the plug end 513 reaches the position of the stopping block 423, the hook portions 1432 of the two elastic hooks 143 may be blocked by the stopping block 423. Under the action of external thrust, the stopping block 423 may gradually squeeze the transitional slopes 14321 of the hook portions 1432 so that the two elastic hooks 143 may be elastically deformed and come close to each other. When the transitional slopes 14321 pass through the stopping block 423 and reach the side of the stopping block 423 close to the inside of the core housing 41, the two elastic hooks 143 may be elastically restored due to the loss of the stopping block 423 and be stuck on an inner surface of the stopping block 423 facing the core housing 41. Thus, the stopping block 423 may be clamped between the inserting portion 142 of the plug end 513 and the hook portion 1432, thereby realizing the fixation of the core housing 41 and the plug end 513.

In some embodiments, after the core housing 41 and the plug end 513 are plugged and fixed, the inserting portion 422 may be partially inserted into the socket 22. The exposed portion of the inserting portion 142 may be arranged in a stepped manner, so as to form an annular table surfaces 1422 spaced apart from the outer end surface 421 of the core housing 41.

It should be noted that the exposed portion of the inserting portion 142 refers to the portion of the inserting portion 142 exposed to the core housing 41. Specifically, the exposed portion of the inserting portion 142 refers to the portion exposed to the core housing 41 and close to the outer end surface of the core housing 41.

In some embodiments, the annular table surface 1422 may be disposed opposite to the outer end surface 421 of the core housing 41. The spacing between the two may refer to the spacing along the direction of insertion and the spacing perpendicular to the direction of insertion.

In some embodiments, the protective sleeve 5016 may extend to the side of the annular table surface 1422 facing the outer end surface 421 of the core housing 41. When the socket 422 and the plug end 513 of the core housing 41 are plugged and fixed, the protective sleeve 5016 may be at least partially filled in the space between the annular table surface 1422 and the outer end surface 421 of the core housing 41, and elastically abut against the core housing 41. Thus, it is difficult for external liquid to enter the inside of the core housing 41 from the junction between the plug end 513 and the core housing 41, thereby realizing the sealing between the plug end 513 and the socket 422, protecting the earphone core 42, etc. inside the core housing 41, and improving the waterproof effect of the speaker apparatus.

In some embodiments, the protective sleeve 5016 may form an annular abutting surface 161 on a side of the annular table surface 1422 facing the outer end surface 421 of the core housing 41. The annular abutting surface 161 may be the end surface of the protective sleeve 5016 facing the core housing 41.

In some embodiments, the protective sleeve 5016 may further include an annular boss 162 locating inside the annular abutting surface 161 and protruding from the annular abutting surface 161. Specifically, the annular boss 162 may be formed on the side of the annular abutting surface 161 facing the plug end 513, and be protruding toward the core housing 41 relative to the annular abutting surface 161. Further, the annular boss 162 may also be directly formed on the periphery of the annular table surface 1422 and cover the annular table surface 1422.

In some embodiments, the core housing 41 may include a connecting slope 424 for connecting the outer end surface 421 of the core housing 41 and the inner sidewall of the socket 422. The connecting slope 424 may be the transitional surface between the outer end surface 421 of the core housing 41 and the inner sidewall of the socket 422. The connecting slope 424 may be not on the same plane as the outer end surface 421 of the core housing 41 and the inner sidewall of the socket 422. The connecting slope 424 may be a flat surface, or may also be a curved surface or other shapes according to actual requirements, there is no specific limitation herein.

In some embodiments, when the core housing 41 and the plug end 513 are plugged and fixed, the annular abutting surface 161 and the annular boss 162 may elastically abut against the outer end surface of the core housing 41 and the connecting slope 424, respectively.

It should be noted that since the outer end surface 421 of the core housing 41 and the connecting slope 424 are not on the same plane, the elastic abutment between the protective sleeve 5016 and the core housing 41 may be not on the same plane. Thus, it is difficult for external liquid to enter the core housing 41 from the junction of the protective sleeve 5016 and the core housing 41, and further enter the earphone core 42, so as to improve the waterproof effect of the speaker, protect the inner functional structure, and extend the lifetime of the speaker.

In some embodiments, the inserting portion 142 may be further formed with an annular groove 1423 adjacent to the annular table surface 1422 on the side of the annular table surface 1422 facing the outer end surface 421 of the core housing 41. The annular boss 162 may be formed in the annular groove 1423.

In some embodiments, the annular groove 1423 may be formed on the side of the annular table surface 1422 facing the core housing 41. In an application scenario, the annular table surface 1422 may be the side wall surface of the annular groove 1423 facing the core housing 41. At this time, the annular boss 162 may be formed in the annular groove 1423 along the side wall surface.

Figure 42:
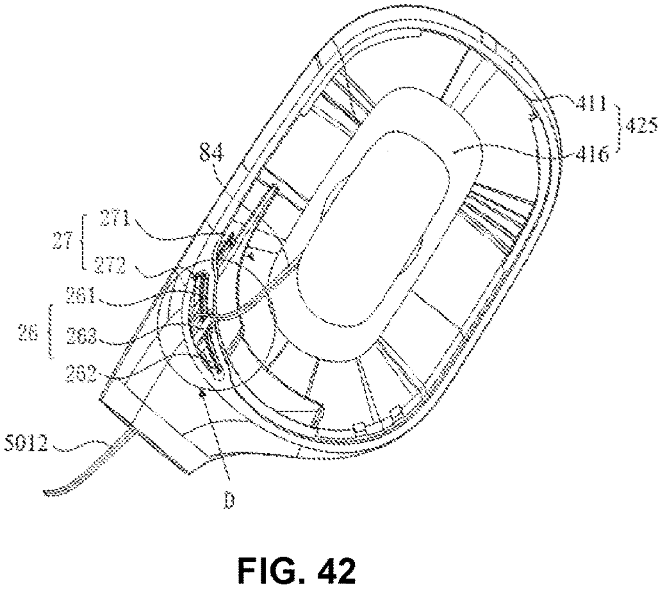
FIG. 42 is a partial structural diagram of a core housing of a speaker according to some embodiments of the present disclosure.
Figure 43:
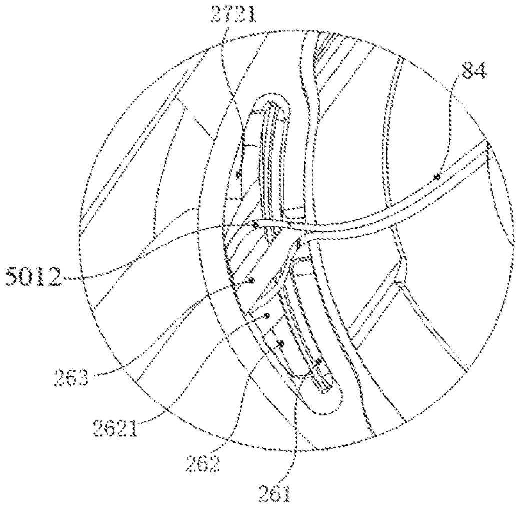
FIG. 43 is a partial enlarged view of part D in FIG. 42.
Figure 44:
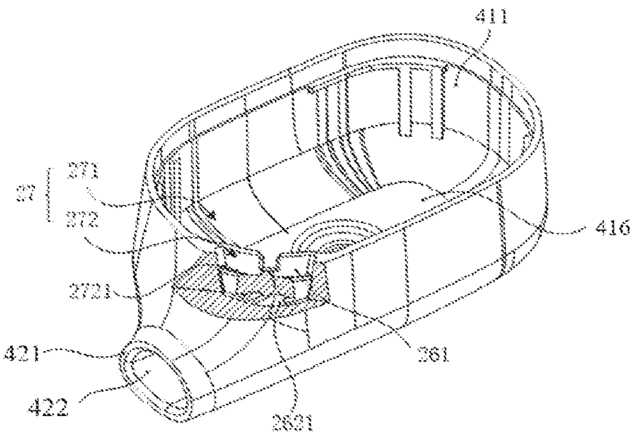
FIG. 44 is a partial sectional view of a core housing of a speaker according to some embodiments of the present disclosure.

FIG. 42 is a partial structural diagram of a core housing of a speaker according to some embodiments of the present disclosure. FIG. 43 is a partial enlarged view of part D in FIG. 42. FIG. 44 is a partial sectional view of a core housing of a speaker according to some embodiments of the present disclosure.

Combing FIG. 42, FIG. 43, FIG. 44, and FIG. 45, the core housing 41 may include a main housing 425 and a partition component 426. The partition component 426 may be arranged inside the main housing 425 and connected to the main housing 425, so as to divide the inner space 27 of the main housing 425 into a first accommodation space 271 and a second accommodation space 272 on the side close to the socket 422.

In some embodiments, the main housing 425 may include a peripheral sidewall 411 and a bottom wall 416 connected to one end surface of the peripheral sidewall 411. The peripheral sidewall 411 and the bottom wall 416 jointly form the inner space 27 of the main housing 425.

In some embodiments, the partition component 26 may be disposed on the side of the main housing 425 close to the socket 422 and include a side partition 261 and a bottom partition 262. The side partition 261 may be arranged in a direction perpendicular to the bottom wall 416 and both ends of the side partition 261 may be connected with the peripheral sidewall 411, thereby separating the inner space 27 of the main housing 425. The bottom partition 262 and the bottom wall 416 may be parallel or nearly parallel and spaced apart. Further, the bottom partition 262 and the bottom wall 416 may be connected to the peripheral side wall 411 and the side partition 261, respectively. Thus, the inner space 27 formed by the main housing 425 may be divided into two to form the first accommodation space 271 surrounded by the side partition 261, the bottom partition 262, the peripheral sidewall 411 away from the socket 422, and the bottom wall 416, and the second accommodation space 272 surrounded by the bottom partition 262, the side partition 261, and the peripheral sidewall 411 close to the socket 422. The second accommodation space 272 may be smaller than the first accommodation space 271.

The partition component 26 may also divide the inner space 27 of the main housing 425 by other arrangements, which are not specifically limited herein.

In some embodiments, the partition component 26 may further include an inner partition 263. The inner partition 263 may further divide the second accommodation space 272 into two sub-accommodation spaces 2721. Specifically, the inner partition 263 may be arranged perpendicular to the bottom wall 416 of the main housing 425 and connected to the side partition 261 and the peripheral sidewall 411 respectively, and further extend to the wiring hole 2621, so as to divide the wiring hole 2621 into two, while dividing the second accommodation space 272 into two sub-accommodation spaces 2721. Each of the two wiring holes 2621 may be connected with a corresponding sub-accommodation space 2721 respectively.

In some embodiments, the second accommodation space 272 may be further filled with sealant. In this way, the wire 5012 and the wire 84 included in the second accommodation space 272 may be further fixed, which may reduce the adverse effect on the sound quality caused by the vibration of the wire, improve the sound quality of the speaker, and protect the welding point between the wire 5012 and the wire 84. In addition, the purpose of waterproof and dustproof may also be achieved by sealing the second accommodation space 272.

Figure 45:
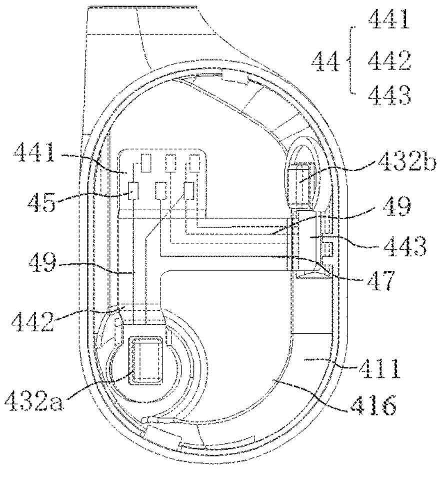
FIG. 45 is a schematic structural diagram illustrating a partial structure of a loudspeaker device according to some embodiments of the present disclosure.
Figure 46:
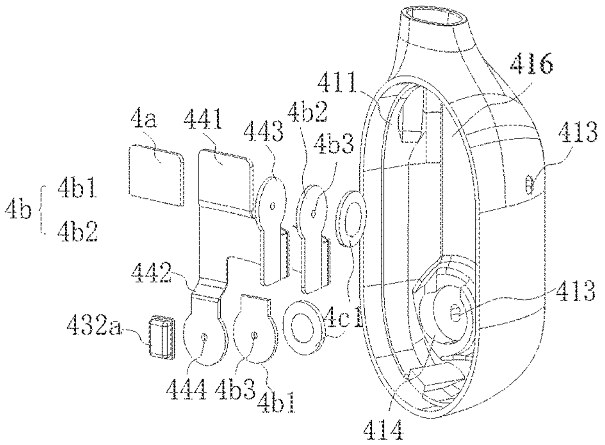
FIG. 46 is an exploded view of a partial structure of a loudspeaker device according to some embodiments of the present disclosure.
Figure 47:
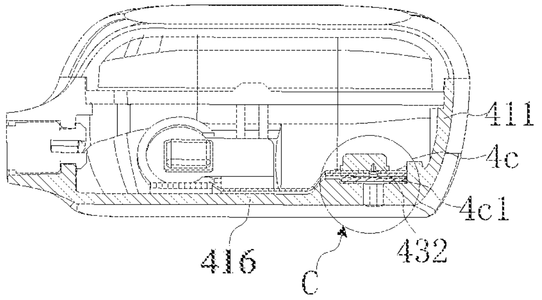
FIG. 47 is a cross-sectional view of a partial structure of a loudspeaker device according to some embodiments of the present disclosure.

FIG. 45 is a schematic structural diagram illustrating a partial structure of a loudspeaker device according to some embodiments of the present disclosure. FIG. 46 is an exploded view of a partial structure of a loudspeaker device according to some embodiments of the present disclosure. FIG. 47 is a cross-sectional view of a partial structure of a loudspeaker device according to some embodiments of the present disclosure.

According to FIG. 45 and FIG. 46, in some embodiments, the core housing 41 may include an auxiliary function module, and the auxiliary function module may be a module different from the earphone core 42 for receiving auxiliary signals and performing auxiliary functions. For example, the auxiliary function module may be a microphone 432, a key switch, etc., which may be specifically set according to actual needs.

In some embodiments, the auxiliary function module may include a microphone 432. The microphone 432 may include a first microphone **432*a* and a second microphone 432*b*. Both the first microphone 432*a* and the second microphone 432*b* may be MEMS (Micro Electro Mechanical System) microphones 432, which have a small operating current, relatively stable performance, and high quality of voice produced. The two microphones 432 may be set on different positions of the first flexible circuit board 44** according to actual requirements.

In some embodiments, the first flexible circuit board 44 may include a main circuit board 441 and a first branch circuit board 442 and a second branch circuit board 443 connected to the main circuit board 441. The first branch circuit board 442 and the main circuit board may extend in the same direction. The first microphone **432*a* may be mounted on the end of the first branch circuit board 442 away from the main circuit board 441. The second branch circuit board 443 may extend perpendicularly to the main circuit board 441, and the second microphone 432*b* may be mounted on the end of the second branch circuit board 443 away from the main circuit board 441. Multiple first pads 45 may be disposed on the end of the main circuit board 441 away from the first branch circuit board 442 and the second branch circuit board 443**.

In some embodiments, the core housing 41 may include a peripheral side wall 411 and a bottom end wall 416 connected to one end surface of the peripheral side wall 411, thereby forming an accommodation space with an open end. The earphone core 42 may be placed in the accommodation space through the open end. The first microphone **432*a* may be fixed on the bottom wall 416, and the second microphone 432*b* may be fixed on the peripheral side wall 411**.

In some embodiments, the first branch circuit board 442 and/or the second branch circuit board 443 may be bent appropriately to adapt to the location of the sound inlet corresponding to the microphone 432 on the core housing 41. Specifically, the first flexible circuit board 44 may be disposed in the core housing 41 in such a way that the main circuit board 441 is parallel to the bottom end wall 416, so that the first microphone **432*a* may correspond to the bottom end wall 416 without bending the main circuit board 441. Since the second microphone 432*b* is fixed on the peripheral side wall 411 of the core housing 41, the second main circuit board 441 needs to be arranged for bending Specifically, the second branch circuit board 443 may be bent at the end far away from the main circuit board 441, so that the surface of the second branch circuit board 443 is perpendicular to the surfaces of the main circuit board 441 and the first branch circuit board 442. Therefore, the second microphone 432*b* may face the direction away from the main circuit board 441 and the first branch circuit board 442, and be fixed to the peripheral side wall 411 of the core housing 41**.

In some embodiments, the first pad 45, the first microphone 432*a*, and the second microphone 432*b* may all be disposed on the same side of the first flexible circuit board 44.

In some embodiments, the other side of the first flexible circuit board 44 may be provided with a rigid support plate 4*a* and a microphone rigid support plate 4*b* for supporting the first pad 45. The microphone rigid support plate 4*b* may include a rigid support plate 4*b*1 for supporting the first microphone 432*a* and a rigid support plate 4*b*2 for supporting the second microphone 432*b*.

In some embodiments, the rigid support plate 4*a*, the rigid support plate 4*b*1, and the rigid support plate 4*b*2 may be mainly used to support the corresponding pads and the microphone 432, so they need to have a certain strength. The materials of the three components may be the same or different, and specifically may be polyimide (Polyimide Film, PI), or other materials capable of supporting strength, such as polycarbonate, polyvinyl chloride, etc. In addition, the thickness of the three rigid support plates may be set according to the strength of the rigid support plate itself and the strength actually required by the first pad 45, the first microphone 432*a*, and the second microphone 432*b*, which are not specifically limited here.

The first microphone 432*a* and the second microphone 432*b* may correspond to the two microphone components 4*c*, respectively. In some embodiments, the two microphone components 4*c* may have the same structure, and the core housing 41 may be provided with a sound inlet 413. Further, the loudspeaker device may also be disposed at the core housing 41 with an annular blocking wall 414 integrally formed on the inner surface of the core housing 41. The annular blocking wall 414 may be disposed on the periphery of the sound inlet 413, thereby defining the accommodation space 415 communicating with the sound inlet 413.

According to FIG. 45, FIG. 46, and FIG. 47, in some embodiments, the microphone component 4*c* may further include a waterproof membrane assembly 4*c*1.

The waterproof membrane assembly 4*c*1 may be disposed in the accommodation space 415 and cover the sound inlet 413. The microphone rigid support plate 4*b* may be disposed in the accommodation space 415 and located on the side of the waterproof membrane assembly 4*c*1 away from the sound inlet 413 to press the waterproof membrane assembly 4*c*1 on the inner surface of the core housing 41. In some embodiments, the microphone rigid support plate 4*b* may be provided with a sound inlet 4*b*3 corresponding to the sound inlet 413. In some embodiments, the microphone 432 may be disposed on the side of the microphone rigid support plate 4*b* away from the waterproof membrane assembly 4*c*1 and cover the sound inlet 4*b*3.

The waterproof membrane assembly 4*c*1 may have the function of waterproof and sound transmission, and be closely attached to the inner surface of the core housing 41 to prevent the liquid outside the core housing 41 from entering the core housing 41 through the sound inlet 413 and affecting the performance of the microphone 432.

The axial directions of the sound inlet 4*b*3 and the sound inlet 413 may coincide, or they may intersect at a certain angle according to the actual requirements of components such as the microphone 432.

It should be noted that all the sound inlets in the above embodiments may be used to refer to the structure of the core housing 41 for receiving sound.

The microphone rigid support plate 4*b* may be disposed between the waterproof membrane assembly 4*c*1 and the microphone 432. On the one hand, the waterproof membrane assembly 4*c*1 may be pressed and held so that the waterproof membrane assembly 4*c*1 is closely attached to the inner surface of the core housing 41. On the other hand, the microphone rigid support plate 4*b* may have a certain strength, so as to support the microphone 432.

In some embodiments, the material of the microphone rigid support plate 4*b* may be polyimide (Polyimide Film, PI), or other materials capable of supporting strength, such as polycarbonate, polyvinyl chloride, etc. In addition, the thickness of the microphone rigid support plate 4*b* may be set according to the strength of the microphone rigid support plate 4*b* and the strength actually required by the microphone 432, which is not specifically limited here.

Figure 48:
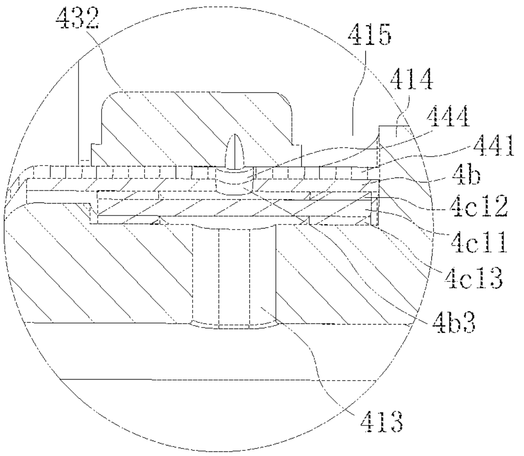
FIG. 48 is a partial enlarged view of part C in FIG. 47.

FIG. 48 is a partial enlarged view of part C in FIG. 47. As shown in FIG. 48, in some embodiments, the waterproof membrane assembly 4*c*1 may include a waterproof membrane body 4*c*11 and an annular rubber pad 4*c*12. The annular rubber pad 4*c*12 may be disposed on the side of the waterproof membrane body 4*c*11 facing the microphone rigid support plate 4*b*, and further disposed on the periphery of the sound inlet 413 and the sound inlet 4*b*3.

The microphone rigid support plate 4*b* may be pressed against the annular rubber pad 4*c*12, so that the waterproof membrane assembly 4*c*1 and the microphone rigid support plate 4*b* are adhesively fixed together.

In some embodiments, the annular rubber pad 4*c*12 may be arranged to form a sealed cavity between the waterproof membrane body 4*c*11 and the rigid support plate that is connected to the microphone 432 only through the sound inlet 4*b*3, that is, there is no gap in the connection between the waterproof membrane assembly 4*c*1 and the microphone rigid support plate 4*b*, so that the space around the annular rubber pad 4*c*12 between the waterproof membrane body 4*c*11 and the microphone rigid support plate 4*b* is isolated from the sound inlet 4*b*3.

In some embodiments, the waterproof membrane body 4*c*11 may specifically be a waterproof sound-permeable membrane, which is equivalent to the tympanic membrane of a human ear. When an external sound enters through the sound inlet 413, the waterproof membrane body 4*c*11 vibrates, which causes the air pressure in the sealed cavity to change, thereby causing the microphone 432 to emit sound.

Further, the air pressure in the sealed cavity changes due to the vibration of the waterproof membrane body 4*c*11, and the air pressure needs to be controlled within an appropriate range. If the air pressure is too large or too small, the air pressure may affect the sound quality. In this embodiment, the distance between the waterproof membrane body 4*c*11 and the rigid support plate may be in a range of 0.1-0.2 mm, specifically may be 0.1 mm, 0.15 mm, 0.2 mm, etc., so that the air pressure in the sealed cavity caused by vibration of the waterproof membrane body 4*c*11 changes within an appropriate range, thereby improving the sound quality.

In some embodiments, the waterproof membrane assembly 4*c*1 may further include an annular rubber pad 4*c*13 disposed on the side of the waterproof membrane body 4*c*11 facing the inner surface of the core housing 41 and overlapped with the annular rubber pad 4*c*12.

In this way, the waterproof membrane assembly 4*c*1 may be closely attached to the inner surface of the core housing 41 surrounding the sound inlet 413, thereby reducing the loss of sound entering the sound inlet 413 and improving the conversion rate of sound into vibration of the waterproof membrane body 4*c*11.

In some embodiments, sealant may be further coated on the outer periphery of the annular blocking wall 414 and the microphone 432 to further improve the sealing performance, thereby increasing the sound conversion rate and improving the sound quality.

In some embodiments, the first flexible circuit board 44 may be disposed between the rigid support plate and the microphone 432, and a sound inlet 444 may be disposed at a position corresponding to the sound inlet **4*b*3 of the microphone rigid support plate 4*b*, so that the vibration of the waterproof membrane body 4*c*11 caused by external sound passes through the sound inlet 444 to further affect the microphone 432**.

In some embodiments, the first flexible circuit board 44 may further extend away from the microphone 432 to connect with other functional elements or wires to achieve corresponding functions. Correspondingly, the microphone rigid support plate **4*b* may also extend a distance away from the microphone 432** along with the flexible circuit board.

Correspondingly, a notch matching the shape of the flexible circuit board may be disposed on the annular blocking wall 414 to allow the flexible circuit board to extend from the accommodation space 415. In addition, sealant may be further filled in the notch to further improve the sealing performance.

In some embodiments, the loudspeaker device may further include a key module **4*d*. The auxiliary function module mounted on the flexible circuit board 44 may include a key switch. The key switch and the microphone 432 may be disposed in different circuit housings 100. Of course, in other embodiments, the key switch and the microphone 432 may also be disposed in the same circuit housing 100**, which is not specifically limited here.

Figure 49:
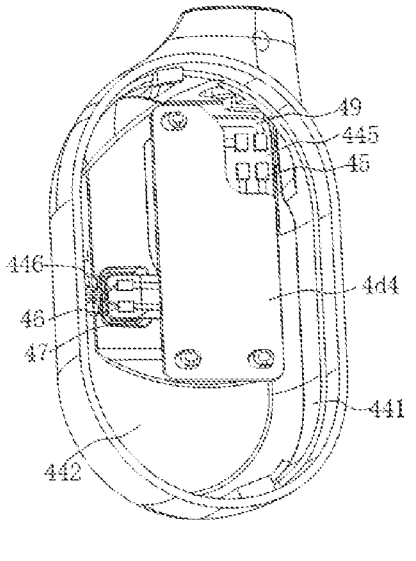
FIG. 49 is a schematic structural diagram illustrating a partial structure of a loudspeaker device according to some embodiments of the present disclosure.
Figure 50:
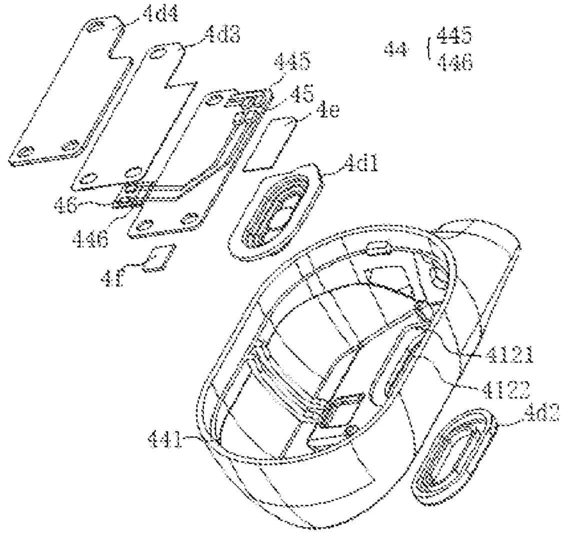
FIG. 50 is an exploded view of a partial structure of a loudspeaker device according to some embodiments of the present disclosure.
Figure 51:
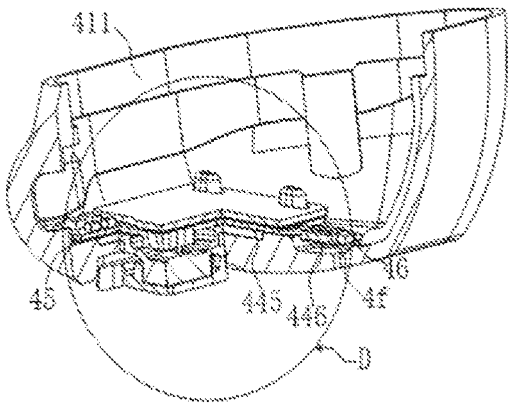
FIG. 51 is a cross-sectional view of a partial structure of a loudspeaker device according to some embodiments of the present disclosure.
Figure 52:
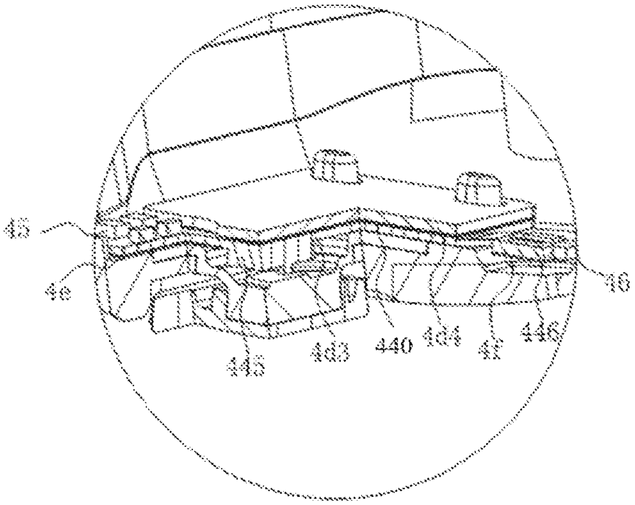
FIG. 52 is a partial enlarged view of part D in FIG. 51.
Figure 53:
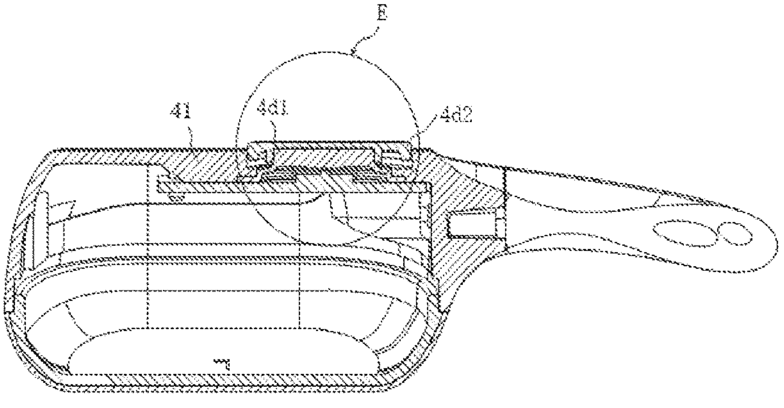
FIG. 53 is a cross-sectional view of a partial structure of a loudspeaker device according to some embodiments of the present disclosure.
Figure 54:
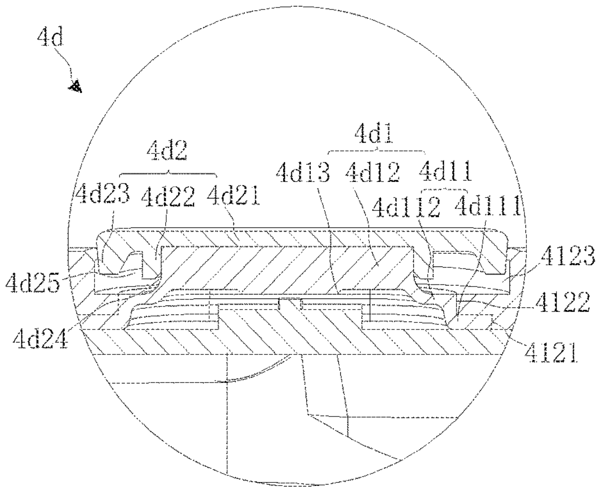
FIG. 54 is a partial enlarged view of part E in FIG. 53.

FIG. 49 is a schematic structural diagram illustrating a partial structure of a loudspeaker device according to some embodiments of the present disclosure. FIG. 50 is an exploded view of a partial structure of a loudspeaker device according to some embodiments of the present disclosure. FIG. 51 is a cross-sectional view of a partial structure of a loudspeaker device according to some embodiments of the present disclosure. FIG. 52 is a partial enlarged view of part D in FIG. 51. FIG. 53 is a cross-sectional view of a partial structure of a loudspeaker device according to some embodiments of the present disclosure. FIG. 54 is a partial enlarged view of part E in FIG. 53.

According to FIG. 49, FIG. 50, and FIG. 54, in some embodiments, a flexible circuit board 44 may be disposed inside the core housing 41, and the outside of the core housing 41 may be provided with a key module **4*d* adapted to the flexible circuit board. In some embodiments, correspondingly, the flexible circuit board 44 may include a main circuit board 445 and a branch circuit board 446, wherein the branch circuit board 446 may extend along an extension direction perpendicular to the main circuit board 445. The plurality of first pads 45 may be disposed on the end of the main circuit board 445 away from the branch circuit board 446. The key switch may be disposed on the main circuit board 445, and the second pads 46 may be disposed on the end of the branch circuit board 446 away from the main circuit board 445**.

It should be noted that the circuit boards in the above embodiments may all be used to refer to the structure for mounting electronic components.

In some embodiments, the core housing 41 may include a peripheral side wall 411 and a bottom end wall 416 connected to one end surface of the peripheral side wall 411, thereby forming an accommodation space with an open end. The board surface of the flexible circuit board 44 and the bottom end wall 416 may be arranged in parallel and spaced apart, so that the key switch may be disposed toward the bottom end wall 416 of the core housing 41.

In some embodiments, the key switch may be disposed on the side of the flexible circuit board 44 facing the bottom end wall 416. To facilitate assembly, the first pad 45 and the second pad 46 may be disposed on the side of the flexible circuit board 44 away from the bottom wall 416, so that the first pad 45 and the second pad 46, and the key switch may be respectively disposed on both sides of the flexible circuit board 44.

According to FIG. 50, FIG. 51, and FIG. 52, in some embodiments, the main circuit board 445 may be provided with a rigid support plate **4*d*3 on the side away from the key switch for supporting the key switch and keeping the first pad 45 exposed. The main circuit board 445 may be further provided with a rigid support plate 4*e* on the side away from the first pad 45 for supporting the first pad 45 and keeping the key switch exposed. The branch circuit board 446 may be provided with a rigid support plate 4*f* on the side away from the second pad 46 for supporting the second pad 46**.

In some embodiments, the key switch and the first bonding pad 45 may be respectively disposed on two sides of the main circuit board 445 and spaced apart on both sides of the main circuit board 445. Correspondingly, the rigid support plate **4*d*3 corresponding to the key switch and the rigid support plate 4*e* corresponding to the first pad 45 may also be respectively arranged on both sides of the main circuit board 445, and further bypass the key switch and the first pad 45 respectively. Therefore, the rigid support plate 4*d*3 and the rigid support plate 4*e* may have adjacent edges arranged adjacently. In some embodiments, a side of the rigid support plate 4*d*3 away from the flexible circuit board 44 may be further provided with a rigid support plate 4*d*4. The rigidity of the rigid support plate 4*d*4 may be greater than the rigid support plate 4*d*3, and the rigid support plate 4*d*3** may correspond to the key switch.

In some embodiments, the inner surface of the core housing 41 (specifically the inner surface of the bottom end wall 416) may be provided with a recessed area 4121, and may be further provided with a key hole 4122 located in the recessed area 4121 and used to communicate with the inner surface of the core housing 41 and the outer surface. The recessed area 4121 may be formed by recessing the inner surface of the core housing 41 toward the outside of the core housing 41. The key hole 4122 may be further arranged in the middle part of the recessed area 4121, or arranged in other parts according to actual needs.

As shown in FIG. 50, FIG. 53, and FIG. 54, in some embodiments, the key module **4*d* may further include an elastic bearing 4*d*1 and a key 4*d*2. In some embodiments, the elastic bearing 4*d*1 may include an integrally formed bearing body 4*d*11 and a supporting column 4*d*12. The bearing body 4*d*11 may be disposed in the recessed area 4121 and fixed to the bottom of the recessed area 4121. Specifically, the bottom of the recessed area 4121 refers to the inner wall surface of the recessed area 4121 away from the inside of the core housing 41. The support column 4*d*12 may be arranged on the side of the bearing body 4*d*11 facing the outside of the core housing 41 and may be exposed from the key hole 4122**.

In the above manner, the elastic bearing **4*d*1 may be arranged in the recessed area 4121 and fixed to the bottom of the recessed area 4121, and cover the key hole 4122 from the inner side of the core housing 41 through the bearing body 4*d*11, so as to separate the inside and the outside of the core housing 41. Therefore, it is difficult for the liquid outside the core housing 41 to enter the inside of the core housing 41 through the key hole 4122, thereby playing a role of waterproofing and protecting the internal components of the core housing 41**.

In some embodiments, the elastic bearing **4*d*1 may be fixed to the bottom of the recessed area 4121 through the bearing body 4*d*11 in a pasting manner. Specifically, adhesive, double-sided tape, etc. may be applied between the surface of the bearing body 4*d*11 facing the outside of the core housing 41 and the bottom of the recessed area 4121**.

In some embodiments, the bearing body **4*d*11 may be fixed to the bottom of the recessed area 4121 by injection molding. The surface of the bearing body 4*d*11 facing the outside of the core housing 41 and the bottom of the recessed area 4121 of the core housing 41 may be integrally formed by injection molding, which may be formed by encapsulation. In this embodiment, the elastic bearing 4*d*1 and the bottom of the recessed area 4121 of the core housing 41 may be integrally formed by injection molding, thereby making the combination between the two components stronger and increasing the strength of the combination between the two components. In addition, the sealing performance of the core housing 41 may be improved, so that on the one hand, the entire key module 4*d* may be made more stable and reliable, and on the other hand, the waterproof effect of the core housing 41** may be further improved.

In some embodiments, the bearing body **4*d*11 may include an annular fixing portion 4*d*111 and an elastic support part 4*d*112. The annular fixing portion 4*d*111 may be arranged around the key hole 4122 and may be attached to and fixed to the bottom of the recessed area 4121, thereby fixing the elastic bearing 4*d*1 and the core housing 41** together.

The elastic support part **4*d*112 may be connected to the inner ring surface of the annular fixing portion 4*d*111 and protrude in a dome shape toward the outside of the core housing 41, so that the top to the bottom thereof has a certain height in the pressing direction of the key 4*d*2, and the size of the top portion perpendicular to the pressing direction is smaller than that of the bottom portion. The support column 4*d*12 may be arranged on the top of the elastic support part 4*d*112. When the key 4*d*2 is pressed, the top of the elastic support part 4*d*112 may be pressed and moves toward the bottom, thereby driving the key 4*d*2 to move in the direction of the key hole 4122** until the key switch is triggered.

It should be noted that due to the small overall structure of the loudspeaker device, the connections between the components may be relatively tight, so that the pressing stroke between the key **4*d*2 and the key switch is small, thereby weakening the pressing touch to the key 4*d*2. In this embodiment, since the elastic support part 4*d*112 is raised toward the outside of the core housing 41 in a dome shape, the distance between the keys 4*d*2 and the key switch in the core housing 41 may be increased, so that the pressing stroke of the keys 4*d*2 triggers the key switch may be appropriately increased, thereby improving the user's feel when pressing the key 4*d*2**.

Specifically, the bottom of the elastic support part **4*d*112 may be fixed on the side wall surface of the key hole 4122, so that the top of the elastic support part 4*d*112 is exposed from the key hole 4122, and the support column 4*d*12 provided at the end of the elastic support part 4*d*112 facing the outside of the core housing 41 is completely exposed to the outside of the core housing 41. As a result, the support column 4*d*12 may be further fixed with the key 4*d*2 on the outside of the core housing 41**.

In some embodiments, the outer surface of the core housing 41 may be provided with a recessed area 4123. The key hole 4122 may be further located in the recessed area 4123, that is, the recessed area 4121 and the recessed area 4123 may be respectively located at two ends of the key hole 4122, and may be penetrated by the key hole 4122. The shapes and sizes of the recessed area 4121 and the recessed area 4123 may be set to be the same or different according to actual requirements. In addition, the number of recessed areas 4121 and the number of recessed areas 4123 may be the same, which are determined according to the number of keys **4*d*2, and may be one or more. Each recessed area 4121 and each recessed area 4123 may correspond to one or more key holes 4122, which are not specifically limited here. In this embodiment, the number of keys 4*d*2 corresponding to the core housing 41 may be one, and the key 4*d*2 may correspond to one recessed area 4121 and one recessed area 4123**.

In some embodiments, the support column **4*d*12 may be supported by the elastic support part 4*d*112 to the side of the key hole 4122 facing the outside of the core housing 41 and is located in the recessed area 4123. Further, the key 4*d*2 may be disposed on one side of the elastic support part 4*d*112 of the support column 4*d*12. In this embodiment, by providing the elastic support part 4*d*112 and the height of the support column 4*d*12 along the pressing direction of the key 4*d*2, the key 4*d*2 may be at least partially sunk in the recessed area 4123 to improve the space utilization and reduce the space occupied by the key module 4*d***.

In some embodiments, the key **4*d*2 may include a key body 4*d*21, an annular flange 4*d*22, and an annular flange 4*d*23. The annular flange 4*d*22 and the annular flange 4*d*23 may be disposed on one side of the key body 4*d*21. The annular flange 4*d*22 and the annular flange 4*d*23 may be specifically arranged on the opposite side of the pressing surface of the key body 4*d*21**.

In some embodiments, the annular flange **4*d*22 may be located in the middle area of the key body 4*d*21, and the annular flange 4*d*23 may be located on the outer edge of the key body 4*d*21. Both the annular flange 4*d*22 and the annular flange 4*d*23 may be formed to protrude toward the direction face away from the pressing surface of the key body 4*d*21, thereby forming a cylindrical accommodation space 4*d*24 surrounded by the annular flange 4*d*22, and a cylindrical accommodation space 4*d*25 surrounded by the annular flange 4*d*22 and the annular flange 4*d*23. The protrusion heights of the annular flange 4*d*22 and the annular flange 4*d*23 relative to the key body 4*d*21 may be equal or unequal. In this embodiment, the protrusion height of the annular flange 4*d*22 relative to the key body 4*d*21 may be greater than the protrusion height of the annular flange 4*d*23 relative to the key body 4*d*21**.

In some embodiments, the support column **4*d*12 may be inserted into the annular flange 4*d*22, that is, the support column 4*d*12 may be accommodated in the accommodation space 4*d*24. Specifically, the support column 4*d*12 may be bonded to the annular flange 4*d*22** by means of bonding, injection molding, or elastic abutment.

In some embodiments, the end surface of the annular flange **4*d*23 away from the key body 4*d*21 may be sunk in the recessed area 4123, and may be spaced a certain distance from the bottom of the recessed area 4123 when the elastic bearing 4*d*1** is in a natural state.

In some embodiments, the bottom of the recessed area 4123 refers to the inner wall surface of the recessed area 4123 facing the inside of the core housing 41. Specifically, when the elastic bearing **4*d*1 is in a natural state, by pressing the pressing surface of the key 4*d*2, the top of the elastic support part 4*d*112 of the elastic bearing 4*d*1 may move in the direction toward the core housing 41 and triggers the key switch before the end surface of the annular flange 4*d*23 away from the key body 4*d*21 touches the bottom of the recessed area 4123**.

In some embodiments, the elastic bearing **4*d*1 may further include a contact head 4*d*13 for contacting the key switch. The contact head 4*d*13 may be arranged on the inner side of the bearing body 4*d*11 close to the core housing 41, and specifically may be arranged on the middle area of the top of the elastic support part 4*d*112 facing the inner wall surface of the inside of the core housing 41, and may protrude toward the inside of the core housing 41** relative to the inner wall surface.

When the key **4*d*2 is pressed, the top of the elastic support part 4*d*112 of the elastic bearing 4*d*1 may move in the direction toward the inside of the core housing 41, thereby driving the contact head 4*d*13 to move toward the key switch inside the core housing 41. The key switch may be triggered by the contact head 4*d*13 to realize the corresponding function. In this way, the pressing stroke of the key 4*d*2** may be reduced according to actual needs.

Figure 55:
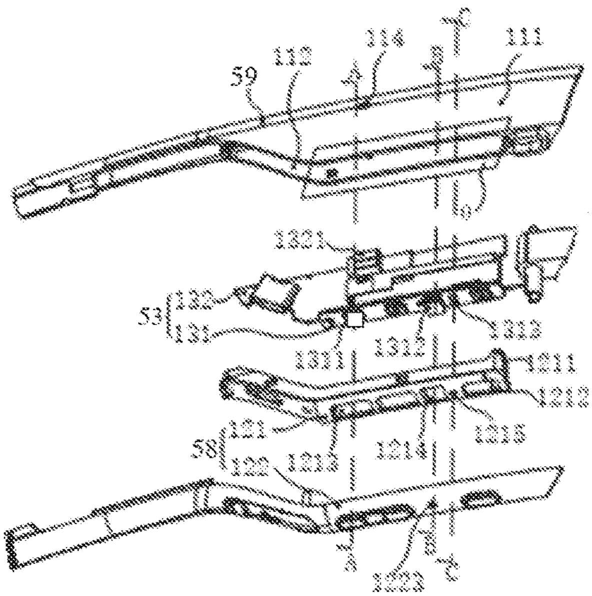
FIG. 55 is a schematic diagram illustrating an exploded view of structures of a loudspeaker device according to some embodiments of the present disclosure.
Figure 56:
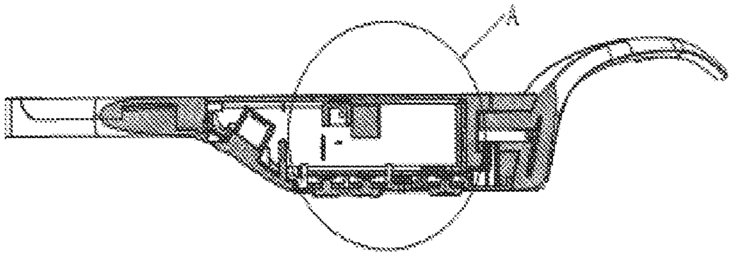
FIG. 56 is a schematic diagram illustrating a partial cross-section view of a loudspeaker device according to some embodiments of the present disclosure.
Figure 57:
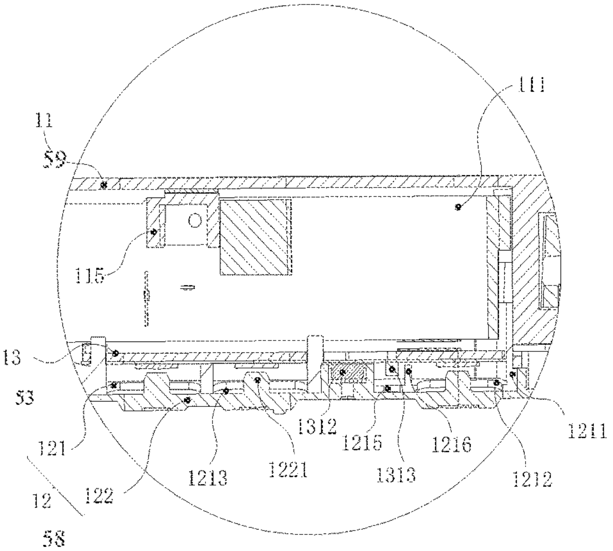
FIG. 57 is a schematic diagram illustrating an enlarged view of a part A in FIG. 56.

FIG. 55 is a schematic diagram illustrating an exploded view of structures of a loudspeaker device according to some embodiments of the present disclosure. FIG. 56 is a schematic diagram illustrating a partial cross-section view of a loudspeaker device according to some embodiments of the present disclosure. FIG. 57 is a schematic diagram illustrating an enlarged view of a part A in FIG. 56. According to FIGS. 55-57, in some embodiments, the loudspeaker device may include a component body. A cavity 111 may be formed inside the component body. It should be noted that the component body may be equivalent to the circuit housing 100 mentioned in the foregoing embodiments.

The component body may be a structure formed by combining at least two parts. The component body may also be a structure manufactured by an integral molding technology, such as a structure integrally formed by an integral injection molding process. The spatial shape of the component body may include, but is not limited to, a rectangular parallelepiped, a cube, an ellipsoid, a sphere, a cone, and other irregular spatial shapes. The material of the component body may include but is not limited to one or a combination of plastic, silica gel, rubber, plastic, glass, ceramic, alloy, stainless steel, etc.

In some embodiments, the component body may include an accommodating body 11 and a cover 12. The interior of the accommodating body 11 may be hollow to form a cavity 111. The accommodating body 11 may be provided with an opening 112 connected with the cavity 111. The cover 12 may be placed on the opening 112 of the cavity 111 for sealing the cavity 111. The cavity 111 may be an internal cavity formed by two or more components when assembled, or may be an internal cavity formed according to the shape of the molding die during the integral molding process of the components. The cavity 111 may be used to accommodate multiple electronic components and circuit structures of the loudspeaker device. The component body may be used to seal the cavity 111. The cavity 111 may be completely sealed by the component body, or jointly sealed by the component body and other accessories on the component body.

It should be noted that the accommodating body 11 may be equivalent to the peripheral side wall in the foregoing embodiment, and the cover body 12 may be equivalent to the bottom end wall in the foregoing embodiment.

The accommodating body 11 may be at least a part of the loudspeaker device. The accommodating body 11 in this embodiment may specifically be a structure for holding, for example, a circuit board, a battery 52, and electronic components in the loudspeaker device. For example, the accommodating body 11 may be the whole or a part of the housing of the loudspeaker device.

In addition, the accommodating body 11 may be provided with a cavity 111 having an opening 112 for accommodating the above-mentioned circuit board, battery, electronic components, etc. The opening 112 may communicate with the cavity and be used for the mounting and dismounting passages of the circuit boards, batteries, electronic components, or the like. Specifically, the number of openings 112 may be one or multiple, which is not limited here.

Further, the shape of the cover 12 may at least partially match the opening 112, such that the cover 12 may be placed on the opening 112 to seal the cavity 111. The material of cover 12 may be different from or partially the same as the accommodating body 11.

In some embodiments, the cover 12 may include a hard bracket 121 and a soft cover layer 124. The hard bracket 121 may be used to physically connect to the accommodating body 11. The soft cover layer 124 may be integrated on the surface of the hard bracket 121 to seal the cavity 111 after the hard bracket 121 is connected to the accommodating body 11.

Specifically, the material of the hard bracket 121 may be rigid plastic, and the material of the soft cover layer 124 may be soft silicone or rubber. A shape of the side of the hard bracket 121 facing toward the accommodating body 11 may match the opening 112, and fixed to the opening 112 of the cavity 111 by means of plugging, buckling, etc., so as to physically connect to the accommodating body 11. A gap may be easily formed at a physical connection portion between the hard bracket 121 and the accommodating body 11, which may reduce a sealing effect of the cavity 111. Further, the soft cover layer 124 may be injection molded integrally on an outer surface of the hard bracket 121 away from the accommodating body 11, which may further cover the physical connection portion between the hard bracket 121 and the accommodating body 11, thereby sealing the cavity 111.

In the embodiment, the cover 12 may include the hard bracket 121 and the soft cover layer 124 injection-molded integrally on a surface of the hard bracket 121. The hard bracket 121 may be used to physically connect to the accommodating body 11. The soft cover layer 124 may further seal the cavity 111 after the hard bracket 121 is connected to the accommodating body 11. The soft cover layer 124 may be more conducive to fit the gap between the hard bracket 121 and the accommodating body 11, so as to further improve the sealing effect of the electronic component, thereby improving the waterproof performance of the electronic component. At the same time, the hard bracket 121 and the soft cover layer 124 may be injection molded integrally, which can simplify an assembly process of electronic components.

In some embodiments, the hard bracket 121 may include an insertion part 1211 and a cover part 1212. The cover part 1212 may be placed on the opening 112, and the insertion part 1211 may be placed on one side of the cover part 1212 and extend into the cavity 111 along an inner wall of the cavity 111 to fix the cover part 1212 on the opening 112.

In an application scenario, the insertion part 1211 may not be inserted through the inner wall of cavity 111. For example, a plug-in part matching a shape of the insertion part 1211 of the hard bracket 121 may also be placed inside the cavity 111, such that the insertion part 1211 may be engaged with the plug-in part to fix the plug-in part inside the cavity 111. For example, the shape of insertion part 1211 may be a cylinder. In such cases, a plug-in part may be a cylindrical ring that surrounds the insertion part 1211 of the shape of the cylinder. An inner diameter of the plug-in part of the cylindrical ring may be appropriately less than an outer diameter of the plug-in part of the cylindrical body. In such cases, when inserting the insertion part 1211 in the plug-in part, an interference fit with the plug-in part may make the hard bracket 121 be stably connected to the cavity 111. Of course, other insertion methods may also be used, as long as the insertion part 1211 may be inserted into the cavity 111 and fixed with the cavity 111.

Specifically, the cover part 1212 may be placed on a side of the insertion part 1211 facing away from the cavity 111, and cover the opening 112 after the insertion part 1211 is inserted into the cavity 111. The cover part 1212 may be a complete structure, or may further include some holes according to needs, so as to achieve a certain function.

Figure 58:
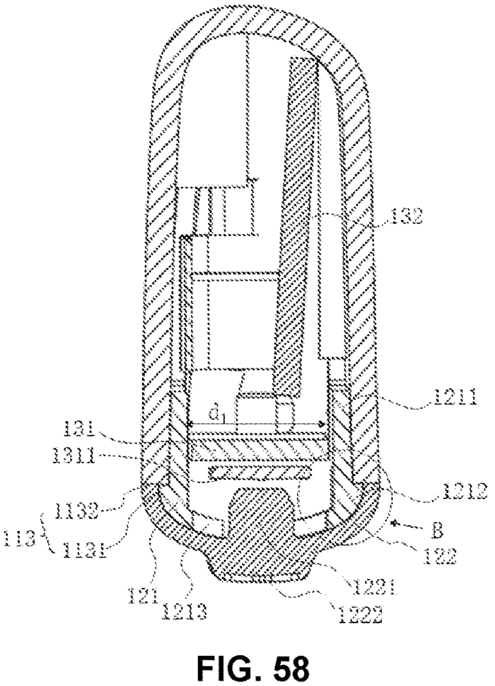
FIG. 58 is a schematic diagram illustrating a cross-section view of a loudspeaker device in an assembled state along an A-A axis in FIG. 55.

Further referring to FIG. 58, FIG. 58 is a schematic diagram illustrating a cross-section view of a loudspeaker device in an assembled state along an A-A axis in FIG. 55 according to some embodiments of the present disclosure. In some embodiments, the accommodating body 11 may include an opening edge 113 for defining the opening 112. A cover part 1212 may be pressed on an inner region 1131 of the opening edge 113 near the opening 112. The soft cover layer 124 may cover an outer surface of the cover part 1212 away from the accommodating body 11, and may be pressed on an outer region 1132 outside the inner region 1131 of the opening edge 113, thereby sealing the soft cover layer 124 and the opening edge 113.

The inner region 1131 and the outer region 1132 of the opening edge 113 may both belong to the opening edge 113, instead of regions other than the opening edge 113. The inner region 1131 of the opening edge 113 may be a region near the opening 112 of the opening edge 113, and the outer region 1132 of the opening edge 113 may be a region away from the opening 112 of the opening edge 113.

In the embodiment, the cover part 1212 of the hard bracket 121 may be pressed on the inner region 1131 of the opening edge 113 near the opening 112, which causes the cover part 1212 to initially seal the opening edge 113. However, since the accommodating body 11 and the hard bracket 121 are made of hard materials, a connection therebetween and a further coverage of the connection by the cover part 1212 may not achieve a good sealing effect. At an end where the cover part 1212 is pressed on the opening edge 113 and away from the opening 112, a gap between the end and the opening edge 113 may be easily generated. The end may further penetrate the cavity 111 through the gap, thereby reducing the sealing effect.

According to the descriptions above, in the embodiment of the present disclosure, the soft cover layer 124 may cover the outer surface of the cover part 1212 away from the accommodating body 11, and may be further pressed on the outer region 1132 outside the inner region 1131 of the opening edge 113, such that the gap between the cover part 1212 of the hard bracket 121 and the opening edge 113 may be further covered. Since the soft cover layer 124 is made of a soft material, it can further improve the sealing effect of the loudspeaker device and make the loudspeaker device more waterproof.

Figure 59:
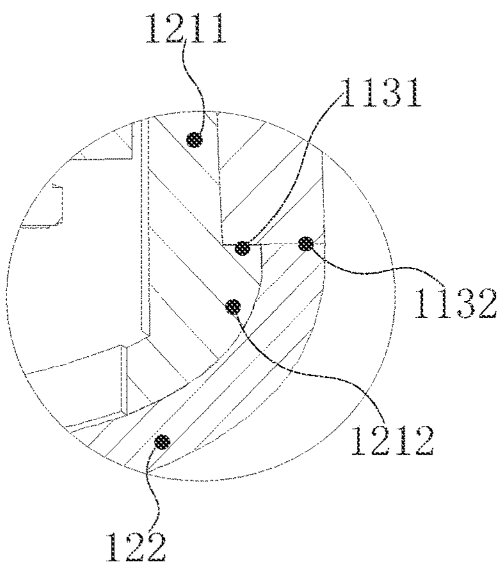
FIG. 59 is a schematic diagram illustrating an enlarged view of a part B in FIG. 58.

Further referring to FIG. 59, FIG. 59 is a schematic diagram illustrating an enlarged view of a part B in FIG. 58 according to some embodiments of the present disclosure. In an application scenario, in a snapped state of the cover 12, a periphery of the cover part 1212 may cover the inner region 1131 of the opening edge 113 and contact the inner region 1131 of the opening edge 113. The soft cover layer 124 may be placed on a side of the cover part 1212 away from the accommodating body 11, such that the cover part 1212 of the inner region 1131 located at the opening edge 113 may be sandwiched between the inner region 1131 and the soft cover layer 124 of the opening edge 113. The soft cover layer 124 may further extend toward the cover part 1212 away from the opening 112, and toward the opening edge 113, until it contacts the outer region 1132 of the opening edge 113. Therefore, a contact end surface between the cover part 1212 and the opening edge 113 and a contact end surface between the soft cover layer 124 and the opening edge 113 may be flush with each other, so as to form an "opening edge 113-cover part 1212-soft cover layer 124" structure on the inner region 1131 of the opening edge 113.

Figure 60:
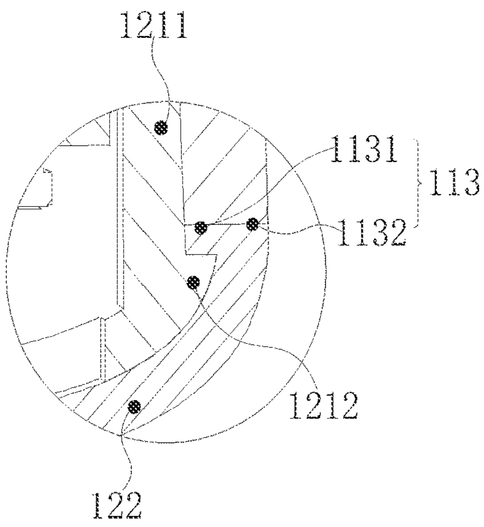
FIG. 60 is a schematic diagram illustrating a partial cross-section view of a loudspeaker device according to some embodiments of the present disclosure.

Further referring to FIG. 60, FIG. 60 is a schematic diagram illustrating a partial cross-section view of a loudspeaker device according to some embodiments of the present disclosure. In the embodiment, after the soft cover layer 124 extends to contact the outer region 1132 of the opening edge 113, the soft cover layer 124 may further extend along a region between the cover part 1212 and the opening edge 113 to the inner region 1131 of the opening edge 113. It is further assumed that, the cover part 1212 may be pressed on the inner region 1131 of the opening edge 113 to form an "opening edge 113-soft cover layer 124-cover part 1212-soft cover layer 124" structure between the inner region 1131 of the opening edge 113 and the cover part 1212. In the embodiment, the soft cover layer 124 may extend between the hard bracket 121 and the opening edge 113 after covering the cover part 1212 of the hard bracket 121, thereby further improving the sealing effect between the cavity 111 and the cover 12, and further improving the waterproof effect of the loudspeaker device.

In some embodiments, referring to FIGS. 55-60, the loudspeaker device may further include a circuit component 93 placed in the cavity 111, and the circuit component 93 may include a switch 1311.

Specifically, the circuit component 93 may include a first circuit board 131, and the switch 1311 may be placed on an outer side of the first circuit board 131 facing toward the opening 112 of the cavity 111. The number of the switches 1311 may be one or multiple. When the number of switches 1311 is multiple, the switches 1311 can be arranged on the first circuit board 131 at intervals. It should be noted that the first circuit board 131 may be equivalent to the first branch circuit board in the foregoing embodiment.

Correspondingly, the hard bracket 121 may include a switch hole 1213 corresponding to the switch 1311. The soft cover layer 124 may further cover the switch hole 1213 and may include a pressing part 1221 at a position corresponding to the switch hole 1213. The pressing part 1221 may extend toward the inside of the cavity 111 through the switch hole 1213. When a corresponding position of the soft cover layer 124 is pressed, the pressing part 1221 may press the switch 1311 on the circuit component 93, thereby triggering the circuit component 93 to perform a preset function.

The pressing part 1221 on the soft cover layer 124 may be formed by protruding a side of the soft cover layer 124 facing toward the hard bracket 121 toward the switch hole 1213 and the switch 1311. A shape of the pressing part 1221 may match a shape of the switch hole 1213. In this way, when the corresponding position of the soft cover layer 124 is pressed, the pressing part 1221 may pass through the switch hole 1213 and reach the corresponding switch 1311 on the first circuit board 131. At the same time, a length of the pressing part 1221 along a direction of the switch 1311 may be set such that the switch 1311 is not pressed when the corresponding position of the soft cover layer 124 is not pressed, and the corresponding switch 1311 is pressed when the corresponding position of the soft cover layer 124 is pressed.

In an application scenario, a position corresponding to the pressing part 1221 on the soft cover layer 124 may further be protruded toward a side facing away from the hard bracket 121, so as to form a convex pressing part 1222. In this way, a user may clarify a position of the switch 1311, and trigger the circuit component 93 to perform a corresponding function by pressing the corresponding convex pressing part 1222.

In some embodiments, the auxiliary function module 804 may be used to receive auxiliary signals and perform auxiliary functions. The auxiliary function module 804 may be a module different from the earphone core 42 for receiving auxiliary signals and performing auxiliary functions. Further, the auxiliary function module 804 may implement one or more of the image function, voice function, auxiliary control function, and switch control function. In this application, the conversion of audio signals into sound signals may be considered as the main function of the speaker, and other functions different from the main function may be considered as auxiliary functions of the speaker. For example, the auxiliary function of the speaker may include receiving sounds of user and/or environment through a microphone, and controlling the playing process of the sound signal through keys.

Further, the auxiliary function module may include at least a first auxiliary function module and a second auxiliary function module. The first auxiliary function module may be disposed on the main circuit board 445, and the second auxiliary function module may be disposed on the first branch circuit board 442.

Further, the auxiliary function module may further include a third auxiliary function module, and the third auxiliary function module is disposed on the second branch circuit board.

Specifically, the second auxiliary function module may be the first microphone element 1312, and the third auxiliary function module may be the second microphone element 1321. Both the first microphone element 1312 and the second microphone element 1321 may be MEMS (Micro Electro Mechanical System) microphones, which have a small operating current, relatively stable performance, and high quality of voice produced.

It should be noted that the first microphone element 1312 and the second microphone element 1321 may be equivalent to the microphone 432 in the foregoing embodiment.

In some embodiments, the first microphone and the second microphone may be distributed in the loudspeaker device in a specific manner, so that the main sound source (for example, a person's mouth) is located in a direction in which the second microphone element 1321 points to the first microphone element 1312.

Specifically, the first microphone element 1312 may be disposed on the side of the first circuit board 131 facing the cover 12, and the second microphone element 1321 may be disposed on the second circuit board 132 facing the accommodating body.

When the user wears the loudspeaker device, since the distances between the mouth (the main sound source) and the first microphone element 1312 and the second microphone element 1321 are less than the distances between other sound sources (for example, noise sources) in the environment and the first microphone element 1312 and the second microphone element 1321, the mouth may be considered as the near-field sound source of the first microphone element 1312 and the second microphone element 1321. For near-field sound sources, the magnitude of the sound received by the two sets of microphone elements may be related to the distance from the sound source. Since the first microphone element 1312 is closer to the main sound source, the first microphone element 1312 may receive greater audio signal $V_{J1}$. Since the second microphone element 1321 is farther from the main sound source, the second microphone element 1321 may receive less audio signals $V_{J2}$, that is, $V_{J1}>V_{J2}$.

Since the noise source in the environment is relatively far away from the first microphone element 1312 and the second microphone element 1321, the noise source in the environment may be considered as the far-field sound source of the first microphone element 1312 and the second microphone element 1321. For far-field sound sources, the amplitudes of the noise signals received by the two sets of microphone elements may be close, i.e., $V_{Y1}\approx V_{Y2}$.

Therefore, the total sound signal received by the first microphone element 1312 may be:

$$V_1=V_{J1}+V_{Y1}, \tag{1}$$

The total sound signal received by the second group of microphone components may be:

$$V_2=V_{J2}+V_{Y2}, \tag{2}$$

In order to eliminate the noise in the received sound signal, the total sound signal of the first microphone element 1312 and the total sound signal of the second microphone element 1321 may be processed by a differential processing. The form of differential processing may be denoted as follows:

$$V=V_1-V_2=(V_{J1}-V_{J2})+(V_{Y1}-V_{Y2}\approx V_{J1}-V_{J2}, \tag{3}$$

Further, according to the differential result of the signal obtained by Equation (3), and combining with the distance between the first microphone element 1312 and the second microphone element 1321 relative to the main sound source, the audio signal from the main sound source actually obtained by the first microphone element 1312 and/or the second microphone element may be further obtained, that is, $V_{J1}$ or $V_{J2}$.

Therefore, in order to ensure the quality of the audio signal finally obtained, the differential result of the signal obtained in Equation (3) needs be made as large as possible, i.e., $V_{J1}>>V_{J2}$. In some embodiments of the present disclosure, this effect may be achieved in the following ways: making the installation position of the first microphone element 1312 as close as possible to the main sound source (such as a human mouth); making the installation position of the second microphone element 1321 as far away as possible from the main sound source (such as human mouth); isolating the space of two microphones; setting a sound barrier between the two microphone elements. It should be noted that all of the above methods may achieve the effect of improving the quality of the audio signal, and these methods may be used alone or in combination.

In some embodiments, in order to make the installation position of the first microphone element 1312 as close as possible to the main sound source (such as a human mouth), the first circuit board 131 and the first microphone element 1312 mounted on it may be set to be inclined. In some embodiments, in order to make the installation position of the second microphone element 1321 as far away as possible from the main sound source (such as a human mouth), the second circuit board 132 and the second microphone element 1321 installed on it may be set to be inclined, so as to flexibly adjust the required installation distance. At the same time, corresponding sound guide channels and sound barriers may be arranged in each microphone element installation area. Specific installation methods may be found in FIGS. 61-63 and related descriptions.

It should be noted that the second circuit board 132 may be equivalent to the second branch circuit board in the foregoing embodiment.

Figure 61:
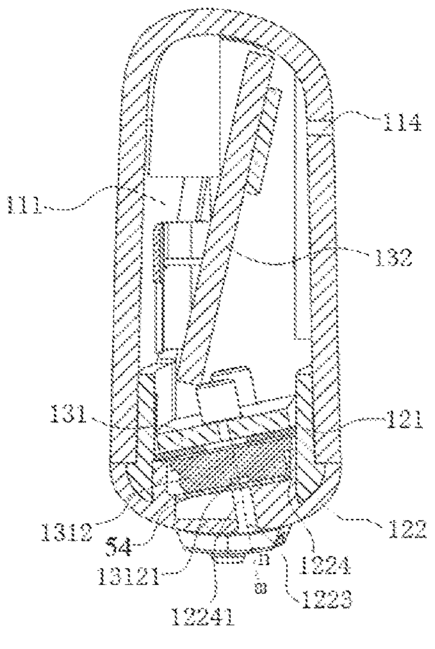
FIG. 61 is a schematic diagram illustrating a cross-section view of a loudspeaker device in an assembled state along a B-B axis in FIG. 55 of the present disclosure.

FIG. 61 is a schematic diagram illustrating a cross-section view of a loudspeaker device in an assembled state along a B-B axis in FIG. 55. The first circuit board 131 may include the first microphone element 1312. In some embodiments, the first microphone element 1312 may be placed on one side of the first circuit board 131 facing the cover 12. For example, the first microphone element 1312 may be placed on the first circuit board 131 at intervals from the switch 1311 in the embodiment. The first microphone element 1312 may be used to receive a sound signal from the outside of the loudspeaker device, and convert the sound signal into an electrical signal for analysis and processing.

Correspondingly, the bracket 121 may be provided with a first microphone hole corresponding to the first microphone element 1312, and the soft cover layer 124 may be provided with a first sound guiding hole 1223 corresponding to the first microphone hole 1214. The first sound guiding hole 1223 may be arranged corresponding to the first microphone element 1312.

Specifically, the first sound guiding hole 1223 may be disposed on the cover 12, one end of the first sound guiding hole 1223 may be connected to the first microphone hole 1214 on the cover 12, and the other end of the first sound guiding hole 1223 may face to the first microphone element 1312, thereby shortening the sound guide distance and improving the sound guide effect.

Specifically, the first circuit board 131 may face the cover 12 in a manner parallel or inclined to the cover 12, and the first sound guiding hole 1223 may be perpendicular or inclined to the surface of the cover 12.

In some embodiments, the depth direction of the opening 112 may be vertical or inclined with respect to the bottom of the accommodating body 11. When the opening 112 is vertical, the cover 12 may be horizontal with respect to the accommodating body 11 after being covered. When the opening 112 is inclined, the cover 12 may be inclined relative to the accommodating body 11 after being covered, and the inclination may be inclined toward the side of the mouth of the human body. In this way, the first sound guiding hole 1223 may be more directly faced to the mouth or face of the human, thereby improving the effect of the microphone assembly for acquiring the sound of the main sound source.

Further, when the opening 112 is inclined, the included angle between the plane of the opening 112 and the plane of the width direction of the accommodating body may be in the range of 10° to 30°, so that the first sound guiding hole 1223 further faces the mouth area of the person. Specifically, when the opening 112 is inclined, the included angle between the plane of the opening 112 and the plane of the width direction of the accommodating body may be any angle within the above range, such as 10°, 15°, 20°, 23°, 27°, 30°, etc., which is not specifically limited here.

Specifically, the first sound guiding hole 1223 may penetrate the soft cover layer 124. When the opening 112 is vertical and the first circuit board 131 is parallel to the cover 12, the first sound guiding hole 1223 may be perpendicular to the cover 12, that is, the first sound guiding hole 1223 may be vertical. When the opening 112 is vertical and the first circuit board 131 is inclined to the cover 12, the first sound guiding hole 1223 may be inclined to the cover 12, that is, the first sound guiding hole 1223 may be inclined. When the opening 112 is inclined and the first circuit board 131 is parallel to the cover 12, the first sound guiding hole 1223 may be arranged perpendicular to the cover 12, that is, the first sound guiding hole 1223 may be inclined. When the opening 112 is inclined and the first circuit board 131 is inclined to the cover 12, the first sound guiding hole 1223 may also be arranged inclined to the cover 12. That is, the first sound guiding hole 1223 may be vertical or inclined.

Further, when the first circuit board 131 faces the cover 12 in a manner inclined to the cover 12, the included angle between the first circuit board 131 and the plane where the cover 12 may be located is in the range of 5°-20°. Specifically, when the first circuit board 131 faces the cover 12 in a manner inclined to the cover 12, the included angle between the first circuit board 131 and the plane where the cover 12 is located may be within the range of the above included angle, such as 5°, 8°, 10°, 15°, 20°, etc., which is not specifically limited here.

Specifically, the first sound guiding hole 1223 may correspond to the first microphone hole 1214 on the bracket 121, and the first microphone element 1312 may be communicated with the outside of the loudspeaker device, so that the sound outside the loudspeaker device may pass through the first sound guiding hole 1223 and the first microphone hole 1214, and is received by the first microphone element 1312.

In order to further improve the sound guide effect, the central axis of the first sound guiding hole 1223 may coincide with the main axis of the sound receiving region 13121 of the first microphone element 1312. The sound receiving region 13121 of the first microphone element 1312 refers to a region (for example, a diaphragm) on the first microphone element 1312 that receives sound waves. When the central axis of the first sound guiding hole 1223 coincides with the main axis of the sound receiving region 13121 of the first microphone element 1312, the sound of the main sound source may be collected by the first microphone hole 1214 and may be directly guided to the receiving region 13121 of the first microphone element 1312 through the first sound guiding hole 1223. Therefore, the sound propagation path may be further reduced, which may prevent the main sound source from being repeatedly propagated in the cavity to cause loss and echo, and may also prevent the main sound source from being transmitted to the area where the second microphone elements 1321 are located through the channel in the cavity, thereby improving the sound effect.

In an embodiment, the cover 12 may be arranged in a strip shape, wherein the main axis of the first sound guiding hole 1223 and the main axis of the sound receiving region 13121 of the first microphone element 1312 may coincide with each other in the width direction of the cover 12. The main axis of the sound receiving region 13121 of the first microphone element 1312 refers to the main axis of the sound receiving region 13121 of the first microphone element 1312 in the width direction of the cover 12, such as the axis n in FIG. 61. The main axis of the first sound guiding hole 1223 may be the axis m in FIG. 61, and the axis n and the axis m may coincide.

Further, the first sound guiding hole 1223 may be in any shape, as long as it can receive sound from the outside of the loudspeaker device. In some embodiments, the first sound guiding hole 1223 may be a circular hole with a relatively small size, and may be placed in a region of the cover 12 corresponding to the first microphone hole 1214. The small first sound guiding hole 1223 may reduce the communication between the first microphone element 1312 or the like in the loudspeaker device with the outside, thereby improving the sealing effect of the loudspeaker device.

Furthermore, in order to guide the sound signal entering through the first sound guiding hole 1223 to the first microphone element 1312, the sound guide channel 12241 may be set in a curved shape.

Specifically, in an application scenario, the main axis of the first sound guiding hole 1223 may be arranged in the middle of the cover 12 in the width direction of the cover 12.

At the same time, the hard bracket 121 may include a microphone hole 1214 corresponding to the first microphone element 1312. The soft cover layer 124 of the cover 12 may include a first sound blocking member 1224 at a position corresponding to the first sound guiding hole 1223. The first sound blocking member 1224 may extend inside the cavity 111 through the microphone hole 1214, limiting the transmission of sound to the transmission direction of the first microphone element 1313 and defining a sound guiding channel 12241. One end of the sound guiding channel 12241 may be in communication with the first sound guiding hole 1223 on the soft cover layer 124. The first microphone element 1312 may be inserted into the sound guiding channel 12241 from the other end of the sound guiding channel 12241.

The loudspeaker device may further include the switch 1311 described above. The switch hole 1213 and the first microphone hole 1214 may be placed on the hard bracket 121 at intervals.

Further, the distance between switch hole 1213 and the first microphone hole 1214 may be within a range of 10-20 mm, for example, 10 mm, 15 mm, 20 mm, etc.

Correspondingly, the first sound blocking member 1224 may extend from the soft cover layer 124, to a periphery of the first sound guiding hole 1223, through the microphone hole 1214, inside the cavity 111, to a periphery of the first microphone element 1312, to form a sound guiding channel 12241 from the first sound guiding hole 1223 to the first microphone element 1312. Thus, the sound signal of the loudspeaker device entering the sound guiding hole may directly reach the first microphone element 1312 through the sound guiding channel 12241.

Specifically, a shape of a cross section of the sound guiding channel 12241 perpendicular to a length direction thereof may be the same as or different from a shape of the microphone hole 1214 or the first microphone element 1312. In an application scenario, shapes of cross sections of the first microphone hole 1214 and the first microphone element 1312 in a direction perpendicular to the hard bracket 121 facing toward the cavity 111 may be square. A size of the microphone hole 1214 may be slightly larger than an outside size of the sound guiding channel 12241. An inside size of the sound guiding channel 12241 may be not smaller than the outside size of the first microphone element 1312, such that the sound guiding channel 12241 may pass through the first sound guiding hole 1223 to reach the first microphone element 1312 and cover the periphery of the first microphone element 1312.

In this way, the soft cover layer 124 of the loudspeaker device may include a first sound guiding hole 1223 and a sound guiding channel 12241. The sound guiding channel 12241 may pass from the periphery of the first sound guiding hole 1223, through the microphone hole 1214 to reach the first microphone element 1312, and cover the periphery of the first microphone element 1312. The sound guiding channel 12241 may make the sound signal entering from the first sound guiding hole 1223 reach the first microphone element 1312 through the first sound guiding hole 1223, and may be received by the first microphone element 1312, which may reduce leakage of the sound signal in a propagation process, thereby improving the efficiency of receiving electronic signals of the loudspeaker device.

In an application scenario, the loudspeaker device may further include a waterproof mesh 64 placed in the sound guiding channel 12241. The waterproof mesh 64 may abut a side of the soft cover layer 124 facing toward the microphone element by the first microphone element 1312, and cover the first sound guiding hole 1223.

Specifically, the hard bracket 121 in the sound guiding channel 12241 close to the first microphone element 1312 may form a convex surface corresponding to the first microphone element 1312, such that the waterproof mesh 64 may be sandwiched between the first microphone element 1312 and the convex surface. The waterproof mesh 64 may also be directly bonded to a periphery of the first microphone element 1312, and the setting manner thereof is not limited here.

In addition to waterproofing the first microphone element 1312, the waterproof mesh 64 in this embodiment may also have effects such as sound transmission, so as to avoid affecting a sound receiving performance of a sound receiving region 13121 of the first microphone element 1312.

It should be noted that, due to a setting need for the circuit component 93, the first microphone element 1312 may be placed at a first position of the first circuit board 131. When the first sound guiding hole 1223 is disposed, the first sound guiding hole 1223 may be placed at a second position of the cover 12 due to requirements of beauty and convenience. In this embodiment, the first position and the second position may not correspond to each other along the width direction of the cover 12, such that the main axis of the first sound guiding hole 1223 and the main axis of the sound receiving region 13121 of the first microphone element 1312 may be spaced from each other in the width direction of the cover 12. Therefore, the sound entering from the first sound guiding hole 1223 may not be able to reach the sound receiving region 13121 of the first microphone element 1312 in a straight line.

In the embodiment, the cover 12 may be part of a housing of the loudspeaker device. In order to meet an overall aesthetic requirement of the loudspeaker device, the first sound guiding hole 1223 may be placed in the middle of the cover 12 in the width direction, such that the first sound guiding hole 1223 may look more symmetrical and meet visual needs of people.

In some embodiments, the corresponding sound guiding channel 12241 may be set to have a stepped shape along a cross-section along the B-B axis in FIG. 55, such that the sound signal introduced by the first sound guiding hole 1223 may be transmitted to the first microphone element 1312 through the sound guiding channel 12241 in the stepped shape and received by the first microphone element 1312.

Figure 63:
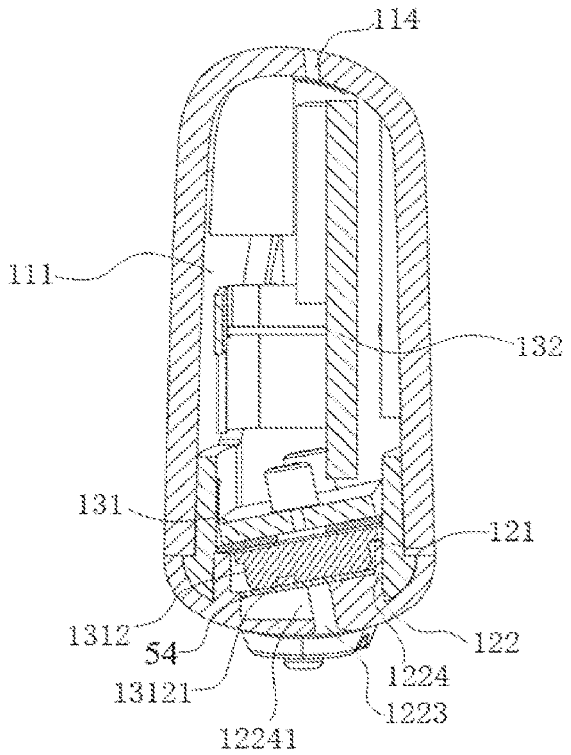
FIG. 63 is a schematic diagram illustrating a cross-section view of a loudspeaker device in an assembled state along a C-C axis in FIG. 61.

FIG. 63 is a schematic diagram illustrating a cross-section view of a loudspeaker device in an assembled state along a C-C axis in FIG. 55 according to some embodiments of the present disclosure. In some embodiments, the loudspeaker device may further include a light emitting element 1313. The light emitting element 1313 may be placed on the first circuit board 131 of the circuit component 93 to be accommodated in the cavity 111. For example, the light emitting element 1313 may be placed on the first circuit board 131 in a certain arrangement together with the switch 1311 and the first microphone element 1312 in the embodiment. It should be noted that the circuit component 93 may be equivalent to the control circuit in the foregoing embodiments.

In some embodiments, the hard bracket 121 may include a light emitting hole 1215 corresponding to the light emitting element 1313. The soft cover layer 124 may cover the light emitting hole 1215, and a thickness of a region corresponding to the light emitting hole 1215 of the soft cover layer 124 may be set to allow light generated by the light emitting element 1313 to be transmitted through the soft cover layer 124.

The light emitting element 1313 may include a light emitting diode, etc. The number of the light emitting element 1313 may be one or more. The number of the light emitting holes 1215 on the hard bracket 121 may be the same as the number of the light emitting element 1313. When there are multiple light emitting element 1313, there may be different light emitting holes 1215 correspondingly, and different signals may be transmitted through different light emitting elements 1313.

In this embodiment, the soft cover layer 124 may still transmit the light emitted by the light emitting element 1313 to the outside of the loudspeaker device while covering the light emitting hole 1215 by certain means.

In some embodiments, a thickness of an entire region or part region of the soft cover layer 124 corresponding to the light emitting hole 1215 may be less than a thickness of a region of the soft cover layer 124 corresponding to a periphery of the light emitting hole 1215, such that the light emitted by the light emitting element 1313 may pass through the light emitting hole 1215 and may be transmitted through the soft cover layer 124. Of course, the region of the soft cover layer 124 covering the light emitting hole 1215 may transmit light through other means, which is not specifically limited here. For example, a window may be disposed on the soft cover layer 124 corresponding to the entire area or part of the light emitting hole 1215, and the window may be covered with a layer of transparent or light-transmitting material (for example, thin film, quartz, etc.), so that the light emitted by the light emitting element 1313 can pass through the light emitting hole 1215 and be further transmitted through the window.

In this way, the soft cover layer 124 may cover the light emitting hole 1215 of the corresponding light emitting element 1313, and may allow light emitted by the light emitting element 1313 to be transmitted from the soft cover layer 124 to the outside of the loudspeaker device. Thus, the light emitting element 1313 may be sealed by the soft cover layer 124 without affecting the light emitting function of the loudspeaker device, so as to improve the sealing effect and waterproof performance of the loudspeaker device.

Specifically, in one embodiment, the hard bracket 121 may be further provided with a light blocking member 1216 extending toward the inside of the cavity 111 on the periphery of the light emitting hole 1215, and the light blocking member 1216 may limit the transmission direction of the light generated by the light emitting element 1313.

The shape of the light emitting hole 1215 may be any shape that may transmit the light emitted by the light emitting element 1313, such as a circle, a square, a triangle, etc. In this embodiment, the shape of the light emitting hole 1215 may be a circle.

Since there is still a certain distance between the light emitting element 1313 and the light emitting hole 1215, if there is no restriction, part of the light emitted by the light emitting element 1313 may be leaked out in the process of reaching the light emitting hole 1215, so that the light can not effectively propagate to the light emitting hole 1215, thereby reducing the brightness of the light that can be seen from the outside of the loudspeaker device, and making it inconvenient for the user to receive signals. However, the arrangement of the light blocking member 1216 in this embodiment may limit the transmission direction of the light generated by the light emitting element 1313, so as to reduce light leakage, thereby improving the brightness of the light transmitted through the light emitting hole 1215.

Specifically, the light blocking member 1216 in this embodiment may be partially or entirely formed by a hard bracket 121. For example, the hard bracket 121 may extend along the periphery of the light emitting hole 1215 toward the inside of the cavity 111 and surround the light emitting element 1313. Therefore, a light channel for light propagation may be formed, through which the light generated by the light emitting element 1313 can propagate directly to the light emitting hole 1215 along the arrangement direction of the channel, or the hard bracket 121 may not form a light channel, but only restrict the propagation of light from one direction or several directions. For example, the hard bracket 121 may extend from only one side of the light emitting hole 1215 into the cavity 111 to form a light blocking member 1216 that shields the light emitting element 1313. As another example, the light blocking member 1216 may further cooperate with other components to limit the spread of light. For example, the hard bracket 121 may extend from one side of the light emitting hole 1215 into the cavity 111 to form a light blocking member 1216 for blocking the light emitting element 1313. The light blocking member 1216 may further cooperate with the inner wall of the cavity 111 or other structures of the hard bracket 121 to restrict the transmission direction of the light generated by the light emitting element 1313 from multiple directions.

In an application scenario, the light emitting element 1313 and the first microphone element 1312 may be adjacently arranged on the first circuit board 131, and the corresponding light emitting holes 1215 and the first microphone holes 1214 may be arranged on the hard bracket 121 at intervals. As described above, a first sound blocking member 1224 formed by a soft cover layer 124 and defining a sound guide channel 12241 may be disposed on the periphery of the first microphone element 1312, and the first sound blocking member 1224 may be arranged to pass through the first microphone hole 1214, so that the first microphone element 1312 and the light emitting element 1313 are spaced apart, and the first microphone hole 1214 and the light emitting hole 1215 are spaced apart.

Specifically, in this application scenario, the light blocking member 1216 formed by the hard bracket 121 may cooperate with a side wall of the first sound blocking member 1224 close to the light emitting element 1313, limiting the transmission direction of the light generated by the light emitting element 1313.

In another application scenario, the cavity 111 may be arranged in a strip shape on a cross section perpendicular to the direction of the opening 112. Correspondingly, the hard bracket 121 may be also in a strip shape and inserted into the cavity 111 from the opening 112 through the insertion part 1211 to form a mechanical connection with the cavity 111. Insertion parts 1211 may be disposed on both sides along the length direction of the hard bracket 121, so that the light emitting element 1313 is also provided with corresponding insertion parts 1211 of the hard bracket 121 on both sides along the length direction of the hard bracket 121, so as to limit the light on both sides of the light emitting element 1313. Further, in this application scenario, the light blocking member 1216 may be further disposed on the side of the light emitting element 1313 perpendicular to the length direction of the hard bracket 121. The side wall of the first sound blocking member 1224 may be arranged on the other side of the light emitting element 1313 perpendicular to the length direction of the hard bracket 121. The light blocking member 1216 and the first sound blocking member 1224 may be parallel plates and further restrict the transmission direction of the light generated by the light emitting element 1313 together with the insertion parts 1211 on both sides of the light emitting element 1313.

In one embodiment, the circuit component 93 in the loudspeaker device may include the first circuit board 131 in the above embodiment of the loudspeaker device, and may further include a second circuit board 132. More descriptions thereof may be found in FIG. 55, FIG. 58, FIG. 61, and FIG. 62.

It should be noted that the second circuit board 132 may be equivalent to the second branch circuit board in the foregoing embodiment.

Specifically, the second circuit board 132 may be disposed facing the accommodating body 11, and the second circuit board 132 may be disposed in the cavity 111 so as to be sloped with respect to the first circuit board 131. One side of the second circuit board 132 facing the accommodating body 11 may be provided with a second microphone element 1321.

The second microphone element 1321 may be arranged to face the side wall of the accommodating body 11, so that there is a large space near the second microphone element 1321, and it is convenient to provide functional components corresponding to the second microphone element 1321 on the accommodating body 11. In addition, the second circuit board 132 may be arranged so as to be sloped with respect to the first circuit board 131, and the functional components on the two circuit boards may be arranged in a staggered manner, which may also reduce the distance between the functional components, thereby further saving and compressing the interior space of the loudspeaker device.

The side wall of the accommodating body 11 opposite to the cover 12 or the first sound guiding hole 1223 may be further provided with a second sound guiding hole 114.

A second sound guiding hole 114 may be correspondingly disposed on the side wall of the accommodating body 11. The second sound guiding hole 114 and the first sound guiding hole 1223 may be away from each other. In some embodiments, the opening 112 of the accommodating body 11 may be an inclined opening, the cover 12 may be inclined with respect to the accommodating body 11. The side wall of the accommodating body 11 opposite to the first sound guiding hole 1223 may be a side surface of the cavity 111. The second sound guiding hole 114 may be disposed on one side surface of the accommodating body 11. Furthermore, the second sound guiding hole 114 may be disposed on one side surface of the accommodating body 11 and may be within a range of 3-6 mm from the top of the accommodating body 11. Specifically, the distance may be 3 mm, 4 mm, 5 mm, 6 mm, etc.

In some embodiments, when the depth direction of the opening 112 of the accommodating body 11 is vertical with respect to the bottom of the accommodating body, the cover 12 may be arranged horizontally relative to the accommodating body 11. The side wall of the accommodating body 11 opposite to the first sound guiding hole 1223 may be the top of the cavity 111. The sound guiding hole 114 may be disposed on the top of the accommodating body 11. Further, the second sound guiding hole 114 may be disposed at the middle position of the top of the accommodating body 11.

The above method may keep the second sound guiding hole 114 away from the main sound source, and reduce the sound of the main sound source received by the second sound guiding hole 114, thereby increasing the proportion of the second sound guiding hole 114 receiving environmental noise, and enhancing the noise reduction effect.

As described in the above embodiment of the loudspeaker device of the present disclosure, the cover 12 may be provided with a first sound guiding hole 1223 corresponding to the first microphone element 1312 and the first microphone hole 1214, wherein the first microphone element 1312 may be used to receive the sound input from the first sound guiding hole 1223, and the second microphone element 1321 may be used to receive and the sound input from the second sound guiding hole 114.

Further, the central axis of the second sound guiding hole 114 may coincide with the main axis of the sound receiving region of the second microphone element 1321.

When the central axis of the second sound guiding hole 114 coincide with the main axis of the sound receiving region of the second microphone element 1321, noise may be directly guided to the sound receiving region of the second microphone element 1321 through the second sound guiding hole 114, thereby reducing the propagation of the noise inside the cavity 111. At the same time, the noise may be directly guided to the sound receiving region 13121 of the first microphone element 1312 through the first sound guiding hole 1223. The noises received by the first microphone element 1312 and the second microphone element 1321 may be approximately the same, which is beneficial for eliminating noise in subsequent processing and improving the quality of the main sound source.

In some embodiments, the central axis of the second sound guiding hole 114 may be coincident with or parallel to the central axis of the first sound guiding hole 1223.

The second sound guiding hole 114 and the first sound guiding hole 1223 may have the same central axis direction, that is, their central axes may coincide or be parallel. In addition, the sound entrance of the second sound guiding hole 114 and the sound entrance of the first sound guiding hole 1223 may face opposite directions, thereby reducing the main sound source received by the second sound guiding hole 114, which is beneficial for eliminating noise in subsequent processing and improving the quality of the main sound source.

In some embodiments, the main axis of the sound receiving region of the second microphone element 1321 may coincide with or be parallel to the main axis of the sound receiving region 13121 of the first microphone element 1312. The sound receiving region of the second microphone element 1321 may receive the sound signal passing through the second sound guiding hole 114, and the sound receiving region 13121 of the first microphone element 1312 may receive the sound signal passing through the first sound guiding hole 1223. Since the main sound source signal passing through the second sound guiding hole 114 is small, the main sound source signal received by the sound receiving region of the second microphone element 1321 may be small, which helps to achieve the effect of improving the quality of the audio signal.

In some embodiments, the first circuit board 131 may be arranged parallel to the opening plane of the opening 112 and close to the opening 112. Optionally, the first circuit board 131 may also be inclined to the opening plane of the opening 112 and disposed close to the opening 112. Furthermore, the switch 1311, the light emitting element 1313, etc., as described above may be further disposed on the first circuit board 131. The switch 1311, the light emitting element 1313, and the first microphone element 1312 may be arranged on the first circuit board 131 in a certain arrangement. Correspondingly, a switch hole 1213, a light emitting hole 1215, a first microphone hole 1214, etc., may be separately arranged on the cover 12 to transmit signals to the outside of the loudspeaker device through the corresponding holes.

Further, the first microphone hole 1214 may be arranged at the center of the cover 12. The switch hole 1213 and the light emitting hole 1215 may be respectively arranged on both sides of the first microphone hole 1214 in the length direction of the cover 12. The distance between the switch hole 1213 and the first microphone hole 1214, and the distance between the light emitting hole 1215 and the first microphone hole 1214 may be in the range of 5-10 mm, and specifically may be 5 mm, 6 mm, 7 mm, 8 mm, 9 mm, 10 mm, etc. The distance between the switch hole 1213 and the light emitting hole 1215 from the first microphone hole 1214 may be equal or unequal.

In some embodiments, the accommodating body 1151 may extend from the opening 112 in a direction perpendicular to the opening plane to form a cavity 111 with a certain width. The second circuit board 132 may be arranged to be parallel to the width direction of the cavity 111 and perpendicular to the opening plane. Optionally, the second circuit board 132 may also be inclined to the width direction of the cavity 111 and arranged inclined to the plane of the opening 112. The second circuit board 132 may be disposed in the cavity 111 so as to be sloped with respect to the first circuit board 131. The second circuit board 132 may be further provided with a main control chip, an antenna, etc.

In some embodiments, the second circuit board 132 may be inclined to the width direction of the cavity 111 and arranged to be inclined to the plane of the opening 112. The included angle between the second circuit board 132 and the width direction of the cavity 111 may be in the range of 5°-20°. Specifically, the included angle between the second circuit board 132 and the width direction of the cavity 111 may be any angle within the above range, for example, 5°, 10°, 15°, 20°, etc., which are not specifically limited here.

In an application scenario, when the user uses the loudspeaker device, the main axis of the sound receiving region of the second microphone element 1321 may coincide with the main axis of the sound receiving region 13121 of the first microphone element 1312, and the first microphone element 1312 and the second microphone element 1321 may be in a straight line with the user's mouth.

In this embodiment, the first microphone element 1312 and the second microphone element 1321 may be respectively disposed on two circuit boards. Two microphone elements may receive sound signals through the first sound guiding hole 1223 and the second sound guiding hole 114 respectively, one of which may be used to collect main sounds such as human voices, while the other microphone element may have a background noise collection function to facilitate the collection of ambient noise. The two microphone elements may cooperate to analyze and process the received sound signal, which may play a role in noise reduction, etc., thereby improving the quality of sound signal processing.

Figure 62:
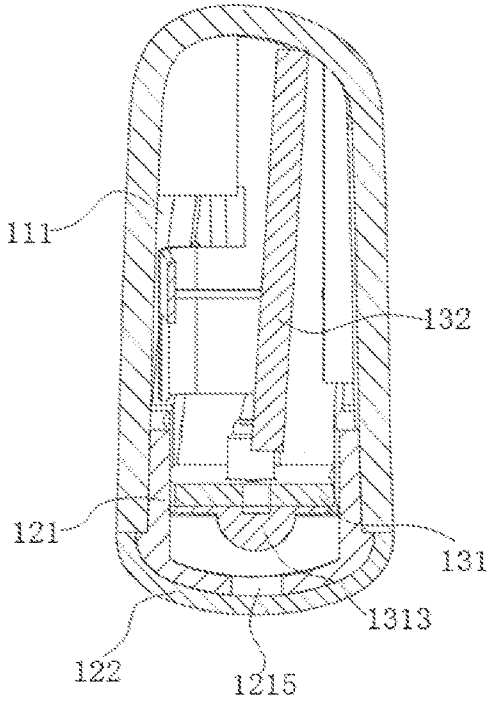
FIG. 62 is a schematic structural diagram illustrating an included angle, different from that in FIG. 61, between a first circuit board and a second circuit board.

Further, as shown in FIG. 61 and FIG. 62, FIG. 62 is a schematic structural diagram illustrating an included angle, different from that in FIG. 61, between a first circuit board and a second circuit board. The first circuit board 131 and the second circuit board 131 may be arranged so as to be sloped with respect to each other in the same cavity 111, which may make the installation mode of the two circuit boards more flexible. The angle between the two circuit boards may be adjusted according to the size and position of the electronic components on the two circuit boards, thereby improving the space utilization rate of the loudspeaker device. Further, when the two circuit boards are further used in the loudspeaker device, the space of the loudspeaker device may be saved, which facilitates the thinning of the loudspeaker device.

Further, the included angle between the first circuit board 131 and the second circuit board 132 may be in the range of 50° to 150°, and specifically, the angle between the first circuit board 131 and the second circuit board 132 may be any angle within the above range, such as 70°, 80°, 90°, 100°, 110°, etc.

Specifically, in an application scenario, the opening 112 and the cover 12 may be arranged in a corresponding elongated shape. The shape of the first circuit board 131 may match the shape of the opening 112, and the width d1 of the first circuit board 131 may be not greater than the size of the plane of the opening along the width direction of the opening 112, so that the first circuit board 131 (parallel or inclined to the plane where the opening is located) may be accommodated in the cavity 111 near the opening 112. That is, the first circuit board 131 may be also arranged in a strip shape. Correspondingly, the switch 1311, the light emitting element 1313, and the first microphone element 1312 may be arranged on the first circuit board 131 at intervals along the length direction of the first circuit board 131, that is, the length direction of the cover 12.

In some embodiments, the second microphone element 1321 may be a bone conduction microphone, and the bone conduction microphone may extend out of the accommodating body 11 through the second sound guiding hole 114. The bone conduction microphone may be installed on a side wall of the housing body 11. The side wall may be a side wall that fits the user's body when the user wears the loudspeaker device, so that the bone conduction microphone may better receive the vibration signal of the main sound source. When the user wears the loudspeaker device for voice input, the second microphone element 1321 may mainly collect the vibration signal of the main sound source, and compare the vibration signal with the sound signal (including audio signal and noise) collected by the first microphone element 1312 (air conduction). In some embodiments, the sound signal collected by the first microphone element 1312 may be optimized based on the above comparison result to obtain a high-quality audio signal.

In some embodiments, the component body may be provided with a second sound guiding hole 114 passing through the side wall of the cavity 111, and a second sound blocking member 115 may be disposed at a position corresponding to the second sound guiding hole 114. The second sound blocking member 115 may extend toward the interior of the cavity 111 through the second sound guiding hole 114 to limit the transmission of sound to the second microphone element 1321.

Specifically, in this embodiment, the second sound guiding hole 114 corresponding to the second microphone element 1321 may be disposed on the component body, and penetrate the cavity 111 to communicate the second microphone element 1321 with the outside, so that the second microphone element 1321 may receive external sound signals.

The second sound blocking member 115 may be a hard material or a soft material. For example, the second sound blocking member 115 may be formed by the accommodating body 11 extending from the inner side of the cavity 111 along the periphery of the second sound guiding hole 114 toward the cavity 111. In this embodiment, the second sound blocking member 114 may be formed by a soft rubber that is integrally injected with the accommodating body 11 and is formed by extending the inner side of the cavity 111 along the periphery of the second sound guiding hole 114 toward the cavity 111. In an application scenario, the second sound blocking member 115 may extend into the cavity 111 along the periphery of the second sound guiding hole 114 to the second microphone element 1321, and further surround the sound receiving region of the second microphone element 1321 to form a channel connecting the second sound guiding hole 114 and the second microphone element 1321, so that the external sound signal input to the second sound guiding hole 114 directly passes through the channel and is received by the sound receiving region of the second microphone element 1321. In another application scenario, the second sound blocking member 115 may not completely surround the periphery of the second sound guiding hole 114, but only extends along one or both sides of the second sound guiding hole 114 toward the inside of the cavity 111. The second sound blocking member 115 may extend to the second microphone element 1321 to guide the sound input from the second sound guiding hole 114 to propagate to the second microphone element 1321 and be received by its sound receiving region.

Figure 64:
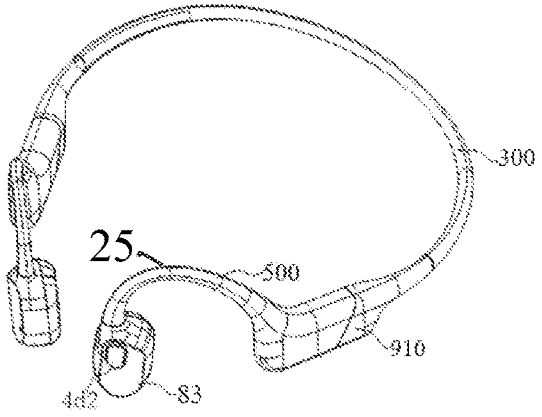
FIG. 64 is a schematic structural diagram illustrating a loudspeaker device according to some embodiments of the present disclosure.
Figure 65:
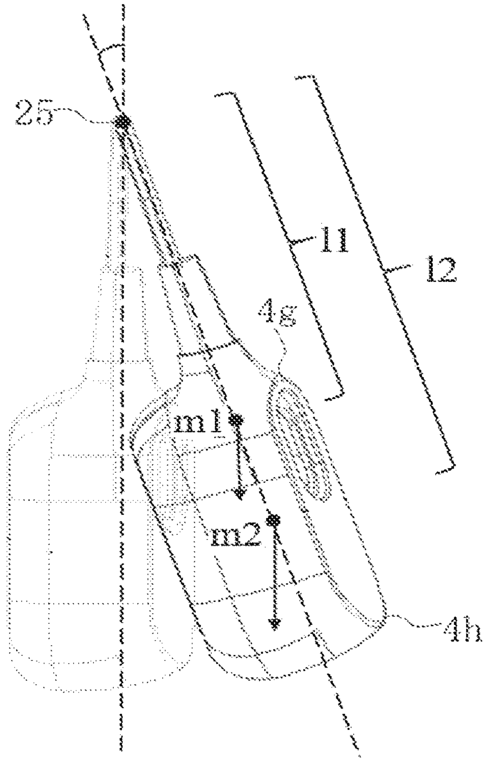
FIG. 65 is a schematic structural diagram illustrating a speaker component according to some embodiments of the present disclosure.

Referring to FIG. 64 and FIG. 65, FIG. 64 is a schematic structural diagram illustrating a loudspeaker device according to some embodiments of the present disclosure. FIG. 65 is a schematic structural diagram illustrating a speaker component according to some embodiments of the present disclosure. The loudspeaker device may transmit a sound to an auditory system of a user of the loudspeaker device via a bone conduction mode and/or an air conduction mode, so that the user can hear the sound. In some embodiments, the loudspeaker device may include a support connector 910 and at least one speaker component 83 disposed on the support connector 910. In some embodiments, the support connector 910 may include an ear hook 500. Specifically, the support connector 910 may include two ear hook s 500 and a rear hook 300, and the rear hook 300 may be connected to the two ear hook s 500 and disposed between the two ear hook s 500. When the loudspeaker device is worn by the user, the two ear hook s 500 may correspond to the left ear and the right ear of the user, respectively, and the rear hook 300 may correspond to the back of the head of the user. The ear hook 500 may be configured to contact with the head of the user, and one or more contact points (i.e., one or more points located near a top end 25) of the ear hook 500 and the head of the user may include a vibration fulcrum of the speaker component 83 when the speaker component 83 vibrates.

It should be noted that the support connector may be equivalent to the circuit housing described above.

In some embodiments, the vibration of the speaker component 83 may be regarded as a reciprocating swing movement. The top end 25 of the ear hook 500 (also referred to as the top end 25 for brevity) may be regarded as a fixed point of the reciprocating swing movement, and a portion of the ear hook 500 between the top end 25 and the speaker component 83 may be regarded as an arm of the reciprocating swing movement. The fixed point of the reciprocating swing movement may be regarded as the vibration fulcrum. A swing amplitude (i.e., vibration acceleration) of the speaker component 83 may be a positive correlation with a volume generated by the speaker component 83. A mass distribution of the speaker component 83 may affect the amplitude of the swing amplitude of the speaker component 83, and further affect the volume generated by the speaker component 83.

In some embodiments, the speaker component 83 may include an earphone core, a core housing 41 configured to accommodate the earphone core, a speaker module (not shown in the figure), and at least one key module **4*d*. Specifically, the speaker module may include a first speaker module and a second speaker module, which may be disposed in the left and right speaker components 83, respectively. In some embodiments, the speaker module may refer to all components of the speaker component 83 other than the key module 4*d*. For example, the speaker module may refer to the earphone core 42 and the core housing 41**.

Further, the support connector 910 may be configured to accommodate a control circuit (not shown in the figure) or a battery (not shown in the figure). The control circuit or the battery may drive the earphone core to vibrate to generate a sound.

In some embodiments, the key module **4*d* may be configured for user operation. For example, a user may operate the key module 4*d*** to perform a function such as a pause/start function, a recording function, an answering a call function, or the like.

Specifically, the key module **4*d* may implement different interactive functions based on a user's operation instruction. For example, the user may click the key module 4*d* once to pause/start e.g., music, recording, etc. As another example, the user may click the key module 4*d* twice to answer a call. As a further example, the user may regularly click the key module 4*d* (e.g., click the key module 4*d* once every second, click the key module 4*d* twice in total) to activate a recording function of the loudspeaker device. In some embodiments, the user's operation instruction may include a click, a slid, a scroll, or the like, or any combination thereof. For example, the user may slide up and down on a surface of the key module 4*d*** to realize a function of switching songs.

In an application scenarios, the speaker component 83 may include at least two key modules **4*d*, and the at least two key modules 4*d* may correspond to a left ear hook and a right ear hook, respectively. The user may use the left and right hands to operate the at least two key modules 4*d***, respectively, thereby improving the user's experience.

In some embodiments, to further improve the user's human-computer interaction experience, the human-computer interaction function may be allocated to the key modules **4*d* corresponding to the left ear hook and the right ear hook, respectively. The user may operate each of the at least two key modules 4*d* to realize corresponding functions. For example, the user may click the key module 4*d* corresponding to the left ear hook once to activate a recording function, and/or click the key module 4*d* corresponding to the left ear hook again to turn off the recording function. As another example, the user may click the key module 4*d* corresponding to the left ear hook twice to realize the pause/play function. As another example, the user may click the key module 4*d*** corresponding to the right ear hook twice to answer a call or realize a next/previous song function when music is playing and there is no call.

In some embodiments, the aforementioned functions corresponding to the at least two key modules **4*d* may be determined by the user. For example, the user may assign the pause/play function executed by the key module 4*d* corresponding to the left ear hook to the key module 4***d* corresponding to the right ear hook by setting an application software. As another example, the user may determine that the function of answering a call function executed by performing an operation on the key module 4*d* corresponding to the left ear hook may be replaced by performing an operation on the key module 4*d* corresponding to the right ear hook. Further, for a specific function, the user may determine the user's operation instruction (e.g., a number of clicking the key module 4*d*, a sliding gesture, etc.) by setting the application software to perform the function. For example, a user's operation instruction corresponding to the answering a call function may be determined as click the key module 4*d* twice instead of once. As another example, a user's operation instruction corresponding to the next/previous song function may be determined as click the key module 4*d* three times instead of twice. The user may determine the user's operation instruction based on a habit of the user, thereby to a certain extent, avoiding operational errors and improving the user experience.

In some embodiments, the above-mentioned interaction function may be not unique, which may be determined according to functions commonly used by the user. For example, the key module 4*d* may be used to perform a call rejection function, a text messages read function, or the like. The user may determine the interaction function and/or the user's operation instruction, thereby meeting different needs.

In some embodiments, a distance between a center of the key module 4*d* and the vibration fulcrum may be not greater than a distance between a center of the speaker module and the vibration fulcrum, thereby improving the vibration acceleration of the speaker component 83 and the volume generated by the vibration of the speaker component 83.

In some embodiments, the center of the key module 4*d* may include a center of mass m1 or a centroid g1. A first distance 11 may be formed between the center of mass m1 or the centroid g1 of the key module 4*d* and the top end 25 (i.e., the vibration fulcrum). A second distance 12 may be formed between a center of mass m2 or a centroid g2 of the speaker module (the portion of the speaker component 83 other than the key module 4*d*) and the top end 25. It should be noted that the center of mass and the centroid of the speaker module may be replaced by a center of mass and a centroid of the core housing 41, respectively.

In some embodiments, a mass distribution of the key module 4*d* and/or the speaker module may be relatively uniform. The center of mass m1 of the key module 4*d* may coincide with the centroid g2 of the key module 4*d*. The center of mass m2 of the speaker module may coincide with the centroid g2 of the speaker module.

In some embodiments, the mass distribution of the key module 4*d* in the speaker component 83 may be indicated by a ratio of the first distance 11 to the second distance 12, and a ratio k of a mass of the key module 4*d* to a mass of the speaker module.

Specifically, according to the dynamic principle, when the key module 4*d* is arranged at a far end 4*h* of the top end 25, a vibration acceleration of the speaker component 83 may be less than a vibration acceleration of the speaker component 83 when the key module 4*d* is arranged at a proximal end 4*g* of the top end 25, thereby reducing the volume generated by the speaker component 83. When the mass of the key module 4*d* is constant, the vibration acceleration of the speaker component 83 may be decreased as the ratio of the first distance 11 to the second distance 12 increases, thereby reducing the volume generated by the speaker component 83. When the ratio of the first distance 11 to the second distance 12 is constant, the vibration acceleration of the speaker component 83 may be decreased as the mass of the key module 4*d* increases, thereby reducing the volume generated by the speaker component 83. The volume generated by the speaker component 83 may be determined and/or adjusted within a range that the ear of the user can recognize by adjusting the ratio of the first distance 11 to the second distance 12 and/or the mass ratio k of the key module 4*d* to the mass of the speaker module.

In some embodiments, the ratio of the first distance 11 to the second distance 12 may not be greater than 1.

Specifically, when the ratio of the first distance 11 to the second distance 12 is equal to 1, the center of mass m1 and centroid g1 of the key module 4*d* may coincide with the center of the mass m2 and the centroid g2 of the speaker module, respectively, and the key module 4*d* may be disposed on a center of the speaker component 83. When the ratio of the first distance 11 to the second distance 12 is less than 1, the center of mass m1 or the centroid g1 of the key module 4*d* may be closer to the top end 25 with respect to the center of mass m2 or the centroid g2 of the speaker module, and the key module 4*d* may be disposed on a proximal end close to the top end 25. The smaller the ratio of the first distance 11 to the second distance 12 is, the closer the center of mass m1 or centroid g1 of the key module 4*d* to the top end 25 relative to the center of mass m2 or centroid g2 of the speaker module is.

In some embodiments, the ratio of the first distance 11 to the second distance 12 may be not greater than 0.95, and the key module 4*d* may be closer to the top end 25. In some embodiments, the ratio of the first distance 11 to the second distance 12 may be 0.9, 0.8, 0.7, 0.6, 0.5, etc., which may be determined according to actual needs and is not limited herein.

Further, when the ratio of the first distance 11 to the second distance 12 satisfies a range aforementioned, the ratio of the mass of the key module 4*d* to the mass of the speaker module may not be greater than 0.3. For example, the ratio of the mass of the key module 4*d* to the mass of the speaker module may not be greater than 0.29, 0.23, 0.17, 0.1, 0.06, 0.04, etc., which are not limited herein.

It should be noted that the center of mass m1 of the key module 4*d* may coincide with the centroid g1 of the key module 4*d* (not shown in the figure), that is, the center of mass m1 of the key module 4*d* and the centroid g1 of the key module 4*d* may locate at a same point. When the mass distribution of the key module 4*d* and the speaker module is relatively uniform, the center of mass m2 of the speaker module may coincide with the centroid g2 (not shown in the figure) of the speaker module.

In some embodiments, the center of mass m1 may not coincide with the centroid g1 of the key module 4*d*. Specifically, since the structure of the key module 4*d* is relatively simple and/or regular, the centroid g1 of the key module 4*d* may be calculated relatively easily, the centroid g1 may be regarded as a reference point. The center of mass m2 of the speaker module may not coincide with the centroid g2 of the speaker module. Since one or more units (e.g., a microphone, a flexible circuit board, a bonding pad, etc.) of the speaker module may be made of different materials, the mass distribution of the speaker module may be not uniform, and the one or more units may have an irregular shape. Thus, the center of mass m2 of the speaker module may be regarded as a reference point.

In an application scenario, the first distance 11 may be formed between the centroid g1 of the key module 4*d* and the top end 25, and the second distance 12 may be formed between the center of mass m2 of the speaker module and the top end 25. The mass distribution of the key module 4*d* in the speaker component 83 may be indicated by the ratio of the first distance 11 to the second distance 12, and the mass ratio k of a mass of the key module 4*d* to the mass of the speaker module. Specifically, when the mass of the key module 4*d* is constant, the vibration acceleration of the speaker component 83 may be decreased as the ratio of the first distance 11 to the second distance 12 increases, thereby reducing the volume generated by the speaker component 83. When the ratio of the first distance 11 to the second distance 12 is constant, the vibration acceleration of the speaker component 83 may be decreased as the mass of the key module 4*d* increases, thereby reducing the volume generated by the speaker component 83. Therefore, the volume generated by the speaker component 83 may be determined and/or adjusted within a range that the ear can recognize by adjusting the ratio of the first distance 11 to the second distance 12 and/or the mass ratio k of the key module 4*d* to the mass of the speaker module.

In an embodiment, the ratio of the first distance 11 to the second distance 12 may not be greater than 1.

Specifically, when the ratio of the first distance 11 to the second distance 12 is equal to 1, the centroid g1 of the key module 4*d* may coincide with the center of mass the m2 of the speaker module. Therefore, the key module 4*d* may be disposed on a center of the speaker component 83. When the ratio of the first distance 11 to the second distance 12 is less than 1, the centroid g1 of the key module 4*d* may be closer to the top end 25 with respect to the center of the mass m2 of the speaker module. Therefore, the key module 4*d* may be disposed on the proximal end close to the top end 25. The smaller the ratio of the first distance 11 to the second distance 12 is, the closer the centroid g1 of the key module 4*d* to the top end 25 relative to the center of mass m2 of the speaker module.

Further, the ratio of the first distance 11 to the second distance 12 may be not greater than 0.95. Therefore, the key module 4*d* may be closer to the top end 25. As used herein, the ratio of the first distance 11 to the second distance 12 may be 0.9, 0.8, 0.7, 0.6, 0.5, etc., which may be determined according to actual needs and is not limited herein.

Further, when the ratio of the first distance 11 to the second distance 12 satisfies a range aforementioned, the ratio of the mass of the key module 4*d* to the mass of the speaker module may not be greater than 0.3. For example, the ratio of the mass of the key module 4*d* to the mass of the speaker module may not be greater than 0.29, 0.23, 0.17, 0.1, 0.06, 0.04, etc., which are not limited herein.

It should be noted that, in some embodiments, the centroid g2 of the speaker module may be regarded as the reference point, which may be similar to the foregoing mentioned embodiments, which is not be repeated herein.

Figure 66:
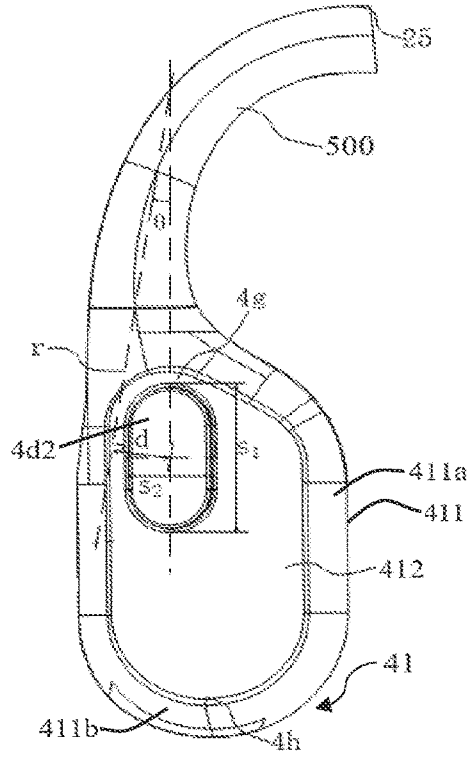
FIG. 66 is a schematic structural diagram illustrating a speaker component of a loudspeaker device according to some embodiments of the present disclosure.

FIG. 66 is a schematic structural diagram illustrating a speaker component of a loudspeaker device according to some embodiments of the present disclosure. In some embodiments, a speaker module may include an earphone core and a core housing 41. The earphone core may be configured to generate a sound and the core housing 41 may be configured to accommodate the earphone core.

In some embodiments, the core housing 41 may include an outer side wall 412 and a peripheral side wall 411. The peripheral side wall 411 may be connected to and surrounding the outer side wall 412. When a user wears the loudspeaker device, one side of the peripheral side wall 411 may be in contact with the human head, and the outer side wall 412 may be located at the side of the peripheral side wall 411 away from the human head. In some embodiments, the core housing 41 may include a cavity configured to accommodate the earphone core.

In some embodiments, the peripheral side wall 411 may include a first peripheral side wall 411*a* arranged along a length direction of the outer side wall 412 and a second peripheral side wall 411*b* arranged along a width direction of the outer side wall 412. The outer side wall 412 and the peripheral side wall 411 may be connected and form the cavity with an open end, and the cavity may be configured to accommodate the earphone core.

In some embodiments, a count (or a number) of the first peripheral side wall 411*a* and/or the second peripheral side wall 411*b* may be two. The first peripheral side wall 411*a* and the second peripheral side wall 411*b* may be enclosed in sequence. When the user wears the loudspeaker device, the two first peripheral side walls 411*a* may face a front side and a back side of the user's head, respectively. The two second peripheral side walls 411*b* may face an upper side and a lower side of the user's head, respectively.

In some embodiments, the outer side wall 412 may cover an end of the first peripheral side wall 411*a* and the second peripheral side wall 411*b* after the first peripheral side wall 411*a* and the second peripheral side wall 411*b* are enclosed. The core housing 41 with an open end and a closed end may be formed and configured to accommodate the earphone core.

In some embodiments, a shape enclosed by the first peripheral side wall 411*a* and the second peripheral side wall 411*b* may be not limited. The shape enclosed by the first peripheral side wall 411*a* and the second peripheral side wall 411*b* may include any shape suitable for wearing on the user's head, such as a rectangle, a square, a circle, an ellipse, etc.

In some embodiments, the shape enclosed by the first peripheral side wall 411*a* and the second peripheral side wall 411*b* may conform to the principle of ergonomics, thereby improving the wearing experience of the user. In some embodiments, a height of the first peripheral side wall 411*a* and a height of the second peripheral side wall 411*b* may be the same or different. When heights of two successively connected peripheral side walls 411 are different, a protruding part of the peripheral side wall 411 may not affect the wearing and/or operation of the user.

Figure 67:
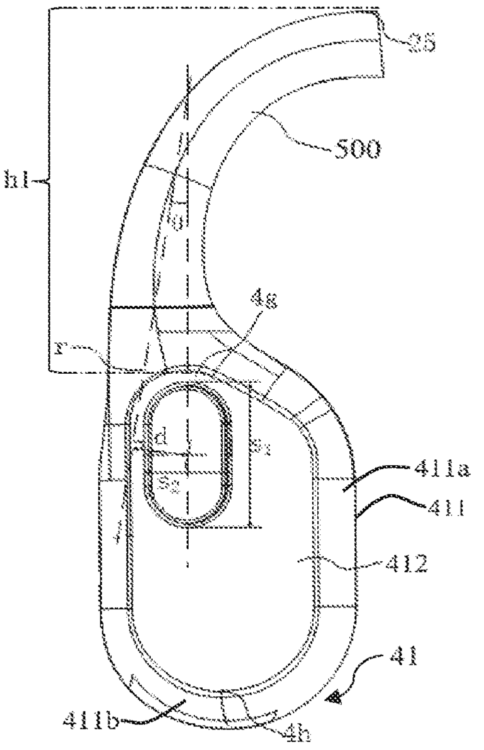
FIG. 67 is a schematic diagram illustrating a distance h1 according to some embodiments of the present disclosure.
Figure 68:
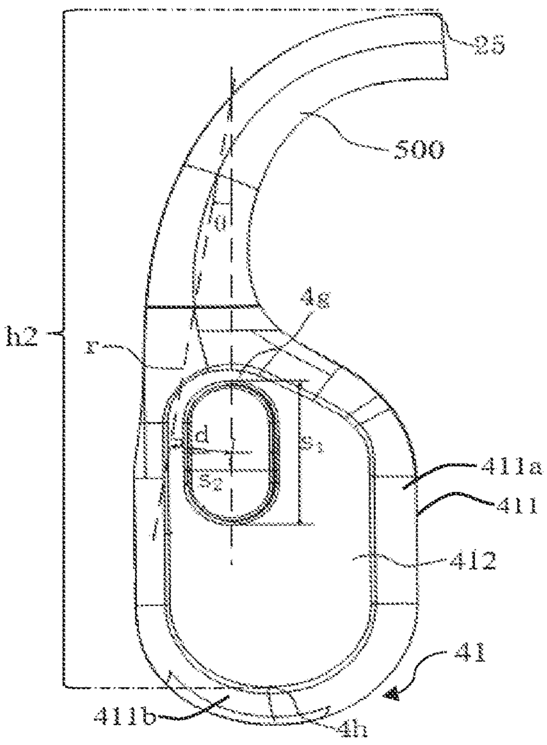
FIG. 68 is a schematic diagram illustrating a distance h2 according to some embodiments of the present disclosure.
Figure 69:
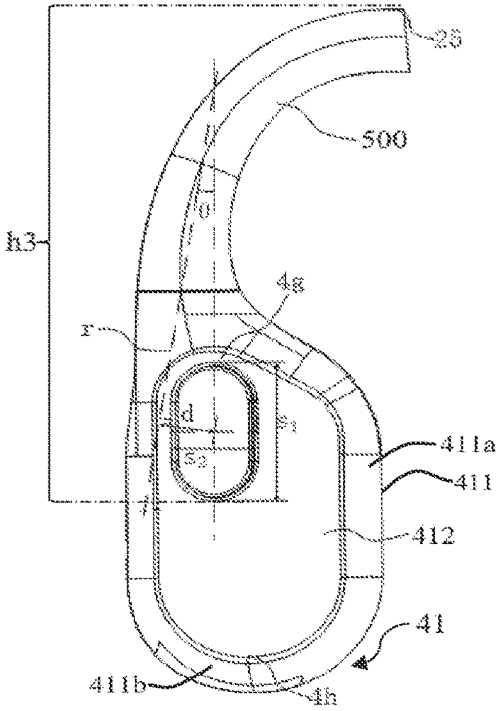
FIG. 69 is a schematic diagram illustrating a distance h3 according to some embodiments of the present disclosure.

FIG. 67 is a schematic diagram illustrating a distance h1 according to some embodiments of the present disclosure. FIG. 68 is a schematic diagram illustrating a distance h2 according to some embodiments of the present disclosure. FIG. 69 is a schematic diagram illustrating a distance h3 according to some embodiments of the present disclosure. In some embodiments, an outer side wall 412 may be disposed on an end enclosed by a first peripheral side wall 411*a* and a second peripheral side wall 411*b*. When a user wears a loudspeaker device, the outer side wall 412 may be located at an end of the first peripheral side wall 411*a* and the second peripheral side wall 411*b* away from the user's head. In some embodiments, the outer side wall 412 may include a proximal end point and a distal end point. The proximal end point and the distal end point may be located on a contour connecting the outer side wall 412 with the first peripheral side wall 411*a* and the second peripheral side wall 411*b*, respectively. The proximal end point may be opposite to the distal end point on the contour. In some embodiments, the distance h1 between the proximal end point and a vibration fulcrum may be relatively short, and the proximal end may be referred to as at a top position. The distance h2 between the distal end point and the vibration fulcrum may be relatively long, and the distal end point may be referred to as at a bottom position. The distance h3 between a midpoint of a line connecting the proximal end point and the distal end point and the vibration fulcrum may be between h1 and h2, and the midpoint may be referred to as at a middle position.

In some embodiments, the key module **4*d* may be located in the middle position of the outer side wall 412. In some embodiments, the key module 4*d* may be located between the middle position and the top position of the outer side wall 412**.

Figure 70:
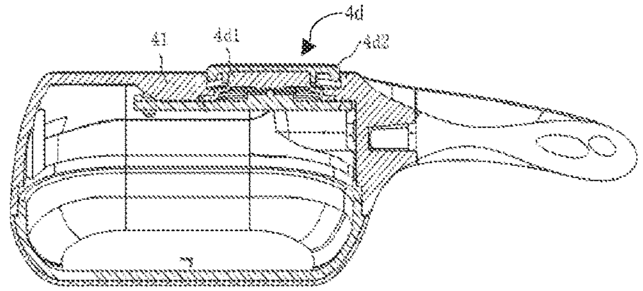
FIG. 70 is a schematic diagram illustrating a cross-sectional view of a partial structure of a speaker component according to some embodiments of the present disclosure.

FIG. 70 is a schematic diagram illustrating a cross-sectional view of a partial structure of a speaker component according to some embodiments of the present disclosure. As shown in FIG. 70, a key module **4*d* may further include an elastic bearing 4*d*1 and a button block 4*d*2**.

In some embodiments, a shape of the button block **4*d*2 may be a rectangle with rounded corners, and the button block 4*d*2 may extend along a length direction of the outer side wall 412. The button block 4*d*2 may include two symmetry axes (e.g., a long axis and a short axis), and the button block 4*d*2** may be arranged symmetrically in two symmetry directions, and the symmetry directions are perpendicular to each other.

Figure 71:
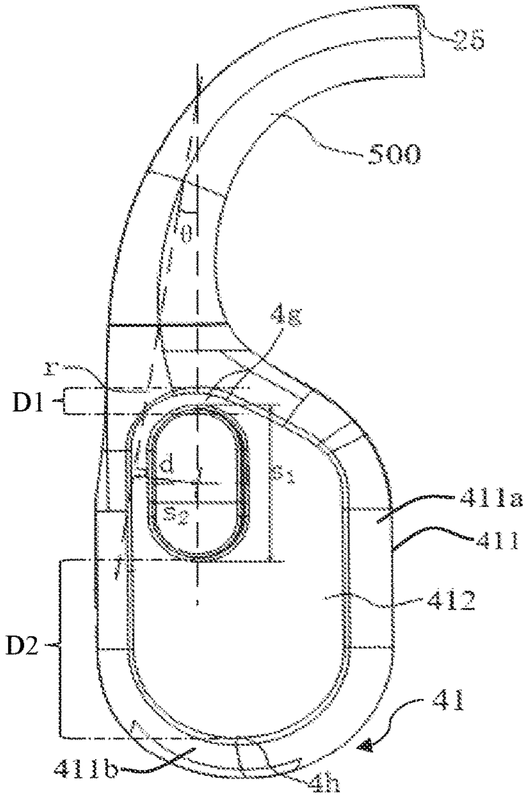
FIG. 71 is a schematic diagram illustrating a distance D1 and a distance D2 according to some embodiments the present disclosure.

FIG. 71 is a schematic diagram illustrating a distance D1 and a distance D2 according to some embodiments the present disclosure. As shown in FIG. 71, a distance between the top of the button **4*g* and a top end position of an outer side wall 412 is the first distance D1. A distance between the bottom of the button 4*g* and a bottom end position of the outer side wall 412 is the second distance D2. A ratio of the first distance D1 to the second distance D2** may not be greater than 1.

Specifically, when the ratio of the distance D1 to the distance D2 is equal to 1, the button **4*g* may be located in a middle position of the outer side wall 412. When the ratio of the first distance D1 and the second distance D2 is less than 1, the button 4*g* may be located between the middle position and the top end position of the outer side wall 412**.

Further, the ratio of the first distance D1 to the second distance D2 may be not greater than 0.95. Therefore, the button block **4*d*2 may be close to the top end position of the outer wall 412, that is, the button block 4*d*2 may be close to the vibration fulcrum, thereby improving a volume of a speaker component 83. In some embodiments, the ratio of the first distance D1 to the second distance D2** may be 0.9, 0.8, 0.7, 0.6, 0.5, etc., which may be determined according to different needs and is not limited herein.

In some embodiments, a connection portion connecting the ear hook 500 and the speaker module may have a central axis. In some embodiments, the connection portion connecting the ear hook 500 and the speaker module may include an outer surface. In some embodiments, the outer surface of the button block **4*d*2 may be a side surface of the button block 4*d*2 away from the user's head when the user wears the loudspeaker device. In some embodiments, an extension line r of the central axis may have a projection on a plane where the outer surface of the button block locates. An angle θ formed between the projection and the long axis direction of the button block 4*d*2** may be less than 10°, for example, 90°, 70°, 50°, 30°, 1°, etc., which is not limited herein.

When the angle θ formed between the projection of the extension line r on the plane where the outer surface of the button block **4*d*2 locates and the long axis direction is less than 10°, a deviation of the long axis direction of the button block 4*d*2 from the extension line r may be relatively small. Therefore, the long axis direction of the button block 4*d*2** may be regarded as consistent or substantially consistent with the direction of the extension line r of the central axis.

In some embodiments, an extension line r of the central axis may have a projection on a plane where the outer surface of the button block **4*d*2 locates. In some embodiments, the long axis direction of the outer surface of the button block 4*d*2 and the short axis direction of the outer surface of the button block 4*d*2 may have an intersection. A distance d between the projection and the intersection may be relatively small. The distance d may be less than a width $S_2$ of the outer surface along the short axis direction of the button block 4*d*2, thereby making the button block 4*d*2 close to the extension line r of the central axis of the ear hook 500. In some embodiments, the projection of the extension line r of the central axis of the ear hook 500 on the plane where the outer surface of the button block 4*d*2 locates may coincide with the long axis direction of the button block 4*d*2, thereby further improving the sound quality of the speaker component 83**.

In some embodiments, a long axis of the button block **4*d*2 may be in a direction from the top of the button block 4*d*2 to the bottom of the button block 4*d*2, or a direction in which the ear hook 500 may be connected to the core housing 41. The short axis of the button block 4*d*2 may be perpendicular to the long axis of the button block 4*d*2 and pass through a midpoint of a line connecting the top of the button block 4*d*2 and the bottom of the button block 4*d*2. A size of the button block 4*d*2 along the long axis direction may be $s_1$, and a size of the button block 4*d*2** along a circumferential direction may be $s_2$.

In some embodiments, the first peripheral side wall **411*a*** may have a bottom end position, a middle position, and a top end position along the direction close to the vibration fulcrum.

The bottom end position of the first peripheral side wall **411*a* may include a connection point connecting the first peripheral side wall 411*a* and the second peripheral side wall 411*b* which is away from the ear hook 500. The top end position may include a connection point connecting the first peripheral side wall 411*a* and the second peripheral side wall 411*b* which is close to the ear hook 500. The middle position may include a midpoint of a line connecting the bottom end position and the top end position of the first peripheral side wall 411*a***.

In some embodiments, the key module **4*d* may be disposed on the middle position of the first peripheral side wall 411*a* (not shown in the figure), or between the middle position and the top end position of the first peripheral side wall 411*b* (not shown in the figure). The key module 4*d* may be centrally disposed on the first peripheral side wall 411*a* along a width direction of the first peripheral side wall 411*a***.

Figure 72:
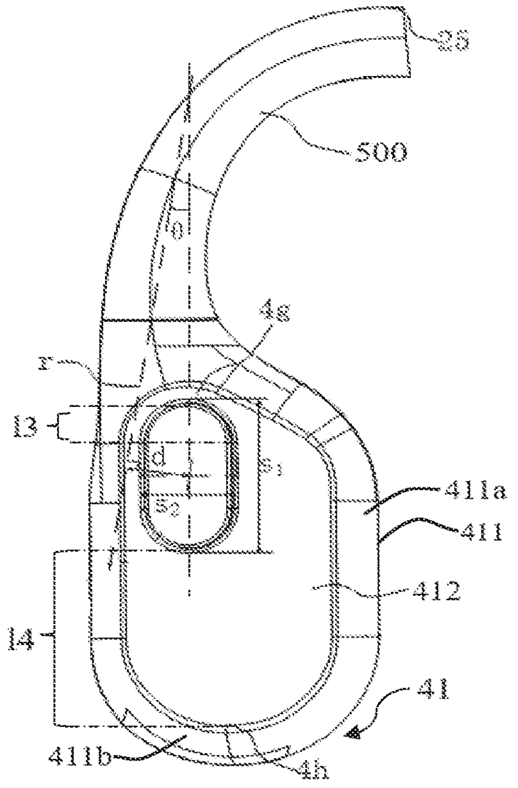
FIG. 72 is a schematic diagram illustrating a distances l3 and a distance l4 according to some embodiments of the present disclosure.

FIG. 72 is a schematic diagram illustrating a distance l3 and a distance l4 according to some embodiments of the present disclosure. In some embodiments, the third distance l3 refers to a distance between a top of a key module **4*d* and a top end position of a first peripheral side wall 411*a*. The fourth distance l4 refers to a distance between a bottom of the key module 4*d* and a bottom end position of the first peripheral side wall 411. A ratio of the third distance l3 to the fourth distance l4** may be not greater than one.

Further, the ratio of the third distance l3 to the fourth distance l4 may be not greater than 0.95, so that the key module **4*d* may be relatively close to the top end position of the first peripheral side wall 411*a*, that is, the key module 4*d* may be relatively close to the vibration fulcrum, thereby improving the volume generated by a speaker component 83. The ratio of the third distance l3 to the fourth distance l4** may also be 0.9, 0.8, 0.7, 0.6, 0.5, etc., which may be determined according to the actual need and not limited herein.

In some embodiments, as mentioned above, the third distance D3 may be formed between a top of a button block 4*d*2 and a top end position of a first peripheral side wall 411*a*. The fourth distance D4 may be formed between a bottom of the button block 4*d*2 and a bottom end position of the first peripheral side wall 411. A ratio of the third distance D3 to the fourth distance D4 may be not greater than one.

Further, the ratio of the third distance D3 to the fourth distance D4 may be not greater than 0.95. Therefore, the button block 4*d*2 may be close to the top end position of the first peripheral side wall 411*a*, that is, the button block 4*d*2 may be close to the vibration fulcrum, thereby improving a volume of a speaker component 83. In some embodiments, the ratio of the third distance D3 to the fourth distance D4 may be 0.9, 0.8, 0.7, 0.6, 0.5, etc., which may be determined according to different needs and is not limited herein.

Figure 73:
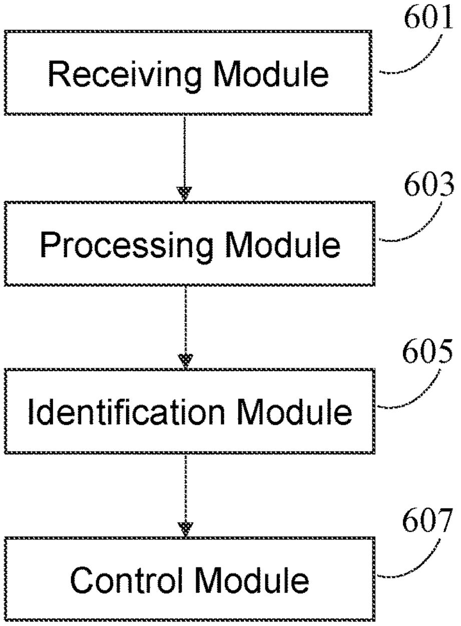
FIG. 73 is a block diagram illustrating a voice control system according to some embodiments of the present disclosure.

FIG. 73 is a block diagram illustrating a voice control system according to some embodiments of the present disclosure. The voice control system may be part of the auxiliary key module, and may also be integrated in the loudspeaker device as a separate module. In some embodiments, the voice control system may include a receiving module 601, a processing module 603, an identification module 605, and a control module 607.

In some embodiments, the receiving module 601 may be configured to receive voice control instruction and send the voice control instruction to the processing module 603. In some embodiments, the receiving module 601 may be one or more microphones. In some embodiments, when the receiving module 601 receives a voice control instruction issued by a user, for example, when the receiving module 601 receives a voice control instruction of "start playing", the voice control instruction may be sent to the processing module 603.

In some embodiments, the processing module 603 may be communicatively connected with the receiving module 601, generate instruction signal according to the voice control instruction, and send the instruction signal to the identification module 605.

In some embodiments, when receiving a voice control instruction issued by the current user from the receiving module 601 through a communication connection, the processing module 603 may generate an instruction signal according to the voice control instruction.

In some embodiments, the identification module 605 may be communicatively connected with the processing module 603 and the control module 607 to identify whether the instruction signal matches a preset signal and send a matching result to the control module 607.

In some embodiments, when the identification module 605 determines that the instruction signal matches the preset signal, the identification module 605 may send the matching result to the control module 607. The control module 607 may control the operation of the loudspeaker device according to the instruction signal. For example, when the receiving module 601 receives a voice control instruction of "start playing", and when the identification module 605 determines that the instruction signal corresponding to the voice control instruction match a preset signal, the control module 607 may automatically execute the voice control instruction, that is, immediately start playing sound data. When the instruction signal does not match the preset signal, the control module 607 may not execute the control instruction.

In some embodiments, the voice control system may further include a storage module, which is communicatively connected with the receiving module 601, the processing module 603, and the identification module 605. The receiving module 601 may receive a preset voice control instruction and send it to the processing module 603. The processing module 603 may generate a preset signal according to the preset voice control instruction, and send the preset signal to the storage module. When the identification module 605 needs to match the instruction signal received by the receiving module 601 with the preset signal, the storage module may send the preset signal to the identification module 605 through a communication connection.

In some embodiments, the processing module 603 may further include removing ambient sounds included in the voice control instructions.

In some embodiments, the processing module 603 in the voice control system in this embodiment may further include a process of denoising the voice control instructions. The denoising process may refer to removing the ambient sound included in the voice control instruction. In some embodiments, for example, when in a complex environment, the receiving module 601 may receive the voice control instruction and send it to the processing module 603. Before generating a corresponding instruction signal according to the voice control instruction, in order to avoid ambient sounds from disturbing the recognition process of the subsequent identification module 605, the processing module 603 may perform denoising process on the voice control instruction. For example, when the receiving module 601 receives a voice control instruction issued by a user when the user is on an outdoor road, the voice control instruction may include noisy environmental sounds such as vehicle driving, whistle on the road, and the processing module 602 may reduce the influence of the environmental sound on the voice control instruction through denoising processing.

In some embodiments, the loudspeaker device may further include an indicator light module (not shown in the figure) to display the current working state of the loudspeaker device. Specifically, the indicator light module can emit a light signal, and the current working state of the loudspeaker device may be learned by observing the light signal.

In some embodiments, the indicator light module may display the power of the loudspeaker device. For example, when the indicator light is red, it indicates that the power of the loudspeaker device is insufficient (for example, the power is less than 5%, 10%, etc.). As another example, when the loudspeaker device is being charged, the indicator light may be in a flashing state. As still an example, when the indicator light is green, it indicates that the loudspeaker device has sufficient power (for example, the power is above 50%, above 80%, etc.). In some embodiments, the color displayed by the indicator light may be adjusted as required, which is not limited here.

Of course, it is easy to understand that the indicator light may indicate the power of the loudspeaker device in other ways. In some embodiments, the indicator light may include multiple indicator lights, and the current power level of the loudspeaker device may be indicated by the number of lighted indicator lights. Specifically, in an application scenario, the indicator light may be set to three. When only one indicator light is on, it indicates that the power of the loudspeaker device is insufficient and may be shut down at any time (for example, the power is at 1%-20%, etc.). When only two indicator lights are on, it means that the power of the loudspeaker device is in normal use and can be charged (for example, the power is 21%-70%, etc.). When all the indicator lights are on, it means that the power of the loudspeaker device is fully charged, it does not need to be charged, and the standby time is long (for example, the power is 71%-100%, etc.).

In some alternative embodiments, the indicator light may indicate the current communication status of the loudspeaker device. For example, when the loudspeaker device is in a communication connection (such as Wireless Fidelity (WIFI), Bluetooth connection, etc.) with other devices, the indicator light may keep flashing, or be displayed in other colors (such as blue).

Figure 74:
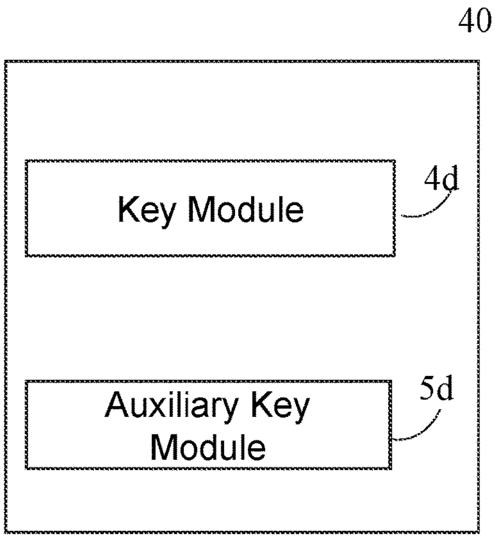
FIG. 74 is a block diagram illustrating a loudspeaker device according to some embodiments of the present disclosure.

FIG. 74 is a block diagram illustrating a loudspeaker device according to some embodiments of the present disclosure.

In some embodiments, the loudspeaker device may further include an auxiliary key module 5*d*. The auxiliary key module 5*d* may be used to provide more human-computer interaction functions.

Specifically, in some embodiments, the auxiliary key module 5*d* may include a power switch key, a function shortcut key, and a menu shortcut key. In some embodiments, the function shortcut key may include a volume up key and a volume down key for adjusting the volume of sound, and a fast forward key and a fast backward key for adjusting the progress of the sound file. In some embodiments, the auxiliary key module 5*d* may include two forms of physical keys and virtual keys. In some embodiments, the end surface of each key in the auxiliary key module 5*d* may be provided with an identification corresponding to its function. In some embodiments, the identification may include text (for example, Chinese and English), symbols (for example, the volume up key is marked with "+", and the volume down key is marked with "–"). In some embodiments, the identifications may be set at the keys by means of laser printing, screen printing, pad printing, laser filling, thermal sublimation, and hollow text. In some embodiments, the identification on the button may also be disposed on the surface of the core housing 41 located on the periphery of the button, which can also serve as a label. In some embodiments, the loudspeaker device may use a touch screen, and the control program installed in the loudspeaker device may generate virtual keys on the touch screen with interactive functions, and the virtual keys can select the function, volume, and files of the player. In addition, the loudspeaker device may also be a combination of a physical display and physical keys.

Under normal circumstances, the sound quality of the loudspeaker device may be affected by many factors such as the physical properties of the components of the loudspeaker device itself, the vibration transmission relationship between the components, the vibration transmission relationship between the loudspeaker device and the outside world, and the efficiency of the vibration transmission system when transmitting vibrations. The components of the loudspeaker device itself may include components generating vibration (such as but not limited to earphone core), components fixing the loudspeaker device (such as, but not limited to ear hook 500), and components transmitting vibration (such as but not limited to panels, vibration transmission layers on the core housing 41, etc.). The vibration transmission relationship between the various components and the vibration transmission relationship between the loudspeaker device and the outside world may be determined by the contact method (such as but not limited to clamping force, a contact area, a contact shape, etc.) between the loudspeaker device and the user.

Figure 75:
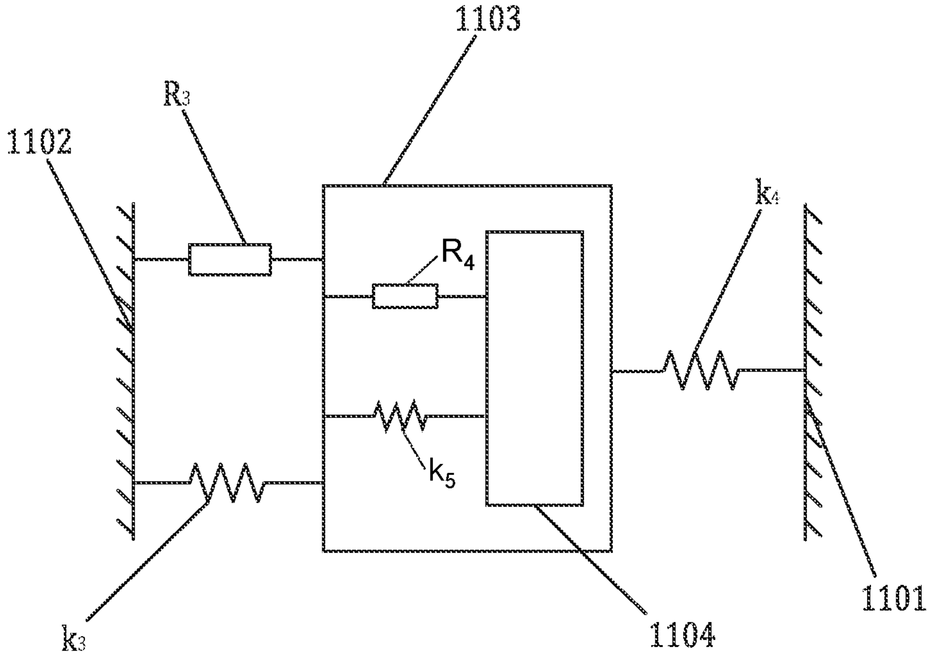
FIG. 75 is an equivalent model illustrating a vibration generation and transmission system of a loudspeaker device according to some embodiments of the present disclosure.

For the purpose of illustration only, relationship(s) between the sound quality and the components of the loudspeaker device may be further described below based on the loudspeaker device. It may need to be known that the contents described below may also be applied to a bone conduction speaker device and an air conduction speaker device without violating the principle. FIG. 75 is an equivalent model illustrating a vibration generation and transmission system of a loudspeaker device according to some embodiments of the present disclosure. As shown in FIG. 75, it may include a fixed end 1101, a sensing terminal 1102, a vibration unit 1103, and an earphone core 1104. In some embodiments, the fixed end 1101 may be connected to the vibration unit 1103 based on a transmission relationship K1 ($k_4$ in FIG. 75). The sensing terminal 1102 may be connected to the vibration unit 1103 based on a transmission relationship K2 ($R_3$, $k_3$ in FIG. 75). The vibration unit 1103 may be connected to the earphone core 1104 based on a transmission relationship K3 ($R_4$, $k_5$ in FIG. 75). It should be noted that the earphone core 1104 may be equivalent to the earphone core 42 in the foregoing embodiments.

The vibration unit mentioned herein may be the core housing 41. The transmission relationships K1, K2, and K3 may be descriptions of functional relationships between corresponding portions of an equivalent system of the loudspeaker device (described in detail below). The vibration equation of the equivalent system may be expressed as:

$$m_3x''_3+R_3x'_3-R_4x'_4+(k_3+k_4)x_3+k_5(x_3-x_4)=f_3, \quad (4)$$

$$m_4x''_4+R_4x'_4-k_5(x_3-x_4)=f_4, \quad (5)$$

As used herein, $m_3$ may be an equivalent mass of the vibration unit 1103; $m_4$ may be an equivalent mass of the earphone core 1104; $x_3$ may be an equivalent displacement of the vibration unit 1103; $x_4$ may be an equivalent displacement of the earphone core 1104; $k_3$ may be an equivalent elastic coefficient between the sensing terminal 1102 and the vibration unit 1103; $k_4$ may be an equivalent elastic coefficient between the fixed end 1101 and the vibration unit 1103; $k_5$ may be an equivalent elastic coefficient between the earphone core 1104 and the vibration unit 1103; $R_3$ may be an equivalent damping between sensing terminal 1102 and vibration unit 1103; $R_4$ may be an equivalent damping between the earphone core 1104 and the vibration unit 1103; and $f_3$ and $f_4$ may be interaction forces between the vibration unit 1103 and the earphone core 1104, respectively. An equivalent amplitude $A_3$ of the vibration unit in the system may be:

$$A_3 = -\frac{m_4\omega^2}{(m_3\omega^2 + j\omega R_3 - (k_3 + k_4 + k_5))(m_4\omega^2 + j\omega R_4 - k_5) - k_5(k_5 - j\omega R_4)} \cdot f_0, \quad (6)$$

As used herein, $f_0$ may mean a driving force unit; and co may mean a vibration frequency. It may be seen that factors affecting a frequency response of a loudspeaker device may include a vibration generation portion (e.g., but is not limited to the vibration unit 1103, the earphone core 1104, a housing, and interconnection manners, such as $m_3$, $m_4$, $k_5$, $R_4$, etc., in equation (6)), a vibration transmission portion (e.g., but is not limited to, a contact manner with the skin, and properties of the ear hook, such as $k_3$, $k_4$, $R_3$, etc., in the equation (6)). The change of structures of the components of the loudspeaker device and parameters of connections between the components may change the frequency response and sound quality of the loudspeaker device. For example, the change of a clamping force may be equivalent to changing the size of $k_4$. The change of a bonding manner of glue may be equivalent to changing the size of $R_4$ and $k_5$. The change of the hardness, elasticity, damping, etc., of a relevant material may be equivalent to changing the size of $k_3$ and $R_3$.

In a specific embodiment, the fixed end 1101 may be points or regions relatively fixed (e.g., the top end 25) in the loudspeaker device during the vibration. These points or regions may be regarded as the fixed end of the loudspeaker device during the vibration. The fixed end may constitute a specific component, or a position determined according to the overall structure of the loudspeaker device. For example, the loudspeaker device may be hung, bonded, or adsorbed near human ears by a specific device. The structure and shape of the loudspeaker device may be designed so that a bone conduction part may be attached to the human skin.

The sensing terminal 1102 may be a hearing system for the human body to receive sound signal(s). The vibration unit 1103 may be portions of the loudspeaker device for protecting, supporting, and connecting the earphone core 1104, including portions that directly or indirectly contact the user, such as a vibration transmission layer or panel (a side close to human body on the core housing) that transmits the vibration to the user, a housing that protects and supports other vibration-generating units, etc.

The transmission relationship K1 may connect the fixed end 1101 and the vibration unit 1103, and represent a vibration transmission relationship between a vibration generating portion and the fixed end during the work of the loudspeaker device. K1 may be determined according to the shape and structure of the loudspeaker device. For example, the loudspeaker device may be fixed to the human head in the form of a U-shaped earphone holder/earphone strap, or installed on a helmet, fire mask or other special-purpose masks, eyeglasses, etc. The shapes and structures of different loudspeaker device may affect the vibration transmission relationship K1. Further, the structure of the loudspeaker device may also include physical properties such as composition materials, qualities, etc., of different portions of the loudspeaker device. The transmission relationship K2 may connect the sensing terminal 1102 and the vibration unit 1103.

K2 may be determined according to the composition of the transmission system. The transmission system may include but be not limited to transmitting sound vibration to the hearing system through tissues of the user. For example, when the sound is transmitted to the hearing system through the skin, subcutaneous tissues, bones, etc., the physical properties of different human tissues and their interconnections may affect K2. Further, the vibration unit 1103 may be in contact with the human tissue. In different embodiments, a contact surface on the vibration unit may be a side of a vibration transmission layer or panel. A surface shape, size of the contact surface, and an interaction force with the human tissue may affect the transmission relationship K2.

The transmission relationship K3 between the vibration unit 1103 and the earphone core 1104 may be determined by connection properties inside the vibration generating device of the loudspeaker device. The earphone core 1104 and the vibration unit 1103 may be connected in a rigid or elastic manner. Alternatively, the change of a relative position of a connecting piece between the earphone core 1104 and the vibration unit 1103 may change the earphone core 1104 to transmit the vibration to the vibrating unit 1103 (in particular, the transmission efficiency of the panel), thereby affecting the transmission relationship K3.

During the use of the loudspeaker device, the sound generation and transmission process may affect the final sound quality felt by the human body. For example, the above-mentioned fixed end 1101, the human sensing terminal 1102, the vibration unit 1103, the earphone core 1104, and the transmission relationships K1, K2, and K3, etc., may all affect the sound quality of the loudspeaker device. It should be noted that K1, K2, and K3 are only a representation of the connection modes of different device portions or systems involved in the vibration transmission process, and may include, but be not limited to, a physical connection manner, a force transmission manner, the sound transmission efficiency, or the like.

The above description of the equivalent system of the loudspeaker device is merely for illustration and should not be regarded as the only feasible implementation scheme. Obviously, for professionals in the art, after understanding the basic principle of the loudspeaker device, various modifications and changes may be made in form and details to the specific methods and steps affecting the vibration transmission of the loudspeaker device without departing from this principle, but these modifications and changes are still within the scope of the above description. For example, K1, K2, and K3 described above may be simple vibration or mechanical transmission mode, or may include complex nonlinear transmission system. The transmission relationship may be formed by direct connection of various parts, or it can be transmitted by non-contact mode.

Figure 76:
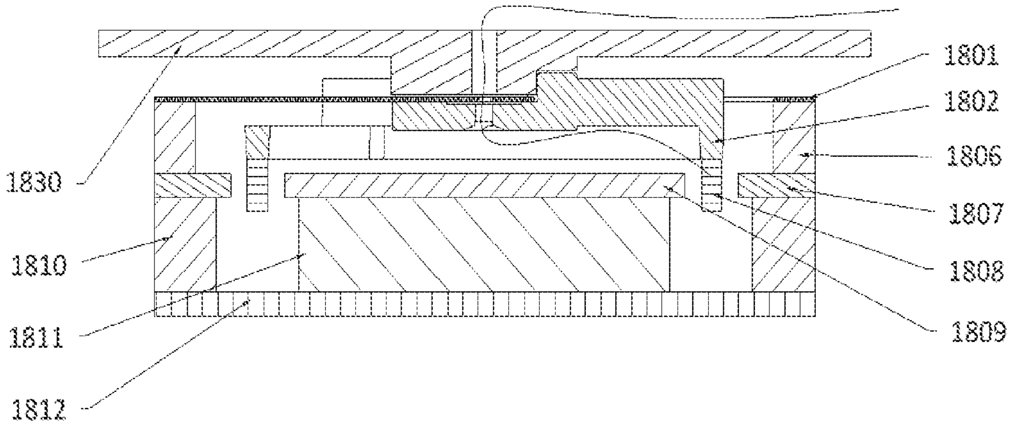
FIG. 76 is a longitudinal sectional view illustrating a composite vibration device of a loudspeaker device according to some embodiments of the present disclosure.
Figure 77:
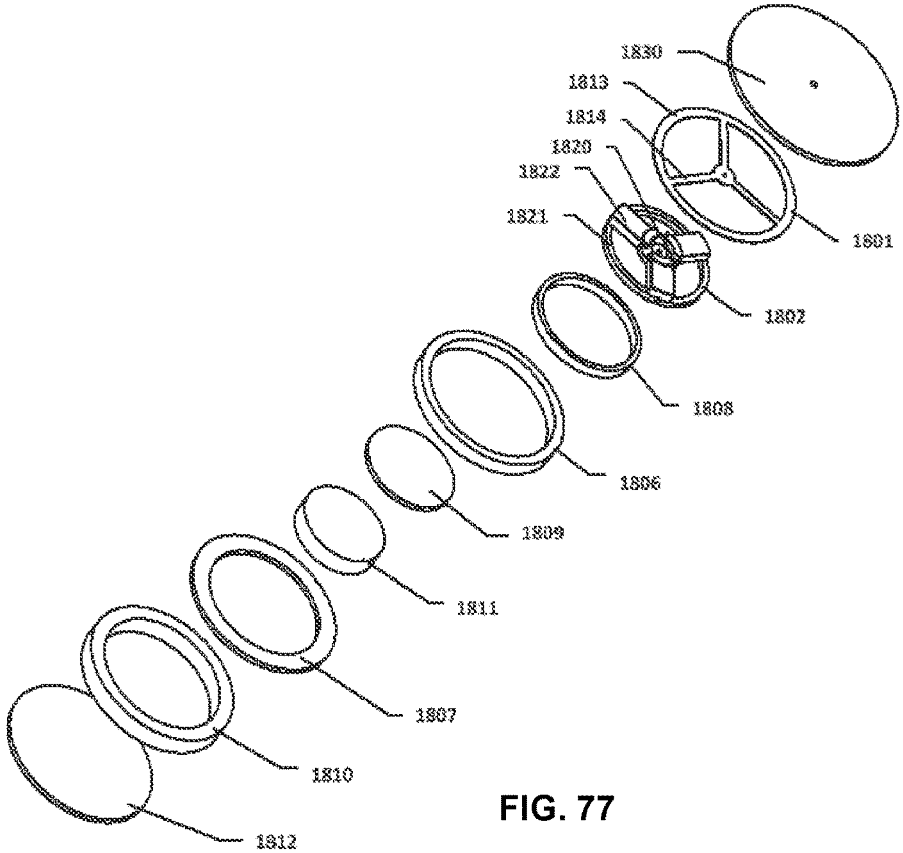
FIG. 77 is an exploded diagram illustrating a composite vibration device of a loudspeaker device according to an embodiment of the present disclosure.

FIG. 76 is a longitudinal sectional view illustrating a composite vibration device of a loudspeaker device according to some embodiments of the present disclosure. FIG. 77 is an exploded diagram illustrating a composite vibration device of a loudspeaker device according to an embodiment of the present disclosure.

In some embodiments, the loudspeaker device may be provided with a composite vibration device. In some embodiments, the composite vibration device may be a portion of an earphone core. Embodiments of the composite vibration device of the loudspeaker device may be shown in FIG. 76 and FIG. 77. A vibration transmission plate 1801 and a vibration plate 1802 may form the composite vibration device. The vibration transmission plate 1801 may be disposed as a first annular body 1813. The first annular body may be disposed with three first supporting rods 1814 converged towards a center. A center position of the converged center may be fixed at the center of the vibration plate 1802. The center of the vibration plate 1802 may be a groove 1820 matching the converged center and the first support rods. The vibration plate 1802 may be disposed with a second annular body 1821 having a radius different from that of the vibration transmission plate 1801, and three second supporting rods 1822 having different thicknesses from that of the first supporting rod 1814. During assembly, the first supporting rods 1814 and the second supporting rods 1822 may be staggered and shown an angle being but be not limited to 60 degrees.

Figure 78:
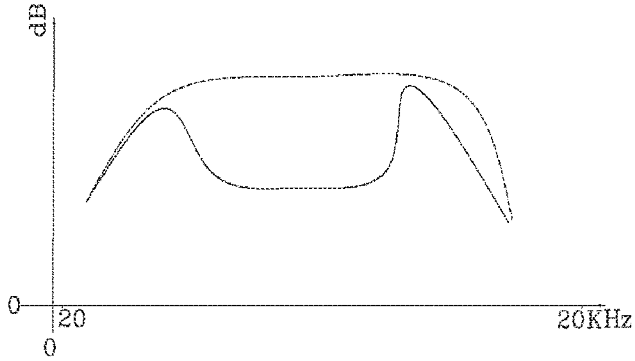
FIG. 78 is a frequency response curve illustrating a loudspeaker device according to an embodiment of the present disclosure.

The first and second supporting rods may both be straight rods or other shapes that meet specific requirements. The count of supporting rods may be more than two, and symmetrical or asymmetrical arrangement may be adapted to meet requirements of economy and practical effects. The vibration transmission plate 1801 may have a thin thickness and be able to increase an elastic force. The vibration transmission plate 1801 may be clamped in the center of the groove 1820 of the vibration plate 1802. A voice coil 1808 may be attached to a lower side of the second annular body 1821 of the vibration plate 1802. The composite vibration device may further include a bottom plate 1812. The bottom plate 1812 may be disposed with an annular magnet 1810. An inner magnet 1811 may be concentrically disposed in the annular magnet 1810. An inner magnetic conduction plate 1809 may be disposed on the top surface of the inner magnet 1811. An annular magnetic conduction plate 1807 may be disposed on the annular magnet 1810. A washer 1806 may be fixedly disposed above the annular magnetic conduction plate 1807. The first annular body 1813 of the vibration transmission plate 1801 may be fixedly connected to the washer 1806. The entire composite vibration device may be connected to the outside through a panel 1830. The panel 1830 may be fixedly connected to the converged center of the vibration transmission plate 1801, and fixed to the center of the vibration transmission plate 1801 and the vibration plate 1802. FIG. 78 is a frequency response curve illustrating a loudspeaker device according to an embodiment of the present disclosure. Using the composite vibration device constituting the vibrating plate and the vibration transmission plate, a frequency response shown in FIG. 78 may be obtained and two formants may be generated. By adjusting parameters such as sizes and materials of the two components, the formants may appear at different positions. For example, a low-frequency formant may appear at a position shifted at a lower frequency, and/or a high-frequency formant may appear at a position at a higher frequency. Preferably, a stiffness coefficient of the vibration plate may be greater than a stiffness coefficient of the vibration transmission plate. The vibration plate may generate the high-frequency formant in the two formants, and the vibration transmission plate may generate the low-frequency formant in the two formants. The range of the formants may be set within a frequency range of sounds audible to the human ear, and may also be not in the range. Preferably, neither of the formants may be within the frequency range of the sounds audible to the human ear. More preferably, one formant may be within the frequency range of the sounds audible to the human ear, and another formant may be out of the frequency range of the sounds audible to the human ear. More preferably, both formants may be within the frequency range of the sounds audible to the human ear. Further preferably, both of the two formants may be within the frequency range of the sounds audible to the human ear, and the peak frequency may be between 80 Hz-18000 Hz. Even further preferably, both of the two formants may be within the frequency range of the sounds audible to the human ear, and the peak frequency is between 200 Hz-15000 Hz. More preferably, both of the two formants may be within the frequency range of the sounds audible to the human ear, and the peak frequency is between 500 Hz-12000 Hz. More preferably, both of the two formants may be within the frequency range of the sounds audible to the human ear, and the peak frequency may be between 800 Hz and 11000 Hz. The frequencies of the peaks of the formants should preferably have a certain difference, for example, the difference between the peaks of the two formants may be at least 500 Hz. Preferably, the difference between the peaks of the two formants may be at least 1000 Hz. Preferably, the difference between the peaks of the two formants may be at least 2000 Hz. More preferably, the difference between the peaks of the two formants may be at least 5000 Hz. To obtain better results, both of the two formants may be within the frequency range of the sounds audible to the human ear, and the difference between the peaks of the two formants may be at least 500 Hz. Preferably, both of the two formants may be within the frequency range of the sounds audible to the human ear, and the difference between the peaks of the two formants may be at least 1000 Hz. More preferably, both of the two formants may be within the frequency range of the sounds audible to the human ear, and the difference between the peaks of the two formants may be at least 2000 Hz. More preferably, both of the two formants may be within the frequency range of the sounds audible to the human ear, and the difference between the peaks of the two formants may be at least 3000 Hz. More preferably, both of the two formants may be within the frequency range of the sounds audible to the human ear, and the difference between the peaks of the two formants may be at least 4000 Hz. One formant may be within the frequency range of the sounds audible to the human ear, another formant may be out of the frequency range of the sounds audible to the human ear, and the difference between the peaks of the two formants may be at least 500 Hz. Preferably, one formant may be within the frequency range of the sounds audible to the human ear, another formant may be out of the frequency range of the sounds audible to the human ear, and the difference between the peaks of the two formants may be at least 1000 Hz. More preferably, one formant may be within the frequency range of the sounds audible to the human ear, another formant may be out of the frequency range of the sounds audible to the human ear, and the difference between the peaks of the two formants may be at least 2000 Hz. More preferably, one formant may be within the frequency range of the sounds audible to the human ear, another formant may be out of the frequency range of the sounds audible to the human ear, and the difference between the peaks of the two formants may be at least 3000 Hz. More preferably, one formant may be within the frequency range of the sounds audible to the human ear, another formant may be out of the frequency range of the sounds audible to the human ear, and the difference between the peaks of the two formants may be at least 4000 Hz. Both of the two formants may be within the frequency range of 5 Hz-30000 Hz, and the difference between the peaks of the two formants may be at least 400 Hz. Preferably, both of the two formants may be within the frequency range of 5 Hz-30000 Hz, and the difference between the peaks of the two formants may be at least 1000 Hz. More preferably, both of the two formants may be within the frequency range of 5 Hz-30000 Hz, and the difference between the peaks of the two formants may be at least 2000 Hz. More preferably, both of the two formants may be within the frequency range of 5 Hz-30000 Hz, and the difference between the peaks of the two formants may be at least 3000 Hz. More preferably, both of the two formants may be within the frequency range of 5 Hz-30000 Hz, and the difference between the peaks of the two formants may be at least 4000 Hz. Both of the two formants may be within the frequency range of 20 Hz-20000 Hz, and the difference between the peaks of the two formants may be at least 400 Hz. Preferably, both of the two formants may be within the frequency range of 20 Hz-20000 Hz, and the difference between the peaks of the two formants may be at least 1000 Hz. More preferably, both of the two formants may be within the frequency range of 20 Hz-20000 Hz, and the difference between the peaks of the two formants may be at least 2000 Hz. More preferably, both of the two formants may be within the frequency range of 20 Hz-20000 Hz, and the difference between the peaks of the two formants may be at least 3000 Hz. More preferably, both of the two formants may be within the frequency range of 20 Hz-20000 Hz, and the difference between the peaks of the two formants may be at least 4000 Hz. Both of the two formants may be within the frequency range of 100 Hz-18000 Hz, and the difference between the peaks of the two formants may be at least 400 Hz. Preferably, both of the two formants may be within the frequency range of 100 Hz-18000 Hz, and the difference between the peaks of the two formants may be at least 1000 Hz. More preferably, both of the two formants may be within the frequency range of 100 Hz-18000 Hz, and the difference between the peaks of the two formants may be at least 2000 Hz. More preferably, both of the two formants may be within the frequency range of 100 Hz-18000 Hz, and the difference between the peaks of the two formants may be at least 3000 Hz. More preferably, both of the two formants may be within the frequency range of 100 Hz-18000 Hz, and the difference between the peaks of the two formants may be at least 4000 Hz. Both of the two formants may be within the frequency range of 200 Hz-12000 Hz, and the difference between the peaks of the two formants may be at least 400 Hz. Preferably, both of the two formants may be within the frequency range of 200 Hz-12000 Hz, and the difference between the peaks of the two formants may be at least 1000 Hz. More preferably, both of the two formants may be within the frequency range of 200 Hz-12000 Hz, and the difference between the peaks of the two formants may be at least 2000 Hz. More preferably, both of the two formants may be within the frequency range of 200 Hz-12000 Hz, and the difference between the peaks of the two formants may be at least 3000 Hz. More preferably, both of the two formants may be within the frequency range of 200 Hz-12000 Hz, and the difference between the peaks of the two formants may be at least 4000 Hz. Both of the two formants may be within the frequency range of 500 Hz-10000 Hz, and the difference between the peaks of the two formants may be at least 400 Hz. Preferably, both of the two formants may be within the frequency range of 500 Hz-10000 Hz, and the difference between the peaks of the two formants may be at least 1000 Hz. More preferably, both of the two formants may be within the frequency range of 500 Hz-10000 Hz, and the difference between the peaks of the two formants may be at least 2000 Hz. More preferably, both of the two formants may be within the frequency range of 500 Hz-10000 Hz, and the difference between the peaks of the two formants may be at least 3000 Hz. More preferably, both of the two formants may be within the frequency range of 500 Hz-10000 Hz, and the difference between the peaks of the two formants may be at least 4000 Hz. In this way, the resonant response range of the loudspeaker may be widened and the sound quality satisfying a specific condition is obtained. It should be noted that in the actual use process, multiple vibration plates and vibration boards may be set to form a multi-layer vibration structure, corresponding to different frequency response ranges respectively, so as to achieve high-quality loudspeaker vibration with full range and full frequency response, or make the frequency response curve meet the use requirements in some specific frequency ranges. For example, in bone conduction hearing aids, in order to meet the requirements of normal hearing, a headphone core composed of one or more vibrating plates and vibration transmission plates with a resonant frequency in the range of 100 Hz-10000 Hz may be selected. The descriptions of the composite vibration device constituting the vibration plate and the vibration transmission plate may be found in a patent application named "Loudspeaker device and composite vibration device thereof" disclosed in Chinese Patent Application No. 201110438083.9, filed on Dec. 23, 2011, which are hereby incorporated by reference in its entirety.

Figure 79:
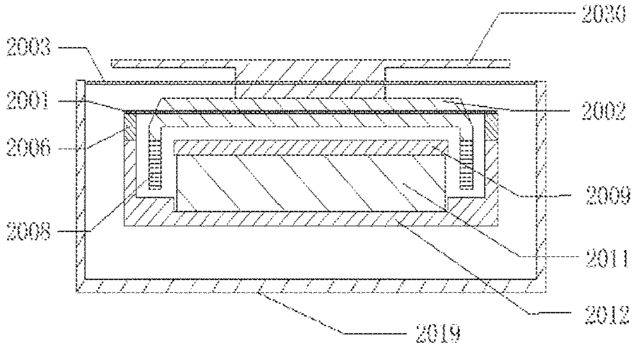
FIG. 79 is a longitudinal sectional view illustrating a composite vibration device of a loudspeaker device according to some embodiments of the present disclosure.
Figure 80:
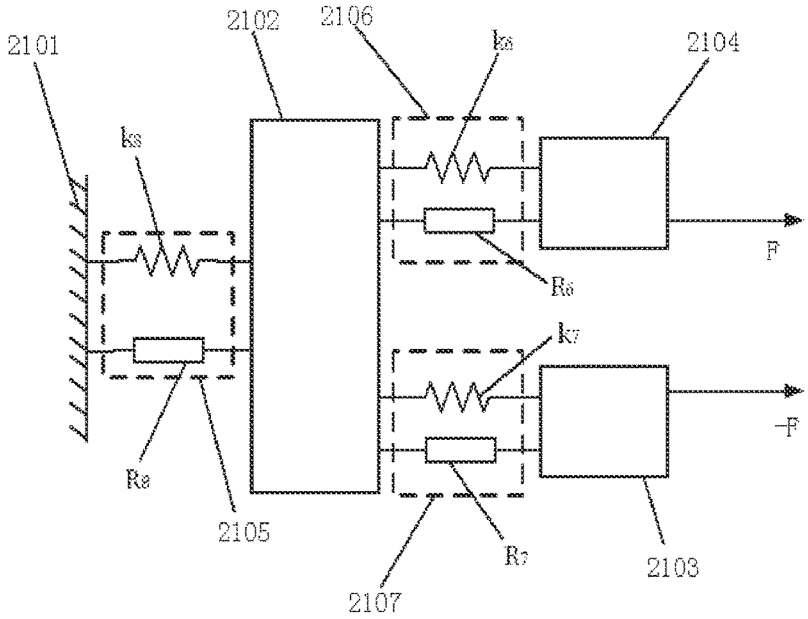
FIG. 80 is an equivalent model illustrating a vibration generation and transmission system of a loudspeaker device according to some embodiments of the present disclosure.

FIG. 79 is a longitudinal sectional view illustrating a composite vibration device of a loudspeaker device according to some embodiments of the present disclosure. FIG. 80 is an equivalent model illustrating a vibration generation and transmission system of a loudspeaker device according to some embodiments of the present disclosure.

In another embodiment, as shown in FIG. 79, the composite vibration device of the loudspeaker device may include a vibration plate 2002, a first vibration transmission plate 2003, and a second vibration transmission plate 2001. The first vibration transmission plate 2003 may fix the vibration plate 2002 and the second vibration transmission plate 2001 on a housing 2219 (i.e., the core housing 41). The composite vibration device constituted by the vibration plate 2002, the first vibration transmission plate 2003, and the second vibration transmission plate 2001 may generate not less than two formants. A flatter frequency response curve may be generated within an audible range of a hearing system, thereby improving the sound quality of the loudspeaker device.

Figure 81:
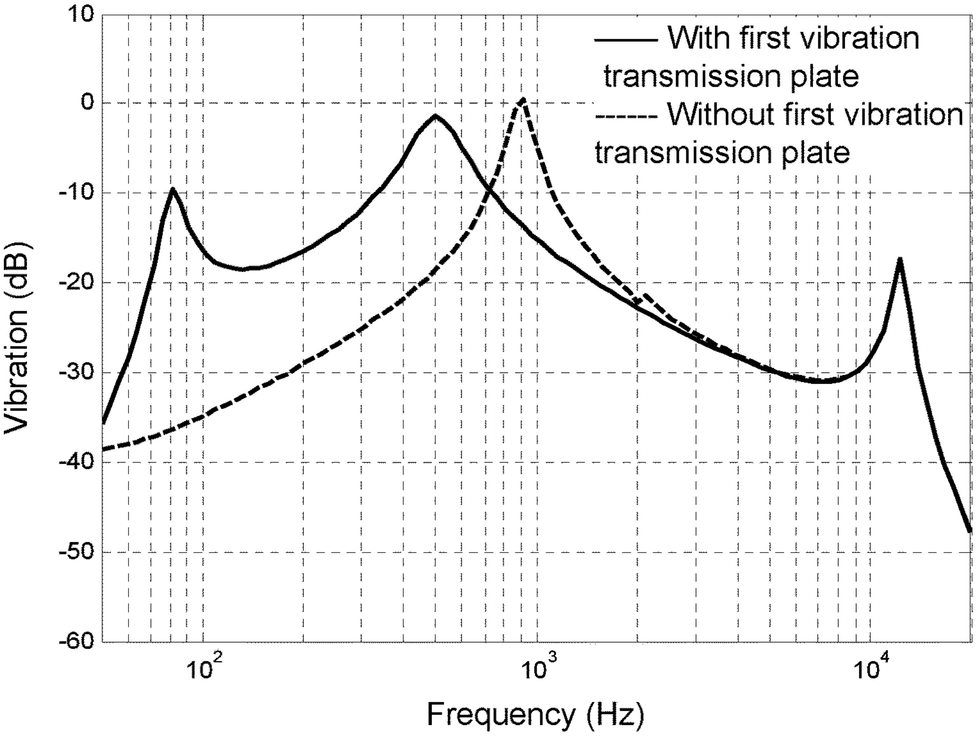
FIG. 81 illustrates vibration response curves of a loudspeaker device according to some embodiments of the present disclosure.

The count of formants generated in a triple composite vibration system of the first vibration transmission plate may be greater than that of a composite vibration system without the first vibration transmission plate. Preferably, the triple composite vibration system may generate at least three formants. More preferably, at least one formant may not be within the range audible to the human ear. More preferably, the formants may be all within the range audible to the human ear. More preferably, the formants may be all within the frequency range of the sounds audible to the human ear r, and the peak frequency may be not greater than 18000 Hz. More preferably, the formants may be all within the frequency range of the sounds audible to the human ear, and the peak frequency may be in a range from 100 Hz to 15000 Hz. More preferably, the formants may be all within the frequency range of the sounds audible to the human ear, and the peak frequency may be in a range from 200 Hz to 12000 Hz. More preferably, the formants may be all within the frequency range of the sounds audible to the human ear, and the peak frequency may be in a range from 500 Hz to 11000 Hz. The frequencies of the peaks of the formants should preferably have a certain difference, for example, the difference between the peaks of at least two formants may be at least 200 Hz. Preferably, the difference between the peaks of at least two formants may be at least 500 Hz. More preferably, the difference between the peaks of at least two formants may be at least 1000 Hz. More preferably, the difference between the peaks of at least two formants may be at least 2000 Hz. More preferably, the difference between the peaks of at least two formants may be at least 5000 Hz. To obtain better results, the formants may be all within the frequency range of the sounds audible to the human ear, and the difference between the peaks of at least two formants may be at least 500 Hz. Preferably, the formants may be all within the frequency range of the sounds audible to the human ear, and the difference between the peaks of at least two formants may be at least 1000 Hz. More preferably, the formants may be all within the frequency range of the sounds audible to the human ear, and the difference between the peaks of at least two formants may be at least 2000 Hz. More preferably, the formants may be all within the frequency range of the sounds audible to the human ear, and the difference between the peaks of at least two formants may be at least 3000 Hz. More preferably, the formants may be all within the frequency range of the sounds audible to the human ear, and the difference between the peaks of at least two formants may be at least 4000 Hz. Two formants may be within the frequency range of the sounds audible to the human ear, another one formant may be out of the frequency range of the sounds audible to the human ear, and the difference between the peaks of at least two formants may be at least 500 Hz. Preferably, two formants may be within the frequency range of the sounds audible to the human ear, another one formant may be out of the frequency range of the sounds audible to the human ear, and the difference between the peaks of at least two formants may be at least 1000 Hz. More preferably, two formants may be within the frequency range of the sounds audible to the human ear, another one formant may be out of the frequency range of the sounds audible to the human ear, and the difference between the peaks of at least two formants may be at least 2000 Hz. More preferably, two formants may be within the frequency range of the sounds audible to the human ear, another one formant may be out of the frequency range of the sounds audible to the human ear, and the difference between the peaks of at least two formants may be at least 3000 Hz. More preferably, two formants may be within the frequency range of the sounds audible to the human ear, another one formant may be out of the frequency range of the sounds audible to the human ear, and the difference between the peaks of at least two formants may be at least 4000 Hz. One formant may be within the frequency range of the sounds audible to the human ear, the other two formants may be out of the frequency range of the sounds audible to the human ear, and the difference between the peaks of at least two formants may be at least 500 Hz. Preferably, one formant may be within the frequency range of the sounds audible to the human ear, the other two formants may be out of the frequency range of the sounds audible to the human ear, and the difference between the peaks of at least two formants may be at least 1000 Hz. More preferably, one formant may be within the frequency range of the sounds audible to the human ear, the other two formants may be out of the frequency range of the sounds audible to the human ear, and the difference between the peaks of at least two formants may be at least 2000 Hz. More preferably, one formant may be within the frequency range of the sounds audible to the human ear, the other two formants may be out of the frequency range of the sounds audible to the human ear, and the difference between the peaks of at least two formants may be at least 3000 Hz. More preferably, one formant may be within the frequency range of the sounds audible to the human ear, the other two formants may be out of the frequency range of the sounds audible to the human ear, and the difference between the peaks of at least two formants may be at least 4000 Hz. The formants may be all within the frequency range of 5 Hz-30000 Hz, and the difference between the peaks of at least two formants may be at least 400 Hz. Preferably, the formants may be all within the frequency range of 5 Hz-30000 Hz, and the difference between the peaks of at least two formants may be at least 1000 Hz. More preferably, the formants may be all within the frequency range of 5 Hz-30000 Hz, and the difference between the peaks of at least two formants may be at least 2000 Hz. More preferably, the formants may be all within the frequency range of 5 Hz-30000 Hz, and the difference between the peaks of at least two formants may be at least 3000 Hz. More preferably, the formants may be all within the frequency range of 5 Hz-30000 Hz, and the difference between the peaks of at least two formants may be at least 4000 Hz. The formants may be all within the frequency range of 20 Hz-20000 Hz, and the difference between the peaks of at least two formants may be at least 400 Hz. Preferably, the formants may be all within the frequency range of 20 Hz-20000 Hz, and the difference between the peaks of at least two formants may be at least 1000 Hz. More preferably, the formants may be all within the frequency range of 20 Hz-20000 Hz, and the difference between the peaks of at least two formants may be at least 2000 Hz. More preferably, the formants may be all within the frequency range of 20 Hz-20000 Hz, and the difference between the peaks of at least two formants may be at least 3000 Hz. More preferably, the formants may be all within the frequency range of 20 Hz-20000 Hz, and the difference between the peaks of at least two formants may be at least 4000 Hz. The formants may be all within the frequency range of 100 Hz-18000 Hz, and the difference between the peaks of at least two formants may be at least 400 Hz. Preferably, the formants may be all within the frequency range of 100 Hz-18000 Hz, and the difference between the peaks of at least two formants may be at least 1000 Hz. More preferably, the formants may be all within the frequency range of 100 Hz-18000 Hz, and the difference between the peaks of at least two formants may be at least 2000 Hz. More preferably, the formants may be all within the frequency range of 100 Hz-18000 Hz, and the difference between the peaks of at least two formants may be at least 3000 Hz. More preferably, the formants may be all within the frequency range of 100 Hz-18000 Hz, and the difference between the peaks of at least two formants may be at least 4000 Hz. The formants may be all within the frequency range of 200 Hz-12000 Hz, and the difference between the peaks of at least two formants may be at least 400 Hz. Preferably, the formants may be all within the frequency range of 200 Hz-12000 Hz, and the difference between the peaks of at least two formants may be at least 1000 Hz. More preferably, the formants may be all within the frequency range of 200 Hz-12000 Hz, and the difference between the peaks of at least two formants may be at least 2000 Hz. More preferably, the formants may be all within the frequency range of 200 Hz-12000 Hz, and the difference between the peaks of at least two formants may be at least 3000 Hz. More preferably, the formants may be all within the frequency range of 200 Hz-12000 Hz, and the difference between the peaks of at least two formants may be at least 4000 Hz. The formants may be all within the frequency range of 500 Hz-10000 Hz, and the difference between the peaks of at least two formants may be at least 400 Hz. Preferably, the formants may be all within the frequency range of 500 Hz-10000 Hz, and the difference between the peaks of at least two formants may be at least 1000 Hz. More preferably, the formants may be all within the frequency range of 500 Hz-10000 Hz, and the difference between the peaks of at least two formants may be at least 2000 Hz. More preferably, the formants may be all within the frequency range of 500 Hz-10000 Hz, and the difference between the peaks of at least two formants may be at least 3000 Hz. More preferably, the formants may be all within the frequency range of 500 Hz-10000 Hz, and the difference between the peaks of at least two formants may be at least 4000 Hz. FIG. 81 illustrates vibration response curves of a loudspeaker device according to some embodiments of the present disclosure. In one embodiment, by using the triple composite vibration system constituted by the vibration plate, the first vibration transmission plate, and the second vibration transmission plate, the frequency response shown in FIG. 81 may be obtained, resulting in three distinct formants, so that the sensitivity of the frequency response of the loudspeaker device in the low frequency range (about 600 Hz) may be greatly improved, and the sound quality may be improved.

By changing parameters such as the size and material of the first vibration transmission plate, the formant(s) may be shifted to obtain an ideal frequency response. Preferably, the first vibration transmission plate may be an elastic plate. The elasticity may be determined by various aspects such as the material, thickness, and structure of the first vibration transmission plate. The material of the first vibration transmission plate may be, but be not limited to, steel (such as, but is not limited to, stainless steel, carbon steel, etc.), a light alloy (such as, but is not limited to, an aluminum alloy, a beryllium copper, a magnesium alloy, a titanium alloy, etc.), plastics (such as, but being is limited to, high-molecular polyethylene, blown nylon, engineering plastics, etc.), other single or composite materials capable of implementing the same performance. The composite materials may be but be not limited to a reinforcing material, for example, glass fiber, carbon fiber, boron fiber, graphite fiber, graphene fiber, silicon carbide fiber, aramid fiber, etc. The composite materials may also be a composite of other organic and/or inorganic materials, such as various types of glass steels constituted by glass fiber reinforcing unsaturated polyester, epoxy resin, or phenolic resin. The thickness of the first vibration transmission plate may not be less than 0.005 mm. Preferably, the thickness may be 0.005 mm to 3 mm. More preferably, the thickness may be 0.01 mm to 2 mm. Still more preferably, the thickness may be 0.01 mm to 1 mm. Further preferably, the thickness may be 0.02 mm to 0.5 mm. The structure of the first vibration transmission plate may be disposed in a ring shape, and preferably include at least one ring. Preferably, the structure may include at least two rings, which may be concentric rings or non-concentric rings. The rings may be connected by at least two supporting rods that centrally radiate from the outer ring to the inner ring. Further preferably, the structure may include at least one elliptical ring. Further preferably, the structure may include at least two elliptical rings. Different elliptical rings may have a different radius of curvature. The rings may be connected by the supporting rods. Still further preferably, the first vibration transmission plate may include at least one square ring. The structure of the first vibration transmission plate may also be disposed in a plate shape. Preferably, a hollow pattern may be disposed on the first vibration transmission plate, and the area of the hollow pattern may not be less than the area without a hollow pattern. The material, thickness, and structure described above may be combined to form different vibration transmission plates. For example, the ring-shaped vibration transmission plate may have different thickness distributions. Preferably, the thickness of the supporting rod may be equal to the thickness of the ring. Further preferably, the thickness of the supporting rod may be greater than the thickness of the ring. More preferably, the thickness of the inner ring may be greater than the thickness of the outer ring.

Figure 82:
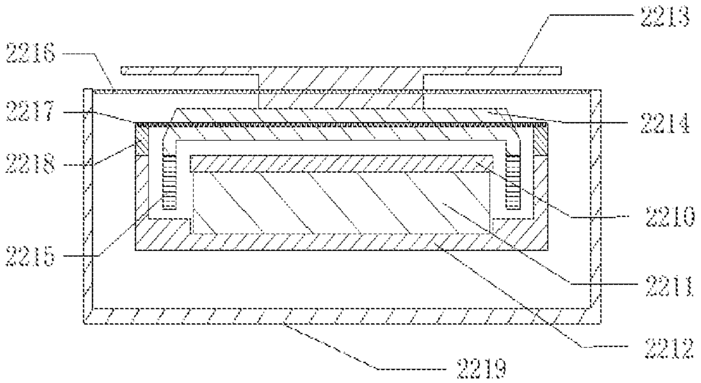
FIG. 82 is a longitudinal sectional view illustrating a composite vibration device of a loudspeaker device according to some embodiments of the present disclosure.

The content disclosed in the present disclosure may also disclose specific embodiments of the vibration plate, the first vibration transmission plate, and the second vibration transmission plate described above. FIG. 82 is a longitudinal sectional view illustrating a composite vibration device of a loudspeaker device according to some embodiments of the present disclosure. As shown in FIG. 82, an earphone core may include a magnetic circuit system, a vibration plate 2214, a coil 2215, a first vibration transmission plate 2216, and a second vibration transmission plate 2217. The magnetic circuit system may be constituted by a magnetic conduction plate 2210, a magnet 2211, and a magnetic conductive magnet 2212. A panel 2213 may protrude from a housing 2219, and be bonded to the vibration plate 2214 by glue. The first vibration transmission plate 2216 may connect and fix the earphone core on the housing 2219 to form a suspension structure.

Figure 83:
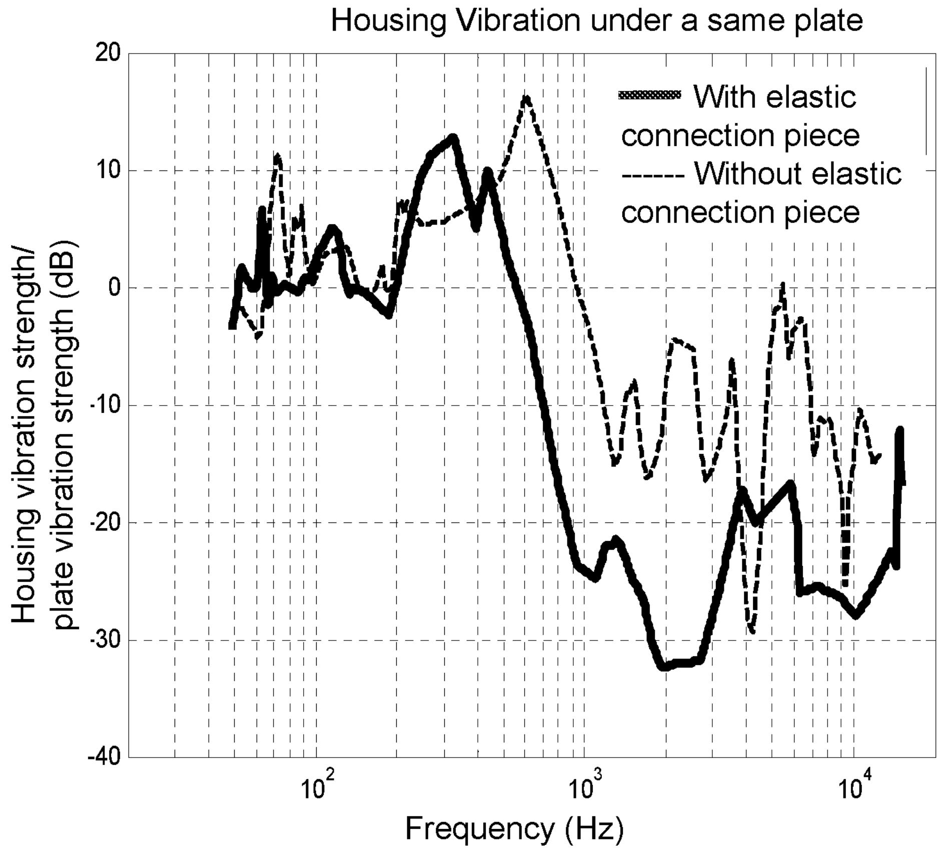
FIG. 83 illustrates vibration response curves of a vibration generating portion of a loudspeaker device according to some embodiments of the present disclosure.
Figure 84:
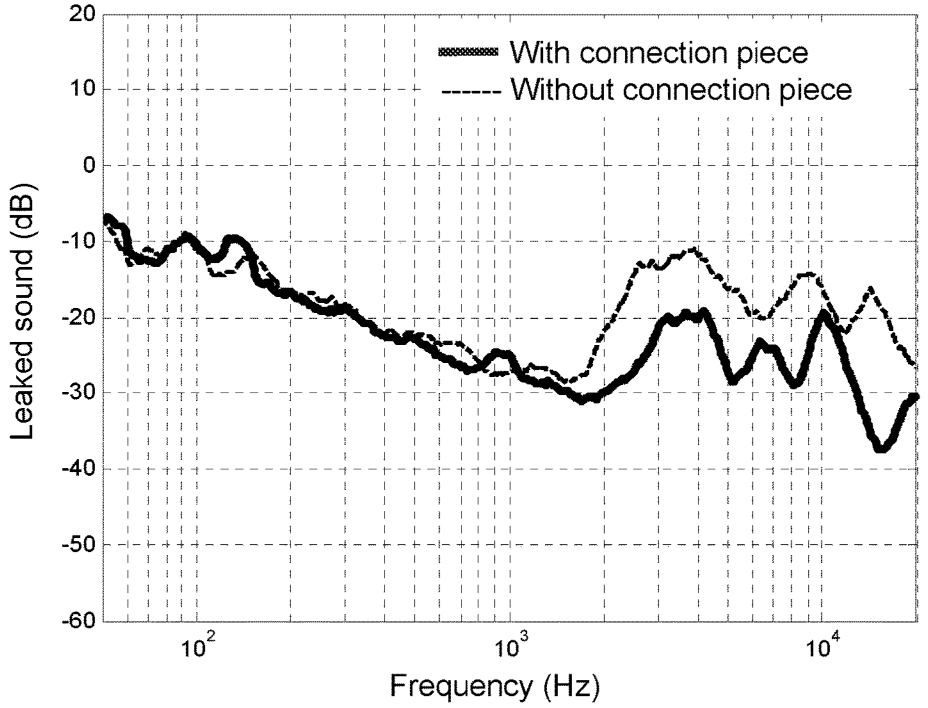
FIG. 84 illustrates vibration response curves of a vibration generating portion of a loudspeaker device according to some embodiments of the present disclosure.

During the working of the loudspeaker device, a triple vibration system constituted by the vibration plate 2214, the first vibration transmission plate 2216, and the second vibration transmission plate 2217 may generate a flatter frequency response curve, thereby improving the sound quality of the loudspeaker device. The first vibration transmission plate 2216 may elastically connect the earphone core to the housing 2219, which may reduce the vibration transmitted by the earphone core to the housing, thereby effectively reducing a leaked sound caused by the vibration of the housing, and also reducing the influence of the vibration of the housing on the sound quality of the loudspeaker device. FIG. 83 illustrates vibration response curves of a vibration generating portion of a loudspeaker device according to some embodiments of the present disclosure. As used herein, the thick line may show the frequency response of the vibration generating portion when the first vibration transmission plate 2216 is used, and the thin line may show the frequency response of the vibration generating portion when the first vibration transmission plate 2216 is not used. It may be seen that the vibration of the housing of the loudspeaker device without the first vibration transmission plate 2216 may be significantly greater than the vibration of the housing of the loudspeaker device with the first vibration transmission plate 2216 in a frequency range above 500 Hz. FIG. 84 is a comparison of a leaked sound in a case of including the first vibration transmission plate 2216 and a case of excluding the first vibration transmission plate 2216. As used herein, the leaked sound of the device with the first vibration transmission plate 2216 in an intermediate frequency (e.g., about 1000 Hz) may be less than the leaked sound of the device without the first vibration transmission plate 2216 in the corresponding frequency range. It may be seen that the vibration of the housing may be effectively reduced after using the first vibration transmission plate between the panel and the housing, thereby reducing the leaked sound. In some embodiments, the first vibration transmission plate may include, but be not limited to, stainless steel, beryllium copper, plastics, a polycarbonate material, or the like. The thickness may be in a range of 0.01 mm-1 mm.

Figure 85A:
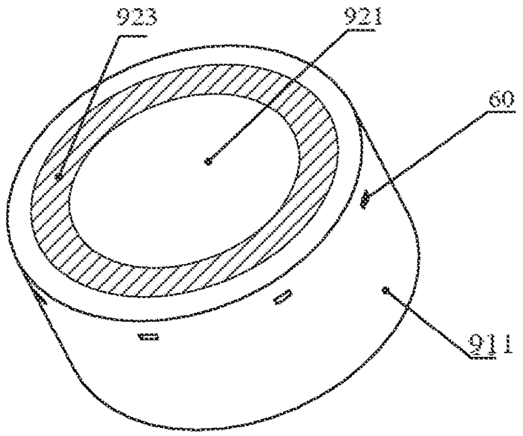
FIG. 85A is a schematic diagram illustrating a structure of a vibration generating portion of a loudspeaker device according to some embodiments of the present disclosure.
Figure 85B:
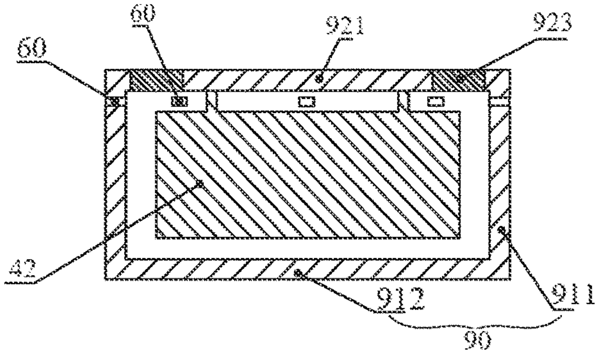
FIG. 85B is a longitudinal section view illustrating a vibration generating portion of a loudspeaker device according to some embodiments of the present disclosure.

FIG. 85A is a schematic diagram illustrating a structure of a vibration generating portion of a loudspeaker device according to some embodiments of the present disclosure. FIG. 85B is a longitudinal section view illustrating a vibration generating portion of a loudspeaker device according to some embodiments of the present disclosure. Referring to FIGS. 85A and 85B, in the embodiment, the loudspeaker device may include a housing 90 (i.e., the core housing 41), a panel 921, and an earphone core 42. In some embodiments, the housing 90 may be consistent with the core housing 41 mentioned above, both of which refer to a housing of a speaker module. The earphone core 42 may include the composite vibration device described in the foregoing embodiments. Similarly, the panel 921 may follow this principle. In some embodiments, the earphone core 42 may be accommodated inside the housing 90 and generate a vibration. The vibration of the earphone core 42 may cause the housing 90 to vibrate, thereby pushing the air outside the housing to vibrate and generate a leaked sound. At least one sound guiding hole 60 may be disposed in at least a portion of the housing 90. The sound guiding hole(s) 60 may be used to lead sound waves in the housing formed by the air vibration inside the housing 90 to the outside of the housing 90, and interfere with leaked sound waves formed by the air outside the housing pushed by the vibration of the housing

90. In some embodiments, the interference may reduce the amplitude of the leaked sound waves.

It should be noted that the panel 921 and the panel described above may be a same structure.

The panel 921 may be fixedly connected to the earphone core 42, and synchronously vibrated by the earphone core 42. The panel 921 may protrude from the housing 90 through an opening of the housing 90, and at least partially fit human skins. The vibration may be transmitted to auditory nerves through human tissues and bones, so that a person may hear a sound. The earphone core 42 and the housing 90 may be connected through a connection piece 923. The connection piece 923 may position the earphone core 42 inside the housing 90.

The connection piece 923 may be one or more independent components, or disposed with the earphone core 42 or the housing 90 as a whole. In some embodiments, in order to reduce a constraint on the vibration, the connection piece 923 may be made of an elastic material.

In some embodiments, the sound guiding hole(s) 60 may be disposed in an upper portion of the height of a side wall, for example, a portion of the side wall from the top (the vibration panel 921) to ⅓ height along the height direction.

Taking a cylindrical housing as an example, for the disposing position, the sound guiding hole(s) 60 may be opened in a side wall and/or a bottom wall of the housing according to different requirements. Preferably, the sound guiding hole(s) 60 may be opened in an upper portion and/or a lower portion of the side wall 911 of the housing. The count of sound guiding holes in the side wall 911 of the housing may be at least two, and preferably uniformly distributed in a circularly circumferential direction. The count of sound guiding holes in the bottom wall 912 of the housing may be at least two. With a center of the bottom wall as the center of the ring, the holes may be uniformly distributed in a ring shape. The sound guiding holes distributed in the ring may be disposed as at least one ring. The count of sound guiding holes disposed in the bottom wall 912 of the housing may be only one. The sound guiding holes may be disposed at the center of the bottom wall 912.

As for the count, the sound guiding hole(s) may be one or more, preferably multiple, and evenly arranged. For ring-shaped distributed sound guiding holes, the count of sound guiding holes of each ring may be, for example, 6-8.

The shape of the sound guiding hole may be a ring shape, an oval shape, a rectangular shape, or a long strip shape. The long strip shape may generally refer to a long strip along a straight line, a curve, an arc, or the like. Various shapes of the sound guiding holes 60 on the loudspeaker device may be the same or different.

In some embodiments, the penetrating sound guiding hole(s) 60 may be disposed in the lower portion of the side wall of the housing 90 (a portion of the side wall from ⅔ height to the bottom along the height direction). The count of the sound guiding hole(s) 60 may be, for example, eight, and the shape may be, for example, a rectangle. Each sound guiding hole 60 may be uniformly distributed in a ring shape on the side wall of the housing 90.

In some embodiments, the housing 90 may be cylindrical. The penetrating sound guiding hole(s) 60 may be disposed in a middle portion of the side wall of the housing 90 (a portion of the side wall from ⅓ to ⅔ height along the height direction). The count of the sound guiding hole(s) 60 may be, for example, eight, and the shape may be, for example, a rectangle. Each sound guiding hole 60 may be uniformly distributed in a ring shape on the side wall of the housing 90.

In some embodiments, the penetrating sound guiding hole(s) 60 may be disposed in a circumferential direction of the bottom wall of the housing 90. The count of the sound guiding hole(s) 60 may be, for example, eight, and the shape may be, for example, a rectangle. Each sound guiding hole 60 may be uniformly distributed in a ring shape on the side wall of the housing 90.

In some embodiments, the penetrating sound guiding hole(s) 60 may be respectively formed in the upper and lower portions of the side wall of the housing 90. The sound guiding hole(s) 60 may be uniformly distributed in the upper portion and the lower portion of the side wall of the housing 90 in a ring shape. The count of the sound guiding hole(s) 60 of each ring may be eight. In addition, the sound guiding hole(s) 60 disposed at the upper and lower portions may be symmetrically disposed relative to a middle portion of the housing 90. The shape of each sound guiding hole 60 may be a ring.

In some embodiments, the penetrating sound guiding hole(s) 60 may be disposed in the upper portion and the lower portion of the side wall of the housing 90, and the bottom wall of the housing 90, respectively. The sound guiding hole(s) 60 opened on the side wall may be evenly distributed in the upper portion and the lower portion of the side wall of the housing 90. The count of the hole(s) of each ring may be eight. The sound guiding hole(s) 60 disposed at the upper portion and the lower portion may be symmetrically arranged relative to a middle portion of the housing 90. Each sound guiding hole 60 opened on the side wall may be rectangular. The shape of the sound guiding hole(s) 60 opened on the bottom wall may be a long strip shape arranged along an arc. The count of the hole(s) may be four. The hole(s) may be uniformly distributed in a ring shape with the center of the bottom wall as the ring center. The sound guiding hole(s) 60 opened on the bottom wall may also include a ring through-hole opened at the center.

In some embodiments, the penetrating sound guiding hole(s) 60 may be opened in the upper portion of the side wall of the housing 90. The hole(s) may be evenly distributed in the upper portion of the side wall of the housing 90. The count may be, for example, eight, and the shape of the sound guiding hole(s) 60 may be a ring.

In some embodiments, in order to show a better effect of suppressing leaked sound, the sound guiding hole(s) 60 may be uniformly distributed in the upper portion, the middle portion, and the lower portion of the side wall 911, respectively, and a ring of the sound guiding hole(s) 60 may also be disposed in the bottom wall 912 of the housing 90 in the circumferential direction. The aperture of each sound guiding hole 60 and the count of the hole(s) may be the same.

In some embodiments, the sound guiding hole 60 may be an unobstructed through-hole, so that a damping layer can be disposed at the opening of the sound guiding hole(s) 60. The material and position of the damping layer may be set in many manners. For example, the damping layer may be made of tuning paper, tuning cotton, non-woven fabric, silk, cotton, sponge, rubber, or other materials with a certain damping for sound quality conduction. The damping layer may be attached to an inner wall of the sound guiding hole(s) 60, or placed on the outside of the sound guiding hole(s) 60.

In some embodiments, corresponding to different sound guiding holes, the disposed damping layer may be disposed to have the same phase difference between the different sound guiding hole(s) 60 to suppress the leaked sound of the same wavelength, or different phase differences between the different sound guiding hole(s) 60 to suppress the leaked sound of different wavelengths (i.e., a specific band of leaked sound).

In some embodiments, different portions of the same sound guiding hole(s) 60 may be disposed to have the same phase (e.g., using a pre-designed step or step-shaped damping layer) to suppress leaked sound waves of the same wavelength. Alternatively, different portions of the same sound guiding hole 60 may be disposed to have different phases to suppress leaked sound waves of different wavelengths.

The earphone core 42 may not only drive the panel 921 to vibrate, but also be a vibration source, which is accommodated inside the housing 90. The vibration of the surface of the earphone core 42 may cause the air in the housing to vibrate with the surface. Sound waves may be formed inside the housing 90, which may be referred to as in-housing sound waves. The panel 921 and the earphone core 42 may be located at the housing 90 through the connection piece 923. It may be inevitable that the vibration may be applied to the housing 90 to drive the housing 90 to vibrate synchronously. Therefore, the housing 90 may push the air outside the housing to vibrate to form the leaked sound wave. The leaked sound wave may propagate outward, forming the leaked sound.

According to the following equation to determine a position of the sound guiding hole to suppress the leaked sound, the reduction of the leaked sound may be proportional to:

$$\left(\iint_{S_{opening}} P ds - \iint_{S_{housing}} P_d ds\right), \tag{7}$$

where $S_{opening}$ denotes an opening area of the sound guiding hole, and $S_{housing}$ denotes a housing area that is not in contact with the face.

An in-housing pressure may be represented by:

$$P = P_a + P_b + P_c + P_e, \tag{8}$$

where $P_a$, $P_b$, $P_c$, and $P_e$ denote sound pressures generated at any point of a-plane, b-plane, c-plane, and e-plane in the accommodation space, respectively.

$$P_a(x, y, z) = -j\omega\rho_0 \iint_{S_a} W_a(x'_a, y'_a) \cdot \frac{e^{jkR(x'_a, y'_a)}}{4\pi R(x'_a, y'_a)} dx'_a dy'_a - P_{aR} \tag{9}$$

$$P_b(x, y, z) = -j\omega\rho_0 \iint_{S_b} W_b(x', y') \cdot \frac{e^{jkR(x', y')}}{4\pi R(x', y')} dx' dy' - P_{bR} \tag{10}$$

$$P_c(x, y, z) = -j\omega\rho_0 \iint_{S_c} W_c(x'_c, y'_c) \cdot \frac{e^{jkR(x'_c, y'_c)}}{4\pi R(x'_c, y'_c)} dx'_c dy'_c - P_{cR} \tag{11}$$

-continued $$P_e(x, y, z) = -j\omega\rho_0 \iint_{S_e} W_e(x'_e, y'_e) \cdot \frac{e^{jkR(x'_e, y'_e)}}{4\pi R(x'_e, y'_e)} dx'_e dy'_e - P_{eR} \tag{12}$$

where, $R(x', y') = \sqrt{(x - x')^2 + (y - y')^2 + z^2}$ denotes the distance from an observation point (x, y, z) to a point (x', y', 0) on a b-plane sound source, $S_a$, $S_b$, $S_c$, and $S_e$ denote the areas of a-plane, b-plane, c-plane, and e-plane, respectively, $R(x'_a, y'_a) = \sqrt{(x - x_a')^2 + (y - y_a')^2 + (z - z_a)^2}$ denotes the distance from the observation point (x, y, z) to a point ($x'_a$, $y_a'$, $z_a$) on a a-plane sound source, $R(x'_c, y'_c) = \sqrt{(x - x_c')^2 + (y - y_c')^2 + (z - z_c)^2}$ denotes the distance from the observation point (x, y, z) to a point ($x'_c$, $y_c'$, $z_c$) on a c-plane sound source, $R(x'_e, y'_e) = \sqrt{(x - x_e')^2 + (y - y_e')^2 + (z - z_e)^2}$ denotes the distance from the observation point (x, y, z) to a point ($x'_e$, $y_e'$, $z_e$) on an e-plane sound source, $k = \omega/u$ denotes a wave count (u may be the speed of sound), $\rho_0$ denotes a density of air. In some embodiments, $\omega$ may be an angular frequency of vibration, and $P_{aR}$, $P_{bR}$, $P_{cR}$, and $P_{eR}$ denote sound resistances of air itself, which respectively may be:

$$P_{aR} = A \cdot \frac{z_a \cdot r + j\omega \cdot z_a \cdot r'}{\varphi} + \delta, \tag{13}$$

$$P_{bR} = A \cdot \frac{z_b \cdot r + j\omega \cdot z_b \cdot r'}{\varphi} + \delta, \tag{14}$$

$$P_{cR} = A \cdot \frac{z_c \cdot r + j\omega \cdot z_c \cdot r'}{\varphi} + \delta, \tag{15}$$

$$P_{eR} = A \cdot \frac{z_e \cdot r + j\omega \cdot z_e \cdot r'}{\varphi} + \delta, \tag{16}$$

where r denotes a sound damping of each unit length, r' denotes a sound mass of each unit length, $z_a$ denotes the distance from the observation point to the a-plane sound source, $z_b$ denotes the distance from the observation point to the b-plane sound source, $z_c$ denotes the distance from the observation point to the c-plane sound source, $z_e$ denotes the distance from the observation point to the e-plane sound source.

$W_a(x, y)$, $W_b(x, y)$, $W_c(x, y)$, $W_e(x, y)$, and $W_d(x, y)$ denote sound source intensities of each unit area of the a-plane, b-plane, c-plane, e-plane, and d-plane, and may be derived from the following equation group (17):

$$\begin{cases} F_e = F_a = F - k_1\cos\omega t - \iint_{S_a} W_a(x, y)dxdy - \iint_{S_e} W_e(x, y)dxdy - f \\ F_b = -F + k_1\cos\omega t + \iint_{S_b} W_b(x, y)dxdy - \iint_{S_e} W_e(x, y)dxdy - L \\ F_c = F_d = F_b - k_2\cos\omega t - \iint_{S_c} W_c(x, y)dxdy - f - \gamma \\ F_d = F_b - k_2\cos\omega t - \iint_{S_d} W_d(x, y)dxdy \end{cases} \tag{17}$$

where F denotes a driving force converted by the earphone core, $F_a$, $F_b$, $F_c$, $F_d$, $F_e$ denote driving forces of a, b, c, d, and e, respectively, $S_d$ denotes the housing (d-plane) area, f denotes a viscous resistance formed by a small gap of the side wall, f=ηΔs(dv/dy), L denotes an equivalent load of the face when the vibration plate acts on the face, γ denotes energy dissipated on an elastic element 2, $k_1$, $k_2$ denote elastic coefficients of an elastic element 1 and the elastic element 2, respectively, η denotes a fluid viscosity coefficient, dv/dy denotes a fluid velocity gradient, Δs denotes a sectional area of an object (plate), A denotes the amplitude, Φ denotes an area of a sound field, Δ denotes a high-order quantity (derived from an incomplete symmetry of the shape of the housing). At any point outside the housing, a sound pressure generated by the vibration of the housing may be:

$$P_d = -j\omega\rho_0 \int\int W_d(x'_d, y'_d) \cdot \frac{e^{jkR(x'_d, y'_d)}}{4\pi R(x'_d, y'_d)} dx'_d dy'_d, \quad (18)$$

where $R(x'_d, y'_d) = \sqrt{(x-x'_d)^2 + (y-y'_d)^2 + (z-z_d)^2}$ denotes the distance from the observation point (x, y, z) to a point ($x'_d$, $y'_d$, $z_d$) on the d-plane sound source.

$P_a$, $P_b$, $P_c$, $P_e$ may be all functions of position. When a hole is opened at any position of the housing, and the area of the hole is S, the total effect of sound pressure at the hole may be $\iint_{S_{opening}} P ds$.

Since the panel 921 on the housing 90 is closely attached to the human tissue, and its output energy may be absorbed by the human tissue, only the d-plane may push the air outside the housing to vibrate to form the leaked sound. The total effect of vibration of the air outside the housing pushed by the housing may be $\iint_{S_{housing}} P_d ds$.

In some application scenarios, our goal may be to make $\iint_{S_{opening}} P ds$ and $\iint_{S_{housing}} P_d ds$ equal in magnitude and opposite in direction, so as to achieve the effect of reducing the leaked sound. Once the basic structure of the device is determined, $\iint_{S_{housing}} P_d ds$ may be an amount that we can not adjust, $\iint_{S_{opening}} P ds$ may be adjusted to offset $\iint_{S_{housing}} P_d ds$. $\iint_{S_{opening}} P ds$ may include complete phase and amplitude information. The phase and amplitude may be closely related to the size of the housing 90 of the loudspeaker device, the vibration frequency of the earphone core, the positions, shapes, count, sizes of the sound guiding hole(s) 60, and whether there is a damping on each hole, which may allow us to implement the purpose of suppressing the leaked sound by adjusting the opening position, shape and count of sound guiding hole(s), and/or increasing damping and/or adjusting damping material.

The in-housing sound wave(s) and leaked sound wave(s) may be equivalent to two sound sources shown in the figure. The penetrating sound guiding hole(s) 60 may be opened on the wall surface of the housing 90 in some embodiments of the present disclosure, which may guide the in-housing sound wave(s) to propagate to the outside of the housing, propagate in the air with the leaked sound waves(s), and interfere therewith, thereby reducing the amplitude of the leaked sound wave(s), that is, reducing the leaked sound. Therefore, the technical solution of the present disclosure, through the convenient improvement of opening sound guiding hole(s) in the housing, may solve the problem of the leaked sound to a certain extent without increasing the volume and weight of the loudspeaker device.

According to the equation derived by the inventor, those skilled in the art may easily understand that the elimination effect of leaked sound wave(s) may be closely related to the housing size of the loudspeaker device, the vibration frequency of the earphone core, the opening position, shape, count, and size of the sound guiding hole(s) 60, and whether there is a damping on the hole, such that the opening position, shape, count, and the damping material of the sound guiding hole(s) 60 may have a variety of different solutions according to needs.

Figure 86:
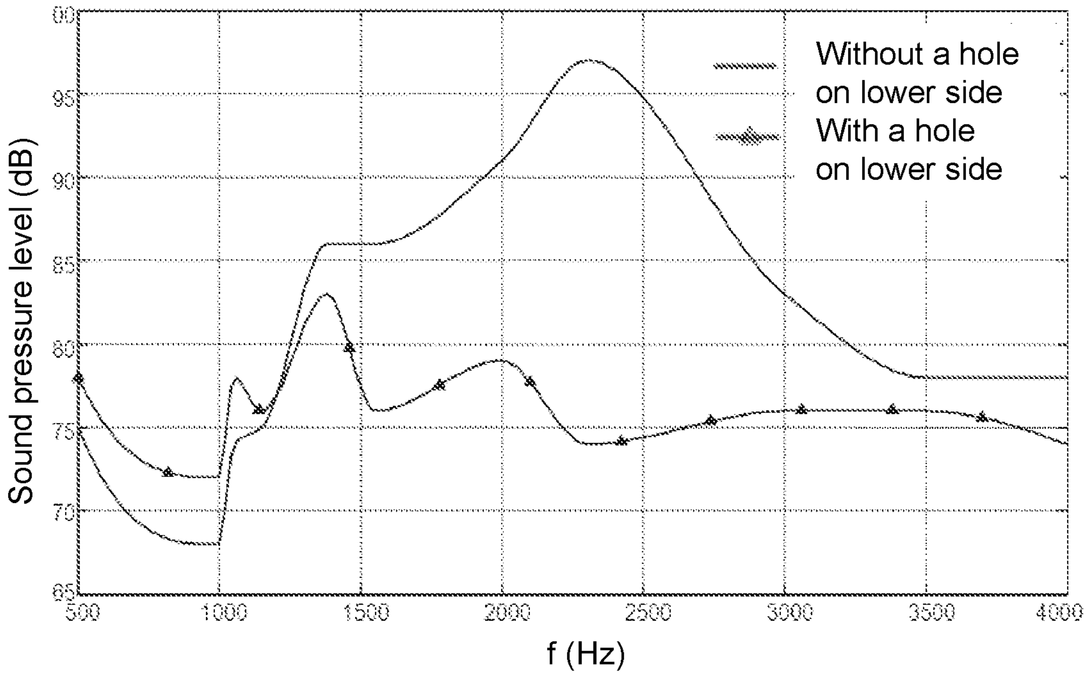
FIG. 86 is a diagram illustrating an effect of suppressing leaked sound of a loudspeaker device according to some embodiments of the present disclosure.

FIG. 86 is a diagram illustrating an effect of suppressing leaked sound of a loudspeaker device according to some embodiments of the present disclosure. In a target region near the loudspeaker device (e.g., the loudspeaker device shown in FIGS. 85A and 85B), a difference between a phase of a leaked sound wave transmitted to the target region and a phase of an in-housing sound wave propagating to the target region through sound guiding hole(s) may be close to 180 degrees. By doing this, the leaked sound wave generated by the housing 90 may be significantly reduced or even eliminated in the target region.

As shown in FIG. 86, the leaked sound wave may be significantly suppressed in a frequency band from 1500 Hz to 4000 Hz. As used therein, within a frequency band from 1500 Hz to 3000 Hz, the suppressed leaked sound may basically exceed 10 dB. Especially within a frequency band from 2000 Hz to 2500 Hz, the leaked sound may be reduced by more than 20 dB after the sound guiding hole(s) is opened in a lower side of the housing compared with a case without opening the sound guiding hole(s).

In some embodiments, the transmission relationship K2 between the sensing terminal 1102 and the vibration unit 1103 (i.e., the core housing 41) may also affect the conducted frequency response. The sound heard by the human ear depends on the energy received by the cochlea, which is affected by different physical quantities in the process of transmission and can be expressed by the following Equation:

$$P=\iint_S \alpha \cdot f(a,R) \cdot L \cdot ds. \quad (19)$$

In Equation (19), P is proportional to the energy received by the cochlea, s denotes the contact area between the contact surface 502*a* and the face, α denotes a dimension conversion coefficient, f (a, R) denotes the influence of the acceleration of a point on the contact surface and the tightness degree R between the contact surface and the skin on the energy transfer, L denotes the impedance of mechanical wave transmission at any contact point, that is, the transmission impedance per unit area.

It should be noted that the sensing terminals in the foregoing embodiments may have the same structure, which refers a system that sense hearing by the human body.

It can be seen from Equation (19) that the transmission of sound is affected by the transmission impedance L, and the vibration transmission efficiency of the conduction system is related to L. The frequency response curve of the conduction system is the superposition of the frequency response curve of each point on the contact surface. The factors that affect the impedance include the size, the shape, the roughness, the force size, the force distribution, etc., of the energy transfer area. For example, by changing the structure and shape of the vibration unit 1202, the sound transmission effect is changed, thereby changing the sound quality of the loudspeaker device. Merely by way of example, by changing the corresponding physical characteristics of the contact surface 1202*a* of the vibrating unit, the effect of changing the sound transmission can be achieved.

Figure 87:
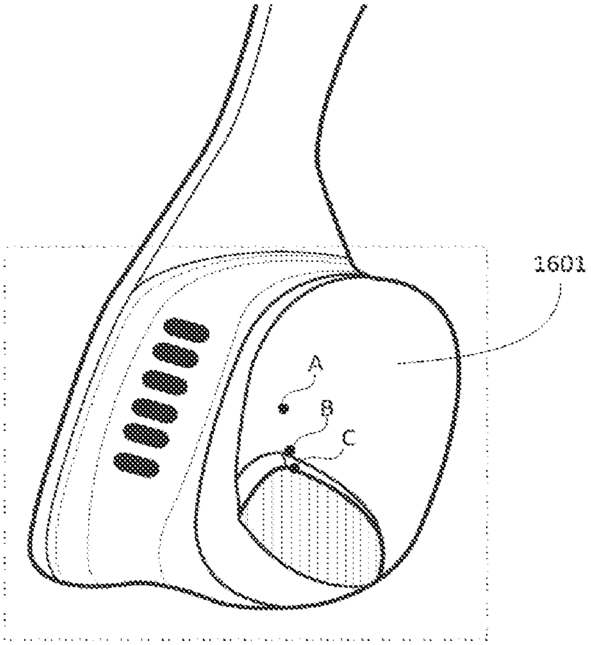
FIG. 87 is a schematic diagram illustrating a vibration unit contact surface of a loudspeaker device according to the embodiment of the present disclosure.

FIG. 87 is a schematic diagram illustrating a vibration unit contact surface of a loudspeaker device according to the embodiment of the present disclosure. A well-designed surface of a contact surface may be provided with a gradient structure, and the gradient structure may refer to a region where the surface of the contact surface has a height variation. As used herein, the contact surface refers to a side of the core housing 41 that is in contact with the user. The gradient structure may be a convex/concave or stepped structure on the outside of the contact surface (the side that is in contact with the user), or may also be a convex/concave or stepped structure on the inside of the contact surface (the side facing away from the user). It should be known that the contact surface of the vibration unit may fit on any position of the user's head, for example, the top of the head, forehead, cheeks, hips, auricles, back of auricles, or the like. As shown in FIG. 87, the contact surface 1601 (outer side of the contact surface) may have convexities or concaves (not shown in FIG. 87). During the operation of the loudspeaker device, the convex or concave portion may be in contact with the user, which changes the pressures at different positions where the contact surface 1601 contact the human face. The convex part may be in closer contact with the human face, and the skin and subcutaneous tissue that comes into contact with it may be more stressed than other parts. Correspondingly, the skin and subcutaneous tissue that are in contact with the concave part may be subjected to less pressure than other parts. For example, there are three points A, B, and C on the contact surface 1601 in FIG. 87, which are located on the non-convex portion, on the edge of the convex portion, and on the convex portion of the contact surface 1601, respectively. In contacting with the skin, the clamping force on the skin at three points A, B, and C may be FC>FA>FB. In some embodiments, the clamping force of point B may be 0, that is, point B may not be in contact with the skin. Human skin and subcutaneous tissue may show different impedance and response to the sound under different pressures. The impedance ratio may be small in the part with high pressure, which has a high-pass filtering characteristic for sound waves, and the impedance ratio may be large in the part with a low pressure, which has a low-pass filtering characteristic. The impedance characteristic L of each part of the contact surface 1601 may be different. According to Equation (19), different parts may respond differently to the frequency of sound transmission, the effect of sound transmission through the full contact surface may be equivalent to the sum of sound transmission in each part. When the sound is finally transmitted to the brain, a smooth frequency response curve may be formed, which avoids the appearance of excessively high formants at low or high frequencies, thereby obtaining an ideal frequency response within the entire sound band. Similarly, the material and thickness of the contact surface 1601 may also affect the sound transmission, thereby affecting the sound quality effect. For example, when the material of the contact surface is soft, the sound wave transmission effect in the low frequency range may be better than in the high frequency range, when the material of the contact surface is hard, the sound wave transmission effect in the high frequency range may be better than in the low frequency range.

Figure 88:
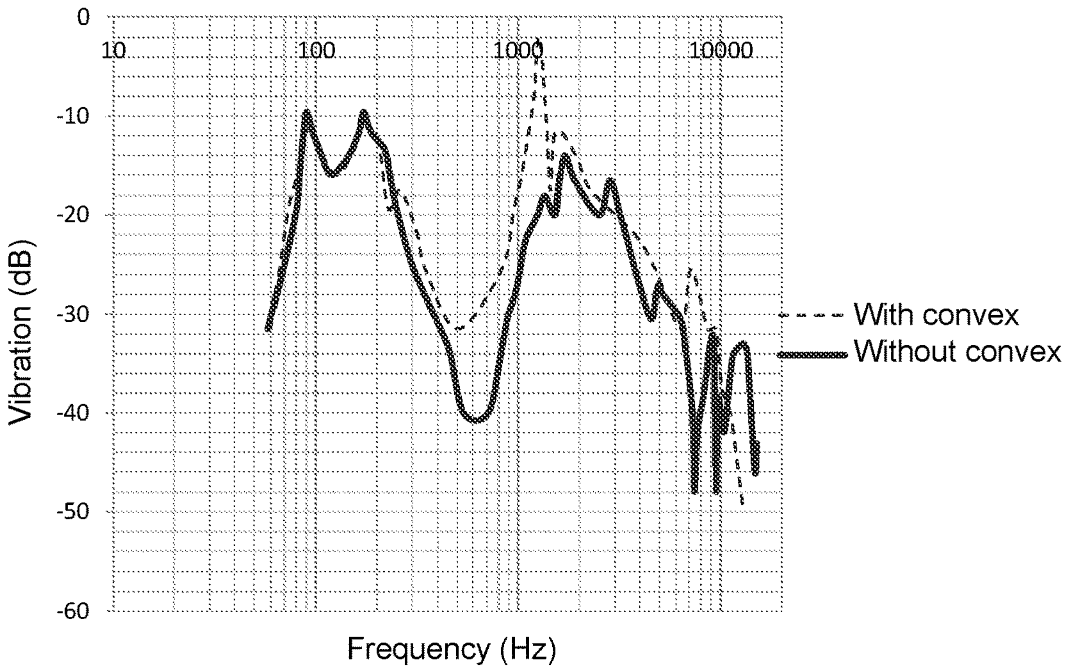
FIG. 88 shows the frequency response of a loudspeaker device containing different contact surfaces.

FIG. 88 shows the frequency response of a loudspeaker device containing different contact surfaces. The dotted line may correspond to the frequency response of a loudspeaker device with a convex structure on the contact surface, and the solid line may correspond to the frequency response of a loudspeaker device without a convex structure on the contact surface. In the mid-low frequency range (for example, in the range of 300 Hz to 1000 Hz), the vibration of the structure with a convex may be significantly weakened relative to that with the convex structure, which forms a "deep pit" on the frequency response curve and appears to be a less than ideal frequency response, thereby affecting the sound quality of the Loudspeaker device.

The above description of FIG. 88 is only an explanation for a specific example. For those skilled in the art, after understanding the basic principles that affect the frequency response of the loudspeaker device, various modifications and alterations can be made to the structure and components of loudspeaker device to obtain different frequency response effects.

It should be noted that, for those skilled in the art, the shape and structure of the contact surface 1601 is not limited to the above description, and may satisfy other specific requirements. For example, the convex or concave portions on the contact surface may be distributed on the edge of the contact surface or may be distributed in the middle of the contact surface. The contact surface may include one or more convex or concave portions, and the convex and concave portions may be distributed on the contact surface at the same time. The material of the convex or concave part of the contact surface may be other materials different from the material of the contact surface, it may be flexible, rigid, or a material more suitable for generating a specific pressure gradient; it may either be a memory material or a non-memory material; it may be a single-material material or a composite material. The structural graphics of the convex or concave part of the contact surface may include but not limited to axisymmetric graphics, center-symmetric graphics, rotationally-symmetric graphics, and asymmetric graphics. The structural graphic of the convex or concave portion of the contact surface may be two or more combinations of graphics. The contact surface may include but not limited to a certain degree of smoothness, roughness, and waviness. The position distribution of the convex or concave portion of the contact surface may include but not limited to axisymmetric, center-symmetric, rotationally-symmetric, and asymmetric distribution. The convex or concave part of the contact surface may be at the edge of the contact surface, and may also be distributed inside the contact surface.

Figure 89:
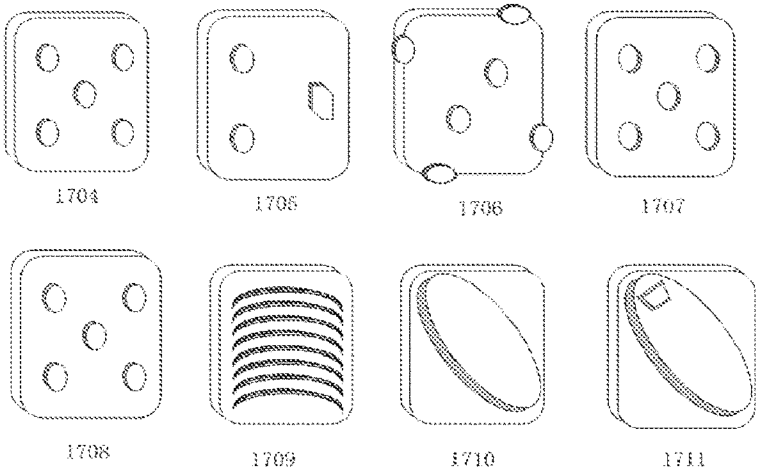
FIG. 89 is a schematic diagram illustrating a vibration unit contact surface of a loudspeaker device according to some embodiments of the present disclosure.

FIG. 89 shows various exemplary contact surface structures. Structure 1704 shown in the figure may be an example in which the contact surface includes various convexities with similar shapes and structures. The convexities may be made of the same or similar materials as the other parts of the panel, and may also be made of materials different from the other parts. In particular, the convexities may include a memory material and a vibration transmission layer material, wherein the proportion of the memory material may not be less than 10%, and preferably, the proportion of the memory material in the convexities may not be less than 50%. The area of a single convex may occupy 1%-80% of the total area, preferably, the proportion of the total area may be 5%-70%, and more preferably, the proportion of the total area may be 8%-40%. The area of all the convexities collectively may account for 5%-80% of the total area, and preferably, the ratio may be 10%-60%. There may be at least one convex, preferably, there may be one convex, more preferably, there may be two convexities, and even more preferably, there may be at least five convexities. The shape of the convexities may be a circle, an oval, a triangle, a rectangle, a trapezoid, an irregular polygon, or other similar graphics, the structure of the convexities may be symmetrical or asymmetrical, and the position distribution of the convex parts may be symmetrical or asymmetrical, the number of convex parts may be one or more, the height of the convexities may be the same or may not the same, the height and distribution of the convexities may form a certain gradient.

Structure 1705 shown in the figure may be an example in which the structure of the convexities of the contact surface may be a combination of two or more figures, where the number of the convexities in different figures may be one or more. The two or more convexities shapes may be any two or more combinations of circles, ovals, triangles, rectangles, trapezoids, irregular polygons, or shapes in other similar graphics. The material, number, area, and symmetry of the convexities may be similar to 1704 in the figure.

Structure 1706 shown in the figure may be an example in which the convex portions of the contact surface may be distributed on the edges and inside of the contact surface, and the number of the convex portions may not be limited to that shown in the figure. The number of the convexities at the edge of the contact surface may account for 1%-80% of the total number of convexities, preferably, the proportion may be 5%-70%, more preferably, the ratio may be 10%-50%, and even more preferably, the ratio may be 30%-40%. The material, number, area, shape, symmetry, etc. of the convexities may be similar to those in 1704.

Structure 1707 in the figure may be a structural graphic of the concave portion of the contact surface, the structure of the concave portion may be symmetrical or asymmetrical, and the position distribution of the concave portion may also be symmetrical or asymmetrical. The number of the concave portions may be one or more, the shape of the concave portions may be the same or different, and the concave portions may be hollow. The area of a single recess may occupy 1%-80% of the total area, preferably, the proportion of the total area may be 5%-70%, and more preferably, the proportion of the total area may be 8%-40%. All the concave areas may together account for 5%-80% of the total area, and preferably, the ratio may be 10%-60%. There may be at least one concave, preferably, there may be one concave, more preferably, there may be two concaves, and even more preferably, there may be at least five concaves. The shape of the concaves may be a circle, an oval, a triangle, a rectangle, a trapezoid, an irregular polygon, or other similar graphics.

Structure 1708 in the figure may be an example in which both the convex portion and the concave portion may exist on the contact surface, and the number of convexities and concave portions may not be limited to one or more. The ratio of the number of concaves to the number of convexities may be 0.1-100, preferably, the ratio may be 1-80, more preferably, the ratio may be 5-60, and even more preferably, the ratio may be 10-20. The material, area, shape, symmetry, etc. of the single convexities/concaves may be similar to 1704 in the figure.

Structure 1709 in the figure may be an example of a contact surface with a certain degree of waviness. The corrugation may be formed by more than two convexities/concaves or a combination of both, preferably, the distances between the adjacent convexities/concaves may be equal, more preferably, the distances between the convexities/concaves may be set in a progression manner.

Structure 1710 in the figure may be an example in which the contact surface has a large area of convex. The convex area may account for 30%-80% of the total area of the contact surface. Preferably, a portion of the edge of the convex and a portion of the edge of the contact surface may substantially contact each other.

Structure 1711 in the figure may be a contact surface with a first convex with a larger area and a second convex with a smaller area on the first convex. The convex with a larger area may account for 30%-80% of the total area of the contact surface, and the convex with a smaller area may account for 1%-30% of the total area of the contact surface. Preferably, the proportion may be 5%-20%. The smaller area may account for 5%-80% of the larger area, preferably, the ratio may be 10%-30%.

Figure 90:
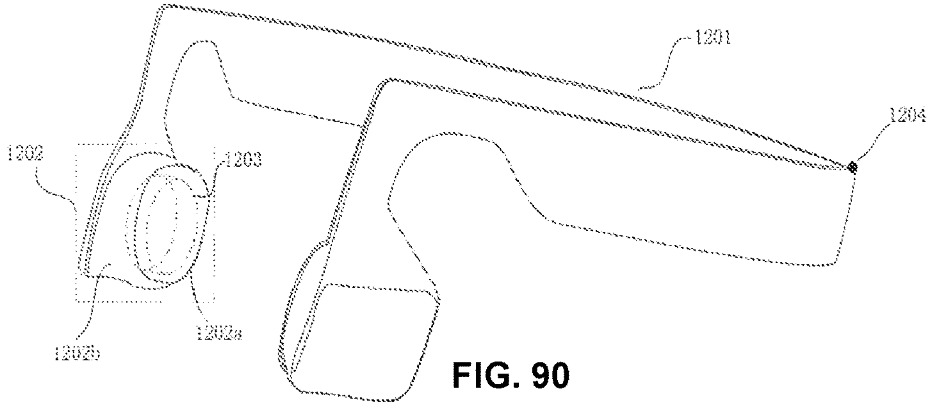
FIG. 90 illustrates a structure of a loudspeaker device according to some embodiments of the present disclosure.

FIG. 90 illustrates a structure of a loudspeaker device according to some embodiments of the present disclosure. Referring to FIG. 90, in some embodiments, the loudspeaker device may include a headset bracket/headset lanyard 1201, a vibration unit 1202, and an earphone core 1203. The vibration unit 1202 may include a contact surface **1202*a* and a housing 1202*b*. The earphone core 1203 is set within the vibration unit 1202 and is connected to it. The vibration unit 1202 may contact the user through the contact surface 1202*a*. For example, the contact surface 1202*a*** may be attached to any position of the user's head, such as the top of the head, a forehead, a cheek, a temple, an auricle, the back of an auricle, etc.

It should be noted that the earphone core 1203 may be equivalent to the earphone core 42 in the foregoing embodiments. The headset bracket/headset lanyard 1201 may include the ear hook 500, the rear hook 300, and the circuit housing 100 in the foregoing embodiments, which are used to refer to structures of fixing the loudspeaker device to the human head. The speaker component 83 in the foregoing embodiments may include the vibration unit 1202, which is used to refer to a structure of the loudspeaker device for generating a sound.

During usage, the loudspeaker device may be fixed to some special parts of a user body, for example, the head, by means of the headset bracket/headset lanyard 1201, which provides a clamping force between the vibration unit 1202 and the user. The contact surface **1202*a* may be connected to the earphone core 1203, and keep contact with a user for transferring vibrations to the user. In some embodiments, the loudspeaker device has a symmetrical structure, and driving forces provided by transducers at two sides are equal and opposite, and the midpoint of the headset bracket/headset lanyard 1201 may be selected as an equivalent fixed end accordingly, for example, the position 1204. In some other embodiments, the driving forces provided by the transducers at two sides are unequal, in other words, the loudspeaker device generates stereo, or the loudspeaker device has an asymmetric structure, and other points or areas on/off the headset bracket/headset lanyard 1201 may be chosen as the equivalent fixed end. The fixed end described herein may be an equivalent end relatively fixed when the loudspeaker device works. In some embodiments, changing the clamping force provided by the headset bracket/headset lanyard 1201, and changing the physical parameter of the headset bracket/headset lanyard 1201, may change the sound transmission efficiency of the loudspeaker device and may affect the frequency response in the specific frequency range. For example, the headset bracket/headset lanyard 1201 with different intensity materials may provide different clamping forces. Changing the structure of the headset bracket/headset lanyard 1201, for example, by adding an assistant device with elastic force may also change the clamping force, therefore affecting the sound transmission efficiency. Different sizes of the headset bracket/headset lanyard 1201 may also affect the clamping force, which increases as the distance between two vibration units 1202** increases.

Further, to obtain the headset bracket/headset lanyard 1201 with a certain clamping force, a person having ordinary skill in the art may practice variations or modifications based on actual situations, like choosing a material with different stiffness, modulus, or changing the size of the headset bracket/headset lanyard 1201 under the teaching of the present disclosure. It should be noted that different clamping forces may affect not only the sound transmission efficiency but also the user experience in the lower frequency range. The clamping force described herein refers to a force between a contact surface and a user. Preferably, the clamping force is between 0.1N to 5N. More preferably, the clamping force ranges from 0.1N to 4N. More preferably, the clamping force ranges from 0.2N to 3N. More preferably, the clamping force ranges from 0.2N to 1.5N. And further preferably, the clamping force ranges from 0.3N to 1.5N.

In some embodiments, the clamping force of the headset bracket/headset lanyard 1201 may be determined by the material. Preferably, the material used in the headset bracket/headset lanyard 1201 may include plastic with certain hardness, for example, but not limited to, Acrylonitrile butadiene styrene (ABS), Polystyrene (PS), High Impact polystyrene (HIPS), Polypropylene (PP), Polyethylene terephthalate (PET), Polyester (PES), Polycarbonate (PC), Polyamides (PA), Polyvinyl chloride (PVC), Polyurethanes (PU), Polyvinylidene chloride Polyethylene (PE), Polymethyl methacrylate (PMMA), Polyetheretherketone (PEEK), Melamine formaldehyde (MF), or the like, or any combination thereof. More preferably, the materials of the headset bracket/headset lanyard 1201 may include metal, alloy (for example, aluminum alloy, chromium-molybdenum alloy, a scandium alloy, magnesium alloy, titanium alloy, magnesium-lithium alloy, nickel alloy), or compensate, etc. Further, the material of the headset bracket/headset lanyard 1201 may include a memory material. The memory material may include but not limited to memory alloy, memory polymer, Inorganic memory material, etc. Memory alloy may include titanium-nickel-copper memory alloy, titanium-nickel-iron memory alloy, titanium-nickel-chromium memory alloy, copper-nickel-based memory alloy, copper-aluminum-based memory alloy, copper-zinc-based memory alloy, iron-based memory alloy, etc. Memory polymer may include but not limited to Polynorbonene, trans-polyisoprene, styrene-butadiene copolymer, cross-linked polyethylene, polyurethanes, lactones, fluorine-containing polymers, polyamides, crosslinked polyolefin, polyester, etc. Memory inorganic material may include but not limited to memory ceramics, memory glass, garnet, mica, etc. Furthermore, the memory material may have selected memory temperature. Preferably, the memory temperature may not be lower than 10° C. More preferably, the memory temperature may not be lower than 40° C. More preferably, the memory temperature may not be lower than 60° C. Moreover, further preferably, the memory temperature may not be lower than 100° C. The percentage of the memory material in the headset bracket/headset lanyard 1201 may not be less than 5%. More preferably, the percentage may not be less than 7%. More preferably, the percentage may not be less than 15%. More preferably, the percentage may not be less than 30%. Moreover, further preferably, the percentage may not be less than 50%. The headset bracket/headset lanyard 1201 herein refers to a hang-back structure that provides a clamp force for the loudspeaker device. The memory material may be at different locations of the headset bracket/headset lanyard 1201. Preferably, the memory material may be at the stress concentration location of the headset bracket/headset lanyard 1201, for example but not limited to the joints between the headset bracket/headset lanyard 1201 and the vibration unit, the symmetric center of the headset bracket/headset lanyard 1201, or at a location where wires within the headset bracket/headset lanyard 1201 are intensively distributed. In some embodiments, the headset bracket/headset lanyard 1201 may be made of a memory alloy, which reduces the clamping force difference for different users and improves the consistency of tone quality which is affected by the clamping force. In some embodiments, the headset bracket/headset lanyard 1201 made of a memory alloy may be elastic enough, thus being able to recover to its original shape after a large deformation, and in addition, may stably maintain the clamping force after long time deformation. In some embodiments, the headset bracket/headset lanyard 1201 made of a memory alloy may be light enough and flexible enough to provide great deformation and distortion and be better connected to a user.

Figure 91:
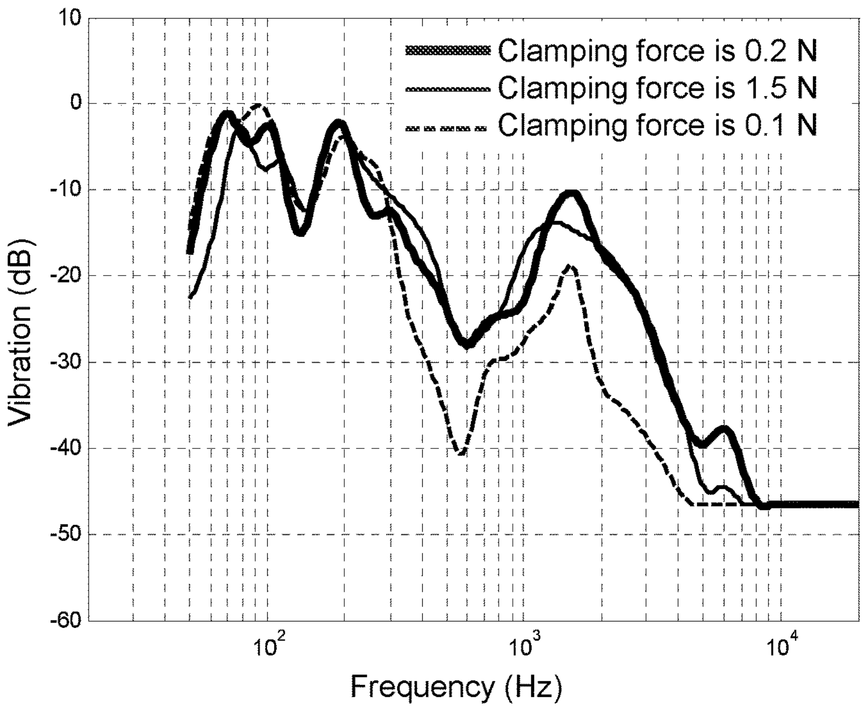
FIG. 91 illustrates vibration response curves of a loudspeaker device according to some embodiments of the present disclosure.
Figure 92:
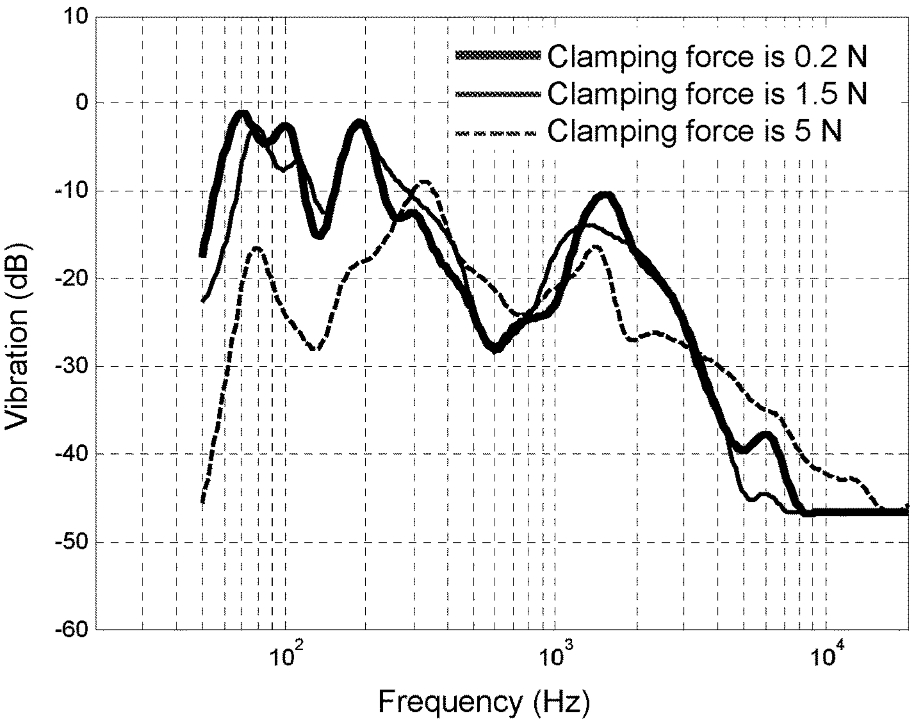
FIG. 92 illustrates vibration response curves of a loudspeaker device according to some embodiments of the present disclosure.

Further, the clamping force provides the pressure between the contact surface of the vibration generating portion of the loudspeaker device and the user. FIG. 91 illustrates vibration response curves of a loudspeaker device according to some embodiments of the present disclosure. FIG. 92 illustrates vibration response curves of a loudspeaker device according to some embodiments of the present disclosure. Referring to FIGS. 91 and 92, specifically, in a process of vibration transmission, if a clamping force is lower than a certain threshold, it may not facilitate the transmission of high frequency vibration. As shown in FIG. 91, for the same vibration source (sound source), midrange-frequency and high-frequency portions of a vibration (sound) received by a wearer when the clamping force is 0.1 N may be significantly less than those of a received vibration (sound) when the clamping force is 0.2 N and 1.5 N. That is, with respect to sound quality, the performance of the midrange-frequency and high-frequency portions when the clamping force is 0.1 N may be weaker than the performance of those when the clamping force is between 0.2 N to 1.5 N. Similarly, in the process of vibration transmission, if the clamping force is greater than a certain threshold, it may not facilitate the transmission of low-frequency vibration. As shown in FIG. 92, for the same vibration source (sound source), midrange-frequency and low-frequency portions of a vibration (sound) received by the wearer when the clamping force is 5.0 N may be significantly less than those of a received vibration (sound) when the clamping force is 0.2 N and 1.5 N. That is, with respect to sound quality, the performance of the low-frequency portion when the clamping force is 5.0 N may be weaker than the performance of that when the clamping force is between 0.2 N to 1.5 N.

In a specific embodiment, by selecting a suitable material of the headset bracket/headset lanyard 1201 and setting the appropriate structure of the headset bracket/headset lanyard 1201, the pressure between the contact surface and the user may be kept in a proper range. The pressure between the contact surface and the user may be greater than a certain threshold. Preferably, the threshold may be 0.1 N. More preferably, the threshold may be 0.2 N. More preferably, the threshold may be 0.3 N. Even more preferably, the threshold may be 0.5 N. The pressure between the contact surface and the user may be less than another threshold. Preferably, the threshold may be 5.0 N. More preferably, the threshold may be 4 N. Even more preferably, the threshold may be 3 N. Even more preferably, the threshold may be 1.5 N.

It should be noted that those skilled in the art, after understanding the basic principle that the clamping force of the loudspeaker device changes the frequency response of the sound transmission system, can, on this basis, modify and replace the material and structure of the headset bracket/headset lanyard, so as to set the clamping force range meeting different sound quality requirements, and these modifications and replacement are still within the protection scope of this disclosure.

Figure 93:
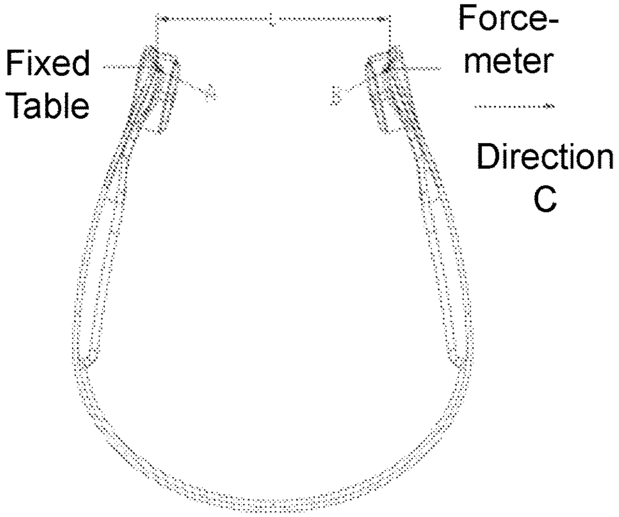
FIG. 93 illustrates a process for testing a clamping force of a loudspeaker device according some embodiments of the present disclosure.
Figure 94:
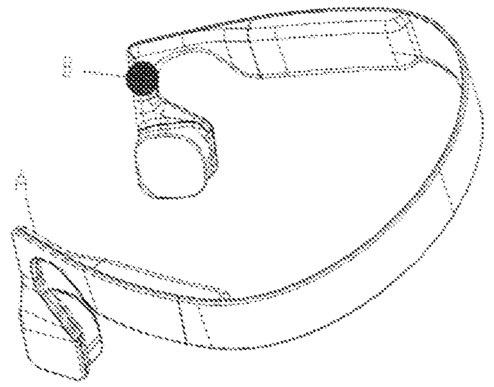
FIG. 94 illustrates a process for testing a clamping force of a loudspeaker device according some embodiments of the present disclosure.

The clamping force of the loudspeaker device may be tested with certain devices or methods. FIG. 93 illustrates a process for testing a clamping force of a loudspeaker device according some embodiments of the present disclosure. FIG. 94 illustrates a process for testing a clamping force of a loudspeaker device according some embodiments of the present disclosure. Point A and point B may be close to the vibration unit of the headset bracket/headset lanyard 1201 of the loudspeaker device. In the testing process, one of the point A or the point B may be fixed, and the other one of the point A or the point B may be connect to a force-meter. When a distance between the point A and the point B is in a range (e.g., a range from 125 mm to 155 mm), the clamping force may be obtained.

Figure 95:
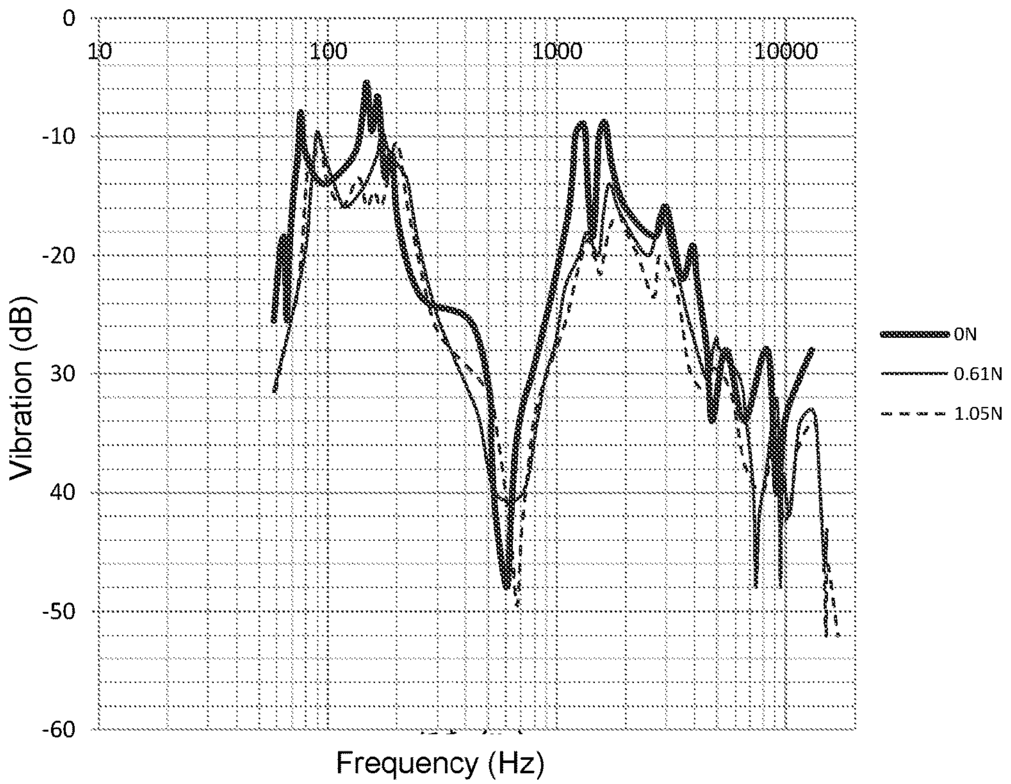
FIG. 95 illustrates three frequency vibration response curves corresponding to different clamping forces of a loudspeaker device according to some embodiments of the present disclosure.

Further, FIG. 95 illustrates three frequency vibration response curves corresponding to different clamping forces of a loudspeaker device according to some embodiments of the present disclosure. As illustrated in FIG. 95, clamping forces corresponding to the three curves in the figure may be 0N, 0.61 N, and 1.05 N, respectively. The load on the vibration unit of the loudspeaker device, which may be generated by a user's face, may be larger with an increasing clamping force of the loudspeaker device, and vibrations from a vibration area may be reduced. A loudspeaker device with too small clamping force or too large clamping force may lead to an unevenness (e.g., a range from 500 Hz to 800 Hz on curves corresponding to 0 N and 1.05 N, respectively) on the frequency response during vibration. If the clamping force is too large (e.g., the curve corresponding to 1.05 N), a user may feel uncomfortable, and vibrations of the loudspeaker device may be reduced, and sound volume may be lower. If the clamping force is too small (e.g., the curve corresponding to 0 N), a user may feel more apparent vibrations from the loudspeaker device.

Figure 96:
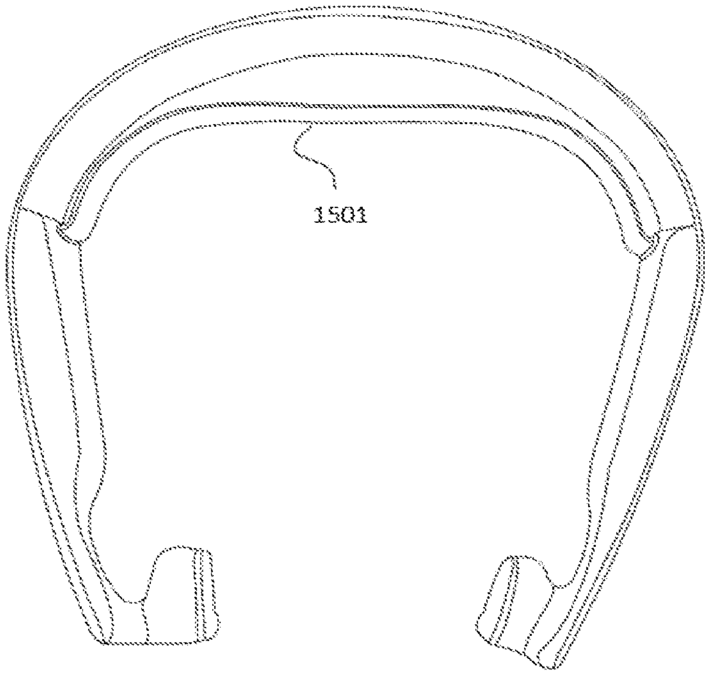
FIG. 96 illustrates a configuration to adjust the clamping force of a loudspeaker device according to some embodiments of the present disclosure.

Further, an adjustment unit used to adjust the clamping force may be installed on the loudspeaker device. For example, as shown in FIG. 96, FIG. 96 illustrates a configuration to adjust the clamping force of a loudspeaker device according to some embodiments of the present disclosure. An elastic bandage 1501 may be installed on the headset bracket/headset lanyard 1201 of the loudspeaker device. The elastic bandage 1501 may provide an additional recovery force when the headset bracket/headset lanyard 1201 is compressed or stretched off a balanced position.

In some embodiments, the headset bracket/headset lanyard 1201 may include a memory alloy. The headset bracket/headset lanyard 1201 may match the curves of different users' heads and have a good elasticity and a better wearing comfort. The headset bracket/headset lanyard 1201 may recover to its original shape from a deformed status last for a certain period. As used herein, the certain period may refer to ten minutes, thirty minutes, one hour, two hours, five hours, or may also refer to one day, two days, ten days, one month, one year, or a longer period. The clamping force that the headset bracket/headset lanyard 1201 provides may keep stable, and may not decline gradually over time. The force intensity between the loudspeaker device and the body surface of a user may be within an appropriate range, so as to avoid pain or clear vibration sense caused by undue force when the user wears the loudspeaker device. Moreover, the clamping force of the loudspeaker device may be within a range of 0.2 N-1.5 N when the loudspeaker device is used.

In some embodiments, the elastic coefficient of the headset bracket/headset lanyard 1201 may be kept in a specific range, which results in the value of the frequency response curve in low frequency (e.g., under 500 Hz) being higher than the value of the frequency response curve in high frequency (e.g., above 4000 Hz).

Figure 97:
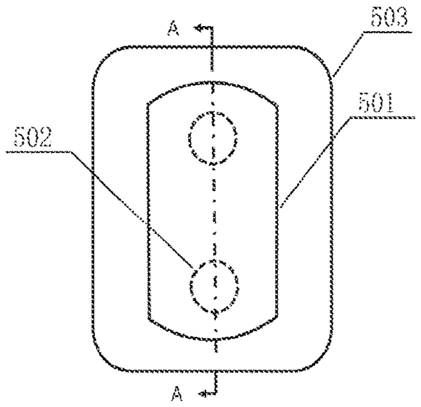
FIG. 97 is a top view illustrating a bonding panel of a loudspeaker device according to some embodiments of the present disclosure.
Figure 98:
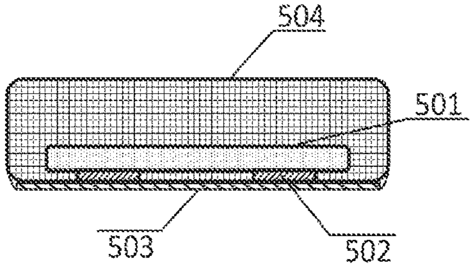
FIG. 98 is a top view illustrating a bonding panel of a loudspeaker device according to some embodiments of the present disclosure.

In some embodiments, a side of the core housing 41 close to the user may include a panel 501 and a vibration transmission layer 503. FIG. 97 is a top view illustrating a bonding panel of a loudspeaker device according to some embodiments of the present disclosure. FIG. 98 is a top view illustrating a bonding panel of a loudspeaker device according to some embodiments of the present disclosure.

In some embodiments, the vibration transmission layer may be provided at the outer surface of the side wall of the core housings 41 that is in contact with the human body. The vibration transmission layer in this embodiment may be a specific embodiment of changing the physical characteristics of the contact surface of the vibration unit to change the sound transmission effect. Different regions on the vibration transmission layer 503 may have different transmission effects on vibration. For example, a first contact surface region and a second contact surface region may exist on the vibration transmission layer 53. Preferably, the first contact surface region may not be attached to the panel, and the second contact surface region may be attached to the panel. More preferably, when the vibration transmitting layer 503 is in direct or indirect contact with the user, the clamping force on the first contact surface region may be less than that on the second contact surface region (the clamping force mentioned here may refer to the pressure between the contact surface of the vibration unit and the user). Further preferably, the first contact surface region may not be in direct contact with the user, and the second contact surface region may be in direct contact with the user and transmit vibration. The area of the first contact surface region may be different from that of the second contact surface region. Preferably, the area of the first contact surface region may be less than that of the second contact surface region. More preferably, there may be small holes in the first contact surface region to further reduce the area of the first contact region. The outer surface of the vibration transmission layer 503 (that is, the surface facing the user) may be flat or may be uneven. Preferably, the first contact surface region and the second contact surface region may be not on a same plane. More preferably, the second contact surface region may be higher than the first contact surface region. Further preferably, the second contact surface region and the first contact surface region may constitute a step structure. Still further preferably, the first contact surface region may be in contact with the user, and the second contact surface region may not be in contact with the user. The materials of the first contact surface region and the second contact surface region may be the same or different, and may be one or more combination of materials of the vibration transmission layer 503 described above.

As shown in FIGS. 97 and 98, in some embodiments, the panel 501 and the vibration transmission layer 503 may be bonded by glues 502. The glued joints may be located at both ends of the panel 501, and the panel 501 may be located in a housing formed by the vibration transmitting layer 503 and the housing 504. Preferably, the projection of the panel 501 on the vibration transmission layer 503 may be the first contact surface region, and region located around the first contact surface region may be the second contact surface region.

Figure 99:
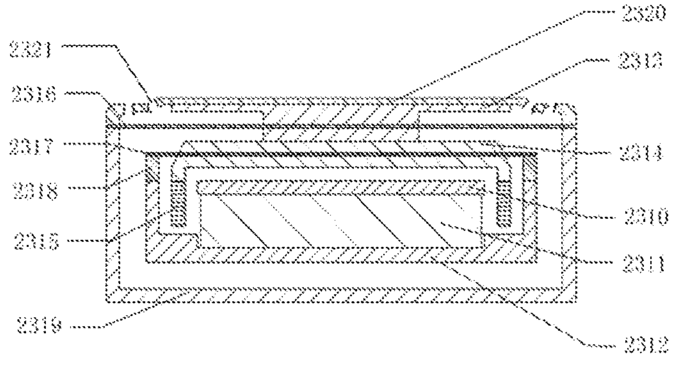
FIG. 99 is a structural diagram illustrating a vibration generating portion of a loudspeaker device according to some embodiments of the present disclosure.

As a specific embodiment, as shown in FIG. 99, the earphone core may include a magnetic circuit system including a magnet 2311, a magnetic conductive plate 2310, and a magnetic conductive magnet 2312. The earphone core may also include a vibration plate 2314, a coil 2315, a first vibration transmission plate 2316, a second vibration transmission plate 2317, and a washer 2318. The panel 2313 may protrude out of the housing 2319 and bond with the vibration plate 2314 by glues. The first vibration transmission plate 2316 may fix the earphone core on the housing 2319 to form a suspension structure. A vibration transmission layer 2320 (such as but not limited to silica gel) may be added to the panel 2313, and the vibration transmission layer 2320 may generate a certain deformation to adapt to the skin shape. A portion of the vibration transmission layer 2320 that is in contact with the panel 2313 may be higher than a portion of the vibration transmission layer 2320 that is not in contact with the panel 2313, forming a step structure. One or more guiding holes 2321 may be designed in a portion where the vibration transmission layer 2320 does not contact with the panel 2313 (the portion where the vibration transmission layer 2320 does not protrude in FIG. 99). Designing guiding holes in the vibration transmission layer may reduce sound leakage: the connection between the panel 2313 and the housing 2319 through the vibration transmission layer 2320 may be weakened, and the vibration transmitted from the panel 2313 to the housing 2319 through the vibration transmission layer 2320 may be reduced, thereby reducing the sound leakage caused by the vibration of the housing 2319; the area of the non-protruding part of the vibration transmission layer 2320 may be reduced by providing guiding holes 2321, reducing the amount of air that can be actuated, and reducing the sound leakage caused by air vibration; after the guiding holes 2321 are provided in the non-protruding part of the vibration transmission layer 2320, the air vibration in the housing may be guided out of the housing, and the air vibration caused by the housing 2319 may cancel each other out, and reduce sound leakage. It should be noted that, since the guiding holes 2321 lead out the sound waves in the composite vibration apparatus housing, and superimpose with the sound leakage sound wave to reduce the sound leakage, the guiding holes may also be called the sound guiding holes.

In some embodiments, the vibration transmitting layer 503 mentioned in the foregoing embodiments may be the same structure. Similarly, the panel mentioned in the foregoing embodiments may be the same structure. The earphone core may include the composite vibration device mentioned in the foregoing embodiments.

What needs to be explained here is that, in this embodiment, since the panel 2313 protrudes out of the housing of the loudspeaker device, and at the same time, the first vibration transmission plate 2316 may be used to connect the panel 2313 to the housing 2319 of the loudspeaker device, the degree of coupling between the panel 2313 and the housing 2319 may be greatly reduced, and the first vibration transmission plate 2316 may provide a certain amount of deformation, so that the panel 2313 may have a higher degree of freedom when it attaches the user to better adapt to complex skin surfaces. The first vibration transmission plate 2316 may cause the panel 2313 to incline at a certain angle relative to the housing 2319. Preferably, the angle of inclination may not exceed 5 degrees.

Figure 100:
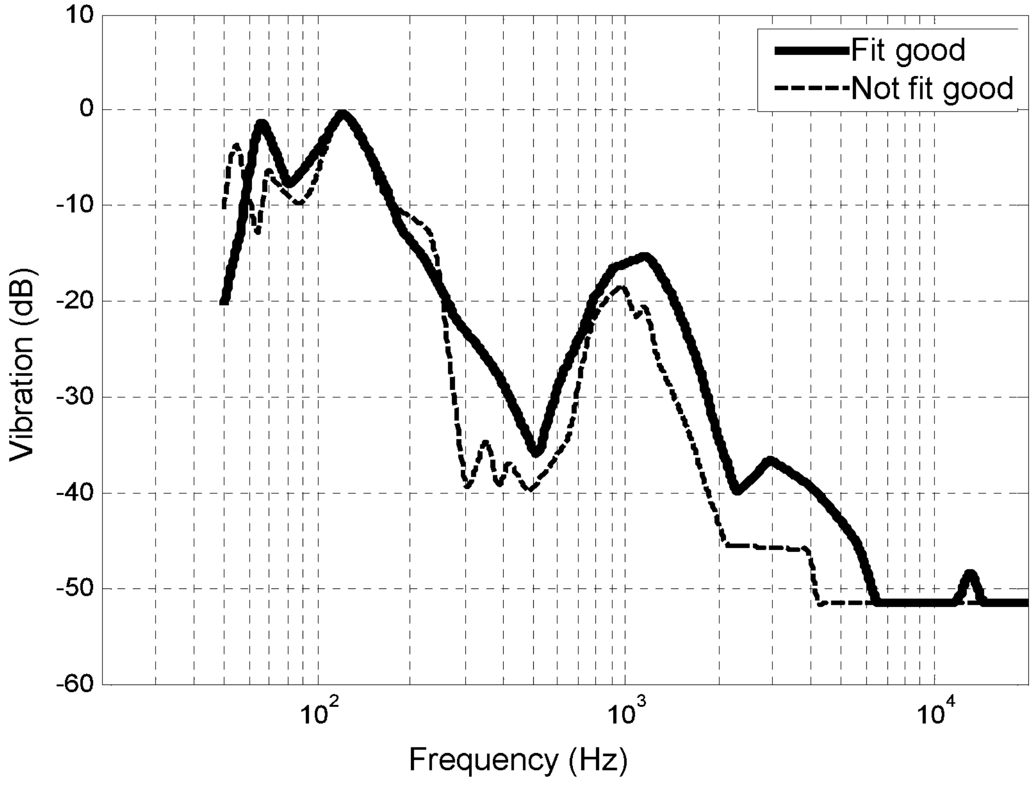
FIG. 100 is a vibration response graph of a vibration generating portion of a loudspeaker device according to some embodiments of the present disclosure.

Further, the vibration efficiency of the loudspeaker device may vary with the bonding states. A good bonding state may have higher vibration transmission efficiency. As shown in FIG. 100, the thick line may show the vibration transmission efficiency in a good bounding state, and the thin line shows the vibration transmission efficiency in a bad bounding state. It may be seen that the better bounding state may have higher vibration transmission efficiency.

Figure 101:
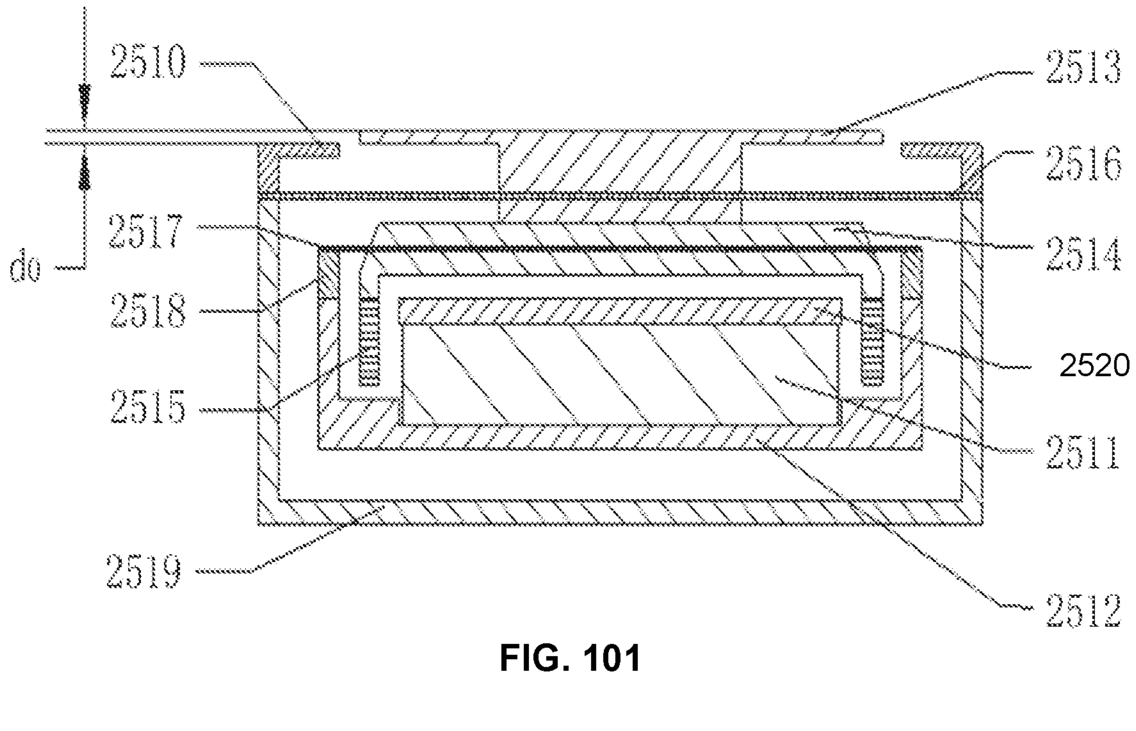
FIG. 101 is a structural diagram illustrating a vibration generating portion of a loudspeaker device according to some embodiments of the present disclosure.

FIG. 101 is a structural diagram illustrating a vibration generating portion of a loudspeaker device according to some embodiments of the present disclosure. As shown in FIG. 101, as a specific embodiment, in this embodiment, the earphone core may include a magnetic circuit system including a magnetic conductive plate 2520, a magnet 2511, and a magnetic conductive magnet 2512. The earphone core may also include a vibration sheet 2514, coils 2515, a first vibration transmission plate 2516, a second vibration transmission plate 2517, and a washer 2518. The panel 2513 may protrude out of the housing 2519 and bond with the vibration plate 2514 by glues, and the first vibration transmission plate 2516 may fix and connect the earphone core to the housing 2519 to form a suspension structure.

The difference between this embodiment and the embodiment provided in the FIG. 99 may lie in: an enclosure may be added to the edge of the housing, during the process of the housing contacting the skin, the enclosure may make the force distribution more uniform, and increase the wearing comfort of the loudspeaker device. There is a height difference d0 between the surrounding edge 2510 and the panel 2513. The force of the skin acting on the panel 2513 may reduce the distance between the panel 2513 and the surrounding edge 2510. When the pressure between the loudspeaker device and the user is greater than the force experienced when the first vibration transmission plate 2516 is deformed into d0, excessive clamping force may be transmitted to the skin through the surrounding edge 2510 without affecting the clamping force of the vibrating part, making the clamping force more consistent, thereby ensuring sound quality.

In some embodiments, the first vibration transmission plate mentioned in the foregoing embodiments may be the same structure, and the second vibration transmission plate mentioned in the foregoing embodiments may be the same structure. Similarly, the washer, the panel, and the housing mentioned in the foregoing embodiments may be the same structure, respectively.

Under normal circumstances, the sound quality of the loudspeaker device may be affected by many factors such as the physical properties of the components of the loudspeaker device itself, the vibration transmission relationship between the components, the vibration transmission relationship between the loudspeaker device and the outside world, and the efficiency of the vibration transmission system when transmitting vibrations. The components of the loudspeaker device itself may include components generating vibration (such as but not limited to earphone core), components fixing the loudspeaker device (such as, but not limited to ear hook 500/core housing 41), and components transmitting vibration (such as but not limited to panels, vibration transmission layers, etc.). The vibration transmission relationship between the various components and the vibration transmission relationship between the loudspeaker device and the outside world may be determined by the contact method (such as but not limited to clamping force, a contact area, a contact shape, etc.) between the loudspeaker device and the user.

Figure 102:
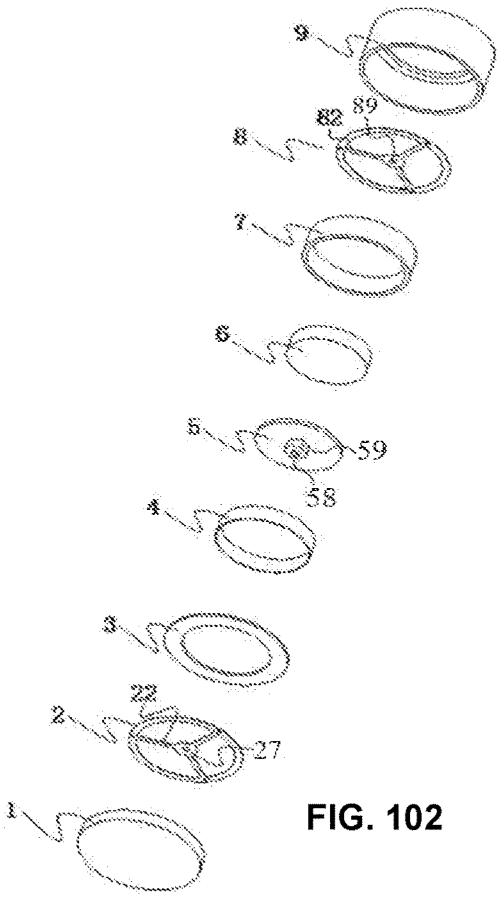
FIG. 102 is an exploded three-dimensional schematic diagram of a dual positioning loudspeaker device according to some embodiments of the present disclosure.
Figure 103:
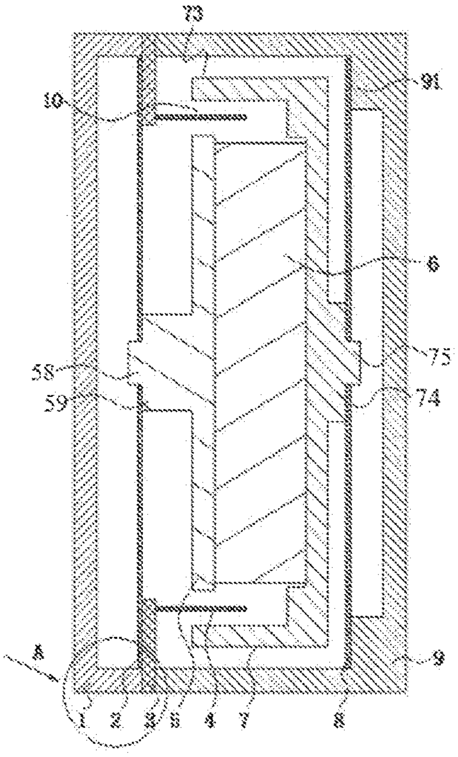
FIG. 103 is a cross-sectional view of a dual positioning loudspeaker device according to some embodiments of the present disclosure.
Figure 104:
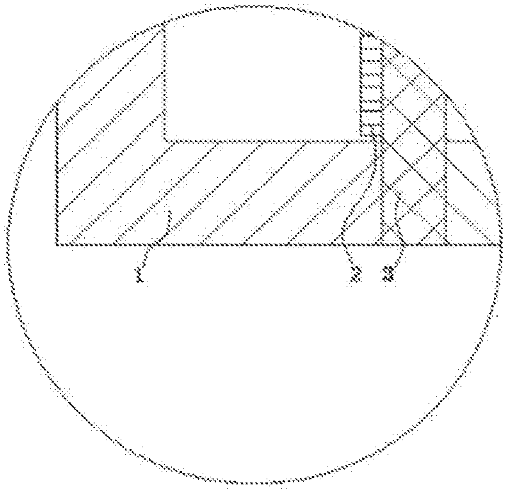
FIG. 104 is partial enlarged view along the direction A in FIG. 103.
Figure 105:
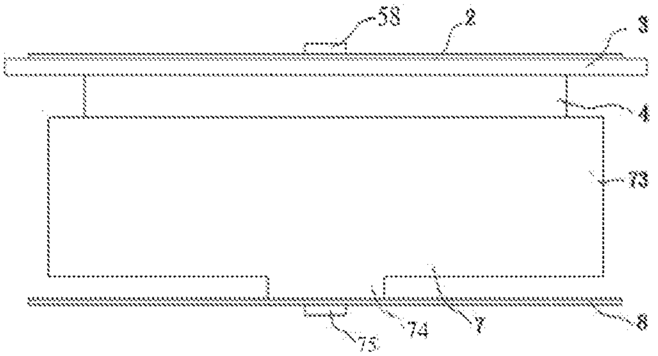
FIG. 105 is a combined schematic diagram of a dual positioning loudspeaker device (removing the support part) according to some embodiments of the present disclosure.
Figure 106:
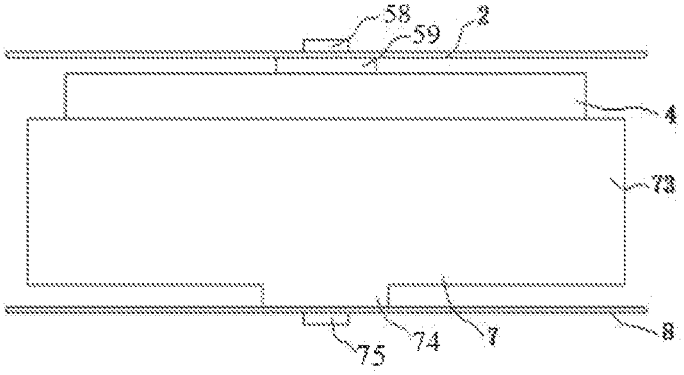
FIG. 106 is an assembly schematic diagram of a magnetic component, a positioning component, and a voice coil in FIG. 105.
Figure 107:
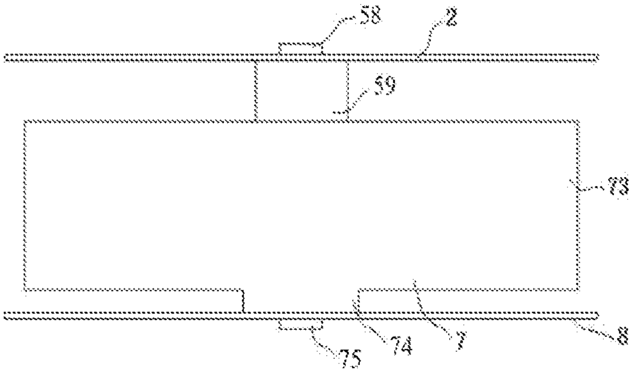
FIG. 107 is an assembly diagram of a magnetic component and a positioning component in FIG. 105.
Figure 108:
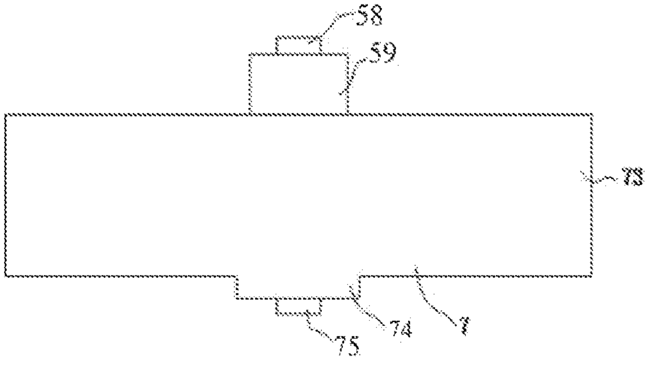
FIG. 108 is a schematic structural diagram of a magnetic component in FIG. 105.
Figure 109:
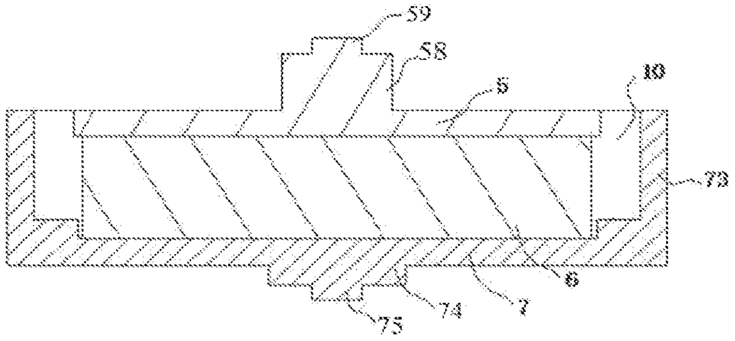
FIG. 109 is a sectional view of FIG. 108.

FIG. 102 is an exploded three-dimensional schematic diagram of a dual positioning loudspeaker device according to some embodiments of the present disclosure. FIG. 103 is a cross-sectional view of a dual positioning loudspeaker device according to some embodiments of the present disclosure. FIG. 104 is partial enlarged view along the direction A in FIG. 103. FIG. 105 is a combined schematic diagram of a dual positioning loudspeaker device (removing the support part) according to some embodiments of the present disclosure. FIG. 106 is an assembly schematic diagram of a magnetic component, a positioning component, and a voice coil in FIG. 105. FIG. 107 is an assembly diagram of a magnetic component and a positioning component in FIG. 105. FIG. 108 is a schematic structural diagram of a magnetic component in FIG. 105. FIG. 109 is a sectional view of FIG. 108. Referring to FIG. 102 to FIG. 109, in some embodiments, the dual positioning loudspeaker device may include an earphone core and a support part (i.e., the core housing in the foregoing embodiment). The earphone core may include a magnetic component, an (elastic) positioning component arranged between the magnetic component and the support part, a voice coil, and a washer.

In some embodiments, the magnetic component may include a first magnetic conductive magnet 5, a second magnetic conductive magnet 7 and a magnet 6. The magnet mentioned here may be, but is not limited to, aluminum-iron-boron, cobalt-nickel-aluminum, rare earth materials, composite materials, and permanent magnet ferrites. The magnetic conductive magnet mentioned here is also referred to a magnetic field concentrator or an iron core, which may be but not limited to laminations or block elements made of soft magnetic materials. The soft magnetic materials mentioned here may be, but not limited to, silicon steel sheets, ferrite, and iron. The magnet 6 may be arranged between the first magnetic conductive magnet 5 and the second magnetic conductive magnet 7. Preferably, the first magnetic conductive magnet 5 and the second magnetic conductive magnet 7 may be fixed on both sides of the magnet 6 respectively. The first magnetic conductive magnet 5, the second magnetic conductive magnet 7, and the magnet 6 may be connected as a whole in a certain way, which may be a physical way, such as clamping and welding, or a chemical way, such as bonding. Preferably, the first magnetic conductive magnet 5, the second magnetic conductive magnet 7, and the magnet 6 may be connected as a whole by bonding. The first magnetic conductor 5, the second magnetic conductive magnet 7, and the magnet 6 may be arranged coaxially Preferably, the first magnetic conductor 5, the second magnetic conductive magnet 7, and the magnet 6 may be all arranged as structures with the same axis of symmetry. The structures with the axis of symmetry may be a ring structure, a columnar structure, or other structures with an axis of symmetry.

According to FIG. 102 and FIG. 103, in some embodiments, the support part (i.e., the core housing in the foregoing embodiment) may include a first housing 1 and a second housing 9. The first housing 1 may be connected with the second housing to form an accommodation space for accommodating the magnetic component, the elastic element, and/or the voice coil. The first housing 1 and the first magnetic conductive magnet 5 may be on the same side, and there may be a gap between them. The second housing 9 and the second magnetic conductive magnet 7 may be on the same side, and there may be a gap between them. The support part mentioned here may be a bracket or other device that may support the magnetic component and the positioning component.

In some embodiments, a washer 3 may be fixedly arranged in an accommodation space formed by the first housing 1 and the second housing 9, and the washer 3 is preferably annular. The inner diameter of the annular washer 3 may be smaller than the inner diameters of the first housing 1 and the second housing 9, so that the inner side of the annular washer 3 protrudes toward the inside with respect to the first housing 1 and the second housing 9. The outer diameter of the annular washer 3 may be the same or different from the outer diameters of the first housing 1 and the second housing 9. Preferably, the outer diameter of the annular washer 3 may be the same as the outer diameters of the first housing 1 and the second housing 9 to form a smooth and flat outer plane. The washer 3 may be fixedly arranged at the junction of the first housing 1 and the second housing 9, or may be fixedly mounted on the inner side of the accommodation space formed by the first housing 1 and the second housing 9. The washer 3, the first housing 1, and the second housing 9 may be connected in a certain manner as a whole. The above-mentioned connection method may be a physical method, such as clamping and welding, or a chemical method, such as bonding. Preferably, the washer 3, the first housing 1, and the second housing 9 may be connected as a hole by bonding.

In some embodiments, inside the second housing 9, that is, on the side facing the first housing 1, a stepped surface 91 may be disposed on the bottom surface, and the lower surface of the second elastic element 8 is fixedly provided on the stepped surface 91. The second elastic element 8 and the stepped surface 91 may be connected together in a certain manner. The above-mentioned connection method may be a physical method, such as clamping and welding, or a chemical method, such as bonding. Preferably, the second elastic element 8 and the stepped surfaces 91 may be connected by bonding.

In some embodiments, a voice coil 4 may be fixed on the washer 3, and the voice coil 4 may be fixed on the lower surface of the inner side of the washer 3. The washer 3 and the voice coil 4 may be connected in a certain way as a whole. The connection method may be a physical method, such as clamping and welding, or a chemical method, such as bonding. Preferably, the washer 3 and the voice coil 4 may be connected as a whole by bonding. The voice coil 4 continues to extend downward from the lower surface of the inner side of the washer 3 and may be located in the magnetic gap formed by the ring-shaped side edge 73 of the first magnetic conductive magnet 5 and the second magnetic conductive magnet 7.

It should be noted that the voice coil 4 may be equivalent to the voice coil 1808 in the foregoing embodiment.

According to FIG. 102, FIG. 104, FIG. 105, FIG. 106, FIG. 107 and FIG. 108, in some embodiments, the center of the first magnetic conductive magnet 5 may be provided with a protruding first step 59. The first step 59 may extend away from the magnet 6 and the second magnetic conductive magnet 7. A vibration space may be formed between the first magnetic conductive magnet 5 and the first elastic element 2 through the first step 59 to ensure that the first elastic element 2 may drive the first magnetic conductive magnet 5 to vibrate. If the first step 59 is not provided, although the first elastic element 2 may drive the magnetic component to vibrate, noise may be produced. The deformation of the center region of the elastic element may be the largest along the axis of symmetry, and the deformation of the region of the sides and the region bonded with the housing may be the smallest. Since the elastic element drives the magnetic component to vibrate, and the displacement of the magnetic component in the axial direction is the deformation of the center of the elastic element, the height of the first step 59 may ensure the size of the vibration space formed between the magnetic component and the elastic element. Preferably, the height of the first step 59 may be greater than the maximum value of the deformation of the elastic element in the direction of the axis of symmetry in the central region, so as to prevent the magnetic component from hitting the elastic element during movement and causing noise. At the center of the first step 59, a protruding first positioning portion 58 may be provided. The extending direction of the first positioning portion 58 may be away from the magnet 6 and the second magnetic conductive magnet 7 and the first magnetic conductive magnet 5 may be positioned by the first positioning part 58.

In some embodiments, the periphery of the second magnetic conductive magnet 7 may be provided with a convex side 73 extending upward, and preferably, the side 73 may be annular. The side 73 may extend from the second magnetic conductive magnet 7 toward the first magnetic conductive magnet 5 and the magnet 6. The diameter of the side 73 may be greater than the outer diameter of the first magnetic conductive magnet 5, so that a magnetic gap is formed between the side 73 and the first magnetic conductive magnet 5, and a strong magnetic field is formed in the magnetic gap.

In some embodiments, the center of the second magnetic conductive magnet 7 may be provided with a stepped portion, and the inner bottom may be set to be lower and thinner, so that a concave portion may be formed relative to the stepped portion. The center of the second magnetic conductive magnet 7 may also are not provided with the stepped portion and the concave portion. The concave portion mentioned here may be used to place the magnet, and the magnet may be fixedly connected in the concave portion of the second magnetic conductive magnet 7 in a certain way. It may be physical means, such as clamping and welding, or chemical means, such as bonding. Preferably, the magnet may be fixedly connected in the concave portion of the second magnetic conductive magnet 7 by bonding. The provision of the concave portion mentioned here may facilitate assembly but may result in a weakening of the magnetic field. Preferably, stepped portions and concave portions of different depths may be designed and adjusted according to needs, or the stepped portion and concave portion may not be provided.

In some embodiments, the center of the second magnetic conductive magnet 7 may be provided with a protruding second step 74. The second step 74 may extend away from the magnet 6 and the first magnetic conductive magnet 5. A vibration space may be formed between the second magnetic conductive magnet 7 and the second elastic element 8 through the second step 74 to ensure that the second elastic element 8 may drive the second magnetic conductive magnet 7 to vibrate. If the second step 74 is not provided, although the second elastic element 8 may drive the magnetic component to vibrate, noise may be produced. The deformation of the center region of the elastic element may be the largest along the axis of symmetry, and the deformation of the region of the sides and the region bonded with the housing may be the smallest. Since the elastic element drives the magnetic component to vibrate, and the displacement of the magnetic component in the axial direction is the deformation of the center of the elastic element, the height of the second step 74 may ensure the size of the vibration space formed between the magnetic component and the elastic element. Preferably, the height of the second step 74 may be greater than the maximum value of the deformation of the elastic element in the direction of the axis of symmetry in the central region, so as to prevent the magnetic component from hitting the elastic element during the movement process and causing noise. At the center of the second step 74, a protruding second positioning part 75 may be provided. The extending direction of the second positioning part 75 may be away from the magnet 6 and the first magnetic conductive magnet 5, and the second magnetic conductive magnet 7 may be positioned by the second positioning part 75.

In some embodiments, the positioning component may include the first elastic element 2 and the second elastic element 8. The first elastic element 2 and the second elastic element 8 may be located on both sides of the magnetic component, respectively. The first elastic element 2 may be fixed on the first positioning part 58 and the washer 3, and the second elastic element 8 may be fixed on the second housing 9 and the second positioning part 75. The first elastic element 2 and the washer 3 may form a composite vibration device, and two formants may be generated through double composite vibration. Furthermore, the formants may move by adjusting the size and material parameters of the two components. Specifically, the low-frequency formants may be moved to lower frequency, and the high-frequency formants may be moved to higher frequency, so that the range of these resonant peaks is within the range that can be heard by the ear, so as to broaden the resonance response range of sound and get the ideal sound. The first elastic element 2 and/or the second elastic element 8 may be made of elastic materials including but not limited to stainless steel, beryllium copper, plastic, PC, etc. Preferably, the thickness of the first elastic element 2 and/or the second elastic element 8 may be in a range of 0.04 mm to 0.20 mm. More preferably, the thickness of the first elastic element 2 and/or the second elastic element 8 may be in a range of 0.08 mm to 0.12 mm. Preferably, the first elastic element 2 may be an elastic plate, which may be set to have a first inner ring body and a first outer ring body. The first inner ring body may be located at the center of the first outer ring body. At least one first support rod may be arranged convergently toward the center of the outer ring body, and a first positioning hole may be provided in the center of the first inner ring body. Preferably, the second elastic element 8 may be an elastic plate, which may be set to have a second inner ring body and a second outer ring body. The second inner ring body may be located at the center of the second outer ring body. At least one second supporting rod may be arranged convergently toward the center of the second outer ring body, and a second positioning hole may be arranged in the center of the second inner ring body. The number of the first support rod and the second support rod may be the same or different. Preferably, the number of the first support rod and the second support rod may be greater than or equal to two. Preferably, the support rod may be a straight rod. Preferably, the width of the support rod may be in a range of 0.4 mm to 1.5 mm, and more preferably, the width of the support rod may be in a range of 0.6 mm to 1.0 mm.

Preferably, the outer diameter of the first elastic element 2, that is, the outer diameter of the first outer ring body may be smaller than the inner diameter of the first housing 1. Preferably, in the axial direction of the magnetic component, there may be also a gap between the first elastic element 2 and the first housing 1, and the first elastic element 2 may be not in direct contact with the first housing 1. The first elastic element 2 and the washer 3 may be connected together in a certain manner. The above-mentioned connection method may be a physical method, such as clamping and welding, or a chemical method, such as bonding. Preferably, the connection between the first elastic element 2 with the washer 3 may be bonding.

In some embodiments, the first positioning hole 29 in the first elastic element 2 may match the first positioning part 58 on the first conductor 5, and the two may be fixed together in a certain way, which may be a physical way, for example, snapping, bolting and welding, or may also be chemical methods, such as bonding. Preferably, snapping or bonding may be used for fixing, more preferably, the fixing method may be concentric fixing. The second positioning hole 89 in the second elastic element 8 may match the second positioning part 75 on the second magnetic conductive magnet 7. The two may be fixed together in a certain way, which may be physical means such as snapping, bolting and welding, or may be a chemical method, such as bonding Preferably, a snap-fit or adhesive method may be used for the fixation, and more preferably, the fixation method may be a concentric fixation. In the specific installation process, the center of the first magnetic conductive magnet 5 may be protruded with the first positioning part 58, and the first positioning hole 29 may be recessed in the center of the first elastic element 2. During installation, the first positioning part 58 may be inserted into the first positioning hole 29, so that the first magnetic conductive magnet 5 and the first elastic element 2 may be concentrically fixed. The center of the second magnetic conductive magnet 7 may be protruded with the second positioning part 75, and correspondingly, and the second positioning hole 89 may be recessed in the center of the second elastic element 8. During installation, the second positioning part 75 may be inserted into the second positioning hole 89, so that the second magnetic conductive magnet 7 and the second elastic element 8 are concentrically fixed.

It should be noted that the dual positioning loudspeaker device of the embodiment of the present disclosure may be based on air conduction or bone conduction technology. In some embodiments, when the loudspeaker device is a dual positioning bone conduction loudspeaker device, the magnetic system consisting of the first magnetic conductive magnet 5, the magnet 6, and the second magnetic conductive magnet 7 generates current induction when the voice coil 4 is energized, and then the magnetic field intensity of the magnetic system changes, and the inductance and other parameters also change accordingly. Therefore, the voice coil 4 may be subjected to ampere force in the magnetic field, so that the voice coil 4 move back and forth longitudinally among the first magnetic conductive magnet 5, the magnet 6, and the second magnetic conductive magnet 7. The vibration is transmitted to the first housing 1 and the second housing 9 by the washer 3, and the sound vibration is transmitted to the human bone from the part that is in direct contact with the human bone, so that people may sense the sound. The voice coil 4 may be fixed on the washer 3, so that when the speaker is working, the installation position of the voice coil 4 may not deviate. Since the positions of the first magnetic conductive magnet 5, the second magnetic conductive magnet 7, and the elastic element are relatively fixed, that is, the installation position of the magnetic gap 10 remains unchanged, thereby ensuring the installation stability of the voice coil, and fundamentally ensuring the sound quality of the loudspeaker device.

Figure 110:
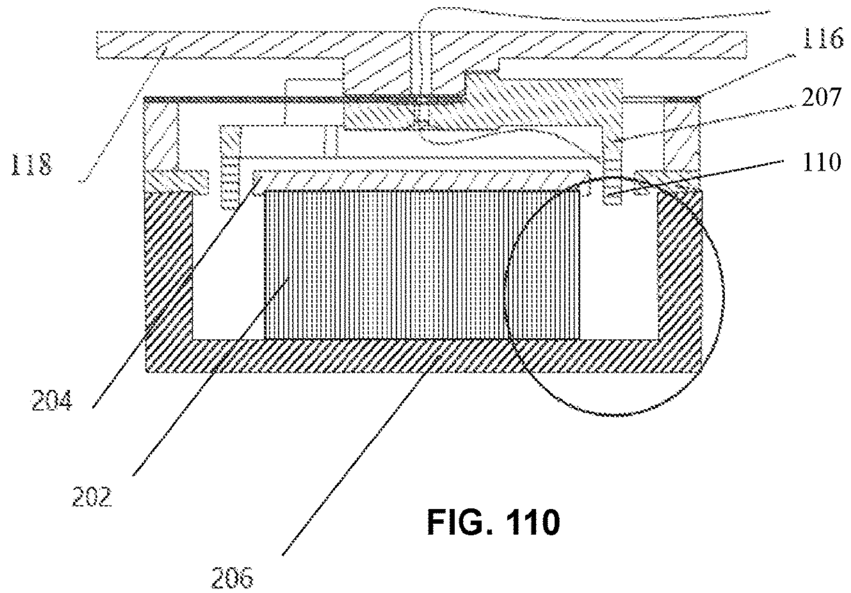
FIG. 110 is a longitudinal sectional view illustrating a magnetic circuit component according to some embodiments of the present disclosure.

FIG. 110 is a longitudinal sectional view illustrating a magnetic circuit component according to some embodiments of the present disclosure. It should be noted that without violating the principle, the descriptions below may be equally applied to an air conduction speaker device and a bone conduction speaker device.

As shown in FIG. 110, in some embodiments, the speaker may include a first magnetic unit 202, a first magnetically conductive unit 204, a second magnetically conductive unit 206, a first vibration plate 207, a voice coil 110, a second vibration plate 116, and a vibration panel 118. As used herein, some units of the earphone core of a bone conduction speaker may compose the magnetic circuit component. In some embodiments, the magnetic circuit component may include the first magnetic unit 202, the first magnetically conductive unit 204, and the second magnetically conductive unit 206. The magnetic circuit component may generate a first full magnetic field (also referred to "total magnetic field of the magnetic circuit component" or "first magnetic field").

The magnetic unit described in the present disclosure may refer to a unit that may generate a magnetic field, such as a magnet. The magnetic unit may have a magnetization direction. The magnetization direction may refer to a direction of a magnetic field inside the magnetic unit. In some embodiments, the first magnetic unit 202 may include one or more magnets. The first magnetic unit may generate a second magnetic field. In some embodiments, the magnet may include a metal alloy magnet, ferrite, or the like. The metal alloy magnet may include neodymium iron boron, samarium cobalt, aluminum nickel cobalt, iron chromium cobalt, aluminum iron boron, iron carbon aluminum, or the like, or any combination thereof. Ferrite may include barium ferrite, steel ferrite, manganese ferrite, lithium manganese ferrite, or the like, or any combination thereof.

In some embodiments, a lower surface of the first magnetically conductive unit 204 may be connected to an upper surface of the first magnetic unit 202. The second magnetically conductive unit 206 may be connected to the first magnetic unit 202. It should be noted that the magnetically conductive unit herein may also refer to a magnetic field concentrator or an iron core. The magnetically conductive unit may adjust a distribution of a magnetic field (e.g., a magnetic field generated by the first magnetic unit 202). The magnetically conductive unit may include a unit made of a soft magnetic material. In some embodiments, the soft magnetic material may include metal materials, metal alloys, metal oxide materials, amorphous metal materials, etc., such as iron, iron-silicon alloys, iron-aluminum alloys, nickel-iron alloys, iron-cobalt series alloys, low carbon steel, silicon lamination, silicon steel sheet, ferrite, etc. In some embodiments, the magnetically conductive unit may be processed by casting, plastic processing, cutting processing, powder metallurgy, or the like, or any combination thereof. The casting may include sand casting, investment casting, pressure casting, centrifugal casting, etc. The plastic processing may include rolling, casting, forging, stamping, extrusion, drawing, or the like, or any combination thereof. The cutting processing may include turning, milling, planing, grinding, or the like. In some embodiments, the processing method of the magnetically conductive unit may include 3D printing, CNC machine tools, or the like. A connection manner between the first magnetically conductive unit 204, the second magnetically conductive unit 206, and the first magnetic unit 202 may include bonding, snapping, welding, riveting, bolting, or the like, or any combination thereof. In some embodiments, the first magnetic unit 202, the first magnetically conductive unit 204, and the second magnetically conductive unit 206 may be disposed as an axisymmetric structure. The axisymmetric structure may be a ring structure, a columnar structure, or other axisymmetric structures.

In some embodiments, a magnetic gap may form between the first magnetic unit 202 and the second magnetically conductive unit 206. The voice coil 110 may be disposed in the magnetic gap. The voice coil 110 may be connected to the first vibration plate 207. The first vibration plate 207 may be connected to the second vibration plate 116. The second vibration plate 116 may be connected to the vibration panel 118. When a current is passed into the voice coil 110, the voice coil 110 may be located in a magnetic field formed by the first magnetic unit 202, the first magnetically conductive unit 204, and the second magnetically conductive unit 206, and applied to an ampere force. The ampere force may drive the voice coil 110 to vibrate, and the vibration of the voice coil 110 may drive the vibration of the first vibration plate 207, the second vibration plate 116, and the vibration panel 118. The vibration panel 118 may transmit the vibration to auditory nerves through tissues and bones, so that a person may hear a sound. The vibration panel 118 may be in direct contact with human skins, or contact with the skins through a vibration transmission layer made of a specific material.

In some embodiments, for a loudspeaker device with a single magnetic unit, magnetic induction line(s) passing through the voice coil 110 may not be uniform and divergent. At the same time, magnetic leakage may form in the magnetic circuit. That is, more magnetic induction lines may leak outside the magnetic gap and fail to pass through the voice coil 110. As a result, a magnetic induction strength (or magnetic field strength) at the position of the voice coil 110 may decrease, which may affect the sensitivity of the loudspeaker device. Therefore, the loudspeaker device may further include at least one second magnetic unit and/or at least one third magnetically conductive unit (not shown in figures). The at least one second magnetic unit and/or at least one third magnetically conductive unit may suppress the leakage of the magnetic induction lines and restrict the shape of the magnetic induction lines passing through the voice coil 110. Therefore, more magnetic induction lines may pass through the voice coil 110 as horizontally and densely as possible to increase the magnetic induction strength (or magnetic field strength) at the position of the voice coil 110, thereby increasing the sensitivity of the loudspeaker device, and further improving the mechanical conversion efficiency of the loudspeaker device (i.e., the efficiency of converting the input power of the loudspeaker device into the mechanical energy of the vibration of the voice coil 110).

Figure 111:
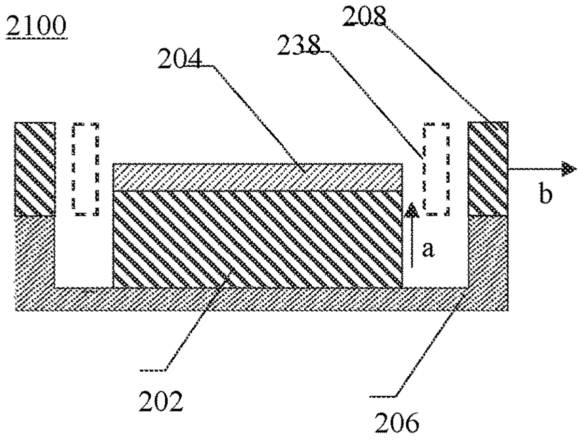
FIG. 111 is a longitudinal sectional view illustrating a magnetic circuit component according to some embodiments of the present disclosure.

FIG. 111 is a longitudinal sectional view illustrating a magnetic circuit component according to some embodiments of the present disclosure. As shown in FIG. 111, the magnetic circuit component 2100 may include a first magnetic unit 202, a first magnetically conductive unit 204, a second magnetically conductive unit 206, and a second magnetic unit 208.

In some embodiments, the magnetic circuit components in the above embodiments may have the same structure. The magnetic circuit component may refer to a structure that provide a magnetic field. In some embodiments, the first magnetic unit 202 and/or the second magnetic unit 208 may include any one or more magnets described in the present disclosure. In some embodiments, the first magnetic unit 202 may include a first magnet, and the second magnetic unit 208 may include a second magnet. The first magnet may be the same as or different from the second magnet. The first magnetically conductive unit 204 and/or the second magnetically conductive unit 206 may include any one or more magnetically conductive materials described in the present disclosure. The processing manner of the first magnetically conductive unit 204 and/or the second magnetically conductive unit 206 may include any one or more processing manners described in the present disclosure. In some embodiments, the first magnetic unit 202 and/or the first magnetically conductive unit 204 may be disposed as an axisymmetric structure. For example, the first magnetic unit 202 and/or the first magnetically conductive unit 204 may be a cylinder, a cuboid, or a hollow ring (e.g., the cross-section is a shape of the runway). In some embodiments, the first magnetic unit 202 and the first magnetically conductive unit 204 may be coaxial cylinders with the same or different diameters. In some embodiments, the second magnetically conductive unit 206 may be a groove-type structure. The groove-type structure may include a U-shaped section. The groove-type second magnetically conductive unit 206 may include a bottom plate and a side wall. In some embodiments, the bottom plate and the side wall may be integrally formed as a whole. For example, the side wall may be formed by extending the bottom plate in a direction perpendicular to the bottom plate. In some embodiments, the bottom plate may be connected to the side wall through any one or more connection manners described in the present disclosure. The second magnetic unit 208 may be disposed as a ring shape or a sheet shape. In some embodiments, the second magnetic unit 208 may be the ring shape. The second magnetic unit 208 may include an inner ring and an outer ring. In some embodiments, the shape of the inner ring and/or the outer ring may be a ring, an ellipse, a triangle, a quadrangle, or any other polygons. In some embodiments, the second magnetic unit 208 may be formed by arranging a number of magnets. Both ends of any one of the number of magnets may be connected to or have a certain distance from both ends of an adjacent magnet. The spacing between the magnets may be the same or different. In some embodiments, the second magnetic unit 208 may be formed by arranging two or three sheet-shaped magnets equidistantly. The shape of the sheet-shaped magnet may be fan-shaped, a quadrangular shape, or the like. In some embodiments, the second magnetic unit 208 may be coaxial with the first magnetic unit 202 and/or the first magnetically conductive unit 204.

Further, the upper surface of the first magnetic unit 202 may be connected to the lower surface of the first magnetically conductive unit 204. The lower surface of the first magnetic unit 202 may be connected to the bottom plate of the second magnetically conductive unit 206. The lower surface of the second magnetic unit 208 may be connected to the side wall of the second magnetically conductive unit 206. The connection manners between the first magnetic unit 202, the first magnetically conductive unit 204, the second magnetically conductive unit 206, and/or the second magnetic unit 208 may include bonding, snapping, welding, riveting, bolting, or the like, or any combination thereof.

In some embodiments, a magnetic gap may be formed between the first magnetic unit 202 and/or the first magnetically conductive unit 204 and the inner ring of the second magnetic unit 208. A voice coil 238 may be disposed in the magnetic gap. In some embodiments, heights of the second magnetic unit 208 and the voice coil 238 relative to the bottom plate of the second magnetically conductive unit 206 may be equal.

In some embodiments, the first magnetic unit 202, the first magnetically conductive unit 204, the second magnetically conductive unit 206, and the second magnetic unit 208 may form a magnetic circuit. In some embodiments, the magnetic circuit component 2100 may generate a first full magnetic field (also referred to "total magnetic field of magnetic circuit component" or "first magnetic field"). The first magnetic unit 202 may generate a second magnetic field. The first full magnetic field may be formed by magnetic fields generated by all components (e.g., the first magnetic unit 202, the first magnetically conductive unit 204, the second magnetically conductive unit 206, and the second magnetic unit 208) in the magnetic circuit component 2100.

In some embodiments, the magnetic field strength of the first full magnetic field in the magnetic gap (also referred to as magnetic induction strength or magnetic flux density) may be greater than the magnetic field strength of the second magnetic field in the magnetic gap. In some embodiments, the second magnetic unit 208 may generate a third magnetic field. The third magnetic field may increase the magnetic field strength of the first full magnetic field in the magnetic gap. The third magnetic field increasing the magnetic field strength of the first full magnetic field herein may mean that the magnetic strength of the first full magnetic field in the magnetic gap when the third magnetic field exists (i.e., the second magnetic unit 208 exists) may be greater than that of the first full magnetic field when the third magnetic field does not exist (i.e., the second magnetic unit 208 does not exist). In other embodiments of the specification, unless otherwise specified, the magnetic circuit component may mean a structure including all magnetic units and magnetically conductive units. The first full magnetic field may represent the magnetic field generated by the magnetic circuit component as a whole. The second magnetic field, the third magnetic field, . . . , and the N-th magnetic field may respectively represent the magnetic fields generated by the corresponding magnetic units. In different embodiments, the magnetic unit that generates the second magnetic field (the third magnetic field, . . . , or the N-th magnetic field) may be the same or different.

In some embodiments, the voice coils in the above embodiments may be a same voice coil, which refers a unit for transmitting audio signals. The magnetic circuit components in the above embodiments may be a same magnetic circuit component, which refers a structure for providing a magnetic field.

In some embodiments, an included angle between a magnetization direction of the first magnetic unit 202 and a magnetization direction of the second magnetic unit 208 may be between 0 degrees and 180 degrees. In some embodiments, the included angle between the magnetization direction of the first magnetic unit 202 and the magnetization direction of the second magnetic unit 208 may be between 45 degrees and 135 degrees. In some embodiments, the induced angle between the magnetization direction of the first magnetic unit 202 and the magnetization direction of the second magnetic unit 208 may be equal to or greater than 90 degrees. In some embodiments, the magnetization direction of the first magnetic unit 202 may be perpendicular to the lower surface or the upper surface of the first magnetic unit 202 and be vertically upward (as shown by the direction a in the figure). The magnetization direction of the second magnetic unit 208 may be directed from the inner ring of the second magnetic unit 208 to the outer ring (as shown by the direction b on the right side of the first magnetic unit 202 in the figure, the magnetization direction of the first magnetic unit 202 may deflect 90 degrees in a clockwise direction).

In some embodiments, at the position of the second magnetic unit 208, an included angle between the direction of the first full magnetic field and the magnetization direction of the second magnetic unit 208 may not be greater than 90 degrees. In some embodiments, at the position of the second magnetic unit 208, the included angle between the direction of the magnetic field generated by the first magnetic unit 202 and the direction of the magnetization of the second magnetic unit 208 may be less than or equal to 90 degrees, such as 0 degrees, 10 degrees, 20 degrees, or the like. Further, compared with a magnetic circuit component with a single magnetic unit, the second magnetic unit 208 may increase the total magnetic flux in the magnetic gap of the magnetic circuit component 2100, thereby increasing the magnetic induction intensity in the magnetic gap. And, under the action of the second magnetic unit 208, originally scattered magnetic induction lines may converge to the position of the magnetic gap, further increasing the magnetic induction intensity in the magnetic gap.

Figure 112:
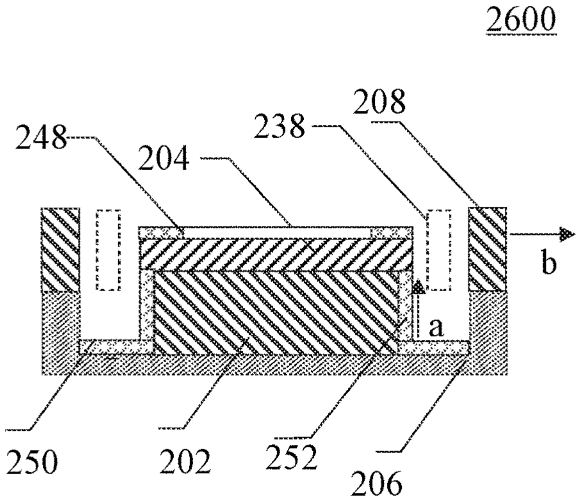
FIG. 112 is a longitudinal sectional view illustrating a magnetic circuit component according to some embodiments of the present disclosure.

FIG. 112 is a longitudinal sectional view illustrating a magnetic circuit component according to some embodiments of the present disclosure. As shown in FIG. 112, different from the magnetic circuit component 2100, the magnetic circuit component 2600 may further include at least one electrically conductive unit (e.g., a first electrically conductive unit 248, a second electrically conductive unit 250, and a third electrically conductive unit 252).

In some embodiments, the electrically conductive unit may include a metal material, a metal alloy material, an inorganic non-metal material, or other conductive materials. The metal material may include gold, silver, copper, aluminum, etc. The metal alloy material may include an iron-based alloy, an aluminum-based alloy material, a copper-based alloys, a zinc-based alloys, etc. The inorganic non-metal material may include graphite, etc. The electrically conductive unit may be a sheet shape, a ring shape, a mesh shape, or the like. The first electrically conductive unit 248 may be disposed on an upper surface of the first magnetically conductive unit 204. The second electrically conductive unit 250 may be connected to the first magnetic unit 202 and the second magnetically conductive unit 206. The third electrically conductive unit 252 may be connected to a side wall of the first magnetic unit 202. In some embodiments, the first magnetically conductive unit 204 may protrude from the first magnetic unit 202 to form a first concave portion. The third electrically conductive unit 252 may be disposed on the first concave portion. In some embodiments, the first electrically conductive unit 248, the second electrically conductive unit 250, and the third electrically conductive unit 252 may include the same or different conductive materials. The first electrically conductive unit 248, the second electrically conductive unit 250, and the third electrically conductive unit 252 may be respectively connected to the first magnetically conductive unit 204, the second magnetically conductive unit 206, and/or the first magnetic unit 202 through any one or more connection manners described in the present disclosure.

In some embodiments, a magnetic gap may be formed between the first magnetic unit 202, the first magnetically conductive unit 204, and the inner ring of the second magnetic unit 208. The voice coil 238 may be arranged in the magnetic gap. The first magnetic unit 202, the first magnetically conductive unit 204, the second magnetically conductive unit 206, and the second magnetic unit 208 may form a magnetic circuit. In some embodiments, the electrically conductive unit may reduce an inductive reactance of the voice coil 238. For example, if a first alternating current flows through the voice coil 238, a first alternating induced magnetic field may be generated near the voice coil 238. Under the action of the magnetic field in the magnetic circuit, the first alternating induced magnetic field may cause the inductive reactance of the voice coil 238 and hinder the movement of the voice coil 238. When an electrically conductive unit (e.g., the first electrically conductive unit 248, the second electrically conductive unit 250, and the third electrically conductive unit 252) is disposed near the voice coil 238, the electrically conductive unit may induce a second alternating current under the action of the first alternating induced magnetic field. A third alternating current in the electrically conductive unit may generate a second alternating induced magnetic field near the third alternating current. The second alternating induction magnetic field may be opposite to the first alternating induction magnetic field, and weaken the first alternating induction magnetic field, thereby reducing the inductive reactance of the voice coil 238, increasing the current in the voice coil, and improving the sensitivity of the speaker.

Figure 113:
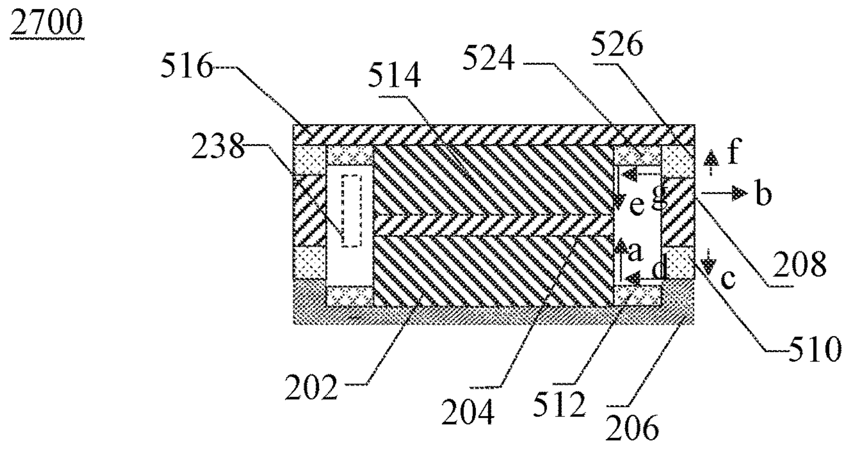
FIG. 113 is a longitudinal sectional view illustrating a magnetic circuit component according to some embodiments of the present disclosure.

FIG. 113 is a longitudinal sectional view illustrating a magnetic circuit component according to some embodiments of the present disclosure. As shown in FIG. 113, different from the magnetic circuit component 2600, the magnetic circuit component 2700 may further include a third magnetic unit 510, a fourth magnetic unit 512, a fifth magnetic unit 514, a third magnetically conductive unit 516, a sixth magnetic unit 524, and a seventh magnetic unit 526. The third magnetic unit 510, the fourth magnetic unit 512, the fifth magnetic unit 514, the third magnetically conductive unit 516 and/or the sixth magnetic unit 524, and the seventh magnetic unit 526 may be disposed as coaxial ring cylinders.

Each magnetic circuit component in the above embodiments may refer to a structure for providing a magnetic field.

In some embodiments, an upper surface of the second magnetic unit 208 may be connected to the seventh magnetic unit 526. A lower surface of the second magnetic unit 208 may be connected to the third magnetic unit 510. The third magnetic unit 510 may be connected to the second magnetically conductive unit 206. An upper surface of the seventh magnetic unit 526 may be connected to the third magnetically conductive unit 516. The fourth magnetic unit 512 may be connected to the second magnetically conductive unit 206 and the first magnetic unit 202. The sixth magnetic unit 524 may be connected to the fifth magnetic unit 514, the third magnetically conductive unit 516, and the seventh magnetic unit 526. In some embodiments, the first magnetic unit 202, the first magnetically conductive unit 204, the second magnetically conductive unit 206, the second magnetic unit 208, the third magnetic unit 510, the fourth magnetic unit 512, the fifth magnetic unit 514, the third magnetically conductive unit 516, the sixth magnetic unit 524, and the seventh magnetic unit 526 may form a magnetic circuit and a magnetic gap.

In some embodiments, an included angle between a magnetization direction of the first magnetic unit 202 and a magnetization direction of the sixth magnetic unit 524 may be between 0 degrees and 180 degrees. In some embodiments, the included angle between the magnetization direction of the first magnetic unit 202 and the magnetization direction of the sixth magnetic unit 524 may be between 45 degrees and 135 degrees. In some embodiments, the included angle between the magnetization direction of the first magnetic unit 202 and the magnetization direction of the sixth magnetic unit 524 may not be higher than 90 degrees. In some embodiments, the magnetization direction of the first magnetic unit 202 may be perpendicular to a lower surface or an upper surface of the first magnetic unit 202 and be vertically upward (as shown by the direction a in the figure). The magnetization direction of the sixth magnetic unit 524 may be directed from an outer ring of the sixth magnetic unit 524 to an inner ring (as shown by the direction g on the right side of the first magnetic unit 202 in the figure, the magnetization direction of the first magnetic unit 202 may deflect 270 degrees in a clockwise direction). In some embodiments, the magnetization direction of the sixth magnetic unit 524 may be the same as that of the fourth magnetic unit 512 in the same vertical direction.

In some embodiments, at the position of the sixth magnetic unit 524, an included angle between the direction of the magnetic field generated by the magnetic circuit component 2700 and the magnetization direction of the sixth magnetic unit 524 may not be higher than 90 degrees. In some embodiments, at the position of the sixth magnetic unit 524, the included angle between the direction of the magnetic field generated by the first magnetic unit 202 and the magnetized direction of the sixth magnetic unit 524 may be less than or equal to 90 degrees, such as 0 degrees, 10 degrees, or 20 degrees.

In some embodiments, the included angle between the magnetization direction of the first magnetic unit 202 and the magnetization direction of the seventh magnetic unit 526 may be between 0 degrees and 180 degrees. In some embodiments, the included angle between the magnetization direction of the first magnetic unit 202 and the magnetization direction of the seventh magnetic unit 526 may be between 45 degrees and 135 degrees. In some embodiments, the included angle between the magnetization direction of the first magnetic unit 202 and the magnetization direction of the seventh magnetic unit 526 may not be higher than 90 degrees. In some embodiments, the magnetization direction of the first magnetic unit 202 may be perpendicular to a lower surface or an upper surface of the first magnetic unit 202 and be vertically upward (as shown by the direction a in the figure). The magnetization direction of the seventh magnetic unit 526 may be directed from the lower surface of the seventh magnetic unit 526 to the upper surface (as shown in the direction f on the right side of the first magnetic unit 202 in the figure, the magnetization direction of the first magnetic unit 202 may deflect 360 degrees in a clockwise direction). In some embodiments, the magnetization direction of the seventh magnetic unit 526 may be opposite to that of the third magnetic unit 510.

In some embodiments, at the position of the seventh magnetic unit 526, the included angle between the direction of the magnetic field generated by magnetic circuit component 2700 and the direction of magnetization of the seventh magnetic unit 526 may not be higher than 90 degrees. In some embodiments, at the position of the seventh magnetic unit 526, the included angle between the direction of the magnetic field generated by the first magnetic unit 202 and the magnetized direction of the seventh magnetic unit 526 may be less than or equal to 90 degrees, such as 0 degrees, 10 degrees, or 20 degrees.

In the magnetic circuit component 2700, the third magnetically conductive unit 516 may close the magnetic circuit generated by the magnetic circuit component 2700, so that more magnetic induction lines may be concentrated in the magnetic gap, thereby implementing the effect of suppressing the magnetic leakage, increasing the magnetic induction strength in the magnetic gap, and improving the sensitivity of the loudspeaker device.

Figure 114:
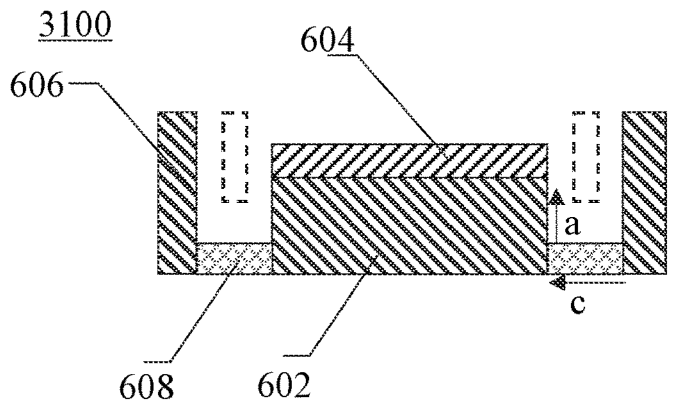
FIG. 114 is a longitudinal sectional view illustrating a magnetic circuit component according to some embodiments of the present disclosure.

FIG. 114 is a longitudinal sectional view illustrating a magnetic circuit component according to some embodiments of the present disclosure. As shown in FIG. 114, the magnetic circuit component 3100 may include a first magnetic unit 602, a first magnetically conductive unit 604, a first full magnetic field changing unit 606, and a second magnetic unit 608.

In some embodiments, the first magnetic units in the above embodiments may refer to units for energy storage, energy conversion, and electrical isolation. Similarly, the second magnetic units may follow a principle same as the first magnetic units. The magnetically conductive unit in the above embodiments refers to a unit for providing a magnetic circuit.

In some embodiments, an upper surface of the first magnetic unit 602 may be connected to a lower surface of the first magnetically conductive unit 604. The second magnetic unit 608 may be connected to the first magnetic unit 602 and the first full magnetic field changing unit 606. The connection manners between the first magnetic unit 602, the first magnetically conductive unit 604, the first full magnetic field changing unit 606, and/or the second magnetic unit 608 may be based on any one or more connection manners described in the present disclosure. In some embodiments, the first magnetic unit 602, the first magnetically conductive unit 604, the first full magnetic field changing unit 606, and/or the second magnetic unit 608 may form a magnetic circuit and a magnetic gap.

In some embodiments, the magnetic circuit component 3100 may generate a first full magnetic field. The first magnetic unit 602 may generate a second magnetic field. A magnetic field intensity of the first full magnetic field in the magnetic gap may be greater than the magnetic field intensity of the second magnetic field in the magnetic gap. In some embodiments, the second magnetic unit 608 may generate a third magnetic field. The third magnetic field may increase a magnetic field strength of the second magnetic field in the magnetic gap.

In some embodiments, the included angle between the magnetization direction of the first magnetic unit 602 and the magnetization direction of the second magnetic unit 608 may be between 0 degrees and 180 degrees. In some embodiments, the included angle between the magnetization direction of the first magnetic unit 602 and the magnetization direction of the second magnetic unit 608 may be between 45 degrees and 135 degrees. In some embodiments, the included angle between the magnetization direction of the first magnetic unit 602 and the magnetization direction of the second magnetic unit 608 may not be higher than 90 degrees.

In some embodiments, at the position of the second magnetic unit 608, the included angle between a direction of the first full magnetic field and the magnetization direction of the second magnetic unit 608 may not be higher than 90 degrees. In some embodiments, at the position of the second magnetic unit 608, the included angle between the direction of the magnetic field generated by the first magnetic unit 602 and the direction of magnetization of the second magnetic unit 608 may be a less than or equal to 90 degrees, such as 0 degrees, 10 degrees, or 20 degrees. As another example, the magnetization direction of the first magnetic unit 602 may be perpendicular to the lower surface or the upper surface of the first magnetic unit 602 and be vertically upward (as shown by the direction a in the figure). The magnetization direction of the second magnetic unit 608 may be directed from the outer ring of the second magnetic unit 608 to the inner ring (as shown by the direction c on the right side of the first magnetic unit 602 in the figure, the magnetization direction of the first magnetic unit 602 may deflect 270 degrees in a clockwise direction). Compared with a magnetic circuit component with a single magnetic unit, the first full magnetic field changing unit 606 in the magnetic circuit component 3100 may increase the total magnetic flux in the magnetic gap, thereby increasing the magnetic induction intensity in the magnetic gap. And, under the action of the first full magnetic field changing unit 606, originally scattered magnetic induction lines may converge to the position of the magnetic gap, further increasing the magnetic induction intensity in the magnetic gap.

Figure 115:
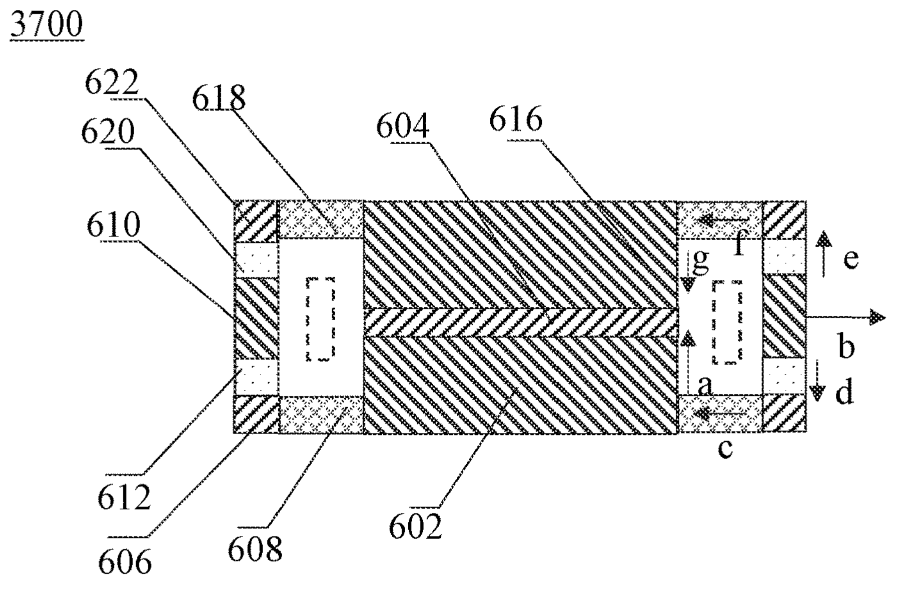
FIG. 115 is a longitudinal sectional view illustrating a magnetic circuit component according to some embodiments of the present disclosure.

FIG. 115 is a longitudinal sectional view illustrating a magnetic circuit component according to some embodiments of the present disclosure. As shown in FIG. 115, in some embodiments, the magnetic circuit component 3700 may include the first magnetic unit 602, a first magnetically conductive unit 604, a first full magnetic field changing unit 606, a second magnetic unit 608, a third magnetic unit 610, a fourth magnetic unit 612, a fifth magnetic unit 616, a sixth magnetic unit 618, a seventh magnetic unit 620, and a second ring unit 622. In some embodiments, the first full magnetic field changing unit 606 and/or the second ring unit 622 may include a ring-shaped magnetic unit or a ring-shaped magnetically conductive unit.

In some embodiments, the ring-shaped magnetic unit may include any one or more magnetic materials described in the present disclosure. The ring-shaped magnetically conductive unit may include any one or more magnetically conductive materials described in the present disclosure. In some embodiments, each of the magnetic circuit components in the above embodiments refers to a unit for providing a magnetic field. In some embodiments, the magnetic units in the above embodiments may refer to units for energy storage, energy conversion, and electrical isolation. The magnetically conductive unit in the above embodiments refers to a unit for providing a magnetic circuit.

In some embodiments, the sixth magnetic unit 618 may be connected to the fifth magnetic unit 616 and the second ring unit 622. The seventh magnetic unit 620 may be connected to the third magnetic unit 610 and the second ring unit 622. In some embodiments, the first magnetic unit 602, the fifth magnetic unit 616, the second magnetic unit 608, the third magnetic unit 610, the fourth magnetic unit 612, the sixth magnetic unit 618, and/or the seventh magnetic unit 620, the first magnetically conductive unit 604, the first full magnetic field changing unit 606, and the second ring unit 622 may form a magnetic circuit.

In some embodiments, an included angle between the magnetization direction of the first magnetic unit 602 and a magnetization direction of the sixth magnetic unit 618 may be between 0 degrees and 180 degrees. In some embodiments, the angle between the magnetization direction of the first magnetic unit 602 and the magnetization direction of the sixth magnetic unit 618 may be between 45 degrees and 135 degrees. In some embodiments, the included angle between the magnetization direction of the first magnetic unit 602 and the magnetization direction of the sixth magnetic unit 618 may not be higher than 90 degrees. In some embodiments, the magnetization direction of the first magnetic unit 602 may be perpendicular to the lower surface or the upper surface of the first magnetic unit 602 and be vertically upward (as shown by the direction a in the figure). The magnetization direction of the sixth magnetic unit 618 may be directed from an outer ring of the sixth magnetic unit 618 to an inner ring (as shown by the direction f on a right side of the first magnetic unit 602 in the figure, the magnetization direction of the first magnetic unit 602 may deflect 270 degrees in a clockwise direction). In some embodiments, in the same vertical direction, the magnetization direction of the sixth magnetic unit 618 may be the same as that of the second magnetic unit 608. In some embodiments, the magnetization direction of the first magnetic unit 602 may be perpendicular to the lower surface or the upper surface of the first magnetic unit 602 and be vertically upward (as shown by the direction a in the figure). The magnetization direction of the seventh magnetic unit 620 may be directed from the lower surface of the seventh magnetic unit 620 to the upper surface (as shown by the direction e on the right side of the first magnetic unit 602 in the figure, the magnetization direction of the first magnetic unit 602 may deflect 360 degrees in the clockwise direction). In some embodiments, a magnetization direction of the seventh magnetic unit 620 may be the same as that of the fourth magnetic unit 612.

In some embodiments, at a position of the sixth magnetic unit 618, an included angle between a direction of a magnetic field generated by the magnetic circuit component 3700 and the magnetization direction of the sixth magnetic unit 618 may not be higher than 90 degrees. In some embodiments, at the position of the sixth magnetic unit 618, the included angle between the direction of the magnetic field generated by the first magnetic unit 602 and the direction of magnetization of the sixth magnetic unit 618 may be less than or equal to 90 degrees, such as 0 degrees, 10 degrees, or 20 degrees.

In some embodiments, an included angle between the magnetization direction of the first magnetic unit 602 and the magnetization direction of the seventh magnetic unit 620 may be between 0 degrees and 180 degrees. In some embodiments, the included angle between the magnetization direction of the first magnetic unit 602 and the magnetization direction of the seventh magnetic unit 620 may be between 45 degrees and 135 degrees. In some embodiments, the included angle between the magnetization direction of the first magnetic unit 602 and the magnetization direction of the seventh magnetic unit 620 may not be higher than 90 degrees.

In some embodiments, at a position of the seventh magnetic unit 620, an included angle between a direction of a magnetic field generated by the magnetic circuit component 3700 and the magnetization direction of the seventh magnetic unit 620 may not be higher than 90 degrees. In some embodiments, at the position of the seventh magnetic unit 620, the included angle between the direction of the magnetic field generated by the first magnetic unit 602 and the direction of magnetization of the seventh magnetic unit 620 may be less than or equal to 90 degrees, such as 0 degrees, 10 degrees, or 20 degrees.

In some embodiments, the first full magnetic field changing unit 606 may be a ring-shaped magnetic unit. In such cases, a magnetization direction of the first full magnetic field changing unit 606 may be the same as that of the second magnetic unit 608 or the fourth magnetic unit 612. For example, on the right side of the first magnetic unit 602, the magnetization direction of the first full magnetic field changing unit 606 may be directed from an outer ring to an inner ring of the first full magnetic field changing unit 606. In some embodiments, the second ring unit 622 may be a ring-shaped magnetic unit. In such cases, a magnetization direction of the second ring unit 622 may be the same as that of the sixth magnetic unit 618 or the seventh magnetic unit 620. For example, on the right side of the first magnetic unit 602, the magnetization direction of the second ring unit 622 may be directed from an outer ring to an inner ring of the second ring unit 622. In the magnetic circuit component 3700, a number of magnetic units may increase the total magnetic flux. Different magnetic units may interact with each other, thereby suppressing the leakage of the magnetic induction lines, increasing the magnetic induction strength in the magnetic gap, and improving the sensitivity of the loudspeaker device.

In some embodiments, the magnetic circuit component 3700 may further include a magnetically conductive shield. The magnetically conductive shield may include any one or more magnetically conductive materials described in the present disclosure, such as low carbon steel, silicon lamination, silicon steel sheet, ferrite, etc. The magnetically conductive shield may be connected to the first magnetic unit 602, the first full magnetic field changing unit 606, the second magnetic unit 608, the third magnetic unit 610, the fourth magnetic unit 612, the fifth magnetic unit 616, the sixth magnetic unit 618, the seventh magnetic unit 620, and the second ring unit 622 by any one or more connection ways described in the present disclosure. In some embodiments, the magnetically conductive shield may include at least a bottom plate and a side wall. The side wall has a ring structure. In some embodiments, the bottom plate and the side wall may be integrally formed. In some embodiments, the bottom plate may be connected to the side wall by any one or more connection ways described in the present disclosure. For example, the magnetically conductive shield may include a first bottom plate, a second bottom plate, and a side wall. The first bottom plate and the side wall may be integrally formed. The second bottom plate may be connected to the side wall by any one or more connection ways described in the present disclosure.

In the magnetic circuit component 3700, the magnetically conductive shield may shield the magnetic circuit generated in the magnetic circuit component 3700, so that more magnetic induction lines are concentrated in the magnetic gap in the magnetic circuit component 3700, thereby achieving effects of suppressing magnetic flux leakage, increasing the magnetic induction intensity at the magnetic gap, and improving the intensity of the speaker.

It should be noted that the magnetic circuit components in the above embodiments may refer to structures for providing magnetic fields.

In some embodiments, the magnetic circuit component 3700 may further include one or more electrically conductive units (e.g., a fourth electrically conductive unit, a fifth electrically conductive unit, and a sixth electrically conductive unit). The descriptions of the fourth electrically conductive unit, the fifth electrically conductive unit, and the sixth electrically conductive unit may be similar to the first electrically conductive unit 248, the second electrically conductive unit 250, and the third electrically conductive unit 252, and the related descriptions may be not repeated here.

Figure 116:
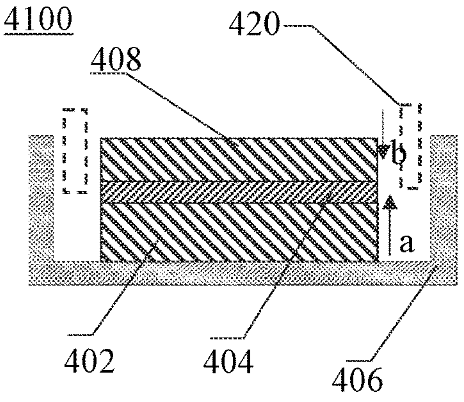
FIG. 116 is a longitudinal sectional view illustrating a magnetic circuit component according to some embodiments of the present disclosure.

FIG. 116 is a longitudinal sectional view illustrating a magnetic circuit component according to some embodiments of the present disclosure. As shown in FIG. 116, the magnetic circuit component 4100 may include a first magnetic unit 402, a first magnetically conductive unit 404, a second magnetically conductive unit 406, and a second magnetic unit 408.

It should be noted that, each of the magnetic circuit components in the above embodiments refers to a unit for providing a magnetic field. The magnetic units in the above embodiments may refer to units for energy storage, energy conversion, and electrical isolation. The magnetically conductive unit in the above embodiments refers to a unit for providing a magnetic circuit.

In some embodiments, the first magnetic unit 402 and/or the second magnetic unit 408 may include any one or more of the magnets described in the present disclosure. In some embodiments, the first magnetic unit 402 may include a first magnet. The second magnetic unit 408 may include a second magnet. The first magnet may be the same as or different from the second magnet. The first magnetically conductive unit 404 and/or the second magnetically conductive unit 406 may include any one or more magnetically conductive materials described in the present disclosure. The processing manner of the first magnetically conductive unit 404 and/or the second magnetically conductive unit 406 may include any one or more processing manners described in the present disclosure. In some embodiments, the first magnetic unit 402, the first magnetically conductive unit 404, and/or the second magnetic unit 408 may be disposed as an axisymmetric structure. For example, the first magnetic unit 402, the first magnetically conductive unit 404, and/or the second magnetic unit 408 may be cylinders. In some embodiments, the first magnetic unit 402, the first magnetically conductive unit 404, and/or the second magnetic unit 408 may be coaxial cylinders with the same diameter or different diameters. The thickness of the first magnetic unit 402 may be greater than or equal to the thickness of the second magnetic unit 408. In some embodiments, the second magnetically conductive unit 406 may be a groove-type structure. The groove-type structure may include a U-shaped section. The groove-type second magnetically conductive unit 406 may include a bottom plate and a side wall. In some embodiments, the bottom plate and the side wall may be integrally formed as a whole. For example, the side wall may be formed by extending the bottom plate in a direction perpendicular to the bottom plate. In some embodiments, the bottom plate may be connected to the side wall through any one or more connection manners described in the present disclosure. The second magnetic unit 408 may be disposed as a ring shape or a sheet shape. The shape of the second magnetic unit 408 may refer to descriptions elsewhere in the specification. In some embodiments, the second magnetic unit 408 may be coaxial with the first magnetic unit 402 and/or the first magnetically conductive unit 404.

Further, an upper surface of the first magnetic unit 402 may be connected to a lower surface of the first magnetically conductive unit 404. A lower surface of the first magnetic unit 402 may be connected to the bottom plate of the second magnetically conductive unit 406. A lower surface of the second magnetic unit 408 may be connected to an upper surface of the first magnetically conductive unit 404. A connection manner between the first magnetic unit 402, the first magnetically conductive unit 404, the second magnetically conductive unit 406, and/or the second magnetic unit 408 may include one or more manners such as bonding, snapping, welding, riveting, bolting, or the like, or any combination thereof.

Further, a magnetic gap may be formed between the first magnetic unit 402, the first magnetically conductive unit 404, and/or the second magnetic unit 408 and the side wall of the second magnetically conductive unit 406. A voice coil may be disposed in the magnetic gap. In some embodiments, the first magnetic unit 402, the first magnetically conductive unit 404, the second magnetically conductive unit 406, and the second magnetic unit 408 may form a magnetic circuit. In some embodiments, the magnetic circuit component 4100 may generate a first full magnetic field. The first magnetic unit 402 may generate a second magnetic field. The first full magnetic field may be formed by magnetic fields generated by all components (e.g., the first magnetic unit 402, the first magnetically conductive unit 404, the second magnetically conductive unit 406, and the second magnetic unit 408) in the magnetic circuit component 4100. A magnetic field strength of the first full magnetic field in the magnetic gap (also referred to magnetic induction strength or magnetic flux density) may be greater than a magnetic field strength of the second magnetic field in the magnetic gap. In some embodiments, the second magnetic unit 408 may generate a third magnetic field. The third magnetic field may increase the magnetic field strength of the second magnetic field in the magnetic gap.

In some embodiments, an included angle between a magnetization direction of the second magnetic unit 408 and a magnetization direction of the first magnetic unit 402 may be between 90 degrees and 180 degrees. In some embodiments, the included angle between the magnetization direction of the second magnetic unit 408 and the magnetization direction of the first magnetic unit 402 may be between 150 degrees and 180 degrees. In some embodiments, the magnetization direction of the second magnetic unit 408 may be opposite to that of the first magnetic unit 402 (the direction a and the direction b shown in the figure).

Compared with a magnetic circuit component with a single magnetic unit, the magnetic circuit component 4100 may add the second magnetic unit 408. The magnetization direction of the second magnetic unit 408 may be opposite to the magnetization direction of the first magnetic unit 402, which may suppress a magnetic leakage of the first magnetic unit 402 in the magnetization direction. Therefore, the magnetic field generated by the first magnetic unit 402 may be more compressed into the magnetic gap, thereby increasing the magnetic induction strength within the magnetic gap.

In some embodiments, the speaker may further include a loudspeaker mechanism, such as a bone conduction loudspeaker mechanism, an air conduction loudspeaker mechanism, and the like. As used herein, bone conduction is a sound conduction way that converts a sound into mechanical vibrations of different frequencies, and transmits sound waves through the human skull, bone labyrinth, inner ear lymphatic fluid transmission, spiral organs, auditory nerves, auditory center, etc. In some embodiments, the loudspeaker mechanism may be an MP3 player, a hearing aid, or the like.

In some embodiments, the loudspeaker mechanism of the speaker may be a stand-alone player that can be used directly, or a player that needs to be plugged into an electronic device.

It should be noted that without violating the principle, the descriptions below may be equally applied to an air conduction speaker device and a bone conduction speaker device.

Figure 117:
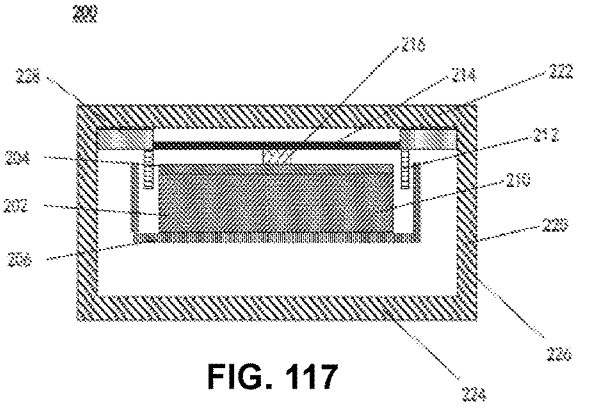
FIG. 117 is a longitudinal sectional view illustrating a loudspeaker device according to some embodiments of the present disclosure.

FIG. 117 is a longitudinal sectional view illustrating a speaker according to some embodiments of the present disclosure. As shown in FIG. 117, in some embodiments, the speaker may include a magnetic circuit component 210, a coil 212, a vibration transmission plate 214, a connector 216, and a housing 220. In some embodiments, the magnetic circuit component 210 may include a first magnetic unit 202, a first magnetically conductive unit 204, and a second magnetically conductive unit 206. The housing 220 may be equivalent to the core housing 41 in the foregoing embodiments, and the vibration transmission plate 214 may be equivalent to the vibration transmission plate 1801 in the foregoing embodiments.

In some embodiments, the housing 220 may include a housing panel 222, a housing back panel 224, and a housing side panel 226. The housing back panel 224 may be located on the side opposite to the housing panel 222 and may be arranged on the two ends of the housing side panel 226, respectively. The housing panel 222, the housing back panel 224, and the housing side panel 226 may form an integral structure with a certain accommodation space. In some embodiments, the magnetic circuit component 210, the coil 212, and the vibration transmission plate 214 may be fixed inside the housing 220. In some embodiments, the speaker may further include a housing bracket 228. The vibration transmission plate 214 may be connected to the housing 220 by the housing bracket 228. In some embodiments, the coil 212 may be fixed on the housing bracket 228 and may drive the housing 220 to vibrate by the housing bracket 228. In some embodiments, the housing bracket 228 may be a part of the housing 220, or may be a separate component, directly or indirectly connected to the inside of the housing 220. In some embodiments, the housing bracket 228 may be fixed on the inner surface of the housing side panel 226. In some embodiments, the housing bracket 228 may be pasted on the housing 220 by glue, or may be fixed on the housing 220 by stamping, injection molding, clamping, riveting, threaded connecting or welding.

In some embodiments, it is possible to design the connection mode of the housing panel 222, the housing back panel 224, and the housing side panel 226 to ensure that the housing 220 has large rigidity. In some embodiments, the housing panel 222, the housing back panel 224, and the housing side panel 226 may be integrally formed. For example, the housing back panel 224 and the housing side panel 226 may be an integral structure. As another example, the housing panel 222 and the housing side panel 226 may be directly pasted and fixed by glue, or fixed by clamping, welding, or threaded connecting. The glue may be glue with strong viscosity and high hardness. As still an example, the housing panel 222 and the housing side panel 226 may be an integral structure. The housing back panel 224 and the housing side panel 226 may be directly pasted and fixed by glue, or may be fixed by clamping, welding, or threaded connecting. In some embodiments, the housing panel 222, the housing back panel 224, and the housing side panel 226 may be all independent components, which may be fixed by one or a combination of glue, clamping, welding, or threaded connecting. For example, the housing panel 222 and the housing side panel 226 may be connected by glue, the housing back panel 224 and the housing side panel 226 may be connected by clamping, welding, or threaded connecting. As another example, the housing back panel 224 and the housing side panel 226 may be connected by glue, the housing panel 222 and the housing side panel 226 may be connected by clamping, welding, or threaded connecting.

In different application scenarios, the housing illustrated in the present disclosure may be made by different assembly techniques. For example, as described elsewhere in the present disclosure, the housing may be integrally formed, and may also be formed in a separate combination manner, or a combination thereof. In the separate combination manner, different components may be fixed by glue, or fixed by clamping, welding, or threaded connecting. Specifically, in order to better understand the assembly technique of the housing of the speaker in the present disclosure, FIGS. 118-120 describe several examples of the assembly technique of the housing.

Figure 118:
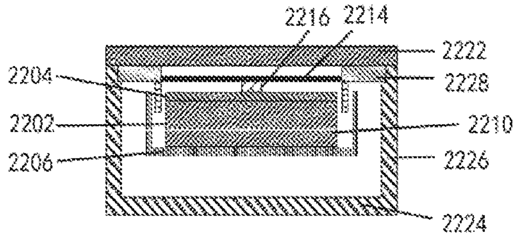

As shown in FIG. 118, a speaker may mainly include a magnetic circuit component 2210 and a housing (e.g., the housing 220 in FIG. 117). The magnetic circuit component 2210 may include a first magnetic unit 2202, a first magnetically conductive unit 2204, and a second magnetically conductive unit 2206.

In some embodiments, the magnetic circuit components in the above embodiments may have a same structure, which refers to a structure for providing a magnetic field. The housings in the above embodiments may have a same structure, which refers to a unit for accommodating the magnetic circuit components.

In some embodiments, the housing of the speaker may include a housing panel 2222, a housing back panel 2224, and a housing side panel 2226. The housing side panel 2226 and the housing back panel 2224 may be made in an integral manner, and the housing panel 2222 may be connected to one end of the housing side panel 2226 in a split combination manner. The split combination manner includes fixing with glue, or fixing the housing panel 2222 to one end of the housing side panel 2226 by means of clamping, welding, or threaded connecting. The housing panel 2222 and the housing side panel 2226 (or the housing back panel 2224) may be made of different, the same, or partially the same materials. In some embodiments, the housing panel 2222 and the housing side panel 2226 may be made of the same material, and Young's modulus of the same material is greater than 2000 MPa. More preferably, Young's modulus of the same material is greater than 4000 MPa. More preferably, Young's modulus of the same material is greater than 6000 MPa. More preferably, Young's modulus of the material of the housing 220 is greater than 8000 MPa. More preferably, Young's modulus of the same material is greater than 12000 MPa. More preferably, Young's modulus of the same material is greater than 15000 MPa, and further preferably, Young's modulus of the same material is greater than 18000 MPa. In some embodiments, the housing panel 2222 and the housing side panel 2226 may be made of different materials, and Young's modulus of the different materials are greater than 4000 MPa. More preferably, Young's modulus of the different materials are greater than 6000 MPa. More preferably, Young's modulus of the different materials are greater than 8000 MPa. More preferably, Young's modulus of the different materials are greater than 12000 MPa. More preferably, Young's modulus of the different materials are greater than 15000 MPa. Further preferably, Young's modulus of the different materials are greater than 18000 MPa. In some embodiments, the material of the housing panel 2222 and/or the housing side panel 2226 includes but is not limited to AcrYlonitrile butadiene stYrene (ABS), PolYstYrene (PS), high High impact polYstYrene (HIPS), PolYpropYlene (PP), PolYethYlene terephthalate (PET), PolYester (PES), PolYcarbonate (PC)), PolYamides (PA), PolYvinYl chloride (PVC), PolYurethanes (PU), PolYvinYlidene chloride (PVC), PolYethYlene (PE), PolYmethYl methacrYlate (PMMA), PolYetheretherketone (PEEK), Phenolics (PF), Urea-formaldehYde (UF), Melamine-formaldehYde (MF), metals, alloy (such as aluminum alloy, chromium-molybdenum steel, scandium alloy, magnesium alloy, titanium alloy, magnesium-lithium alloy, nickel alloy, etc.), glass fiber or carbon fiber, or the like, or any combination thereof. In some embodiments, the material of the housing panel 2222 is glass fiber, carbon fiber, PolYcarbonate (PC), PolYamides (PA), or the like, or any combination thereof. In some embodiments, the material of the housing panel 2222 and/or the housing side panel 2226 may be made by mixing carbon fiber and polycarbonate (PC) in a certain proportion. In some embodiments, the material of the housing panel 2222 and/or the housing side panel 2226 may be made by mixing carbon fiber, glass fiber, and PolYcarbonate (PC) in a certain proportion. In some embodiments, the material of the housing panel 2222 and/or the housing side panel 2226 may be made by mixing glass fiber and PolYcarbonate (PC) in a certain proportion, or it may be made by mixing glass fiber and PolYamides (PA) in a certain proportion.

It should be noted that the housing panel 2222, the housing back panel 2224, the housing side panel 2226, and a housing bracket 2228 may correspond to the housing panel 222, the housing back panel 224, the housing side panel 226, and the hosing bracket 228 described in the foregoing embodiments.

As shown in FIG. 118, the housing panel 2222, the housing back panel 2224, and the housing side panel 2226 may form an integral structure with a certain accommodation space. In some embodiments, in the integral structure, the vibration transmission plate 2214 may be connected to the magnetic circuit component 2210 by the connector 2216. The two ends of the magnetic circuit component 2210 may be connected to the first magnetically conductive unit 2204 and the second magnetically conductive unit 2206, respectively. The vibration transmission plate 2214 may be fixed inside the integral structure by the housing bracket 2228. In some embodiments, the housing side panel 2226 may have a stepped structure for supporting the housing bracket 2228. After the housing bracket 2228 is fixed on the housing side panel 2226, the housing panel 2222 may be fixed on the housing bracket 2228 and the housing side panel 2226 at the same time, or separately fixed on the housing bracket 2228 or the housing side panel 2226. Under the circumstances, optionally, the housing side panel 2226 and the housing bracket 2228 may be integrally formed. In some embodiments, the housing bracket 2228 may be directly fixed on the housing panel 2222 (for example, by glue, clamping, welding, threaded connecting, etc.). The fixed housing panel 2222 and housing bracket 2228 may be then fixed to the housing side panel (for example, by glue, clamping, welding, threaded connecting, etc.). Under the circumstances, optionally, the housing bracket 2228 and the housing panel 2222 may be integrally formed.

Figure 119:
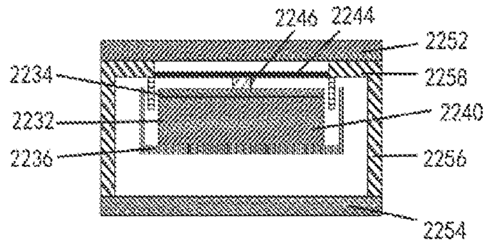

As shown in FIG. 119, the speaker in the embodiment may mainly include a magnetic circuit component 2240 and a housing. The magnetic circuit component 2240 may include a first magnetic unit 2232, a first magnetically conductive unit 2234, and a second magnetically conductive unit 2236. In the integral structure, a vibration transmission plate 2244 may be connected to the magnetic circuit component 2240 by a connector 2246.

In some embodiments, the magnetic circuit components in the above embodiments may have a same structure, which refers to a structure for providing a magnetic field. The housings in the above embodiments may have a same structure, which refers to a unit for accommodating the magnetic circuit components. The vibration transmission plates in the above embodiments may have a same structure, which refers to a structure for adjusting formants of the low frequency. Similarly, the connections in the above embodiments refer to units connecting the vibration transmission plates and the magnetic circuit components.

This embodiment is different from the embodiment provided in FIG. 118 is that the housing bracket 2258 and the housing side panel 2256 may be integrally formed. The housing panel 2252 may be fixed to an end of the housing side panel 2256 connected to the housing bracket 2258 (for example, by glue, clamping, welding, threaded connecting, etc.), and the housing back 2254 may be fixed to the other end of the housing side panel 2256 (for example, by glue, clamping, welding, threaded connecting, etc.). Under the circumstances, optionally, the housing bracket 2258 and the housing side panel 2256 may be splitable and combined structures. The housing panel 2252, the housing back panel 2254, the housing bracket 2258, and the housing side panel 2256 may be all fixedly connected by glue, clamping, welding, threaded connecting, etc.

Figure 120:
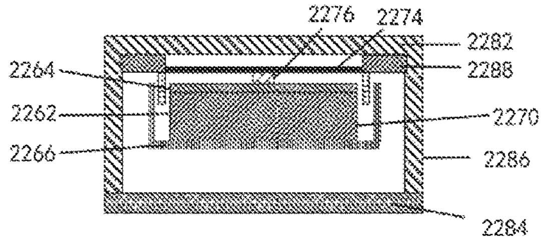

As shown in FIG. 120, the speaker in the embodiment may mainly include a magnetic circuit component 2270 and a housing. The magnetic circuit component 2270 may include a first magnetic unit 2262, a first magnetically conductive unit 2264, and a second magnetically conductive unit 2266. In the integral structure, a vibration transmission plate 2274 may be connected to the magnetic circuit component 2270 by a connector 2276.

In some embodiments, the magnetic circuit components in the above embodiments may have a same structure, which refers to a structure for providing a magnetic field. The housings in the above embodiments may have a same structure, which refers to a unit for accommodating the magnetic circuit components. The vibration transmission plates in the above embodiments may have a same structure, which refers to a structure for adjusting formants of the low frequency. Similarly, the connections in the above embodiments refer to units connecting the vibration transmission plates and the magnetic circuit components.

The difference between this embodiment and the embodiment provided in FIG. 118 and FIG. 119 is that the housing panel 2282 and the housing side panel 2286 may be integrally formed. The housing back panel 2284 may be fixed on an end of the housing side panel 2286 opposite to the housing side panel 2282 (for example, by glue, clamping, welding, threaded connecting, etc.). The housing bracket 2288 may be fixed on the housing panel 2282 and/or the housing side 2286 by glue, clamping, welding, or threaded connecting. Under the circumstances, optionally, the housing bracket 2288, the housing panel 2282, and the housing side panel 2286 may be integrally formed.

Figure 121:
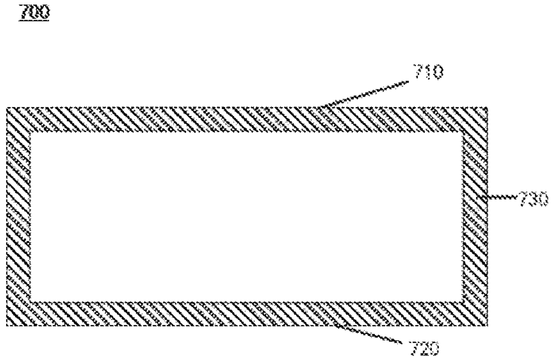

FIG. 121 is a structural diagram illustrating a housing of a speaker according to some embodiments of the present disclosure. As shown in FIG. 121, the housing 700 may include a housing panel 710 facing the human body, a housing back panel 720 opposite to the housing panel 710, and a housing side panel 730. The housing panel 710 may be in contact with the human body and transmits the vibration of the bone conduction speaker to the auditory nerve of the human body.

In some embodiments, the vibration of an earphone core may drive the housing panel 710 and the housing back panel 720 to vibrate. The vibration of the housing panel 710 may have a first phase, and the vibration of the housing back panel 720 may have a second phase. When the vibration frequencies of the housing panel 710 and the housing back panel 720 is within a range of 2000 Hz to 3000 Hz, an absolute value of a difference between the first phase and the second phase may be less than 60 degrees.

In some embodiments, when the overall rigidity of the housing 700 is relatively large, the vibration amplitudes and phases of the housing panel 710 and the housing back panel 720 keep the same or substantially the same (the housing side panel 730 does not compress air and therefore does not generate sound leakage) within a certain frequency range, so that a first leaked sound signal generated by the housing panel 710 and a second leaked sound signal generated by the housing back panel 720 may be superimposed on each other. The superposition may reduce the amplitude of the first leaked sound wave or the second leaked sound wave, thereby achieving the purpose of reducing the sound leakage of the housing 700. In some embodiments, the certain frequency range includes at least the portion with a frequency greater than 500 Hz. Preferably, the certain frequency range includes at least the portion with a frequency greater than 600 Hz. Preferably, the certain frequency range includes at least the portion with a frequency greater than 800 Hz. Preferably, the certain frequency range includes at least the portion with a frequency greater than 1000 Hz. Preferably, the certain frequency range includes at least the portion with a frequency greater than 2000 Hz. More preferably, the certain frequency range includes at least the portion with a frequency greater than 5000 Hz. More preferably, the certain frequency range includes at least the portion with a frequency greater than 8000 Hz. Further preferably, the certain frequency range includes at least the portion with a frequency greater than 10000 Hz.

In some embodiments, the rigidity of the housing of the bone conduction speaker may affect the vibration amplitudes and phases of different parts of the housing (for example, the housing panel, the housing back panel, and/or the housing side panel), thereby affecting the sound leakage of the bone conduction speaker. In some embodiments, when the housing of the bone conduction speaker has a relatively large rigidity, the housing panel and the housing back panel may keep the same or substantially the same vibration amplitude and phase at higher frequencies, thereby significantly reducing the sound leakage of the bone conduction earphone.

In some embodiments, the higher frequency may include a frequency not less than 1000 Hz, for example, a frequency between 1000 Hz and 2000 Hz, a frequency between 1100 Hz and 2000 Hz, a frequency between 1300 Hz and 2000 Hz, a frequency between 1500 Hz and 2000 Hz, a frequency between 1700 Hz-2000 Hz, a frequency between 1900 Hz-2000 Hz. Preferably, the higher frequency mentioned herein may include a frequency not less than 2000 Hz, for example, a frequency between 2000 Hz and 3000 Hz, a frequency between 2100 Hz and 3000 Hz, a frequency between 2300 Hz and 3000 Hz, a frequency between 2500 Hz and 3000 Hz, a frequency between 2700 Hz-3000 Hz, or a frequency between 2900 Hz-3000 Hz. Preferably, the higher frequency may include a frequency not less than 4000 Hz, for example, a frequency between 4000 Hz and 5000 Hz, a frequency between 4100 Hz and 5000 Hz, a frequency between 4300 Hz and 5000 Hz, a frequency between 4500 Hz and 5000 Hz, a frequency between 4700 Hz and 5000 Hz, or a frequency between 4900 Hz-5000 Hz. More preferably, the higher frequency may include a frequency not less than 6000 Hz, for example, a frequency between 6000 Hz and 8000 Hz, a frequency between 6100 Hz and 8000 Hz, a frequency between 6300 Hz and 8000 Hz, a frequency between 6500 Hz and 8000 Hz, a frequency between 7000 Hz-8000 Hz, a frequency between 7500 Hz-8000 Hz, or a frequency between 7900 Hz-8000 Hz. More preferably, the higher frequency may include a frequency not less than 8000 Hz, for example, a frequency between 8000 Hz-12000 Hz, a frequency between 8100 Hz-12000 Hz, a frequency between 8300 Hz-12000 Hz, a frequency between 8500 Hz-12000 Hz, a frequency between 9000 Hz-12000 Hz, a frequency between 10000 Hz-12000 Hz, or a frequency between 11000 Hz-12000 Hz.

Keeping vibration amplitudes of the housing panel and the housing back panel the same or substantially the same refers that a ratio of the vibration amplitudes of the housing panel and the housing back panel is within a certain range. For example, the ratio of the vibration amplitudes of the housing panel and the housing back panel is between 0.3 and 3. Preferably, the ratio of the vibration amplitudes of the housing panel and the housing back panel is between 0.4 and 2.5. Preferably, the ratio of the vibration amplitudes of the housing panel and the housing back panel is between 0.4 and 2.5. Preferably, the ratio of the vibration amplitudes of the housing panel and the housing back panel is between 0.5 and 1.5. More preferably, the ratio of the vibration amplitudes of the housing panel and the housing back panel is between 0.6 and 1.4. More preferably, the ratio of the vibration amplitudes of the housing panel and the housing back panel is between 0.7 and 1.2. More preferably, the ratio of the vibration amplitudes of the housing panel and the housing back panel is between 0.75 and 1.15. More preferably, the ratio of the vibration amplitudes of the housing panel and the housing back panel is between 0.8 and 1.1. More preferably, the ratio of the vibration amplitudes of the housing panel and the housing back panel is between 0.85 and 1.1. More preferably, the ratio of the vibration amplitudes of the housing panel and the housing back panel is between 0.9 and 1.05. In some embodiments, the vibrations of the housing panel and the housing back panel may be represented by other physical quantities that can characterize the vibration amplitude. For example, sound pressures generated by the housing panel and the housing back panel at a point in the space may be used to represent the vibration amplitudes of the housing panel and the housing back panel.

Keeping the vibration phases of the housing panel and the housing back panel the same or substantially the same refers that a difference between the vibration phases of the housing panel and the housing back panel is within a certain range. For example, the difference between the vibration phases of the housing panel and the housing back panel is between −90° and 90°. Preferably, the difference between the vibration phases of the housing panel and the housing back panel is between −80° and 80°. Preferably, the difference between the vibration phases of the housing panel and the housing back panel is between −60° and 60°. Preferably, the difference between the vibration phases of the housing panel and the housing back panel is between −45° and 45°. More preferably, the difference between the vibration phases of the housing panel and the housing back panel is between −30° and 30°. More preferably, the difference between the vibration phases of the housing panel and the housing back panel is between −20° and 20°. More preferably, the difference between the vibration phases of the housing panel and the housing back panel is between −15° and 15°. More preferably, the difference between the vibration phases of the housing panel and the housing back panel is between −12° and 12°. More preferably, the difference between the vibration phases of the housing panel and the housing back panel is between −10° and 10°. More preferably, the difference between the vibration phases of the housing panel and the housing back panel is between −8° and 8°. More preferably, the difference between the vibration phases of the housing panel and the housing back panel is between −6° and 6°. More preferably, the difference between the vibration phases of the housing panel and the housing back panel is between −5° and 5°. More preferably, the difference between the vibration phases of the housing panel and the housing back panel is between −4° and 4°. More preferably, the difference between the vibration phases of the housing panel and the housing back panel is between −3° and 3°. More preferably, the difference between the vibration phases of the housing panel and the housing back panel is between −2° and 2°. More preferably, the difference between the vibration phases of the housing panel and the housing back panel is between −1° and 1°. More preferably, the difference between the vibration phases of the housing panel and the housing back panel is 0°.

Figure 122:
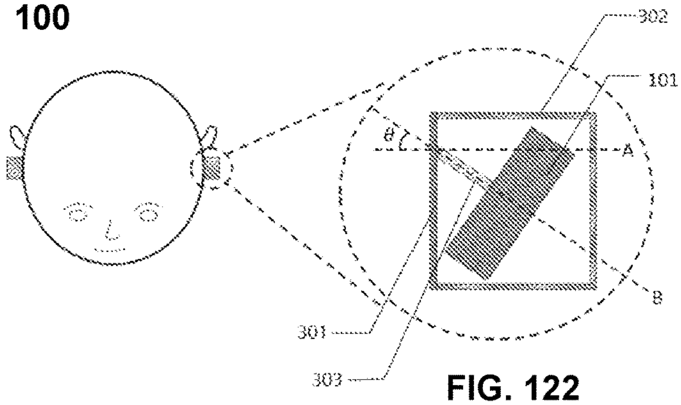

FIG. 122 is a structural diagram and an application scenario of a loudspeaker device according to some embodiments of the present disclosure. As shown in FIG. 122, in some embodiments, the loudspeaker device may include a driving component 101, a transmission component 303, a panel 301, a housing 302, or the like.

It should be noted that the housing, and the core housing in the above embodiments may be a same structure, which refers to a structure for accommodating the magnetic circuit components. The panel and the housing panel may be a same structure, which refers to a structure for transmitting sound (s) in contact with the human body. The driving device 101 may be equivalent to the earphone core in the foregoing embodiments.

In some embodiments, the driving device 101 may transmit vibration signal(s) to the panel 301 and/or the housing 302 through the transmission component 303, so as to transmit a sound to human body by contacting human skin through the panel 301 or the housing 302. In some embodiments, the panel 301 and/or the housing 302 of a speaker may be in contact with human skin at the tragus, so as to transmit a sound to human body. In some embodiments, the panel 301 and/or the housing 302 may be in contact with human skin on the back of the auricle.

As illustrated in FIG. 122, according to speakers provided in some embodiments of the present disclosure, a straight line B (or a vibrating direction of a driving device 101) of a driving force generated by the driving device 101 and a normal line A of the panel 301 may form an angle θ. In other words, the straight line B is not parallel to the normal line A.

Further, the panel 301 has an area that contacts or abuts the user's body, such as human skin. It should be understood that when the panel 301 is covered with other materials (such as silicone and other soft materials) to enhance the user's wearing comfortability, the panel 301 and the user's body are not in direct contact, but abut against each other. In some embodiments, when the speaker is worn on the user's body, the whole area of the panel 301 contacts or abuts the user's body. In some embodiments, when the loudspeaker device is worn on the user's body, a part of the panel 301 contacts or abuts the user's body. In some embodiments, the area of the panel 301 contacting or abutting the user's body may account for more than 50% of the entire area of the panel 301. More preferably, it may account for more than 60% of the entire area of the panel 301. In general, the area of the panel 301 contacting or abutting the user's body may be flat or curved.

In some embodiments, when the area of the panel 301 contacting or abutting the user's body is a flat surface, its normal line meets the general definition, that is, a dashed line perpendicular to the flat surface. In some embodiments, when the area contacting or abutting the user's body of the panel 301 is a curved surface, its normal line is the average normal line of the area.

In some embodiments, the average normal line may be defined as follows:

$$\hat{r}_0 = \frac{\oiint_S \hat{r} ds}{\left|\oiint_s \hat{r} ds\right|}. \quad (20)$$

In Equation (20), $\hat{r}_0$ is the average normal line; $\hat{r}$ is the normal line of any point on the curved surface; ds is a surface unit.

Further, the curved surface is a quasi-flat surface that is close to the flat surface. That is, the curved surface is a surface that an angle between a normal line of any point of at least 50% of the area on the curved surface and the average normal line is less than a set threshold. In some embodiments, the set threshold may be less than 10°. In some embodiments, the set threshold may be less than 5°.

In some embodiments, the straight line B of the driving force and the normal line A' of the area of the panel 301 for contacting or abutting the user's body may form the angle θ. A value range of the angle θ may be 0<θ<180°. Further, the value range may be 0<θ<180° and not equal to 90°. In some embodiments, it is assumed that the straight line B has a positive direction pointing to the outside of the loudspeaker device, and the normal line A of the panel 301 (or the normal line A' of a contact surface of the panel 301 and the human skin) also has a positive direction pointing to the outside of the loudspeaker device. Thus, the angle θ formed by the normal line A or A' and the straight line B in the positive direction is an acute angle, that is, 0<θ<90°.

Figure 123:
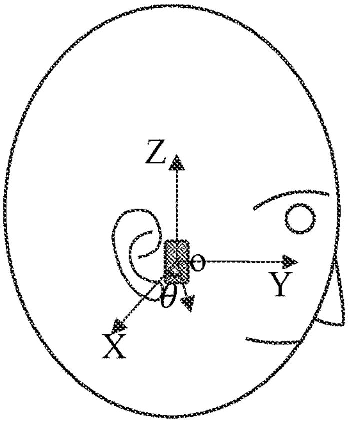

FIG. 123 is a schematic diagram illustrating a direction of an included angle according to some embodiments of the present disclosure. As shown in FIG. 123, in some embodiments, a driving force generated by a driving device 101 has a component in a first quadrant and/or a third quadrant of an XOY plane coordinate system. As used herein, the XOY plane coordinate system is a reference coordinate system whose origin O is located on a contact surface between the panel and/or the housing and the human body after the loudspeaker device is worn on the human body. The X axis is parallel to the coronal axis of the human body, the Y axis is parallel to the sagittal axis of the human body, and the positive direction of the X axis faces the outside of the human body, the positive direction of the Y axis faces the front of the human body. Quadrants should be understood as four regions divided by the horizontal axis (such as X axis) and the vertical axis (such as Y axis) in a rectangular coordinate system. Each region is a quadrant. The quadrant is centered at the origin, and the X axis and Y axis are the dividing lines. The upper right region (the region enclosed by the positive half axis of the X axis and the positive half axis of the Y axis) is the first quadrant, the upper left region (the region enclosed by the negative half axis of the X axis and the positive half axis of the Y axis) is the second quadrant, the lower left region (the region enclosed by the positive half axis of the X axis and the negative half axis of the Y axis) is the third quadrant, and the lower right region (the region enclosed by the positive half axis of the X axis and the negative half axis of the Y axis) is the fourth quadrant. The points on the X axis and the Y axis do not belong to any quadrant. It should be understood that the driving force in the embodiment may be directly located in the first quadrant and/or the third quadrant of the XOY plane coordinate system, or the driving force may point to other directions, but the projection or component in the first quadrant and/or the third quadrant is not equal to 0 in the XOY plane coordinate system, and the projection or component in a direction of a Z axis may be equal to 0 or not equal to 0. As used herein, the Z axis is perpendicular to the XOY plane and passes through the origin O. In some embodiments, the angle θ between the straight line of the driving force and the normal line of the area contacting or abutting the user's body of the panel may be any acute angle, for example, the range of the angle θ is 5°~80°. More preferably, the range is 15°~70°. More preferably, the range is 25°~60°. More preferably, the range is 25°~50°. More preferably, the range is 28°~50°. More preferably, the range is 30°~39°. More preferably, the range is 31°~38°. More preferably, the range is 32°~37°. More preferably, the range is 33°~36°. More preferably, the range is 33°~35.8°. More preferably, the range is 33.5°~35°. Specifically, the angle θ may be 26°, 27°, 28°, 29°, 30°, 31°, 32°, 33°, 34°, 34.2°, 35°, 35.8°, 36°, 37°, 38°, etc., wherein the error is controlled within 0.2°. It should be noted that the illustrations of the driving force direction described above should not be interpreted as a limitation of the driving force in the present disclosure. In other embodiments, the driving force may also have component in the second and fourth quadrants of the XOY plane coordinate system, even the driving force may be located on the Y axis, or the like.

Figure 124:
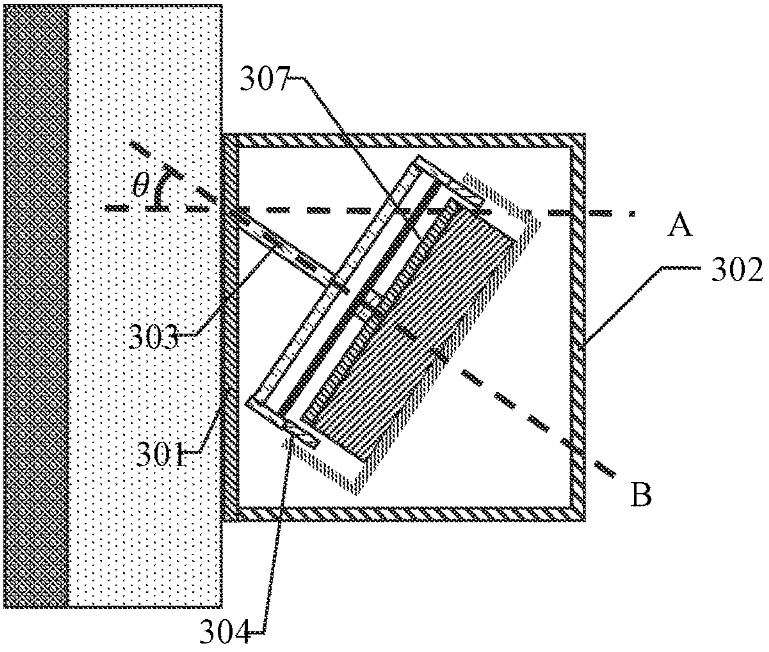

FIG. 124 is a structural diagram of a loudspeaker device acting on human skin and bones according to some embodiments of the present disclosure. As shown in FIG. 124, the loudspeaker device may include a driving device 101 (also referred to as a transducer in other embodiments), a transmission component 303, a panel 301, and a housing 302.

In some embodiments, the straight line of the driving force is collinear or parallel to the straight line of the vibration of the driving device 101. For example, in a driving device 101 based on the moving-coil principle, the direction of the driving force may be the same as or opposite to the vibrating direction of the coil and/or the magnetic circuit component. The panel 301 may have a flat surface or curved surface, or there are a plurality of protrusions or grooves on the panel 301. In some embodiments, when the loudspeaker device is worn on the user's body, the normal line of the area contacting or abutting the user's body of the panel 301 is not parallel to the straight line of the driving force. In general, the area contacting or abutting the user's body of the panel 301 is flat relatively. Specifically, it may have a flat surface, or a quasi-flat plane with little curvature. When the area contacting or abutting the user's body of the panel 301 has a flat surface, the normal line of any point on it may be the normal line of the area. When the panel 301 used to contact the user's body is non-planar, the normal line of the area may be the average normal line. At this time, the normal line A of the panel 301 may be parallel or coincident to the normal line A' of the contact surface between the panel 301 and human skin. More detailed definition of the average normal line may be found in FIG. 122 and the descriptions thereof. In some other embodiments, when the panel 301 used to contact the user's body is non-planar, the normal line of the area may also be determined as follows: selecting a certain point in an area when the panel 301 is in contact with human skin, determining a tangent plane of the panel 301 at the selected point, determining a straight line that passes through the point and is perpendicular to the tangent plane, and designating the straight line as the normal line of the panel 301. When the panel 301 used to contact the user's body is non-planar, different points correspond to different tangent planes of the panel 301, and the determined normal line may also be different. At this time, the normal line A' is not parallel to the normal line A of the panel 301. According to a specific embodiment of the present disclosure, the straight line of the driving force (or the straight line of the vibration of the driving device 101) and the normal line of the area may form an angle θ, where 0<θ<180°. In some embodiments, when the straight line of the driving force has a positive direction pointing to the outside of the loudspeaker device from the panel (or the contact surface between the panel 301 and/or the housing 302 and human skin), and the normal line of the designated panel 301 (or the contact surface between the panel 301 and/or the housing and human skin) has a positive direction pointing to the outside of the loudspeaker device, the angle formed by the two straight lines in the positive direction is an acute angle. As illustrated in FIG. 124, in some embodiments, a coil 304 and a magnetic circuit component 307 are both ring-shaped. In some embodiments, the coil 304 and the magnetic circuit component 307 have axes parallel to each other. The axis of the coil 304 or the magnetic circuit component 307 is perpendicular to the radial plane of the coil 304 and/or the magnetic circuit component 307. In some embodiments, the coil 304 and the magnetic circuit component 307 have the same central axis. The central axis of the coil 304 is perpendicular to the radial plane of the coil 304 and passes through the geometric center of the coil 304. The central axis of the magnetic circuit component 307 is perpendicular to the radial plane of the magnetic circuit component 307 and passes through the geometric center of the magnetic circuit component 307. The axis of the coil 304 or the magnetic circuit component 307 and the normal line of the panel 301 may form the angle θ described above.

In some embodiments, the magnetic circuit components in the above embodiments may have a same structure, which refers to a structure for providing a magnetic field. The coils in the above embodiments may have a same structure, which refers to a structure for receiving external electrical signals and converting the electrical signals into mechanical vibration signals under the action of a magnetic field.

Merely by way of example, the relationship between the driving force F and the deformation S of the skin will be illustrated below combined with FIG. 124. When the straight line of the driving force generated by the driving device 101 is parallel to the normal line of the panel 301 (i.e., the angle θ is zero), the relationship between the driving force and the total deformation of the skin is:

$$F_{\perp}=S_{\perp}\times E\times A/h, \quad (21)$$

where, $F_{\perp}$ denotes the driving force, $S_{\perp}$ denotes the total deformation of the skin in the direction perpendicular to the skin, E denotes the elastic modulus of the skin, A denotes the contact area between the panel 301 and the skin, h denotes a total thickness of the skin (i.e., the distance between the panel and the bone).

When the straight line of the driving force generated by the driving device 101 is parallel to the normal line of the area contacting or abutting the user's body of the panel (i.e., the angle θ is 90°), the relationship between the driving force in the vertical direction and the total deformation of the skin may be shown in Equation (22):

$$F_{//}=S_{//}\times G\times A/h, \quad (22)$$

where, $F_{//}$ denotes the driving force, $S_{//}$ denotes the total deformation of the skin in the direction parallel to the skin, G denotes the shear modulus of the skin, A denotes the contact area between the panel 301 and the skin, h denotes total thickness of the skin (i.e., the distance between the panel and the bone).

The relationship between the shear modulus G and the elastic modulus E is:

$$G=E/2(1+\gamma), \quad (23)$$

where, γ denotes the Poisson's ratio of the skin 0<γ<0.5. Thus the shear modulus G is less than the elastic modulus E, and under the same driving force, the corresponding total deformation of the skin $S_{//}>S_{\perp}$. Generally, the Poisson's ratio of the skin is close to 0.4.

When the straight line of the driving force generated by the driving device 101 is not parallel to the normal line of the area contacting or abutting the user's body of the panel 301, the driving force in the horizontal direction and the driving force in the vertical direction are expressed as the Equation (24) and Equation (25), respectively:

$$F_{\perp}=F\times\cos(\theta), \quad (24)$$

$$F_{//}=F\times\sin(\theta), \quad (25)$$

where, the relationship between the driving force F and the deformation S of the skin may be shown in the following equation (26):

$$S = \sqrt[2]{S_{\perp}^2 + S_{//}^2} = \frac{h}{A} \times F \times \sqrt[2]{(\cos(\theta)/E)^2 + (\sin(\theta)/G)^2}, \tag{26}$$

Figure 125:
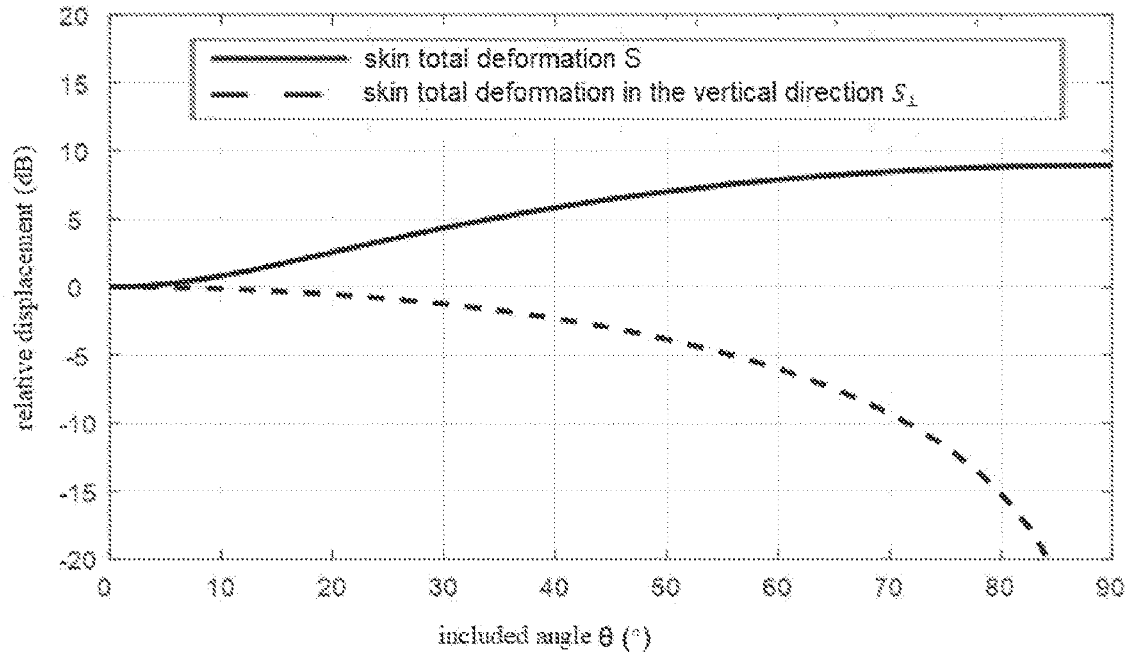

When the Poisson's ratio is 0.4, the descriptions regarding the relationship between the angle θ and the total deformation of the skin may be found in FIG. 125.

FIG. 125 is a diagram illustrating an angle-relative displacement relationship of a loudspeaker device according to some embodiments of the present disclosure. As shown in FIG. 125, the relationship between the angle θ and the total deformation of the skin is that the greater the angle θ, and the greater the relative displacement, the greater the total deformation S of the skin. The greater the angle θ, and the less the relative displacement, the less the deformation $S_{\perp}$ of the skin in the vertical direction of the skin. When the angle θ is close to 90°, the deformation $S_{\perp}$ of the skin in the vertical direction of the skin gradually tends to 0.

In some embodiments, the volume of the loudspeaker device in the low frequency part is positively correlated with the total deformation of the skin S. The larger the S, the larger the volume of the loudspeaker device in low frequency. The volume of the loudspeaker device in the high frequency part is positively correlated with the deformation $S_{\perp}$ of the skin in the vertical direction of the skin. The larger the $S_{\perp}$, the larger the volume of the loudspeaker device in low frequency.

Further, when the Poisson's ratio of the skin is 0.4, the detailed illustration of the relationship between the angle θ and total deformation of the skin S, the deformation $S_{\perp}$ of the skin in the vertical direction of the skin may be found in FIG. 125. As shown in FIG. 125, the relationship between the angle θ and the total deformation of the skin S is that the larger the angle θ and the larger the total deformation of the skin S, the larger the volume of the corresponding loudspeaker device in the low frequency part. As shown in FIG. 125, the relationship between the angle θ and the deformation $S_{\perp}$ of the skin in the vertical direction of the skin is that the larger the angle θ and the smaller the deformation $S_{\perp}$ of the skin in the vertical direction of the skin, the smaller the volume of the corresponding loudspeaker device in the high frequency part.

It may be seen from Equation (26) and curves in the FIG. 125 that with the increase of the angle θ, the speed at which the total deformation of the skin S increases is different from the speed at which the deformation $S_{\perp}$ of the skin in the vertical direction of the skin decreases. The speed at which the total deformation of the skin S increases becomes faster at first, and then becomes slower, and the speed at which the deformation $S_{\perp}$ of the skin in the vertical direction of the skin decreases becomes faster and faster. In order to balance the volume of the loudspeaker device in the low frequency part and the high frequency part, the angle θ should be at an appropriate value, for example, within a range of θ is 5°~80°, 15°~70°, 25°~═°, 25°~35°, 25°~30°, or the like.

Figure 126:
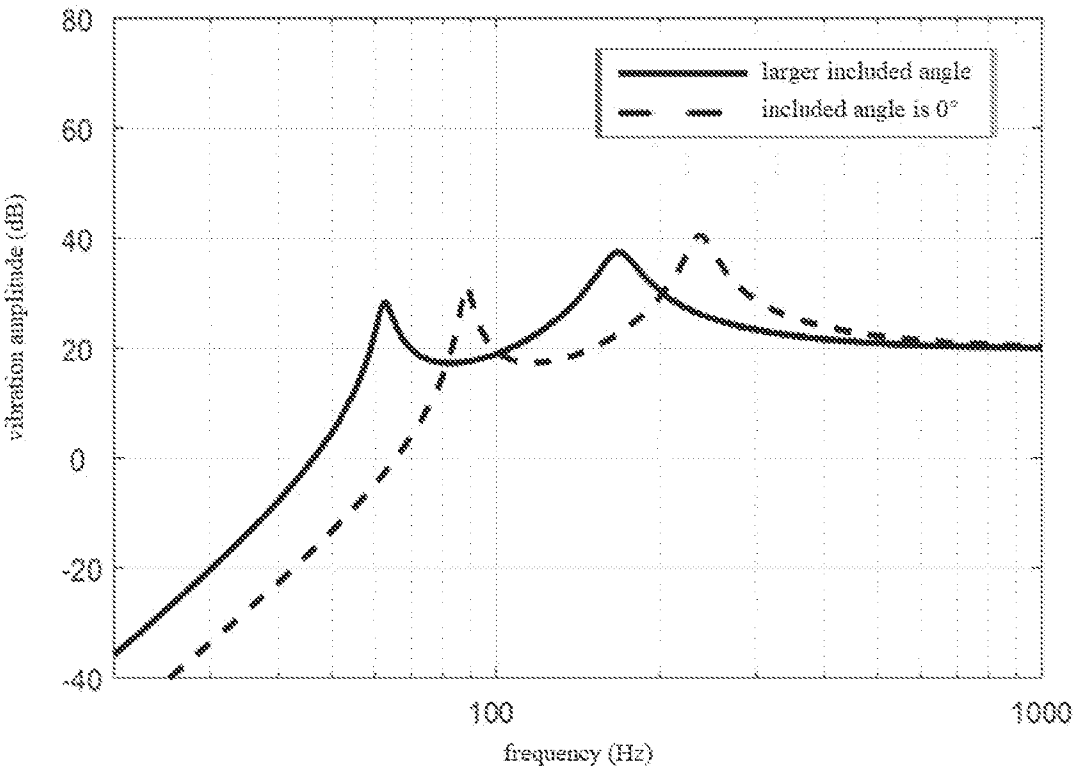

FIG. 126 is a schematic diagram illustrating frequency response curves of a loudspeaker device in a low-frequency part correspond to different angles θ according to some embodiments in the present disclosure. As shown in FIG. 126, the panel 301 is in contact with the skin and transmits vibration to the skin. During this process, the skin may also affect the vibration of the loudspeaker device, so as to affect the frequency response curve of the loudspeaker device. From the above analysis, it is found that the larger the included angle, the larger the total deformation of the skin under the same driving force, and for the loudspeaker device, it is equivalent to that the elasticity of the skin relative to the panel 301 decreases. It may be further understood that when a certain angle θ is formed between the straight line of the driving force generated by the driving device 101 and the normal line of the area contacting or abutting the user's body of the panel 301. Especially when the angle θ increases, the resonance peak in the low frequency area of the frequency response curve may be adjusted to a lower frequency area, thus making the low frequency to dive deeper and increasing signals in the low frequencies. Compared with other techniques to improve the low frequency components of the sound (e.g., adding a vibration transmission plate to the loudspeaker device), setting the included angle may suppress the increase of the vibration effectively while increasing the energy of the low frequency, so as to reduce the sense of vibration, which improves the sensitivity of the low frequency of the loudspeaker device significantly, and improves the sound quality and human experience. It should be noted that, in some embodiments, the increase of the low frequency and the reduction of the vibration may be expressed as when the angle θ increases in the range of (0, 90°), the energy in the range of the low frequency of the vibration or the sound signal(s) increases, and the sense of vibration also increases, but the degree of energy increase in the low frequency range is greater than the degree of vibration sensation increase. Thus, in relative effect, the vibration sensation is reduced relatively. It may be seen in FIG. 126, when the included angle is relatively large, the resonance peak in the low frequency area may appear in a lower frequency range, which extends the flat part of the frequency curvature, so as to improve the sound quality of the speaker.

It should be noted that the illustration of the loudspeaker device described above is only a specific example, and should not be regarded as the only feasible implementation. Obviously, for those skilled in the art, after the basic principles of the loudspeaker device, it may be possible to make various modifications and changes in forms and details of the specific methods and steps for implementing the loudspeaker device without departing from the principles, but the modifications and changes are still within the scope illustrated above. For example, the minimum angle θ between the straight line of the driving force generated by the driving device and the normal line of the area contacting or abutting the user's body of the panel may be any acute angle. The acute angle herein is not limited to 5°~80° described above. The angle θ may be less than 5°, such as 1°, 2°, 3°, 4°, etc. In other embodiments, the angle θ may be larger than 80° and less than 90°, such as 81°, 82°, 85°, etc. In some embodiments, the specific value of the angle θ may not be an integer (e.g., 81.3°, 81.38°). Such deformations are all within the protection scope of the present disclosure.

Figure 127:
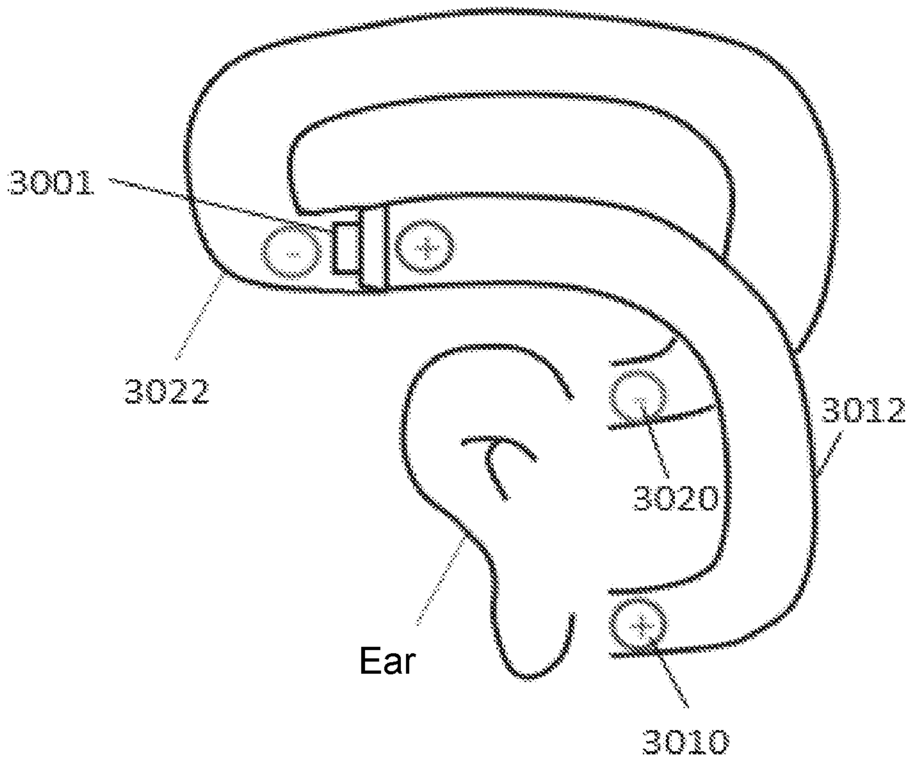

In some embodiments, the loudspeaker device described above may also transmit the sound to the user through air conduction. When the air condition is used to transmit the sound, the loudspeaker device may include one or more sound sources. The sound source may be located at a specific position of the user's head, for example, the top of the head, a forehead, a cheek, a temple, an auricle, the back of an auricle, etc., without blocking or covering an ear canal. FIG. 127 is a schematic diagram illustrating transmitting a sound through air conduction according to some embodiments of the present disclosure.

As shown in FIG. 127, a sound source 3010 and a sound source 3020 may generate sound waves with opposite phases ("+" and "−" in the figure indicate the opposite phases). For brevity, the sound source mentioned herein may refer to sound outlets of the loudspeaker device that may output sounds. For example, the sound source 3010 and the sound source 3020 may be two sound outlets respectively located at specific positions of the loudspeaker device (for example, the core housing 82, or the circuit housing 100).

In some embodiments, the sound source 3010 and the sound source 3020 may be generated by the same vibration device 3001. The vibration device 3001 may include a diaphragm (not shown in the figure). When the diaphragm is driven to vibrate by an electric signal, the front side of the diaphragm may drive the air to vibrate, the sound source 3010 may be formed at the sound outlet through a sound guiding channel 3012, the back of the diaphragm may drive air to vibrate, and the sound source 3020 may be formed at the sound outlet through a sound guiding channel 3022. The sound guiding channel may refer to a sound transmission route from the diaphragm to the corresponding sound outlet. In some embodiments, the sound guiding channel may be a route surrounded by a specific structure on the loudspeaker device (for example, the core housing 82, or the circuit housing 100). It should be known that, in some alternative embodiments, the sound source 3010 and the sound source 3020 may also be generated by different vibrating diaphragms of different vibration devices, respectively.

Among the sounds generated by the sound source 3010 and the sound source 3020, one portion may be transmitted to the ear of the user to form the sound heard by the user. Another portion may be transmitted to the environment to form a leaked sound. Considering that the sound source 3010 and the sound source 3020 are relatively close to the ears of the user, for convenience of description, the sound transmitted to the ears of the user may be referred to as a near-field sound. The leaked sound transmitted to the environment may be referred to as a far-field sound. In some embodiments, the near-field/far-field sounds of different frequencies generated by the loudspeaker device may be related to a distance between the sound source 3010 and the sound source 3020. Generally speaking, the near-field sound generated by the loudspeaker device may increase as the distance between the two sound sources increases, while the generated far-field sound (the leaked sound) may increase with the increasing of the frequency.

For the sounds of different frequencies, the distance between the sound source 3010 and the sound source 3020 may be designed, respectively, so that a low-frequency near-field sound (e.g., a sound with a frequency of less than 800 Hz) generated by the loudspeaker device may be as large as possible and a high-frequency far-field sound (e.g., a sound with a frequency greater than 2000 Hz) may be as small as possible. In order to implement the above purpose, the loudspeaker device may include two or more sets of dual sound sources. Each set of the dual sound sources may include two sound sources similar to the sound source 3010 and the sound source 3020, and generate sounds with specific frequencies, respectively. Specifically, a first set of the dual sound sources may be used to generate low frequency sounds. A second set of the dual sound sources may be used to generate high frequency sounds. In order to obtain more low-frequency near-field sounds, the distance between two sound sources in the first set of the dual sound sources may be set to a larger value. Since the low-frequency signal has a longer wavelength, the larger distance between the two sound sources may not cause a large phase difference in the far-field, and not form excessive leaked sound in the far-field. In order to make the high-frequency far-field sound smaller, the distance between the two sound sources in the second set of the dual sound sources may be set to a smaller value. Since the high-frequency signal has a shorter wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

The beneficial effects of the embodiments of the present disclosure may include but be not limited to the following: (1) the circuit housing, the first housing sheath, and the second housing sheath may be separately molded, thereby avoiding damage to the control circuit or the battery caused by high temperature; (2) the circuit housing may be not completely covered by the first housing sheath and the second housing sheath, and the components used for user operation may be exposed, which is convenient for users to use; (3) there is no need to set up a separate space to place the flexible circuit board, thereby improving the space utilization; (4) the first contact surface and the second contact surface may be accurately positioned by aligning the magnetic adsorption to realize the matching connection with the corresponding joint, thereby improving the accuracy of the docking with the corresponding joint; (5) it has good elasticity which can maximize the comfort of wearing; (6) the composite vibration device composed of the vibration plate, the first vibration transmission plate, and the second vibration transmission plate may generate not less than two formants, which can produce a flatter frequency response curve in the audible range of the hearing system, thereby improving the sound quality of the loudspeaker device; (7) the stability of the voice coil installation may be ensured, thereby fundamentally ensuring the sound quality of the loudspeaker device. It should be noted that different embodiments may have different beneficial effects. In different embodiments, the possible beneficial effects may be any one or a combination of the above, and may be any other beneficial effects that may be obtained.

What is claimed is:

1. A loudspeaker device, comprising:

a speaker component, the speaker component including an earphone core and a core housing for accommodating the earphone core;

a circuit housing configured to accommodate a control circuit, wherein the control circuit drives the earphone core to vibrate to generate a sound, and the vibration of the earphone core includes at least two resonance peaks; and a key module disposed on the core housing, the key module including a key and an elastic bearing for supporting the key, the elastic bearing including an integrally formed bearing body and a support column.

2. The loudspeaker device of claim 1, wherein the support column is exposed from a key hole that is disposed on the core housing.

3. The loudspeaker device of claim 1, wherein the elastic bearing covers a key hole from an inner side of the core housing through the bearing body, and the key hole is disposed on the core housing.

4. The loudspeaker device of claim 1, wherein a ratio of a mass of the key module and a mass of the speaker component is not greater than 0.3.

5. The loudspeaker device of claim 1, further comprising: a support connector configured to be in contact with a head, the core housing being fixedly connected to the support connector.

6. The loudspeaker device of claim 5, wherein the core housing includes an outer side wall away from the head; and the key module is located at a middle position of the outer side wall, or the key module is located between the middle position and a top position of the outer side wall.

7. The loudspeaker device of claim 5, wherein a contact position of the support connector with the head includes at least one contact point, a distance between a center of the key module and the at least one contact point is not greater than a distance between a center of the core housing and the at least one contact point, and the center of the key module or the center of the core housing is a center of mass or a centroid.

8. The loudspeaker device of claim 7, wherein there is a first distance between the center of the key module and the at least one contact point, there is a second distance between the center of the core housing and the at least one contact point, and a ratio between the first distance and the second distance is not greater than 0.95.

9. The loudspeaker device of claim 1, wherein the earphone core includes a composite vibration component including a vibration plate and a second vibration transmission plate, and the composite vibration component generates the at least two resonance peaks.

10. The loudspeaker device of claim 9, wherein a stiffness coefficient of the vibration plate is greater than a stiffness coefficient of the second vibration transmission plate.

11. The loudspeaker device of claim 9, wherein the composite vibration component further includes a first vibration transmission plate, the first vibration transmission plate fixing the vibration plate and the second vibration transmission plate on the core housing.

12. The loudspeaker device of claim 1, wherein the second vibration transmission plate is disposed as a first annular body, and the first annular body is disposed with at least two first supporting rods converged towards a center of the first annular body; the vibration plate is disposed as a second annular body having a radius different from that of the second vibration transmission plate, and the second annular body is disposed with at least two second supporting rods converged towards a center of the second annular body; and the center of the first annular body is fixed at the center of the second annular body.

13. The loudspeaker device of claim 12, wherein the composite vibration component further includes:
a voice coil disposed on a lower side of the second annular body of the vibration plate;
a bottom plate;
an annular magnet disposed on the bottom plate;
an inner magnet concentrically disposed in the annular magnet;
an inner magnetic conduction plate disposed on a top surface of the inner magnet;
an annular magnetic conduction plate disposed on the annular magnet; and
a washer fixedly disposed above the annular magnetic conduction plate, the first annular body of the vibration transmission plate being fixedly connected to the washer.

14. The loudspeaker device of claim 12, wherein the at least two first supporting rods and the at least two second supporting rods are staggered.

15. The loudspeaker device of claim 12, wherein the center of the second annular body is a groove matching the center of the first annular body and the at least two first support rods.

16. The loudspeaker device of claim 1, wherein the earphone core includes:
a magnetic circuit component configured to provide a magnetic field;
a coil configured to drive the core housing to vibrate;
a vibration transmission plate configured to adjust the at least two resonance peaks; and
a connector connecting the vibration transmission plate and the magnetic circuit component.

17. The loudspeaker device of claim 16, wherein the core housing includes a housing panel, a housing back panel, and a housing side panel; the housing back panel is located on a side opposite to the housing panel, and arranged on two ends of the housing side panel, respectively; and the housing panel, the housing back panel, and the housing side panel form an accommodation space accommodating the magnetic circuit component, the coil, and the vibration transmission plate.

18. The loudspeaker device of claim 17, wherein the vibration transmission plate is connected to the core housing by a housing bracket, and the coil is disposed on the housing bracket.

19. The loudspeaker device of claim 18, wherein the housing bracket is a part of the core housing, or is a separate component.

20. The loudspeaker device of claim 17, wherein the housing panel, the housing back panel, and the housing side panel are combined in an integral manner, a separate combination manner, or a manner combining the integral manner and the separate combination manner.

* * * * *